(12) United States Patent
Manzari et al.

(10) Patent No.: US 12,707,140 B2
(45) Date of Patent: Aug. 11, 2026

(54) USER INTERFACES FOR CAMERA MANAGEMENT

(71) Applicant: Apple Inc., Cupertino, CA (US)

(72) Inventors: Johnnie B. Manzari, San Francisco, CA (US); Brandon J. Corey, Palo Alto, CA (US); Jonathan I. McCormack, Los Altos, CA (US); Marius Tico, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 18/204,881

(22) Filed: Jun. 1, 2023

(65) Prior Publication Data

US 2024/0080543 A1 Mar. 7, 2024

Related U.S. Application Data

(60) Provisional application No. 63/349,141, filed on Jun. 5, 2022.

(51) Int. Cl.
*H04N 23/62* (2023.01)

(52) U.S. Cl.
CPC .................................. *H04N 23/62* (2023.01)

(58) Field of Classification Search
CPC ........ H04N 23/62; H04N 23/67; H04N 23/69; H04N 23/71; H04N 23/74; H04N 23/90; H04N 23/815; H04N 23/951
See application file for complete search history.

(56) References Cited

U.S. PATENT DOCUMENTS 4,823,283 A 4/1989 Diehm et al.
4,933,702 A 6/1990 Komatsuzaki et al.
5,493,335 A 2/1996 Parulski et al.
5,557,358 A 9/1996 Mukai et al.
5,615,384 A 3/1997 Allard et al.
5,825,353 A 10/1998 Will
6,148,113 A 11/2000 Wolverton et al.
6,262,769 B1 7/2001 Anderson et al.
6,359,837 B1 3/2002 Tsukamoto
6,429,896 B1 8/2002 Aruga et al.
6,448,987 B1 9/2002 Easty et al.
6,483,878 B1 11/2002 Yonezawa et al.
6,522,347 B1 2/2003 Sakai et al.
6,809,724 B1 10/2004 Shiraishi et al.
(Continued)

FOREIGN PATENT DOCUMENTS

CA 2729392 A1 8/2011
CA 2965700 A1 5/2016
(Continued)

OTHER PUBLICATIONS

Extended European Search Report received for European Patent Application No. 24202041.0, mailed on Dec. 16, 2024, 9 pages.
(Continued)

*Primary Examiner* — Kelly L Jerabek
(74) *Attorney, Agent, or Firm* — YHE Law LLP

(57) ABSTRACT

The present disclosure generally relates to camera management. In some embodiments, methods, computer systems, user interface, and techniques are provided for managing the resolution of media, managing zoom controls for capturing media, managing predefined zoom levels for capturing media, and managing media stabilization.

36 Claims, 37 Drawing Sheets

(56) References Cited

U.S. PATENT DOCUMENTS

| | | | |
|---|---|---|---|
| 6,809,759 | B1 | 10/2004 | Chiang |
| 6,819,867 | B2 | 11/2004 | Mayer et al. |
| 6,900,840 | B1 | 5/2005 | Schinner et al. |
| 7,036,091 | B1 | 4/2006 | Nguyen |
| 7,463,304 | B2 | 12/2008 | Murray |
| 7,515,178 | B1 | 4/2009 | Fleischman et al. |
| 7,516,419 | B2 | 4/2009 | Petro et al. |
| 7,551,899 | B1 | 6/2009 | Nicolas et al. |
| 8,189,087 | B2 | 5/2012 | Misawa et al. |
| 8,203,640 | B2 | 6/2012 | Kim et al. |
| 8,350,945 | B2 | 1/2013 | Yumiki |
| 8,493,408 | B2 | 7/2013 | Williamson et al. |
| 8,624,836 | B1 | 1/2014 | Miller et al. |
| 8,638,371 | B2 | 1/2014 | Laberge et al. |
| 8,675,084 | B2 | 3/2014 | Bolton et al. |
| 8,723,988 | B2 | 5/2014 | Thorn |
| 8,736,704 | B2 | 5/2014 | Jasinski et al. |
| 8,736,716 | B2 | 5/2014 | Prentice |
| 8,742,890 | B2 | 6/2014 | Gocho et al. |
| 8,762,895 | B2 | 6/2014 | Mehta et al. |
| 8,817,158 | B2 | 8/2014 | Saito |
| 8,885,978 | B2 | 11/2014 | Cote et al. |
| 9,158,974 | B1 | 10/2015 | Laska et al. |
| 9,160,869 | B2 | 10/2015 | Schult |
| 9,172,866 | B2 | 10/2015 | Ito et al. |
| 9,185,291 | B1 | 11/2015 | Shabtay et al. |
| 9,223,486 | B2 | 12/2015 | Shin et al. |
| 9,250,797 | B2 | 2/2016 | Roberts et al. |
| 9,313,397 | B2 | 4/2016 | Harris et al. |
| 9,313,401 | B2 | 4/2016 | Frey et al. |
| 9,325,970 | B2 | 4/2016 | Sakayori |
| 9,342,230 | B2 | 5/2016 | Bastien et al. |
| 9,360,671 | B1 | 6/2016 | Zhou |
| 9,423,868 | B2 | 8/2016 | Iwasaki |
| 9,451,144 | B2 | 9/2016 | Dye |
| 9,462,169 | B2 | 10/2016 | Xie et al. |
| 9,467,812 | B2 | 10/2016 | Jung et al. |
| 9,544,563 | B1 | 1/2017 | Cheng et al. |
| 9,602,796 | B2 | 3/2017 | Chandra et al. |
| 9,609,221 | B2 | 3/2017 | Kim et al. |
| 9,639,945 | B2 | 5/2017 | Oberheu et al. |
| 9,667,881 | B2 | 5/2017 | Harris et al. |
| 9,692,964 | B2 | 6/2017 | Steinberg et al. |
| 9,716,825 | B1 | 7/2017 | Manzari et al. |
| 9,749,543 | B2 | 8/2017 | Kim et al. |
| 9,767,613 | B1 | 9/2017 | Bedikian et al. |
| 9,774,778 | B2 | 9/2017 | Miyakawa et al. |
| 9,785,323 | B2 | 10/2017 | Lu et al. |
| 9,852,768 | B1 | 12/2017 | Oh et al. |
| 9,928,411 | B2 | 3/2018 | Sugita et al. |
| 9,942,463 | B2 | 4/2018 | Kuo et al. |
| 9,967,467 | B2 | 5/2018 | Gao et al. |
| 9,973,674 | B2 | 5/2018 | Dye et al. |
| 9,990,727 | B2 | 6/2018 | Yoon et al. |
| 10,015,298 | B2 | 7/2018 | Yang et al. |
| 10,025,462 | B1 | 7/2018 | Ledet |
| 10,027,903 | B2 | 7/2018 | Yim |
| 10,038,838 | B2 | 7/2018 | Castillo et al. |
| 10,104,282 | B2 | 10/2018 | Graham et al. |
| 10,127,639 | B2 | 11/2018 | Miura et al. |
| 10,148,886 | B2 | 12/2018 | Kim et al. |
| 10,152,222 | B2 | 12/2018 | Ozawa et al. |
| 10,187,587 | B2 | 1/2019 | Hasinoff et al. |
| 10,198,148 | B2 | 2/2019 | Shaw |
| 10,225,471 | B2 | 3/2019 | Poindexter, Jr. |
| 10,230,901 | B2 | 3/2019 | Harris et al. |
| 10,277,829 | B1 | 4/2019 | Garrido |
| 10,297,034 | B2 | 5/2019 | Nash et al. |
| 10,303,973 | B2 | 5/2019 | Nakada et al. |
| 10,304,231 | B2 | 5/2019 | Saito |
| 10,325,417 | B1 | 6/2019 | Scapel et al. |
| 10,326,942 | B2 | 6/2019 | Shabtay et al. |
| 10,372,765 | B2 | 8/2019 | Knaapen et al. |
| 10,397,500 | B1 | 8/2019 | Xu et al. |
| 10,447,908 | B2 | 10/2019 | Lee et al. |
| 10,467,729 | B1 | 11/2019 | Perera et al. |
| 10,496,260 | B2 | 12/2019 | Zambetti et al. |
| 10,523,879 | B2 | 12/2019 | Dye et al. |
| 10,528,243 | B2 | 1/2020 | Manzari et al. |
| 10,574,882 | B2 | 2/2020 | Chen |
| 10,614,139 | B2 | 4/2020 | Fujioka et al. |
| 10,645,294 | B1 | 5/2020 | Manzari et al. |
| 10,652,470 | B1 | 5/2020 | Manzari et al. |
| 10,674,072 | B1 | 6/2020 | Manzari et al. |
| 10,681,282 | B1 | 6/2020 | Manzari et al. |
| 10,735,642 | B1 | 8/2020 | Manzari et al. |
| 10,735,643 | B1 | 8/2020 | Manzari et al. |
| 10,791,273 | B1 | 9/2020 | Manzari et al. |
| 10,831,337 | B2 | 11/2020 | Agnoli et al. |
| 11,049,527 | B2 | 6/2021 | Zhang |
| 11,204,692 | B2 | 12/2021 | Manzari et al. |
| 11,212,449 | B1 | 12/2021 | Manzari et al. |
| 11,468,625 | B2 | 10/2022 | Manzari et al. |
| 11,568,517 | B2 | 1/2023 | Kaida |
| 11,687,224 | B2 | 6/2023 | Manzari et al. |
| 11,770,600 | B2 | 9/2023 | O'Leary et al. |
| 12,267,622 | B2 | 4/2025 | O'Leary et al. |
| 2002/0122031 | A1 | 9/2002 | Maglio et al. |
| 2002/0140803 | A1 | 10/2002 | Gutta et al. |
| 2002/0167604 | A1 | 11/2002 | Ban et al. |
| 2002/0171737 | A1 | 11/2002 | Tullis et al. |
| 2003/0025802 | A1 | 2/2003 | Mayer et al. |
| 2003/0107664 | A1 | 6/2003 | Suzuki |
| 2003/0122930 | A1 | 7/2003 | Schofield et al. |
| 2003/0174216 | A1 | 9/2003 | Iguchi et al. |
| 2004/0041924 | A1 | 3/2004 | White et al. |
| 2004/0061796 | A1 | 4/2004 | Honda et al. |
| 2004/0090546 | A1 | 5/2004 | Doron |
| 2004/0095473 | A1 | 5/2004 | Park |
| 2004/0250217 | A1 | 12/2004 | Tojo et al. |
| 2005/0134695 | A1 | 6/2005 | Deshpande et al. |
| 2005/0189419 | A1 | 9/2005 | Igarashi et al. |
| 2005/0248660 | A1 | 11/2005 | Stavely et al. |
| 2006/0026521 | A1 | 2/2006 | Hotelling et al. |
| 2006/0187322 | A1 | 8/2006 | Janson et al. |
| 2006/0233192 | A1 | 10/2006 | Mihara |
| 2006/0275025 | A1 | 12/2006 | Labaziewicz et al. |
| 2007/0025711 | A1 | 2/2007 | Marcus et al. |
| 2007/0025714 | A1 | 2/2007 | Shiraki |
| 2007/0040810 | A1 | 2/2007 | Dowe et al. |
| 2007/0097088 | A1 | 5/2007 | Battles |
| 2007/0109417 | A1 | 5/2007 | Hyttfors et al. |
| 2007/0140675 | A1 | 6/2007 | Yanagi et al. |
| 2007/0146503 | A1 | 6/2007 | Shiraki |
| 2007/0165103 | A1 | 7/2007 | Arima et al. |
| 2007/0228259 | A1 | 10/2007 | Hohenberger |
| 2007/0254640 | A1 | 11/2007 | Bliss |
| 2007/0256029 | A1 | 11/2007 | Maxwell |
| 2007/0271528 | A1 | 11/2007 | Park et al. |
| 2007/0273769 | A1 | 11/2007 | Takahashi |
| 2008/0030592 | A1 | 2/2008 | Border et al. |
| 2008/0084484 | A1 | 4/2008 | Ochi et al. |
| 2008/0106601 | A1 | 5/2008 | Matsuda |
| 2008/0129759 | A1 | 6/2008 | Jeon et al. |
| 2008/0129825 | A1 | 6/2008 | Deangelis et al. |
| 2008/0143840 | A1 | 6/2008 | Corkum et al. |
| 2008/0146275 | A1 | 6/2008 | Tofflinger |
| 2008/0192020 | A1 | 8/2008 | Kang et al. |
| 2008/0215978 | A1 | 9/2008 | Bamba |
| 2008/0218611 | A1 | 9/2008 | Parulski et al. |
| 2008/0219654 | A1 | 9/2008 | Border et al. |
| 2008/0222558 | A1 | 9/2008 | Cho et al. |
| 2008/0259154 | A1 | 10/2008 | Garrison et al. |
| 2008/0284855 | A1 | 11/2008 | Umeyama et al. |
| 2008/0297587 | A1 | 12/2008 | Kurtz et al. |
| 2009/0007012 | A1 | 1/2009 | Mandic et al. |
| 2009/0009612 | A1 | 1/2009 | Tico et al. |
| 2009/0021600 | A1 | 1/2009 | Watanabe |
| 2009/0027539 | A1 | 1/2009 | Kunou |
| 2009/0040332 | A1 | 2/2009 | Yoshino et al. |
| 2009/0051783 | A1 | 2/2009 | Kim et al. |
| 2009/0102933 | A1 | 4/2009 | Harris et al. |
| 2009/0132963 | A1 | 5/2009 | Mahesh et al. |
| 2009/0160778 | A1 | 6/2009 | Nurmi et al. |

(56) References Cited

U.S. PATENT DOCUMENTS

2009/0244318 A1 10/2009 Makii
2009/0263044 A1 10/2009 Imagawa et al.
2009/0315671 A1 12/2009 Gocho et al.
2010/0020221 A1 1/2010 Tupman et al.
2010/0020222 A1 1/2010 Jones et al.
2010/0026637 A1 2/2010 Lai
2010/0039394 A1 2/2010 Moussavi
2010/0097322 A1 4/2010 Hu et al.
2010/0123737 A1 5/2010 Williamson et al.
2010/0141609 A1 6/2010 Frisbee
2010/0162160 A1 6/2010 Stallings et al.
2010/0164893 A1 7/2010 Shin et al.
2010/0173678 A1 7/2010 Kim et al.
2010/0185970 A1 7/2010 Benenson
2010/0194931 A1 8/2010 Kawaguchi et al.
2010/0208122 A1 8/2010 Yumiki
2010/0231777 A1 9/2010 Shintani et al.
2010/0232703 A1 9/2010 Aiso
2010/0232704 A1 9/2010 Thorn
2010/0238327 A1 9/2010 Griffith et al.
2010/0281374 A1 11/2010 Schulz et al.
2010/0283743 A1 11/2010 Coddington
2010/0289825 A1 11/2010 Shin et al.
2010/0289910 A1 11/2010 Kamshilin et al.
2010/0306702 A1 12/2010 Warner et al.
2010/0328513 A1 12/2010 Ryu
2011/0008033 A1 1/2011 Ichimiya et al.
2011/0013049 A1 1/2011 Thörn
2011/0018970 A1 1/2011 Wakabayashi
2011/0019058 A1 1/2011 Sakai et al.
2011/0019655 A1 1/2011 Hakola
2011/0043662 A1 2/2011 Kim
2011/0058052 A1 3/2011 Bolton et al.
2011/0074710 A1 3/2011 Weeldreyer et al.
2011/0074830 A1 3/2011 Rapp et al.
2011/0085016 A1 4/2011 Kristiansen et al.
2011/0109581 A1 5/2011 Ozawa et al.
2011/0115932 A1 5/2011 Shin et al.
2011/0138332 A1 6/2011 Miyagawa
2011/0157379 A1 6/2011 Kimura
2011/0187879 A1 8/2011 Ochiai
2011/0199495 A1 8/2011 Laberge et al.
2011/0234853 A1 9/2011 Hayashi et al.
2011/0242369 A1 10/2011 Misawa et al.
2012/0002098 A1 1/2012 Ueda
2012/0002898 A1 1/2012 Côtéet al.
2012/0056997 A1 3/2012 Jang
2012/0069206 A1 3/2012 Hsieh
2012/0105579 A1 5/2012 Jeon et al.
2012/0120277 A1 5/2012 Tsai et al.
2012/0133797 A1 5/2012 Sato et al.
2012/0162242 A1 6/2012 Amano et al.
2012/0162455 A1 6/2012 Kim et al.
2012/0169776 A1 7/2012 Rissa et al.
2012/0194559 A1 8/2012 Lim
2012/0218305 A1 8/2012 Patterson et al.
2012/0226978 A1 9/2012 Harberts et al.
2012/0243802 A1 9/2012 Fintel et al.
2012/0249853 A1 10/2012 Krolczyk et al.
2012/0272144 A1 10/2012 Radakovitz et al.
2012/0306788 A1 12/2012 Chen et al.
2012/0320141 A1 12/2012 Bowen et al.
2013/0019173 A1 1/2013 Kotler et al.
2013/0019174 A1 1/2013 Gil et al.
2013/0019182 A1 1/2013 Gil et al.
2013/0038546 A1 2/2013 Mineo
2013/0038771 A1 2/2013 Brunner et al.
2013/0055119 A1 2/2013 Luong
2013/0057472 A1 3/2013 Dizac et al.
2013/0076908 A1 3/2013 Bratton et al.
2013/0083222 A1 4/2013 Matsuzawa et al.
2013/0093904 A1 4/2013 Wagner et al.
2013/0120386 A1 5/2013 Wilensky et al.
2013/0141362 A1 6/2013 Asanuma et al.
2013/0155308 A1 6/2013 Wu et al.
2013/0208136 A1 8/2013 Takatsuka et al.
2013/0219340 A1 8/2013 Linge
2013/0246948 A1 9/2013 Chen et al.
2013/0265311 A1 10/2013 Na et al.
2013/0265467 A1 10/2013 Matsuzawa et al.
2013/0278710 A1 10/2013 Mock
2013/0286251 A1 10/2013 Wood et al.
2013/0321340 A1 12/2013 Seo et al.
2013/0329074 A1 12/2013 Zhang et al.
2013/0346916 A1 12/2013 Williamson et al.
2014/0007019 A1 1/2014 Saukko et al.
2014/0007021 A1 1/2014 Akiyama et al.
2014/0022399 A1 1/2014 Rashid et al.
2014/0026099 A1 1/2014 Andersson Reimer et al.
2014/0028872 A1 1/2014 Lee et al.
2014/0028885 A1 1/2014 Ma et al.
2014/0033043 A1 1/2014 Kashima
2014/0033100 A1 1/2014 Noda et al.
2014/0043368 A1 2/2014 Yu
2014/0043517 A1 2/2014 Yim et al.
2014/0047389 A1 2/2014 Aarabi
2014/0063313 A1 3/2014 Choi et al.
2014/0071325 A1 3/2014 Kawahara et al.
2014/0078371 A1 3/2014 Kinoshita
2014/0092100 A1 4/2014 Chen
2014/0104449 A1 4/2014 Masarik et al.
2014/0118563 A1 5/2014 Mehta et al.
2014/0123063 A1 5/2014 Hwang et al.
2014/0132735 A1 5/2014 Lee et al.
2014/0143678 A1 5/2014 Mistry et al.
2014/0152886 A1 6/2014 Morgan-Mar et al.
2014/0157200 A1 6/2014 Jeon
2014/0160231 A1 6/2014 Middleton et al.
2014/0160304 A1 6/2014 Galor et al.
2014/0184524 A1 7/2014 Schiefer et al.
2014/0192212 A1 7/2014 He et al.
2014/0192233 A1 7/2014 Kakkori et al.
2014/0198242 A1 7/2014 Weng et al.
2014/0201672 A1 7/2014 Borzello et al.
2014/0204229 A1 7/2014 Leung et al.
2014/0218599 A1 8/2014 Nakamura et al.
2014/0232838 A1 8/2014 Jorgensen et al.
2014/0240531 A1 8/2014 Nakai et al.
2014/0240577 A1 8/2014 Masugi
2014/0282223 A1 9/2014 Bastien et al.
2014/0307147 A1 10/2014 Hanzawa et al.
2014/0310598 A1 10/2014 Sprague et al.
2014/0327639 A1 11/2014 Papakipos et al.
2014/0333790 A1 11/2014 Wakazono
2014/0337748 A1 11/2014 Lee
2014/0351753 A1 11/2014 Shin et al.
2014/0359438 A1 12/2014 Matsuki
2014/0368719 A1 12/2014 Kaneko et al.
2014/0372856 A1 12/2014 Radakovitz et al.
2014/0375862 A1 12/2014 Kim et al.
2015/0002724 A1 1/2015 Chuang et al.
2015/0022649 A1 1/2015 Koppal
2015/0022674 A1 1/2015 Koss et al.
2015/0033188 A1 1/2015 Devi
2015/0049233 A1 2/2015 Choi
2015/0085174 A1 3/2015 Shabtay et al.
2015/0092077 A1 4/2015 Feder et al.
2015/0116353 A1 4/2015 Miura et al.
2015/0116448 A1 4/2015 Gottlieb
2015/0135234 A1 5/2015 Hall
2015/0138079 A1 5/2015 Lannsjö
2015/0145950 A1 5/2015 Murphy et al.
2015/0146079 A1 5/2015 Kim
2015/0150141 A1 5/2015 Szymanski et al.
2015/0181135 A1 6/2015 Shimosato
2015/0189162 A1 7/2015 Kuo et al.
2015/0220249 A1 8/2015 Snibbe et al.
2015/0248198 A1 9/2015 Somlai-Fisher et al.
2015/0249775 A1 9/2015 Jacumet
2015/0249785 A1 9/2015 Mehta et al.
2015/0254855 A1 9/2015 Patankar et al.
2015/0254868 A1 9/2015 Srikanth et al.
2015/0256749 A1 9/2015 Frey et al.
2015/0264202 A1 9/2015 Pawlowski

(56) References Cited

U.S. PATENT DOCUMENTS

2015/0281585 A1 10/2015 Guldogan
2015/0289104 A1 10/2015 Jung et al.
2015/0297185 A1 10/2015 McCormack et al.
2015/0341536 A1 11/2015 Huang et al.
2015/0346994 A1 12/2015 Chanyontpatanakul
2015/0350523 A1 12/2015 Kinoshita
2015/0350533 A1 12/2015 Harris et al.
2015/0362998 A1 12/2015 Park et al.
2015/0370458 A1 12/2015 Chen
2015/0373257 A1 12/2015 Shirakawa
2015/0378600 A1 12/2015 Sloan et al.
2016/0012567 A1 1/2016 Siddiqui et al.
2016/0037056 A1 2/2016 Takahashi et al.
2016/0044236 A1 2/2016 Matsuzawa et al.
2016/0048598 A1 2/2016 Fujioka et al.
2016/0048599 A1 2/2016 Fujioka et al.
2016/0048725 A1 2/2016 Holz et al.
2016/0048903 A1 2/2016 Fujioka et al.
2016/0050351 A1 2/2016 Lee et al.
2016/0050446 A1 2/2016 Fujioka et al.
2016/0065832 A1 3/2016 Kim et al.
2016/0080639 A1 3/2016 Choi et al.
2016/0080657 A1 3/2016 Chuang et al.
2016/0088280 A1 3/2016 Sadi et al.
2016/0117829 A1 4/2016 Yoon et al.
2016/0127645 A1 5/2016 Sudo
2016/0132201 A1 5/2016 Shaw et al.
2016/0148384 A1 5/2016 Bud et al.
2016/0162039 A1 6/2016 Eilat et al.
2016/0173869 A1 6/2016 Srikanth et al.
2016/0188181 A1 6/2016 Smith
2016/0212319 A1 7/2016 Harris et al.
2016/0219217 A1 7/2016 Williams et al.
2016/0241793 A1 8/2016 Shanmugavadivelu et al.
2016/0247288 A1 8/2016 Omori et al.
2016/0301861 A1 10/2016 Miao
2016/0307045 A1 10/2016 Ma et al.
2016/0316147 A1 10/2016 Bernstein et al.
2016/0320923 A1 11/2016 Hossain et al.
2016/0337570 A1 11/2016 Tan et al.
2016/0337582 A1 11/2016 Shimauchi et al.
2016/0357353 A1 12/2016 Miura et al.
2016/0360116 A1 12/2016 Penha et al.
2016/0364089 A1 12/2016 Blackman et al.
2016/0373650 A1 12/2016 Kim et al.
2017/0006210 A1 1/2017 Dye et al.
2017/0013179 A1 1/2017 Kang et al.
2017/0024872 A1 1/2017 Olsson et al.
2017/0034449 A1 2/2017 Eum et al.
2017/0039686 A1 2/2017 Miura et al.
2017/0041677 A1 2/2017 Anderson et al.
2017/0048450 A1 2/2017 Lee et al.
2017/0048461 A1 2/2017 Lee et al.
2017/0048494 A1 2/2017 Boyle et al.
2017/0091906 A1 3/2017 Liang et al.
2017/0109912 A1 4/2017 Lee et al.
2017/0111567 A1 4/2017 Pila
2017/0186162 A1 6/2017 Mihic et al.
2017/0192627 A1 7/2017 Agnoli et al.
2017/0230585 A1 8/2017 Nash et al.
2017/0237888 A1 8/2017 Harris et al.
2017/0244896 A1 8/2017 Chien et al.
2017/0257596 A1 9/2017 Murata et al.
2017/0264817 A1 9/2017 Yan et al.
2017/0302840 A1 10/2017 Hasinoff et al.
2017/0359504 A1 12/2017 Manzari et al.
2017/0359505 A1 12/2017 Manzari et al.
2017/0359506 A1 12/2017 Manzari et al.
2017/0366729 A1 12/2017 Itoh
2018/0077332 A1 3/2018 Shimura et al.
2018/0081502 A1 3/2018 Sangco et al.
2018/0096487 A1 4/2018 Nash et al.
2018/0113577 A1 4/2018 Burns et al.
2018/0120661 A1 5/2018 Kilgore et al.
2018/0124299 A1 5/2018 Brook
2018/0129224 A1 5/2018 Hur
2018/0131876 A1 5/2018 Bernstein et al.
2018/0146132 A1 5/2018 Manzari et al.
2018/0152611 A1 5/2018 Li et al.
2018/0227479 A1 8/2018 Parameswaran et al.
2018/0227482 A1 8/2018 Holzer et al.
2018/0227505 A1 8/2018 Baltz et al.
2018/0234608 A1 8/2018 Sudo et al.
2018/0262677 A1 9/2018 Dye et al.
2018/0270420 A1 9/2018 Lee et al.
2018/0278823 A1 9/2018 Horesh
2018/0284979 A1 10/2018 Choi et al.
2018/0288310 A1 10/2018 Goldenberg
2018/0302551 A1 10/2018 Yamajo et al.
2018/0302568 A1 10/2018 Kim et al.
2018/0308282 A1 10/2018 Yokoi
2018/0352165 A1 12/2018 Zhen et al.
2018/0376122 A1 12/2018 Park et al.
2019/0028650 A1 1/2019 Bernstein et al.
2019/0029513 A1 1/2019 Gunnerson et al.
2019/0082097 A1 3/2019 Manzari et al.
2019/0121216 A1 4/2019 Shabtay et al.
2019/0149706 A1 5/2019 Rivard et al.
2019/0174054 A1 6/2019 Srivastava et al.
2019/0199926 A1 6/2019 An et al.
2019/0206031 A1 7/2019 Kim et al.
2019/0289201 A1 9/2019 Nishimura et al.
2020/0068121 A1 2/2020 Wang
2020/0082599 A1 3/2020 Manzari
2020/0106965 A1 4/2020 Malia et al.
2020/0112692 A1* 4/2020 Ling ..................... H04N 23/45
2020/0128191 A1 4/2020 Sun et al.
2020/0221020 A1 7/2020 Manzari et al.
2020/0267318 A1 8/2020 Lee et al.
2020/0285806 A1 9/2020 Radakovitz et al.
2020/0336674 A1 10/2020 Bernstein et al.
2020/0358963 A1 11/2020 Manzari et al.
2021/0067749 A1 3/2021 Yadav et al.
2021/0191582 A1 6/2021 Agnoli et al.
2021/0195093 A1 6/2021 Manzari et al.
2021/0287343 A1 9/2021 Kaida
2022/0053142 A1 2/2022 Manzari et al.
2022/0070380 A1 3/2022 Bernstein et al.
2022/0124241 A1 4/2022 Manzari et al.
2022/0210337 A1 6/2022 Anvaripour et al.
2022/0276041 A1 9/2022 Dryer et al.
2022/0294992 A1 9/2022 Manzari et al.
2022/0319100 A1 10/2022 Manzari et al.
2022/0394190 A1 12/2022 Cui et al.
2022/0417440 A1 12/2022 Bernstein et al.
2023/0254573 A1 8/2023 Manzari et al.
2023/0319394 A1 10/2023 Manzari et al.
2023/0328379 A1 10/2023 Bernstein et al.
2024/0259670 A1 8/2024 Manzari et al.
2024/0303779 A1 9/2024 Feng et al.
2024/0373120 A1 11/2024 Manzari et al.
2024/0373121 A1 11/2024 Manzari et al.
2024/0373122 A1 11/2024 Manzari et al.
2024/0373124 A1 11/2024 Manzari et al.
2024/0430564 A1 12/2024 Manzari et al.
2025/0024133 A1 1/2025 Manzari et al.
2025/0080851 A1 3/2025 Bernstein et al.
2025/0330699 A1 10/2025 Manzari et al.

FOREIGN PATENT DOCUMENTS

CA 2729392 C 5/2017
CN 1437365 A 8/2003
CN 1705346 A 12/2005
CN 101243383 A 8/2008
CN 101282422 A 10/2008
CN 101300830 A 11/2008
CN 101310519 A 11/2008
CN 101364031 A 2/2009
CN 101427574 A 5/2009
CN 101576996 A 11/2009
CN 101778220 A 7/2010
CN 101883213 A 11/2010
CN 101931691 A 12/2010

(56) References Cited

FOREIGN PATENT DOCUMENTS

CN 102084327 A 6/2011
CN 102088554 A 6/2011
CN 102272700 A 12/2011
CN 102369723 A 3/2012
CN 102428655 A 4/2012
CN 102457661 A 5/2012
CN 102474560 A 5/2012
CN 202309894 U 7/2012
CN 202330968 U 7/2012
CN 103051837 A 4/2013
CN 103051841 A 4/2013
CN 103297719 A 9/2013
CN 103309602 A 9/2013
CN 103324329 A 9/2013
CN 103491298 A 1/2014
CN 103685925 A 3/2014
CN 103702039 A 4/2014
CN 103777742 A 5/2014
CN 103916582 A 7/2014
CN 103970472 A 8/2014
CN 104346080 A 2/2015
CN 104423946 A 3/2015
CN 104461288 A 3/2015
CN 104813322 A 7/2015
CN 104836947 A 8/2015
CN 105049726 A 11/2015
CN 105138259 A 12/2015
CN 105190511 A 12/2015
CN 105229571 A 1/2016
CN 105338256 A 2/2016
CN 105474163 A 4/2016
CN 105589637 A 5/2016
CN 105620393 A 6/2016
CN 105630290 A 6/2016
CN 105637855 A 6/2016
CN 105765967 A 7/2016
CN 105981372 A 9/2016
CN 105991915 A 10/2016
CN 106067947 A 11/2016
CN 106161956 A 11/2016
CN 106210184 A 12/2016
CN 106210550 A 12/2016
CN 106257909 A 12/2016
CN 106303280 A 1/2017
CN 106341611 A 1/2017
CN 106375662 A 2/2017
CN 106412214 A 2/2017
CN 106412412 A 2/2017
CN 106412445 A 2/2017
CN 106445219 A 2/2017
CN 106791357 A 5/2017
CN 106791377 A 5/2017
CN 106921829 A 7/2017
CN 107077274 A 8/2017
CN 107079141 A 8/2017
CN 107566721 A 1/2018
CN 107580693 A 1/2018
CN 107770448 A 3/2018
CN 107800945 A 3/2018
CN 107820011 A 3/2018
CN 107924113 A 4/2018
CN 108174096 A 6/2018
CN 108353126 A 7/2018
CN 108391053 A 8/2018
CN 108419019 A 8/2018
CN 108513070 A 9/2018
CN 108549522 A 9/2018
CN 108600610 A 9/2018
CN 108668083 A 10/2018
CN 108848308 A 11/2018
CN 108886569 A 11/2018
CN 109005366 A 12/2018
CN 109061985 A 12/2018
CN 109313530 A 2/2019
CN 109496425 A 3/2019
CN 109639970 A 4/2019
CN 109644229 A 4/2019
DK 201670753 A1 1/2018
DK 201670755 A1 1/2018
DK 201670627 A1 2/2018
EP 0257972 A2 3/1988
EP 0651543 A2 5/1995
EP 0651543 A3 12/1997
EP 1278099 A1 1/2003
EP 1953663 A1 8/2008
EP 0651543 B1 9/2008
EP 1981262 A1 10/2008
EP 2194508 A1 6/2010
EP 2430766 A2 3/2012
EP 2454872 A1 5/2012
EP 2482179 A2 8/2012
EP 2487613 A1 8/2012
EP 2487913 A2 8/2012
EP 2430766 A4 12/2012
EP 2579572 A1 4/2013
EP 2627073 A1 8/2013
EP 2640060 A1 9/2013
EP 2682855 A2 1/2014
EP 2950198 A1 12/2015
EP 2966855 A2 1/2016
EP 2972677 A1 1/2016
EP 2430766 B1 3/2016
EP 3008575 A1 4/2016
EP 3012732 A1 4/2016
EP 3033837 A1 6/2016
EP 3033837 A4 3/2017
EP 2194508 B1 12/2017
EP 3333544 A1 6/2018
EP 3033837 B1 10/2018
EP 3393119 A1 10/2018
EP 3135028 B1 1/2019
EP 2482179 B1 3/2019
EP 3457680 A1 3/2019
EP 3012732 B1 5/2019
EP 3008575 B1 7/2019
EP 3633975 A1 4/2020
EP 2682855 B1 2/2021
EP 3633975 B1 5/2023
GB 2515797 A 1/2015
GB 2523670 A 9/2015
JP 2-179078 A 7/1990
JP 9-116792 A 5/1997
JP 11-355617 A 12/1999
JP 2000-207549 A 7/2000
JP 2000-244905 A 9/2000
JP 2001-298649 A 10/2001
JP 2003-8964 A 1/2003
JP 2003-18438 A 1/2003
JP 2003-32597 A 1/2003
JP 2003-241293 A 8/2003
JP 2004-15595 A 1/2004
JP 2004-135074 A 4/2004
JP 2005-31466 A 2/2005
JP 2005-191641 A 7/2005
JP 2005-311699 A 11/2005
JP 2006-332809 A 12/2006
JP 3872041 B2 1/2007
JP 2007-28211 A 2/2007
JP 2007-124279 A 5/2007
JP 2007-124398 A 5/2007
JP 2007-258869 A 10/2007
JP 2007-274017 A 10/2007
JP 2008-66978 A 3/2008
JP 2008-199195 A 8/2008
JP 2009-105919 A 5/2009
JP 2009-212899 A 9/2009
JP 2009-246468 A 10/2009
JP 2009-273023 A 11/2009
JP 2009-290782 A 12/2009
JP 2009-545256 A 12/2009
JP 2010-117444 A 5/2010
JP 2010-119147 A 5/2010
JP 2010-182023 A 8/2010
JP 2010-211166 A 9/2010

(56) References Cited

FOREIGN PATENT DOCUMENTS

| | | | |
|---|---|---|---|
| JP | 2010-268052 | A | 11/2010 |
| JP | 2011-87167 | A | 4/2011 |
| JP | 2011-91570 | A | 5/2011 |
| JP | 2011-124864 | A | 6/2011 |
| JP | 2011-211552 | A | 10/2011 |
| JP | 2012015978 | A | 1/2012 |
| JP | 2012-44564 | A | 3/2012 |
| JP | 2012-79302 | A | 4/2012 |
| JP | 2012-89973 | A | 5/2012 |
| JP | 2012-147379 | A | 8/2012 |
| JP | 2013-70303 | A | 4/2013 |
| JP | 2013-106289 | A | 5/2013 |
| JP | 2013-546238 | A | 12/2013 |
| JP | 2014-7454 | A | 1/2014 |
| JP | 2014-23083 | A | 2/2014 |
| JP | 2014-123069 | A | 7/2014 |
| JP | 2014-212415 | A | 11/2014 |
| JP | 2015-1716 | A | 1/2015 |
| JP | 2015-5255 | A | 1/2015 |
| JP | 2015-22716 | A | 2/2015 |
| JP | 2015-25897 | A | 2/2015 |
| JP | 2015-50713 | A | 3/2015 |
| JP | 2015-76717 | A | 4/2015 |
| JP | 2015-104031 | A | 6/2015 |
| JP | 2015-149095 | A | 8/2015 |
| JP | 2016-66978 | A | 4/2016 |
| JP | 2016-72965 | A | 5/2016 |
| JP | 2016-129315 | A | 7/2016 |
| JP | 2016-175175 | A | 10/2016 |
| JP | 2017-34474 | A | 2/2017 |
| JP | 2019-62556 | A | 4/2019 |
| JP | 2019-92172 | A | 6/2019 |
| JP | 2019-203399 | A | 11/2019 |
| JP | 2020-42602 | A | 3/2020 |
| JP | 6982047 | B2 | 11/2021 |
| KR | 10-2012-0025872 | A | 3/2012 |
| KR | 10-2012-0048397 | A | 5/2012 |
| KR | 10-2012-0057696 | A | 6/2012 |
| KR | 10-2012-0093322 | A | 8/2012 |
| KR | 10-2013-0033445 | A | 4/2013 |
| KR | 10-1341095 | B1 | 12/2013 |
| KR | 10-2014-0049850 | A | 4/2014 |
| KR | 10-2014-0062801 | A | 5/2014 |
| KR | 10-2015-0014290 | A | 2/2015 |
| KR | 10-2016-0019145 | A | 2/2016 |
| KR | 10-2016-0020791 | A | 2/2016 |
| KR | 10-2016-0075583 | A | 6/2016 |
| KR | 10-1674959 | B1 | 11/2016 |
| KR | 10-2017-0123125 | A | 11/2017 |
| KR | 10-2017-0135975 | A | 12/2017 |
| KR | 10-2018-0024761 | A | 3/2018 |
| KR | 10-2018-0037076 | A | 4/2018 |
| KR | 10-2018-0095331 | A | 8/2018 |
| KR | 10-2018-0108847 | A | 10/2018 |
| KR | 10-2018-0116574 | A | 10/2018 |
| KR | 10-2018-0137610 | A | 12/2018 |
| KR | 10-2019-0034248 | A | 4/2019 |
| WO | 2005/043892 | A1 | 5/2005 |
| WO | 2007/126707 | A1 | 11/2007 |
| WO | 2008/014301 | A2 | 1/2008 |
| WO | 2008/025120 | A1 | 3/2008 |
| WO | 2010/059426 | A2 | 5/2010 |
| WO | 2010/077048 | A2 | 7/2010 |
| WO | 2010/102678 | A1 | 9/2010 |
| WO | 2010/077048 | A3 | 10/2010 |
| WO | 2010/131869 | A2 | 11/2010 |
| WO | 2010/134275 | A1 | 11/2010 |
| WO | 2011/007264 | A1 | 1/2011 |
| WO | 2010/131869 | A3 | 2/2011 |
| WO | 2010/059426 | A3 | 5/2011 |
| WO | 2012/001947 | A1 | 1/2012 |
| WO | 2012/006251 | A1 | 1/2012 |
| WO | 2012/051720 | A2 | 4/2012 |
| WO | 2014/066115 | A1 | 5/2014 |
| WO | 2014/109125 | A1 | 7/2014 |
| WO | 2014/159779 | A1 | 10/2014 |
| WO | 2014/160819 | A1 | 10/2014 |
| WO | 2014/165141 | A1 | 10/2014 |
| WO | 2014/200734 | A1 | 12/2014 |
| WO | 2014/200798 | A1 | 12/2014 |
| WO | 2015/023044 | A1 | 2/2015 |
| WO | 2015/026864 | A1 | 2/2015 |
| WO | 2015/080744 | A1 | 6/2015 |
| WO | 2015/085042 | A1 | 6/2015 |
| WO | 2015/112868 | A1 | 7/2015 |
| WO | 2014/200798 | A8 | 8/2015 |
| WO | 2015/183438 | A1 | 12/2015 |
| WO | 2015/187494 | A1 | 12/2015 |
| WO | 2015/190666 | A1 | 12/2015 |
| WO | 2016/028806 | A1 | 2/2016 |
| WO | 2016/028807 | A1 | 2/2016 |
| WO | 2016/028808 | A1 | 2/2016 |
| WO | 2016/028809 | A1 | 2/2016 |
| WO | 2016/072538 | A1 | 5/2016 |
| WO | 2016/073804 | A2 | 5/2016 |
| WO | 2016/073804 | A3 | 7/2016 |
| WO | 2016/172619 | A1 | 10/2016 |
| WO | 2016/204936 | A1 | 12/2016 |
| WO | 2017/051605 | A1 | 3/2017 |
| WO | 2017/058834 | A1 | 4/2017 |
| WO | 2017/218193 | A1 | 12/2017 |
| WO | 2018/048838 | A1 | 3/2018 |
| WO | 2018/057268 | A1 | 3/2018 |
| WO | 2018/099037 | A1 | 6/2018 |
| WO | 2018/144339 | A2 | 8/2018 |
| WO | 2018/159864 | A1 | 9/2018 |
| WO | 2019/050562 | A1 | 3/2019 |

OTHER PUBLICATIONS

International Preliminary Report on Patentability received for PCT Patent Application No. PCT/US2023/024344, mailed on Dec. 19, 2024, 18 pages.

Corrected Notice of Allowance received for U.S. Appl. No. 18/207,293, mailed on Sep. 12, 2024, 2 pages.

Corrected Notice of Allowance received for U.S. Appl. No. 18/207,293, mailed on Sep. 20, 2024, 2 pages.

Corrected Notice of Allowance received for U.S. Appl. No. 18/628,021, mailed on Sep. 12, 2024, 2 pages.

Intention to Grant received for European Patent Application No. 20206196.6, mailed on Mar. 10, 2025, 10 pages.

Applicant-Initiated Interview Summary received for U.S. Appl. No. 17/088,790, mailed on Nov. 8, 2024, 4 pages.

Corrected Notice of Allowance received for U.S. Appl. No. 18/196,997, mailed on Nov. 15, 2024, 2 pages.

Egg Flakes, "Use Slow Shutter to capture night scenes and light trails", Online available at: https://www.jianshu.com/p/6c742da00d3c, Mar. 8, 2018, 5 pages (1 page of English Translation and 4 pages of Official Copy).

International Search Report and Written Opinion received for PCT Patent Application No. PCT/US2024/026652, mailed on Sep. 3, 2024, 15 pages.

Notice of Acceptance received for Australian Patent Application No. 2024213126, mailed on Oct. 30, 2024, 3 pages.

Notice of Allowance received for U.S. Appl. No. 18/196,997, mailed on Nov. 4, 2024, 11 pages.

Office Action received for Chinese Patent Application No. 202010235395.9, mailed on Oct. 19, 2024, 12 pages (7 pages of English Translation and 5 pages of Official Copy).

Notice of Allowance received for Korean Patent Application No. 10-2023-7002360, mailed on Feb. 5, 2025, 8 pages (2 pages of English Translation and 6 pages of Official Copy).

Notice of Allowance received for Korean Patent Application No. 10-2023-7041271, mailed on Nov. 24, 2024, 7 pages (2 pages of English Translation and 5 pages of Official Copy).

Office Action received for Australian Patent Application No. 2023282230, mailed on Dec. 9, 2024, 2 pages.

Office Action received for Japanese Patent Application No. 2023-158354, mailed on Dec. 2, 2024, 6 pages (3 pages of English Translation and 3 pages of Official Copy).

(56) References Cited

OTHER PUBLICATIONS

Notice of Allowance received for U.S. Appl. No. 18/196,997, mailed on Jul. 15, 2024, 11 pages.
Advisory Action received for U.S. Appl. No. 17/088,790, mailed on Nov. 28, 2023, 4 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Applicant-Initiated Interview Summary received for U.S. Appl. No. 15/094,238, mailed on Apr. 24, 2020, 3 pages.
Applicant-Initiated Interview Summary received for U.S. Appl. No. 15/094,238, mailed on Feb. 28, 2019, 3 pages.
Applicant-Initiated Interview Summary received for U.S. Appl. No. 15/094,238, mailed on Jan. 22, 2020, 3 pages.
Applicant-Initiated Interview Summary received for U.S. Appl. No. 15/094,238, mailed on Sep. 3, 2019, 3 pages.
Applicant-Initiated Interview Summary received for U.S. Appl. No. 16/584,100, mailed on Feb. 19, 2020, 3 pages.
Applicant-Initiated Interview Summary received for U.S. Appl. No. 16/586,344, mailed on Feb. 27, 2020, 3 pages.
Applicant-Initiated Interview Summary received for U.S. Appl. No. 17/041,412, mailed on Jan. 31, 2023, 7 pages.
Applicant-Initiated Interview Summary received for U.S. Appl. No. 17/088,790, mailed on Jan. 14, 2022, 5 pages.
Applicant-Initiated Interview Summary received for U.S. Appl. No. 17/088,790, mailed on Jul. 7, 2022, 4 pages.
Applicant-Initiated Interview Summary received for U.S. Appl. No. 17/088,790, mailed on May 25, 2023, 4 pages.
Applicant-Initiated Interview Summary received for U.S. Appl. No. 17/088,790, mailed on Oct. 12, 2023, 4 pages.
Applicant-Initiated Interview Summary received for U.S. Appl. No. 17/190,879, mailed on Oct. 26, 2021, 3 pages.
Applicant-Initiated Interview Summary received for U.S. Appl. No. 18/207,293, mailed on Apr. 19, 2024, 3 pages.
Astrovideo, "AstroVideo enables you to use a low-cost, low-light video camera to capture astronomical images.", Available online at: https://www.coaa.co.uk/astrovideo.htm, Retrieved on: Nov. 18, 2019, 5 pages.
AT&T, "Pantech C3b User Guide", At&T, Feb. 10, 2007, 14 pages.
Board Decision received for Chinese Patent Application No. 201811446867.4, mailed on Apr. 26, 2023, 21 pages (5 pages of English Translation and 16 pages of Official Copy).
Board Opinion received for Chinese Patent Application No. 201811446867.4, mailed on Feb. 14, 2023, 11 pages (4 pages of English Translation and 7 pages of Official Copy).
Brief Communication regarding Oral Proceedings received for European Patent Application No. 17184710.6, mailed on Feb. 19, 2020, 2 pages.
Brief Communication regarding Oral Proceedings received for European Patent Application No. 17184710.6, mailed on Mar. 9, 2020, 2 pages.
Brief Communication Regarding Oral Proceedings received for European Patent Application No. 21163791.3, mailed on Nov. 7, 2023, 4 pages.
Certificate of Examination received for Australian Patent Application No. 2017100683, mailed on Jan. 16, 2018, 2 pages.
Certificate of Examination received for Australian Patent Application No. 2020100720, mailed on Nov. 11, 2020, 2 pages.
Certificate of Examination received for Australian Patent Application No. 2020104220, mailed on Apr. 1, 2021, 2 pages.
Communication for Board of Appeal received for European Patent Application No. 17184710.6, mailed on Feb. 29, 2024, 13 pages.
Corrected Notice of Allowance received for U.S. Appl. No. 14/641,251, mailed on Jun. 17, 2016, 2 pages.
Corrected Notice of Allowance received for U.S. Appl. No. 15/268,115, mailed on Apr. 13, 2018, 11 pages.
Corrected Notice of Allowance received for U.S. Appl. No. 15/268,115, mailed on Mar. 21, 2018, 9 pages.
Corrected Notice of Allowance received for U.S. Appl. No. 15/273,453, mailed on Dec. 21, 2017, 3 pages.
Corrected Notice of Allowance received for U.S. Appl. No. 15/273,453, mailed on Feb. 8, 2018, 2 pages.
Corrected Notice of Allowance received for U.S. Appl. No. 15/273,453, mailed on Nov. 27, 2017, 2 pages.
Corrected Notice of Allowance received for U.S. Appl. No. 15/273,503, mailed on Nov. 2, 2017, 2 pages.
Corrected Notice of Allowance received for U.S. Appl. No. 15/273,503, mailed on Nov. 24, 2017, 2 pages.
Corrected Notice of Allowance received for U.S. Appl. No. 15/858,175, mailed on Sep. 21, 2018, 2 pages.
Corrected Notice of Allowance received for U.S. Appl. No. 16/143,396, mailed on Jan. 30, 2020, 2 pages.
Corrected Notice of Allowance received for U.S. Appl. No. 16/191,117, mailed on Dec. 9, 2019, 2 pages.
Corrected Notice of Allowance received for U.S. Appl. No. 16/191,117, mailed on Feb. 28, 2020, 2 pages.
Corrected Notice of Allowance received for U.S. Appl. No. 16/191,117, mailed on Nov. 20, 2019, 2 pages.
Corrected Notice of Allowance received for U.S. Appl. No. 16/582,595, mailed on Apr. 7, 2020, 5 pages.
Corrected Notice of Allowance received for U.S. Appl. No. 16/582,595, mailed on Apr. 22, 2020, 5 pages.
Corrected Notice of Allowance received for U.S. Appl. No. 16/583,020, mailed on Mar. 24, 2020, 2 pages.
Corrected Notice of Allowance received for U.S. Appl. No. 16/584,044, mailed on Apr. 16, 2020, 3 pages.
Corrected Notice of Allowance received for U.S. Appl. No. 16/584,044, mailed on Jan. 29, 2020, 3 pages.
Corrected Notice of Allowance received for U.S. Appl. No. 16/584,044, mailed on Mar. 4, 2020, 2 pages.
Corrected Notice of Allowance received for U.S. Appl. No. 16/584,100, mailed on Feb. 21, 2020, 9 pages.
Corrected Notice of Allowance received for U.S. Appl. No. 16/584,693, mailed on Feb. 21, 2020, 15 pages.
Corrected Notice of Allowance received for U.S. Appl. No. 16/584,693, mailed on Mar. 4, 2020, 2 pages.
Corrected Notice of Allowance received for U.S. Appl. No. 16/584,693, mailed on Mar. 20, 2020, 2 pages.
Corrected Notice of Allowance received for U.S. Appl. No. 16/586,314, mailed on Apr. 8, 2020, 5 pages.
Corrected Notice of Allowance received for U.S. Appl. No. 16/586,314, mailed on Mar. 4, 2020, 3 pages.
Corrected Notice of Allowance received for U.S. Appl. No. 16/586,344, mailed on Apr. 7, 2020, 4 pages.
Corrected Notice of Allowance received for U.S. Appl. No. 16/586,344, mailed on Jan. 23, 2020, 4 pages.
Corrected Notice of Allowance received for U.S. Appl. No. 16/586,344, mailed on Mar. 17, 2020, 4 pages.
Corrected Notice of Allowance received for U.S. Appl. No. 16/825,879, mailed on Aug. 13, 2021, 2 pages.
Corrected Notice of Allowance received for U.S. Appl. No. 16/825,879, mailed on Jul. 23, 2021, 2 pages.
Corrected Notice of Allowance received for U.S. Appl. No. 16/825,879, mailed on Sep. 15, 2021, 2 pages.
Corrected Notice of Allowance received for U.S. Appl. No. 16/835,651, mailed on Aug. 10, 2021, 4 pages.
Corrected Notice of Allowance received for U.S. Appl. No. 16/835,651, mailed on Aug. 13, 2021, 2 pages.
Corrected Notice of Allowance received for U.S. Appl. No. 16/835,651, mailed on Jul. 28, 2021, 4 pages.
Corrected Notice of Allowance received for U.S. Appl. No. 16/835,651, mailed on Jun. 14, 2021, 2 pages.
Corrected Notice of Allowance received for U.S. Appl. No. 16/840,719, mailed on Jul. 8, 2021, 8 pages.
Corrected Notice of Allowance received for U.S. Appl. No. 16/840,719, mailed on May 14, 2021, 4 pages.
Corrected Notice of Allowance received for U.S. Appl. No. 17/041,412, mailed on Apr. 12, 2023, 2 pages.
Corrected Notice of Allowance received for U.S. Appl. No. 17/041,412, mailed on Mar. 23, 2023, 7 pages.
Corrected Notice of Allowance received for U.S. Appl. No. 17/041,412, mailed on Mar. 31, 2023, 6 pages.

(56) References Cited

OTHER PUBLICATIONS

Corrected Notice of Allowance received for U.S. Appl. No. 17/041,412, mailed on May 17, 2023, 2 pages.
Corrected Notice of Allowance received for U.S. Appl. No. 17/190,879, mailed on Nov. 19, 2021, 2 pages.
Corrected Notice of Allowance received for U.S. Appl. No. 17/409,598, mailed on Jul. 7, 2022, 2 pages.
Corrected Notice of Allowance received for U.S. Appl. No. 17/409,598, mailed on Jul. 18, 2022, 3 pages.
Corrected Notice of Allowance received for U.S. Appl. No. 17/409,598, mailed on Sep. 30, 2022, 2 pages.
Corrected Notice of Allowance received for U.S. Appl. No. 17/510,168, mailed on Mar. 16, 2023, 2 pages.
Corrected Notice of Allowance received for U.S. Appl. No. 17/510,168, mailed on Mar. 29, 2023, 2 pages.
Corrected Notice of Allowance received for U.S. Appl. No. 17/566,094, mailed on Feb. 8, 2023, 2 pages.
Corrected Notice of Allowance received for U.S. Appl. No. 17/566,094, mailed on Jan. 5, 2023, 2 pages.
Corrected Notice of Allowance received for U.S. Appl. No. 17/566,094, mailed on Jan. 23, 2023, 2 pages.
Corrected Notice of Allowance received for U.S. Appl. No. 17/566,094, mailed on Mar. 7, 2023, 2 pages.
Corrected Notice of Allowance received for U.S. Appl. No. 18/121,458, mailed on Jan. 18, 2024, 2 pages.
Corrected Notice of Allowance received for U.S. Appl. No. 18/196,997, mailed on Apr. 18, 2024, 2 pages.
Corrected Notice of Allowance received for U.S. Appl. No. 18/196,997, mailed on Apr. 25, 2024, 2 pages.
Corrected Notice of Allowance received for U.S. Appl. No. 18/196,997, mailed on Jun. 3, 2024, 2 pages.
Corrected Notice of Allowance received for U.S. Appl. No. 18/196,997, mailed on Jun. 13, 2024, 2 pages.
Corrected Notice of Allowance received for U.S. Appl. No. 18/196,997, mailed on May 23, 2024, 2 pages.
Corrected Notice of Allowance received for U.S. Appl. No. 18/628,021, mailed on Jun. 24, 2024, 2 pages.
Decision of Refusal received for Japanese Patent Application No. 2018-243463, mailed on Feb. 25, 2019, 8 pages (5 pages of English Translation and 3 pages of Official Copy).
Decision of Refusal received for Japanese Patent Application No. 2018-545502, mailed on Feb. 25, 2019, 11 pages (7 pages of English Translation and 4 pages of Official Copy).
Decision on Appeal received for Japanese Patent Application No. 2018-225131, mailed on Mar. 11, 2021, 5 pages (4 pages of English Translation and 1 page of Official Copy).
Decision on Appeal received for Japanese Patent Application No. 2018-545502, mailed on Mar. 25, 2021, 3 pages (1 page of English Translation and 2 pages of Official Copy).
Decision to grant received for Danish Patent Application No. PA201570788, mailed on Jul. 10, 2017, 2 pages.
Decision to Grant received for Danish Patent Application No. PA201570791, mailed on Jun. 7, 2017, 2 pages.
Decision to Grant received for Danish Patent Application No. PA201670627, mailed on Nov. 29, 2018, 2 pages.
Decision to Grant received for Danish Patent Application No. PA201670753, mailed on Mar. 6, 2019, 2 pages.
Decision to Grant received for Danish Patent Application No. PA201670755, mailed on Mar. 6, 2019, 2 pages.
Decision to Grant received for Danish Patent Application No. PA201970593, mailed on Sep. 7, 2021, 2 pages.
Decision to Grant received for Danish Patent Application No. PA201970601, mailed on Feb. 3, 2021, 2 pages.
Decision to Grant received for Danish Patent Application No. PA201970603, mailed on May 21, 2021, 2 pages.
Decision to Grant received for European Patent Application No. 15712218.5, mailed on Jun. 7, 2018, 2 pages.
Decision to Grant received for European Patent Application No. 16784025.5, mailed on Nov. 11, 2021, 2 pages.
Decision to Grant received for European Patent Application No. 17809168.2, mailed on Oct. 21, 2021, 3 pages.
Decision to Grant received for European Patent Application No. 18176890.4, mailed on Jul. 9, 2020, 3 pages.
Decision to Grant received for European Patent Application No. 18183054.8, mailed on Jan. 21, 2021, 3 pages.
Decision to Grant received for European Patent Application No. 18209460.7, mailed on Apr. 9, 2021, 2 pages.
Decision to Grant received for European Patent Application No. 18214698.5, mailed on Sep. 10, 2020, 3 pages.
Decision to Grant received for European Patent Application No. 20168009.7, mailed on Jun. 22, 2023, 4 pages.
Decision to Grant received for European Patent Application No. 20206197.4, mailed on Oct. 6, 2023, 4 pages.
Decision to Grant received for European Patent Application No. 20210373.5, mailed on May 19, 2023, 4 pages.
Decision to Grant received for Japanese Patent Application No. 2018-243463, mailed on Aug. 17, 2020, 2 pages (1 page of English Translation and 1 page of Official Copy).
Decision to Grant received for Japanese Patent Application No. 2019-203399, mailed on Oct. 20, 2021, 3 pages (1 page of English Translation and 2 pages of Official Copy).
Decision to Grant received for Japanese Patent Application No. 2020-070418, mailed on Feb. 8, 2021, 3 pages (1 page of English Translation and 2 pages of Official Copy).
Decision to Grant received for Japanese Patent Application No. 2020-184470, mailed on Jul. 1, 2021, 3 pages (1 page of English Translation and 2 pages of Official Copy).
Decision to Grant received for Japanese Patent Application No. 2020-184471, mailed on Jul. 1, 2021, 3 pages (1 page of English Translation and 2 pages of Official Copy).
Decision to Grant received for Japanese Patent Application No. 2021-051385, mailed on Jul. 8, 2021, 3 pages (1 page of English Translation and 2 pages of Official Copy).
Decision to Grant received for Japanese Patent Application No. 2021-187533, mailed on Sep. 28, 2023, 3 pages (1 page of English Translation and 2 pages of Official Copy).
Decision to Grant received for Japanese Patent Application No. 2022-145387, mailed on Mar. 4, 2024, 3 pages (1 page of English Translation and 2 pages of Official Copy).
Decision to Refuse received for European Patent Application No. 17184710.6, mailed on Jun. 16, 2020, 9 pages.
Decision to Refuse received for European Patent Application No. 21163791.3, mailed on Dec. 4, 2023, 16 pages.
Decision to Refuse received for Japanese Patent Application No. 2018-225131, mailed on Jul. 8, 2019, 6 pages (4 pages of English Translation and 2 pages of Official Copy).
Decision to Refuse received for Japanese Patent Application No. 2018-243463, mailed on Jul. 8, 2019, 5 pages (3 pages of English Translation and 2 pages of Official Copy).
Decision to Refuse received for Japanese Patent Application No. 2018-545502, mailed on Jul. 8, 2019, 5 pages (3 pages of English Translation and 2 pages of Official Copy).
Drunk Beauty Flower Digital Technology, "iPhone Xs Max Camera Tips, Tricks, Features and Complete Tutorial", Available online at: https://www.ixigua.com/6606874981844386308?wid_try=1, Oct. 2, 2018, 2 pages (Official Copy Only) {See Communication under Rule 37 CFR § 1.98(a) (3)}.
European Search Report received for European Patent Application No. 18209460.7, mailed on Mar. 15, 2019, 4 pages.
European Search Report received for European Patent Application No. 18214698.5, mailed on Mar. 21, 2019, 5 pages.
European Search Report received for European Patent Application No. 20206196.6, mailed on Dec. 8, 2020, 4 pages.
European Search Report received for European Patent Application No. 20206197.4, mailed on Nov. 30, 2020, 4 pages.
European Search Report received for European Patent Application No. 20210373.5, mailed on Apr. 13, 2021, 4 pages.
European Search Report received for European Patent Application No. 21157252.4, mailed on Apr. 16, 2021, 4 pages.
European Search Report received for European Patent Application No. 21163791.3, mailed on May 6, 2021, 5 pages.

(56) References Cited

OTHER PUBLICATIONS

Extended European Search Report received for European Patent Application No. 16784025.5, mailed on Apr. 16, 2018, 11 pages.
Extended European Search Report received for European Patent Application No. 20168009.7, mailed on Sep. 11, 2020, 12 pages.
Extended European Search Report received for European Patent Application No. 21202358.4, mailed on Dec. 6, 2021, 8 pages.
Extended European Search Report received for European Patent Application No. 24155758.6, mailed on Mar. 20, 2024, 11 pages.
Extended Search Report received for European Patent Application 17809168.2, mailed on Jun. 28, 2018, 9 pages.
Feng et al., "3D Direct Human-Computer Interface Paradigm Based on Free Hand Tracking", Chinese Journal of Computers, vol. 37, No. 6, Jun. 30, 2014, 15 pages (Official copy only) {See Communication under Rule 37 CFR § 1.98(a) (3)}.
Final Office Action received for U.S. Appl. No. 15/094,238, mailed on Feb. 6, 2020, 38 pages.
Final Office Action received for U.S. Appl. No. 15/094,238, mailed on Jul. 1, 2019, 29 pages.
Final Office Action received for U.S. Appl. No. 15/268,115, mailed on Oct. 11, 2017, 48 pages.
Final Office Action received for U.S. Appl. No. 16/143,396, mailed on Jun. 20, 2019, 14 pages.
Final Office Action received for U.S. Appl. No. 17/088,790, mailed on Aug. 17, 2023, 47 pages.
Final Office Action received for U.S. Appl. No. 17/088,790, mailed on May 17, 2022, 37 pages.
Franks Tech Help, "DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
FUJI FILM, "Taking Pictures Remotely: Free iPhone/Android App FUJI FILM Camera Remote", Available at <http://app.fujifilm-dsc.com/en/camera_remote/guide05.html>, Apr. 22, 2014, 3 pages.
Gibson, Andrews, "Aspect Ratio: What it is and Why it Matters", Retrieved from <https://web.archive.org/web/20190331225429/https:/digital-photography-school.com/aspect-ratio-what-it-is-and-why-it-matters/>, Paragraphs: "Adjusting aspect ratio in-camera", "Cropping in post-processing", Mar. 31, 2019, 10 pages.
Hearing Notice received for Indian Patent Application No. 201817024430, mailed on Apr. 6, 2023, 2 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.
Iluvtrading, "Super Bright Night Mode: Samsung Galaxy S1O vs Huawei P30 Pro (Review/How to/Explained)", Online Available at: https://www.youtube.com/watch?v=d4r3PWioY4Y, Apr. 26, 2019, 4 pages.
Intention to Grant received for Danish Patent Application No. PA201570788, mailed on Mar. 27, 2017, 2 pages.
Intention to Grant received for Danish Patent Application No. PA201570791, mailed on Mar. 7, 2017, 2 pages.
Intention to Grant received for Danish Patent Application No. PA201670627, mailed on Jun. 11, 2018, 2 pages.
Intention to Grant received for Danish Patent Application No. PA201670753, mailed on Oct. 29, 2018, 2 pages.
Intention to Grant received for Danish Patent Application No. PA201670755, mailed on Nov. 13, 2018, 2 pages.
Intention to Grant received for Danish Patent Application No. PA201970593, mailed on Apr. 13, 2021, 2 pages.
Intention to Grant received for Danish Patent Application No. PA201970601, mailed on Sep. 21, 2020, 2 pages.
Intention to Grant received for Danish Patent Application No. PA201970603, mailed on Jan. 13, 2021, 2 pages.
Intention to Grant received for European Patent Application No. 15712218.5, mailed on Jan. 24, 2018, 7 pages.
Intention to Grant received for European Patent Application No. 16784025.5, mailed on Jul. 15, 2021, 8 pages.
Intention to Grant received for European Patent Application No. 17809168.2, mailed on Jun. 25, 2021, 8 pages.
Intention to Grant received for European Patent Application No. 18176890.4, mailed on Feb. 28, 2020, 8 pages.
Intention to Grant received for European Patent Application No. 18183054.8, mailed on Nov. 5, 2020, 6 pages.
Intention to Grant received for European Patent Application No. 18209460.7, mailed on Jan. 15, 2021, 8 pages.
Intention to Grant received for European Patent Application No. 18214698.5, mailed on Apr. 21, 2020, 8 pages.
Intention to Grant received for European Patent Application No. 20168009.7, mailed on Feb. 28, 2023, 10 pages.
Intention to Grant received for European Patent Application No. 20168009.7, mailed on May 17, 2022, 9 pages.
Intention to Grant received for European Patent Application No. 20168009.7, mailed on Oct. 31, 2022, 9 pages.
Intention to Grant received for European Patent Application No. 20206196.6, mailed on Nov. 10, 2023, 10 pages.
Intention to Grant received for European Patent Application No. 20206197.4, mailed on Dec. 15, 2022, 10 pages.
Intention to Grant received for European Patent Application No. 20206197.4, mailed on May 25, 2023, 9 pages.
Intention to Grant received for European Patent Application No. 20210373.5, mailed on Jan. 10, 2023, 12 pages.
Intention to Grant received for European Patent Application No. 21202358.4, mailed on Apr. 15, 2024, 9 pages.
International Preliminary Report on Patentability and Written Opinion received for PCT Application No. PCT/US2016/029030, mailed on Nov. 2, 2017, 35 pages.
International Preliminary Report on Patentability received for PCT Patent Application No. PCT/US2015/019298, mailed on Mar. 16, 2017, 12 pages.
International Preliminary Report on Patentability received for PCT Patent Application No. PCT/US2017/035321, mailed on Dec. 27, 2018, 11 pages.
International Preliminary Report on Patentability received for PCT Patent Application No. PCT/US2020/031643, mailed on Nov. 18, 2021, 27 pages.
International Search Report & Written Opinion received for PCT Patent Application No. PCT/US2016/029030, mailed on Aug. 5, 2016, 37 pages.
International Search Report and Written Opinion received for PCT Patent Application No. PCT/US2015/019298, mailed on Jul. 13, 2015, 17 pages.
International Search Report and Written Opinion received for PCT Patent Application No. PCT/US2017/035321, mailed on Oct. 6, 2017, 15 pages.
International Search Report and Written Opinion received for PCT Patent Application No. PCT/US2020/031643, mailed on Dec. 2, 2020, 33 pages.
International Search Report and Written Opinion received for PCT Patent Application No. PCT/US2020/031643, mailed on Nov. 2, 2020, 34 pages.
International Search Report and Written Opinion received for PCT Patent Application No. PCT/US2023/024344, mailed on Oct. 30, 2023, 24 pages.
Invitation to Pay Addition Fees received for PCT Patent Application No. PCT/US2017/035321, mailed on Aug. 17, 2017, 3 pages.
Invitation to Pay Additional Fees and Partial International Search Report received for PCT Patent Application No. PCT/US2023/024344, mailed on Sep. 8, 2023, 16 pages.
Invitation to Pay Additional Fees received for PCT Patent Application No. PCT/US2020/031643, mailed on Sep. 9, 2020, 30 pages.
Invitation to Pay Search Fees received for European Patent Application No. 20728854.9, mailed on Feb. 23, 2024, 3 pages.
KK World, "Redmi Note 7 Pro Night Camera Test I Night Photography with Night Sight & Mode", Online Available at: https://www.youtube.com/watch?v=3EKjGBjX3PY, Mar. 26, 2019, 4 pages.
Minutes of the Oral Proceedings received for European Patent Application No. 17184710.6, mailed on May 22, 2024, 4 pages.
Minutes of the Oral Proceedings received for European Patent Application No. 21163791.3, mailed on Dec. 1, 2023, 6 pages.
Non-Final Office Action received for U.S. Appl. No. 12/508,534, mailed on Dec. 30, 2011, 11 pages.

(56) References Cited

OTHER PUBLICATIONS

Non-Final Office Action received for U.S. Appl. No. 15/094,238, mailed on Nov. 29, 2018, 24 pages.
Non-Final Office Action received for U.S. Appl. No. 15/094,238, mailed on Oct. 1, 2019, 32 pages.
Non-Final Office Action received for U.S. Appl. No. 15/136,323, mailed on Apr. 6, 2017, 27 pages.
Non-Final Office Action received for U.S. Appl. No. 15/268,115, mailed on Apr. 13, 2017, 44 pages.
Non-Final Office Action received for U.S. Appl. No. 15/273,522, mailed on Nov. 30, 2016, 15 pages.
Non-Final Office Action received for U.S. Appl. No. 15/273,544, mailed on May 25, 2017, 18 pages.
Non-Final Office Action received for U.S. Appl. No. 15/863,369, mailed on Apr. 4, 2018, 15 pages.
Non-Final Office Action received for U.S. Appl. No. 16/143,396, mailed on Jan. 7, 2019, 13 pages.
Non-Final Office Action received for U.S. Appl. No. 16/582,595, mailed on Nov. 26, 2019, 17 pages.
Non-Final Office Action received for U.S. Appl. No. 16/583,020, mailed on Nov. 14, 2019, 9 pages.
Non-Final Office Action received for U.S. Appl. No. 16/825,879, mailed on May 5, 2021, 12 pages.
Non-Final Office Action received for U.S. Appl. No. 17/041,412, mailed on Dec. 5, 2022, 13 pages.
Non-Final Office Action received for U.S. Appl. No. 17/088,790, mailed on Feb. 21, 2023, 39 pages.
Non-Final Office Action received for U.S. Appl. No. 17/088,790, mailed on Sep. 17, 2021, 31 pages.
Non-Final Office Action received for U.S. Appl. No. 17/190,879, mailed on Oct. 13, 2021, 10 pages.
Non-Final Office Action received for U.S. Appl. No. 17/510,168, mailed on Dec. 6, 2022, 11 pages.
Non-Final Office Action received for U.S. Appl. No. 17/940,672, mailed on Mar. 16, 2023, 15 pages.
Non-Final Office Action received for U.S. Appl. No. 18/196,997, mailed on Nov. 20, 2023, 12 pages.
Non-Final Office Action received for U.S. Appl. No. 18/207,293, mailed on Feb. 29, 2024, 11 pages.
Notice of Acceptance received for Australian Patent Application No. 2016252993, mailed on Dec. 19, 2017, 3 pages.
Notice of Acceptance received for Australian Patent Application No. 2017286130, mailed on Apr. 26, 2019, 3 pages.
Notice of Acceptance received for Australian Patent Application No. 2019213341, mailed on Aug. 25, 2020, 3 pages.
Notice of Acceptance received for Australian Patent Application No. 2020260413, mailed on Oct. 14, 2021, 3 pages.
Notice of Acceptance received for Australian Patent Application No. 2020267151, mailed on Dec. 9, 2020, 3 pages.
Notice of Acceptance received for Australian Patent Application No. 2020277216, mailed on Mar. 15, 2021, 3 pages.
Notice of Acceptance received for Australian Patent Application No. 2021201167, mailed on Mar. 15, 2021, 3 pages.
Notice of Acceptance received for Australian Patent Application No. 2021203210, mailed on Jul. 9, 2021, 3 pages.
Notice of Acceptance received for Australian Patent Application No. 2021254567, mailed on Nov. 17, 2021, 3 pages.
Notice of Acceptance received for Australian Patent Application No. 2021290292, mailed on Jan. 23, 2023, 3 pages.
Notice of Acceptance received for Australian Patent Application No. 2022200966, mailed on Feb. 25, 2022, 3 pages.
Notice of Acceptance received for Australian Patent Application No. 2022202377, mailed on May 11, 2022, 3 pages.
Notice of Acceptance received for Australian Patent Application No. 2022221466, mailed on Aug. 31, 2023, 3 pages.
Notice of Acceptance received for Australian Patent Application No. 2023200607, mailed on May 9, 2024, 3 pages.
Notice of Allowance received for Brazilian Patent Application No. 112018074765-3, mailed on Oct. 8, 2019, 2 pages (1 page of English Translation and 1 page of Official Copy).
Notice of Allowance received for Brazilian Patent Application No. BR122018076550-0, mailed on Jan. 3, 2022, 3 pages (1 page of English Translation and 2 pages of Official Copy).
Notice of Allowance received for Chinese Patent Application No. 201580046237.6, mailed on Aug. 29, 2018, 4 pages (1 page of English Translation and 3 pages of Official copy).
Notice of Allowance received for Chinese Patent Application No. 201680023520.1, mailed on Jun. 28, 2019, 2 pages (1 page of English Translation and 1 page of Official Copy).
Notice of Allowance received for Chinese Patent Application No. 201710657424.9, mailed on May 8, 2020, 2 pages (1 page of English Translation and 1 page of Official Copy).
Notice of Allowance received for Chinese Patent Application No. 201780002533.5, mailed on Apr. 14, 2020, 2 pages (1 page of English Translation and 1 page of Official Copy).
Notice of Allowance received for Chinese Patent Application No. 201810566134.8, mailed on Apr. 7, 2020, 3 pages (1 page of English Translation and 2 pages of Official Copy).
Notice of Allowance received for Chinese Patent Application No. 201810664927.3, mailed on Jul. 19, 2019, 2 pages (1 page of English Translation and 1 page of Official Copy).
Notice of Allowance received for Chinese Patent Application No. 201811512767.7, mailed on Jul. 27, 2020, 4 pages (1 page of English Translation and 3 pages of Official Copy).
Notice of Allowance received for Chinese Patent Application No. 201910864074.2, mailed on Mar. 10, 2021, 2 pages (1 page of English Translation and 1 page of Official Copy).
Notice of Allowance received for Chinese Patent Application No. 202010287950.2, mailed on Mar. 22, 2022, 7 pages (3 pages of English Translation and 4 pages of Official Copy).
Notice of Allowance received for Chinese Patent Application No. 202010287953.6, mailed on Mar. 18, 2021, 7 pages (3 pages of English Translation and 4 pages of Official Copy).
Notice of Allowance received for Chinese Patent Application No. 202010287958.9, mailed on Aug. 27, 2021, 6 pages (3 pages of English Translation and 3 pages of Official Copy).
Notice of Allowance received for Chinese Patent Application No. 202010287961.0, mailed on Mar. 9, 2021, 8 pages (4 pages of English Translation and 4 pages of Official Copy).
Notice of Allowance received for Chinese Patent Application No. 202010287975.2, mailed on Mar. 1, 2021, 7 pages (3 pages of English Translation and 4 pages of Official Copy).
Notice of Allowance received for Chinese Patent Application No. 202010600151.6, mailed on Aug. 13, 2021, 2 pages (1 page of English Translation and 1 page of Official Copy).
Notice of Allowance received for Chinese Patent Application No. 202010600197.8, mailed on Feb. 9, 2022, 5 pages (1 page of English Translation and 4 pages of Official Copy).
Notice of Allowance received for Chinese Patent Application No. 202010601484.0, mailed on Nov. 23, 2021, 2 pages (1 page of English Translation and 1 page of Official Copy).
Notice of Allowance received for Chinese Patent Application No. 202011480411.7, mailed on Feb. 18, 2022, 6 pages (3 pages of English Translation and 3 pages of Official Copy).
Notice of Allowance received for Japanese Patent Application No. 2018-171188, mailed on Jul. 16, 2019, 3 pages (1 page of English Translation and 2 pages of Official Copy).
Notice of Allowance received for Japanese Patent Application No. 2021-565919, mailed on Oct. 3, 2022, 3 pages (1 page of English Translation and 2 pages of Official Copy).
Notice of Allowance received for Korean Patent Application No. 10-2018-7026743, mailed on Mar. 20, 2019, 7 pages (1 page of English Translation and 6 pages of Official Copy).
Notice of Allowance received for Korean Patent Application No. 10-2018-7028849, mailed on Feb. 1, 2019, 4 pages (1 page of English Translation and 3 pages of Official Copy).
Notice of Allowance received for Korean Patent Application No. 10-2018-7034780, mailed on Jun. 19, 2019, 4 pages (1 page of English Translation and 3 pages of Official Copy).
Notice of Allowance received for Korean Patent Application No. 10-2018-7036893, mailed on Jun. 12, 2019, 4 pages (1 page of English Translation and 3 pages of Official Copy).

(56) References Cited

OTHER PUBLICATIONS

Notice of Allowance received for Korean Patent Application No. 10-2019-7027042, mailed on Nov. 26, 2020, 4 pages (1 page of English Translation and 3 pages of Official Copy).
Notice of Allowance received for Korean Patent Application No. 10-2020-0052618, mailed on Mar. 23, 2021, 5 pages (2 page of English Translation and 3 pages of Official Copy).
Notice of Allowance received for Korean Patent Application No. 10-2020-0143726, mailed on Nov. 10, 2020, 5 pages (2 pages of English Translation and 3 pages of Official Copy).
Notice of Allowance received for Korean Patent Application No. 10-2020-0155924, mailed on Nov. 23, 2020, 7 pages (2 pages of English Translation and 5 pages of Official Copy).
Notice of Allowance received for Korean Patent Application No. 10-2021-0022053, mailed on Nov. 23, 2021, 5 pages (2 pages of English Translation and 3 pages of Official Copy).
Notice of Allowance received for Korean Patent Application No. 10-2021-7000954, mailed on Aug. 18, 2021, 5 pages (2 pages of English Translation and 3 pages of Official Copy).
Notice of Allowance received for Korean Patent Application No. 10-2021-7035687, mailed on Dec. 30, 2021, 5 pages (1 page of English Translation and 4 pages of Official Copy).
Notice of Allowance received for Korean Patent Application No. 10-2021-7036337, mailed on Apr. 5, 2022, 4 pages (1 page of English Translation and 3 pages of Official Copy).
Notice of Allowance received for Korean Patent Application No. 10-2022-7010505, mailed on Dec. 26, 2022, 7 pages (2 pages of English Translation and 5 pages of Official Copy).
Notice of Allowance received for Korean Patent Application No. 10-2022-7023077, mailed on Nov. 1, 2022, 8 pages (2 pages of English Translation and 6 pages of Official Copy).
Notice of Allowance received for Korean Patent Application No. 10-2023-7009943, mailed on Aug. 31, 2023, 7 pages (2 pages of English Translation and 5 pages of Official Copy).
Notice of Allowance received for Taiwanese Patent Application No. 104107328, mailed on Jun. 12, 2017, 3 pages (Official Copy Only) {See Communication under Rule 37 CFR § 1.98(a) (3)}.
Notice of Allowance received for U.S. Appl. No. 14/641,251, mailed on May 18, 2016, 13 pages.
Notice of Allowance received for U.S. Appl. No. 15/094,238, mailed on Jul. 9, 2020, 19 pages.
Notice of Allowance received for U.S. Appl. No. 15/136,323, mailed on Feb. 28, 2018, 9 pages.
Notice of Allowance received for U.S. Appl. No. 15/136,323, mailed on Oct. 12, 2017, 8 pages.
Notice of Allowance received for U.S. Appl. No. 15/268,115, mailed on Mar. 7, 2018, 15 pages.
Notice of Allowance received for U.S. Appl. No. 15/273,453, mailed on Oct. 12, 2017, 11 pages.
Notice of Allowance received for U.S. Appl. No. 15/273,503, mailed on Aug. 14, 2017, 9 pages.
Notice of Allowance received for U.S. Appl. No. 15/273,522, mailed on Mar. 28, 2017, 9 pages.
Notice of Allowance received for U.S. Appl. No. 15/273,522, mailed on May 19, 2017, 2 pages.
Notice of Allowance received for U.S. Appl. No. 15/273,522, mailed on May 23, 2017, 2 pages.
Notice of Allowance received for U.S. Appl. No. 15/273,544, mailed on Mar. 13, 2018, 8 pages.
Notice of Allowance received for U.S. Appl. No. 15/273,544, mailed on Oct. 27, 2017, 8 pages.
Notice of Allowance received for U.S. Appl. No. 15/858,175, mailed on Jun. 1, 2018, 8 pages.
Notice of Allowance received for U.S. Appl. No. 15/858,175, mailed on Sep. 12, 2018, 8 pages.
Notice of Allowance received for U.S. Appl. No. 15/863,369, mailed on Jun. 28, 2018, 8 pages.
Notice of Allowance received for U.S. Appl. No. 15/975,581, mailed on Oct. 3, 2018, 25 pages.
Notice of Allowance received for U.S. Appl. No. 16/143,396, mailed on Nov. 27, 2019, 8 pages.
Notice of Allowance received for U.S. Appl. No. 16/191,117, mailed on Oct. 29, 2019, 9 pages.
Notice of Allowance received for U.S. Appl. No. 16/582,595, mailed on Mar. 20, 2020, 9 pages.
Notice of Allowance received for U.S. Appl. No. 16/583,020, mailed on Apr. 1, 2020, 5 pages.
Notice of Allowance received for U.S. Appl. No. 16/583,020, mailed on Feb. 28, 2020, 5 pages.
Notice of Allowance received for U.S. Appl. No. 16/584,044, mailed on Dec. 11, 2019, 15 pages.
Notice of Allowance received for U.S. Appl. No. 16/584,044, mailed on Mar. 30, 2020, 16 pages.
Notice of Allowance received for U.S. Appl. No. 16/584,044, mailed on Nov. 14, 2019, 13 pages.
Notice of Allowance received for U.S. Appl. No. 16/584,100, mailed on Apr. 8, 2020, 12 pages.
Notice of Allowance received for U.S. Appl. No. 16/584,100, mailed on Jan. 14, 2020, 13 pages.
Notice of Allowance received for U.S. Appl. No. 16/584,693, mailed on Jan. 15, 2020, 15 pages.
Notice of Allowance received for U.S. Appl. No. 16/584,693, mailed on May 4, 2020, 12 pages.
Notice of Allowance received for U.S. Appl. No. 16/586,314, mailed on Apr. 1, 2020, 8 pages.
Notice of Allowance received for U.S. Appl. No. 16/586,314, mailed on Jan. 9, 2020, 10 pages.
Notice of Allowance received for U.S. Appl. No. 16/586,344, mailed on Dec. 16, 2019, 12 pages.
Notice of Allowance received for U.S. Appl. No. 16/586,344, mailed on Mar. 27, 2020, 12 pages.
Notice of Allowance received for U.S. Appl. No. 16/825,879, mailed on Jul. 13, 2021, 9 pages.
Notice of Allowance received for U.S. Appl. No. 16/825,879, mailed on Sep. 28, 2021, 8 pages.
Notice of Allowance received for U.S. Appl. No. 16/835,651, mailed on Jul. 23, 2021, 8 pages.
Notice of Allowance received for U.S. Appl. No. 16/835,651, mailed on Jun. 1, 2021, 10 pages.
Notice of Allowance received for U.S. Appl. No. 16/835,651, mailed on Nov. 10, 2021, 9 pages.
Notice of Allowance received for U.S. Appl. No. 16/840,719, mailed on April 30, 2021, 13 pages.
Notice of Allowance received for U.S. Appl. No. 17/041,412, mailed on Apr. 26, 2023, 11 pages.
Notice of Allowance received for U.S. Appl. No. 17/041,412, mailed on Mar. 15, 2023, 13 pages.
Notice of Allowance received for U.S. Appl. No. 17/190,879, mailed on Nov. 10, 2021, 8 pages.
Notice of Allowance received for U.S. Appl. No. 17/409,598, mailed on Jun. 21, 2022, 12 pages.
Notice of Allowance received for U.S. Appl. No. 17/409,598, mailed on Sep. 14, 2022, 9 pages.
Notice of Allowance received for U.S. Appl. No. 17/510,168, mailed on Feb. 13, 2023, 10 pages.
Notice of Allowance received for U.S. Appl. No. 17/510,168, mailed on May 3, 2023, 10 pages.
Notice of Allowance received for U.S. Appl. No. 17/566,094, mailed on Feb. 23, 2023, 8 pages.
Notice of Allowance received for U.S. Appl. No. 17/566,094, mailed on Nov. 22, 2022, 10 pages.
Notice of Allowance received for U.S. Appl. No. 17/940,672, mailed on Apr. 27, 2023, 9 pages.
Notice of Allowance received for U.S. Appl. No. 18/121,458, mailed on Dec. 6, 2023, 9 pages.
Notice of Allowance received for U.S. Appl. No. 18/121,458, mailed on Mar. 12, 2024, 9 pages.
Notice of Allowance received for U.S. Appl. No. 18/196,997, mailed on Mar. 28, 2024, 11 pages.
Notice of Allowance received for U.S. Appl. No. 18/628,021, mailed on Jun. 5, 2024, 9 pages.

(56) References Cited

OTHER PUBLICATIONS

Notice of Hearing received for Indian Patent Application No. 201818045872, mailed on Nov. 16, 2023, 2 pages.
Notice of Hearing received for Indian Patent Application No. 201818046896, mailed on Jul. 11, 2023, 2 pages.
Notice of Hearing received for Indian Patent Application No. 202118028159, mailed on Nov. 22, 2023, 2 pages.
Office Action received for Australian Patent Application No. 2017100683, mailed on Sep. 20, 2017, 3 pages.
Office Action received for Australian Patent Application No. 2017100684, mailed on Jan. 24, 2018, 4 pages.
Office Action received for Australian Patent Application No. 2017100684, mailed on Oct. 5, 2017, 4 pages.
Office Action Received for Australian Patent Application No. 2017286130, mailed on Jan. 21, 2019, 4 pages.
Office Action received for Australian Patent Application No. 2019213341, mailed on Jun. 30, 2020, 6 pages.
Office Action received for Australian Patent Application No. 2020100720, mailed on Jul. 9, 2020, 7 pages.
Office Action received for Australian Patent Application No. 2020100720, mailed on Sep. 1, 2020, 5 pages.
Office Action received for Australian Patent Application No. 2020260413, mailed on Jun. 24, 2021, 2 pages.
Office Action received for Australian Patent Application No. 2020277216, mailed on Dec. 17, 2020, 5 pages.
Office Action received for Australian Patent Application No. 2021290292, mailed on Nov. 24, 2022, 2 pages.
Office Action received for Australian Patent Application No. 2022221466, mailed on Jun. 16, 2023, 2 pages.
Office Action received for Australian Patent Application No. 2023200607, mailed on Dec. 20, 2023, 3 pages.
Office Action received for Australian Patent Application No. 2023200607, mailed on Feb. 22, 2024, 2 pages.
Office Action received for Brazilian Patent Application No. BR122018076550-0, mailed on Sep. 28, 2022, 7 pages (1 page of English Translation and 6 pages of Official Copy).
Office Action received for Chinese Patent Application No. 201580046237.6, mailed on Feb. 6, 2018, 10 pages (5 pages of English Translation and 5 pages of Official Copy).
Office Action received for Chinese Patent Application No. 201680023520.1, mailed on Jan. 3, 2019, 10 pages (5 pages of English translation and 5 pages of Official Copy).
Office Action received for Chinese Patent Application No. 201710657424.9, mailed on Sep. 17, 2019, 23 pages (11 pages of English Translation and 12 pages of Official Copy).
Office Action received for Chinese Patent Application No. 201780002533.5, mailed on Apr. 25, 2019, 17 pages (7 pages of English Translation and 10 pages of Official Copy).
Office Action received for Chinese Patent Application No. 201780002533.5, mailed on Feb. 3, 2020, 6 pages (3 pages of English Translation and 3 pages of Official Copy).
Office Action received for Chinese Patent Application No. 201780002533.5, mailed on Sep. 26, 2019, 21 pages (9 pages of English Translation and 12 pages of Official Copy).
Office Action received for Chinese Patent Application No. 201810566134.8, mailed on Aug. 13, 2019, 14 pages (8 pages of English Translation and 6 pages of Official Copy).
Office Action received for Chinese Patent Application No. 201810664927.3, mailed on Mar. 28, 2019, 11 pages (5 pages of English Translation and 6 pages of Official Copy).
Office Action received for Chinese Patent Application No. 201811446867.4, mailed on Dec. 31, 2019, 12 pages (5 pages of English Translation and 7 pages of Official Copy).
Office Action received for Chinese Patent Application No. 201811446867.4, mailed on May 6, 2020, 10 pages (5 pages of English Translation and 5 pages of Official Copy).
Office Action received for Chinese Patent Application No. 201811446867.4, mailed on Sep. 8, 2020, 9 pages (4 pages of English Translation and 5 pages of Official Copy).
Office Action received for Chinese Patent Application No. 201811512767.7, mailed on Dec. 20, 2019, 14 pages (7 pages of English Translation and 7 pages of Official Copy).
Office Action received for Chinese Patent Application No. 201811512767.7, mailed on Jun. 4, 2020, 6 pages (3 pages of English Translation and 3 pages of Official Copy).
Office Action received for Chinese Patent Application No. 201910864074.2, mailed on Sep. 23, 2020, 11 pages (5 pages of English Translation and 6 pages of Official Copy).
Office Action received for Chinese Patent Application No. 202010235395.9, mailed on Mar. 16, 2024, 18 pages (9 pages of English Translation and 9 pages of Official Copy).
Office Action received for Chinese Patent Application No. 202010287950.2, mailed on Aug. 10, 2021, 12 pages (6 pages of English Translation and 6 pages of Official Copy).
Office Action received for Chinese Patent Application No. 202010287950.2, mailed on Feb. 20, 2021, 22 pages (10 pages of English Translation and 12 pages of Official Copy).
Office Action received for Chinese Patent Application No. 202010287950.2, mailed on Nov. 19, 2021, 8 pages (5 pages of English Translation and 3 pages of Official Copy).
Office Action received for Chinese Patent Application No. 202010287953.6, mailed on Jan. 14, 2021, 14 pages (7 pages of English Translation and 7 pages of Official Copy).
Office Action received for Chinese Patent Application No. 202010287958.9, mailed on Jan. 5, 2021, 16 pages (8 pages of English Translation and 8 pages of Official Copy).
Office Action received for Chinese Patent Application No. 202010287961.0, mailed on Dec. 30, 2020, 16 pages (8 pages of English Translation and 8 pages of Official Copy).
Office Action received for Chinese Patent Application No. 202010287975.2, mailed on Dec. 30, 2020, 17 pages (9 pages of English Translation and 8 pages of Official Copy).
Office Action received for Chinese Patent Application No. 202010600151.6, mailed on Apr. 29, 2021, 11 pages (5 pages of English Translation and 6 pages of Official Copy).
Office Action received for Chinese Patent Application No. 202010600197.8, mailed on Jul. 2, 2021, 14 pages (6 pages of English Translation and 8 pages of Official Copy).
Office Action received for Chinese Patent Application No. 202010601484.0, mailed on Jun. 3, 2021, 13 pages (6 pages of English Translation and 7 pages of Official Copy).
Office Action received for Chinese Patent Application No. 202011480411.7, mailed on Aug. 2, 2021, 12 pages (6 pages of English Translation and 6 pages of Official Copy).
Office Action received for Chinese Patent Application No. 202011480411.7, mailed on Jan. 12, 2022, 7 pages (4 pages of English Translation and 3 pages of Official Copy).
Office Action received for Chinese Patent Application No. 202110766668.7, mailed on Feb. 16, 2022, 12 pages (6 pages of English Translation and 6 pages of Official Copy).
Office Action received for Chinese Patent Application No. 202110766668.7, mailed on Jan. 20, 2023, 11 pages (6 pages of English Translation and 5 pages of Official Copy).
Office Action received for Chinese Patent Application No. 202110766668.7, mailed on Jun. 7, 2023, 13 pages (9 pages of English Translation and 4 pages of Official Copy).
Office Action received for Chinese Patent Application No. 202110766668.7, mailed on Sep. 15, 2022, 18 pages (9 pages of English Translation and 9 pages of Official Copy).
Office Action received for Danish Patent Application No. PA201570788, mailed on Apr. 8, 2016, 11 pages.
Office Action received for Danish Patent Application No. PA201570788, mailed on Sep. 13, 2016, 3 pages.
Office action received for Danish Patent Application No. PA201570791, mailed on Apr. 6, 2016, 12 pages.
Office action received for Danish Patent Application No. PA201570791, mailed on Sep. 6, 2016, 4 pages.
Office Action received for Danish Patent Application No. PA201670627, mailed on Apr. 5, 2017, 3 pages.
Office Action received for Danish Patent Application No. PA201670627, mailed on Nov. 6, 2017, 2 pages.

(56) References Cited

OTHER PUBLICATIONS

Office Action received for Danish Patent Application No. PA201670627, mailed on Oct. 11, 2016, 8 pages.
Office Action received for Danish Patent Application No. PA201670753, mailed on Dec. 20, 2016, 7 pages.
Office Action received for Danish Patent Application No. PA201670753, mailed on Jul. 5, 2017, 4 pages.
Office Action received for Danish Patent Application No. PA201670753, mailed on Mar. 23, 2018, 5 pages.
Office Action received for Danish Patent Application No. PA201670755, mailed on Apr. 6, 2017, 5 pages.
Office Action received for Danish Patent Application No. PA201670755, mailed on Apr. 20, 2018, 2 pages.
Office Action received for Danish Patent Application No. PA201670755, mailed on Dec. 22, 2016, 6 pages.
Office Action received for Danish Patent Application No. PA201670755, mailed on Oct. 20, 2017, 4 pages.
Office Action received for Danish Patent Application No. PA201970592, mailed on Mar. 2, 2020, 5 pages.
Office Action received for Danish Patent Application No. PA201970592, mailed on Oct. 26, 2020, 5 pages.
Office Action received for Danish Patent Application No. PA201970593, mailed on Apr. 16, 2020, 2 pages.
Office Action received for Danish Patent Application No. PA201970593, mailed on Feb. 2, 2021, 2 pages.
Office Action received for Danish Patent Application No. PA201970593, mailed on Mar. 10, 2020, 4 pages.
Office Action received for Danish Patent Application No. PA201970595, mailed on Mar. 10, 2020, 4 pages.
Office Action received for Danish Patent Application No. PA201970600, mailed on Mar. 9, 2020, 5 pages.
Office Action received for Danish Patent Application No. PA201970601, mailed on Aug. 13, 2020, 3 pages.
Office Action received for Danish Patent Application No. PA201970601, mailed on Jan. 31, 2020, 3 pages.
Office Action received for Danish Patent Application No. PA201970601, mailed on Nov. 11, 2019, 8 pages.
Office Action received for Danish Patent Application No. PA201970603, mailed on Nov. 4, 2020, 3 pages.
Office Action received for Danish Patent Application No. PA201970605, mailed on Mar. 10, 2020, 5 pages.
Office Action received for European Patent Application 17809168. 2, mailed on Jan. 7, 2020, 5 pages.
Office Action received for European Patent Application 17809168. 2, mailed on Oct. 8, 2020, 4 pages.
Office Action received for European Patent Application No. 15712218. 5, mailed on Aug. 3, 2017, 4 pages.
Office Action received for European Patent Application No. 16784025. 5, mailed on Jul. 17, 2020, 6 pages.
Office Action received for European Patent Application No. 17184710. 6, mailed on Dec. 21, 2018, 7 pages.
Office Action received for European Patent Application No. 18176890. 4, mailed on Oct. 16, 2018, 8 pages.
Office Action received for European Patent Application No. 18183054. 8, mailed on Feb. 24, 2020, 6 pages.
Office Action received for European Patent Application No. 18183054. 8, mailed on Nov. 16, 2018, 8 pages.
Office Action received for European Patent Application No. 18209460. 7, mailed on Apr. 10, 2019, 7 pages.
Office Action received for European Patent Application No. 18209460. 7, mailed on Apr. 21, 2020, 5 pages.
Office Action received for European Patent Application No. 18214698. 5, mailed on Apr. 2, 2019, 8 pages.
Office Action received for European Patent Application No. 20168009. 7, mailed on Apr. 20, 2021, 6 pages.
Office Action received for European Patent Application No. 20168009. 7, mailed on Sep. 13, 2021, 8 pages.
Office Action received for European Patent Application No. 20206196. 6, mailed on Aug. 10, 2022, 13 pages.
Office Action received for European Patent Application No. 20206196. 6, mailed on Jan. 13, 2021, 10 pages.
Office Action received for European Patent Application No. 20206197. 4, mailed on Aug. 27, 2021, 6 pages.
Office Action received for European Patent Application No. 20206197. 4, mailed on Jan. 12, 2021, 9 pages.
Office Action received for European Patent Application No. 20206197. 4, mailed on Mar. 18, 2022, 7 pages.
Office Action received for European Patent Application No. 20210373. 5, mailed on Dec. 9, 2021, 7 pages.
Office Action received for European Patent Application No. 20210373. 5, mailed on May 10, 2021, 9 pages.
Office Action received for European Patent Application No. 20210373. 5, mailed on May 31, 2022, 5 pages.
Office Action received for European Patent Application No. 20728854. 9, mailed on Apr. 8, 2024, 7 pages.
Office Action received for European Patent Application No. 20728854. 9, mailed on May 7, 2024, 10 pages.
Office Action received for European Patent Application No. 21157252. 4, mailed on Apr. 23, 2021, 8 pages.
Office Action received for European Patent Application No. 21157252. 4, mailed on Jul. 24, 2023, 5 pages.
Office Action received for European Patent Application No. 21163791. 3, mailed on Jun. 2, 2021, 8 pages.
Office Action received for European Patent Application No. 21163791. 3, mailed on Sep. 20, 2022, 6 pages.
Office Action received for European Patent Application No. 21202358. 4, mailed on Jun. 9, 2023, 7 pages.
Office Action received for Indian Patent Application No. 201817024430, mailed on Sep. 27, 2021, 8 pages.
Office Action received for Indian Patent Application No. 201818025015, mailed on Feb. 4, 2022, 7 pages.
Office Action received for Indian Patent Application No. 201818045872, mailed on Oct. 13, 2021, 7 pages.
Office Action received for Indian Patent Application No. 201818046896, mailed on Feb. 2, 2022, 7 pages.
Office Action received for Indian Patent Application No. 202117017871, mailed on Apr. 4, 2024, 8 pages.
Office Action received for Indian Patent Application No. 202118021941, mailed on Mar. 23, 2022, 5 pages.
Office Action received for Indian Patent Application No. 202118028158, mailed on Apr. 22, 2024, 7 pages.
Office Action received for Indian Patent Application No. 202118028159, mailed on Jun. 27, 2022, 6 pages.
Office Action received for Japanese Patent Application No. 2018-225131, mailed on Aug. 17, 2020, 21 pages (6 pages of English Translation and 15 pages of Official Copy).
Office Action received for Japanese Patent Application No. 2018-225131, mailed on Mar. 4, 2019, 10 pages (6 pages of English Translation and 4 pages of Official Copy).
Office Action received for Japanese Patent Application No. 2018-545502, mailed on Aug. 17, 2020, 14 pages (6 pages of English Translation and 8 pages of Official Copy).
Office Action received for Japanese Patent Application No. 2019-203399, mailed on Aug. 10, 2021, 4 pages (2 pages of English Translation and 2 pages of Official Copy).
Office Action received for Japanese Patent Application No. 2020-070418, mailed on Aug. 3, 2020, 22 pages (14 pages of English Translation and 8 pages of Official Copy).
Office Action received for Japanese Patent Application No. 2020-184470, mailed on May 10, 2021, 3 pages (1 page of English Translation and 2 pages of Official Copy).
Office Action received for Japanese Patent Application No. 2020-184471, mailed on May 10, 2021, 3 pages (1 page of English Translation and 2 pages of Official Copy).
Office Action received for Japanese Patent Application No. 2021-187533, mailed on Feb. 6, 2023, 7 pages (4 pages of English Translation and 3 pages of Official Copy).
Office Action received for Japanese Patent Application No. 2021-187533, mailed on Jun. 26, 2023, 6 pages (3 pages of English Translation and 3 pages of Official Copy).

(56) References Cited

OTHER PUBLICATIONS

Office Action received for Japanese Patent Application No. 2021-565919, mailed on Jun. 13, 2022, 4 pages (2 pages of English Translation and 2 pages of Official Copy).
Office Action received for Japanese Patent Application No. 2022-145387, mailed on Oct. 2, 2023, 7 pages (3 pages of English Translation and 4 pages of Official Copy).
Office Action received for Korean Patent Application No. 10-2018-7026743, mailed on Jan. 17, 2019, 5 pages (2 pages of English Translation and 3 pages of Official Copy).
Office Action received for Korean Patent Application No. 10-2018-7034780, mailed on Apr. 4, 2019, 11 pages (5 pages of English Translation and 6 pages of Official Copy).
Office Action received for Korean Patent Application No. 10-2018-7036893, mailed on Apr. 9, 2019, 6 pages (2 pages of English Translation and 4 pages of Official Copy).
Office Action received for Korean Patent Application No. 10-2019-7027042, mailed on May 13, 2020, 6 pages (2 pages of English Translation and 4 pages of Official Copy).
Office Action received for Korean Patent Application No. 10-2020-0052618, mailed on Aug. 18, 2020, 11 pages (5 pages of English Translation and 6 pages of Official Copy).
Office Action received for Korean Patent Application No. 10-2021-0022053, mailed on Mar. 1, 2021, 11 pages (5 pages of English Translation and 6 pages of Official Copy).
Office Action received for Korean Patent Application No. 10-2021-7000954, mailed on Jan. 28, 2021, 5 pages (2 pages of English Translation and 3 pages of Official Copy).
Office Action received for Korean Patent Application No. 10-2021-7036337, mailed on Dec. 8, 2021, 6 pages (2 pages of English Translation and 4 pages of Official Copy).
Office Action received for Korean Patent Application No. 10-2022-7010505, mailed on Jun. 14, 2022, 5 pages (2 pages of English Translation and 3 pages of Official Copy).
Office Action received for Korean Patent Application No. 10-2022-7023077, mailed on Jul. 25, 2022, 6 pages (2 pages of English Translation and 4 pages of Official Copy).
Office Action received for Korean Patent Application No. 10-2023-7002360, mailed on Jun. 5, 2024, 6 pages (2 pages of English Translation and 4 pages of Official Copy).
Office Action received for Taiwanese Patent Application No. 104107328, mailed on Dec. 28, 2016, 4 pages (1 page of Search Report and 3 pages of Official Copy).
Osxdaily, "How to Zoom the Camera on iPhone", Available Online at: https://osxdaily.com/2012/04/18/zoom-camera-iphone/, Apr. 18, 2012, 6 pages.
Peters, "Long-Awaited iPhone Goes on Sale", nytimes.com, Jun. 29, 2007, 3 pages.
Playmemories Camera Apps, "PlayMemories Camera Apps Help Guide", available at <https://www.playmemoriescameraapps.com/portal/manual/IS9104-NPIA09014_00-F00002/en/index.html>, 2012, 3 pages.
Pre-Appeal Review Report received for Japanese Patent Application No. 2018-225131, mailed on Jan. 24, 2020, 8 pages (4 pages of English Translation and 4 pages of Official Copy).
Pre-Appeal Review Report received for Japanese Patent Application No. 2018-545502, mailed on Jan. 24, 2020, 8 pages (3 pages of English Translation and 5 pages of Official Copy).
"Remote Shot for SmartWatch 2", Available online at: https://play.google.com/store/apps/details?id=net.watea.sw2.rshot&h1=en, Nov. 21, 2017, 3 pages.
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Result of Consultation received for European Patent Application No. 20206196.6, mailed on Mar. 27, 2024, 4 pages.
Schiffhauer, Alexander, "See the Light with Night Sight", Available online at: https://www.blog.google/products/pixel/see-light-night-sight, Nov. 14, 2018, 6 pages.
Search Report and Opinion received for Danish Patent Application No. PA201970592, mailed on Nov. 7, 2019, 8 pages.
Search Report and Opinion received for Danish Patent Application No. PA201970593, mailed on Oct. 29, 2019, 10 pages.
Search Report and Opinion received for Danish Patent Application No. PA201970595, mailed on Nov. 8, 2019, 16 pages.
Search Report and Opinion received for Danish Patent Application No. PA201970600, mailed on Nov. 5, 2019, 11 pages.
Search Report and Opinion received for Danish Patent Application No. PA201970603, mailed on Nov. 15, 2019, 9 pages.
Search Report and Opinion received for Danish Patent Application No. PA201970605, mailed on Nov. 12, 2019, 10 pages.
Shaw et al., "Skills for Closeups Photography", Watson-Guptill Publications, Nov. 1999, 5 pages (Official Copy Only) {See Communication under Rule 37 CFR § 1.98(a) (3)}.
shiftdelete.net, "Oppo Reno 10× Zoom Ön Inceleme—Huawei P30 Pro'ya rakip mi geliyor?", Available online at <https://www.youtube.com/watch?v=ev2wIUztdrg>, See especially 5:34-6:05., Apr. 24, 2019, 2 pages.
"Sony Xperia XZ3 Camera Review—The Colors, Duke, The Colors!", Android Headlines—Android News & Tech News, Available online at <https://www.youtube.com/watch?v=mwpYXzWVOgw>, See especially 1:02-1:27, 2:28-2:30, Nov. 3, 2018, 3 pages.
Sony, "User Guide, Xperia XZ3, H8416/H9436/H9493", Sony Mobile Communications Inc., Retrieved from <https://www-support-downloads.sonymobile.com/h8416/userguide_EN_H8416-H9436-H9493_2_Android9.0.pdf>, See pp. 86-102., 2018, 121 pages.
Summons to Attend Oral Proceedings received for European Patent Application No. 17184710.6, mailed on May 10, 2023, 3 pages.
Summons to Attend Oral Proceedings received for European Patent Application No. 17184710.6, mailed on Sep. 17, 2019, 7 pages.
Summons to Attend Oral Proceedings received for European Patent Application No. 21163791.3, mailed on May 3, 2023, 6 pages.
Supplemental Notice of Allowance received for U.S. Appl. No. 15/136,323, mailed on Jan. 31, 2018, 6 pages.
Supplemental Notice of Allowance received for U.S. Appl. No. 15/863,369, mailed on Aug. 8, 2018, 4 pages.
Supplementary European Search Report received for European Patent Application No. 18176890.4, mailed on Sep. 20, 2018, 4 pages.
Supplementary European Search Report received for European Patent Application No. 18183054.8, mailed on Oct. 11, 2018, 4 pages.
Techsmith, "Snagit® 11 Snagit 11.4 Help", Online available at <http://assets.techsmith.com/Downloads/ua-tutorials-snagit-11/Snagit_11.pdf>, Jan. 2014, 146 pages.
Telleen et al., "Synthetic Shutter Speed Imaging", University of California, Santa Cruz, vol. 26, No. 3, 2007, 8 pages.
The Nitpicker, "Sony Xperia XZ3 | in-depth Preview", Avalaible online at <https://www.youtube.com/watch?v=TGCKxBuiO5c>, See especially 12:40-17:25, Oct. 7, 2018, 3 pages.
Tico et al., "Robust method of digital image stabilization", Nokia Research Center, ISCCSP, Malta, Mar. 12-14, 2008, pp. 316-321.
Xeetechcare, "Samsung Galaxy S10—Super Night Mode & Ultra-Fast Charging!", Online Available at: https://www.youtube.com/watch?v=3bguV4FX6aA, Mar. 28, 2019, 4 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Yuan Ye, "Iphone 4s Original Secrets", China Railway Press, 2012, 15 pages (Official Copy Only) {See Communication under Rule 37 CFR § 1.98(a) (3)}.
Decision to Grant received for European Patent Application No. 21202358.4, mailed on Aug. 29, 2024, 2 pages.
Non-Final Office Action received for U.S. Appl. No. 17/088,790, mailed on Sep. 9, 2024, 51 pages.

(56) References Cited

OTHER PUBLICATIONS

Notice of Allowance received for U.S. Appl. No. 18/628,021, mailed on Aug. 28, 2024, 9 pages.
Office Action received for Indian Patent Application No. 202218016788, mailed on Sep. 4, 2024, 5 pages.
Decision to Grant received for Japanese Patent Application No. 2024-060293, mailed on Oct. 15, 2024, 3 pages (1 page of English Translation and 2 pages of Official Copy).
Office Action received for Australian Patent Application No. 2024213126, mailed on Sep. 26, 2024, 3 pages.
Office Action received for Indian Patent Application No. 202218054598, mailed on Oct. 3, 2024, 5 pages.
Applicant-Initiated Interview Summary received for U.S. Appl. No. 18/628,021, mailed on Aug. 5, 2024, 4 pages.
Corrected Notice of Allowance received for U.S. Appl. No. 18/196,997, mailed on Aug. 19, 2024, 2 pages.
Notice of Allowance received for U.S. Appl. No. 18/207,293, mailed on Aug. 7, 2024, 12 pages.
Office Action received for Japanese Patent Application No. 2024-060293, mailed on Jul. 29, 2024, 6 pages (3 pages of English Translation and 3 pages of Official Copy).
Notice of Hearing received for Indian Patent Application No. 202118021941, mailed on Feb. 21, 2025, 2 pages.
Office Action received for European Patent Application No. 21157252.4, mailed on Feb. 24, 2025, 6 pages.
Applicant-Initiated Interview Summary received for U.S. Appl. No. 18/373,171, mailed on Sep. 29, 2025, 5 pages.
Decision to Grant received for Japanese Patent Application No. 2023-158354, mailed on Sep. 8, 2025, 3 pages (1 page of English Translation and 2 pages of Official Copy).
NAVJOT81, My depth control is not showing up on my i phone x, Available online at: https://discussions.apple.com/thread/253719706?sortBy=rank, Mar. 5, 2022, 5 pages.
Non-Final Office Action received for U.S. Appl. No. 18/373, 163, mailed on Aug. 26, 2025, 14 pages
Non-Final Office Action received for U.S. Appl. No. 18/373,168, mailed on Oct. 1, 2025, 15 pages.
Non-Final Office Action received for U.S. Appl. No. 18/373,171, mailed on Jul. 24, 2025, 27 pages.
Notice of Acceptance received for Australian Patent Application No. 2023282230, mailed on Oct. 17, 2025, 3 pages.
Notice of Allowance received for U.S. Appl. No. 18/373,171, mailed on Oct. 24, 2025, 10 pages.
Office Action received for Chinese Patent Application No. 202110766668.7, mailed on Aug. 27, 2025, 17 pages (10 pages of English Translation and 7 pages of Official Copy).
Office Action received for Japanese Patent Application No. 2024-199034, mailed on Oct. 2, 2025, 7 pages (4 pages of English Translation and 3 pages of Official Copy).
Wesson, Kate, "How to Edit Photos on iPhone Using the Built-In Photos App", Available online at: https://web.archive.org/web/20181116025151/https://iphonephotographyschool.com/how-to-edit-photos-on-iphone/, Aug. 22, 2018, 21 pages.
Wesson, Kate, "How to Use iPhone Portrait Mode to Shoot Stunning Portrait Photos", Available online at: https://web.archive.org/web/20200920073342/https://iphonephotographyschool.com/portrait-mode/, Oct. 22, 2019, 19 pages.
Corrected Notice of Allowance received for U.S. Appl. No. 18/373,158, mailed on Apr. 29, 2025, 2 pages.
Notice of Allowance received for U.S. Appl. No. 18/373,158, mailed on Apr. 15, 2025, 14 pages.
Final Office Action received for U.S. Appl. No. 17/088,790, mailed on Apr. 3, 2025, 59 pages.
Office Action received for Chinese Patent Application No. 202010235395.9, mailed on Mar. 1, 2025, 16 pages (9 pages of English Translation and 7 pages of Official Copy).
Office Action received for Indian Patent Application No. 202318031344, mailed on Apr. 1, 2025, 7 pages.
Notice of Allowance received for U.S. Appl. No. 18/373,158, mailed on Jul. 1, 2025, 15 pages.
Office Action received for European Patent Application No. 20728854.9, mailed on Jun. 20. 2025, 6 pages.
Office Action received for Japanese Patent Application No. 2023-158354, mailed on Jun. 3, 2025, 6 pages (3 pages of English Translation and 3 pages of Official Copy).
Office Action received for European Patent Application No. 24155758.6, mailed on May 28, 2025, 8 pages.
Intention to Grant received for European Patent Application No. 20206196.6, mailed on Jul. 14, 2025, 10 pages.
Office Action received for Chinese Patent Application No. 202010235395.9, mailed on May 31, 2025, 15 pages (7 pages of English Translation and 8 pages of Official Copy).
Decision to Grant received for European Patent Application No. 20206196.6, mailed on Nov. 6, 2025, 4 pages.
Examiner's Answer to Appeal Brief received for U.S. Appl. No. 17/088,790, mailed on Nov. 7, 2025, 16 pages.
International Preliminary Report on Patentability received for PCT Patent Application No. PCT/US2024/026652, mailed on Nov. 20, 2025, 11 pages.
Notice of Allowance received for Chinese Patent Application No. 202010235395.9, mailed on Nov. 10, 2025, 2 pages (1 page of English Translation and 1 page of Official Copy).
Office Action received for Chinese Patent Application No. 202010235395.9, mailed on Oct. 29, 2025, 2 pages (1 page of English Translation and 1 page of Official Copy).
Office Action received for Indian Patent Application No. 202218054596, mailed on Nov. 14, 2025, 6 pages.
Office Action received for Indian Patent Application No. 202218054599, mailed on Nov. 14, 2025, 8 pages.
Office Action received for Indian Patent Application No. 202318031342, mailed on Nov. 12, 2025, 6 pages.
Office Action received for Japanese Patent Application No. 2024-571042, mailed on Jan. 5, 2026, 5 pages (2 pages of English Translation and 3 pages of Official Copy).
Office Action received for European Patent Application No. 23736510.1, mailed on Mar. 11, 2026, 4 pages.
Office Action received for Korean Patent Application No. 10-2024-7039980, mailed on May 26, 2026, 11 pages (4 pages of English Translation and 7 pages of Official Copy).

* cited by examiner

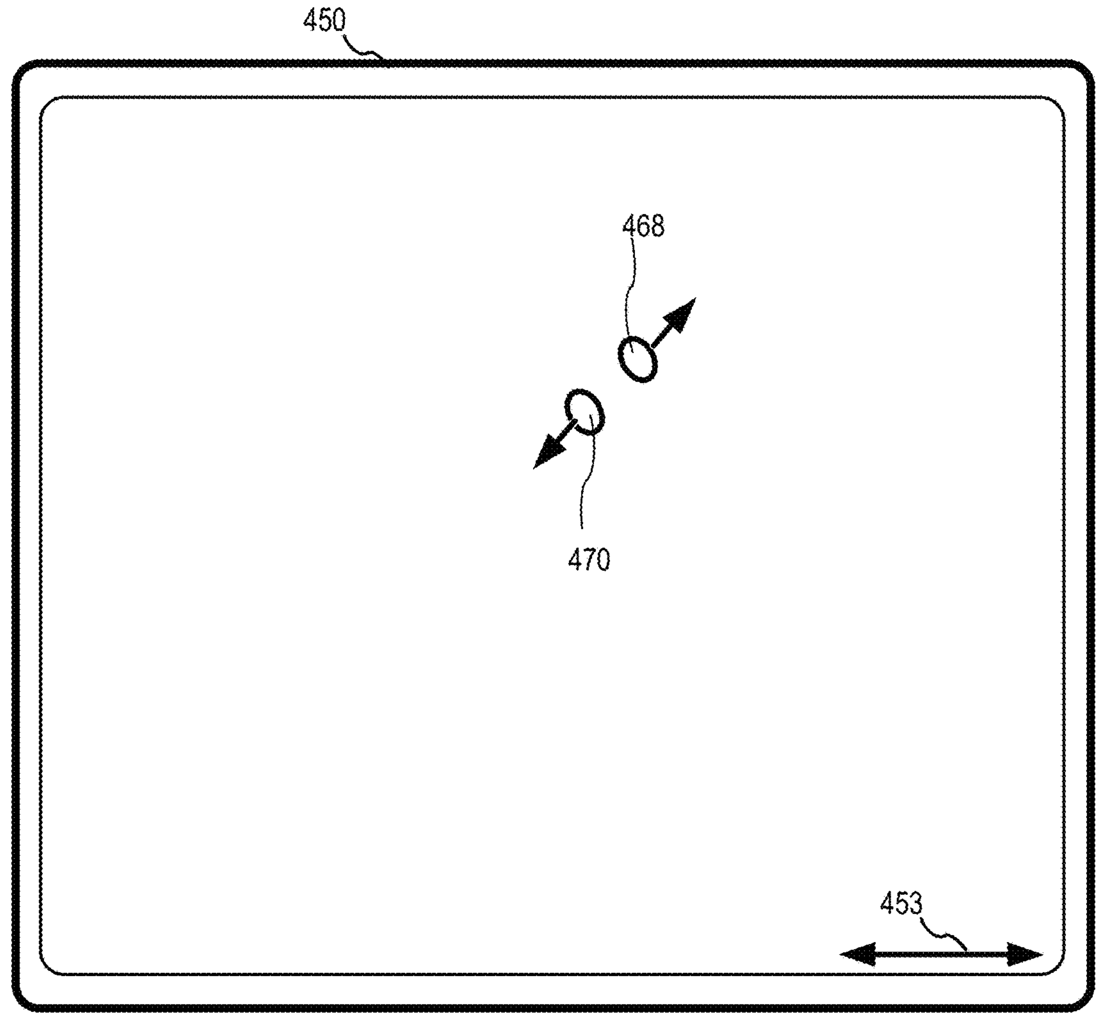
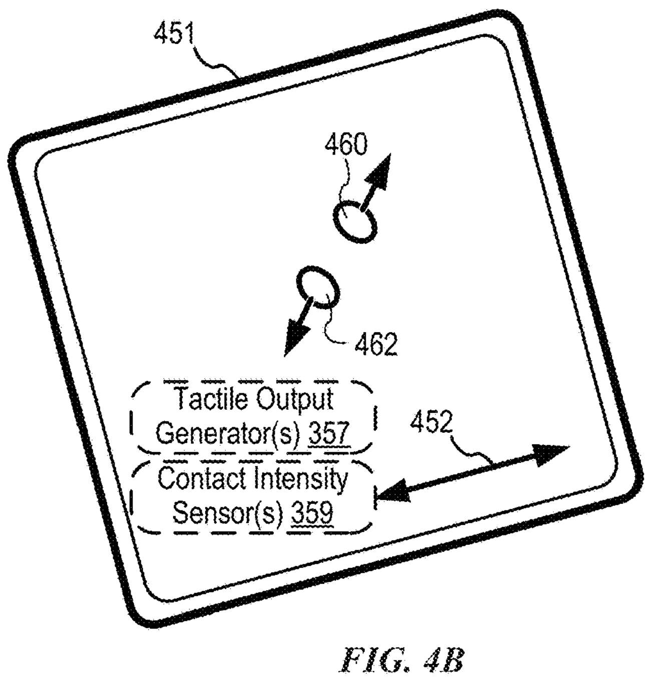
*FIG. 4B*

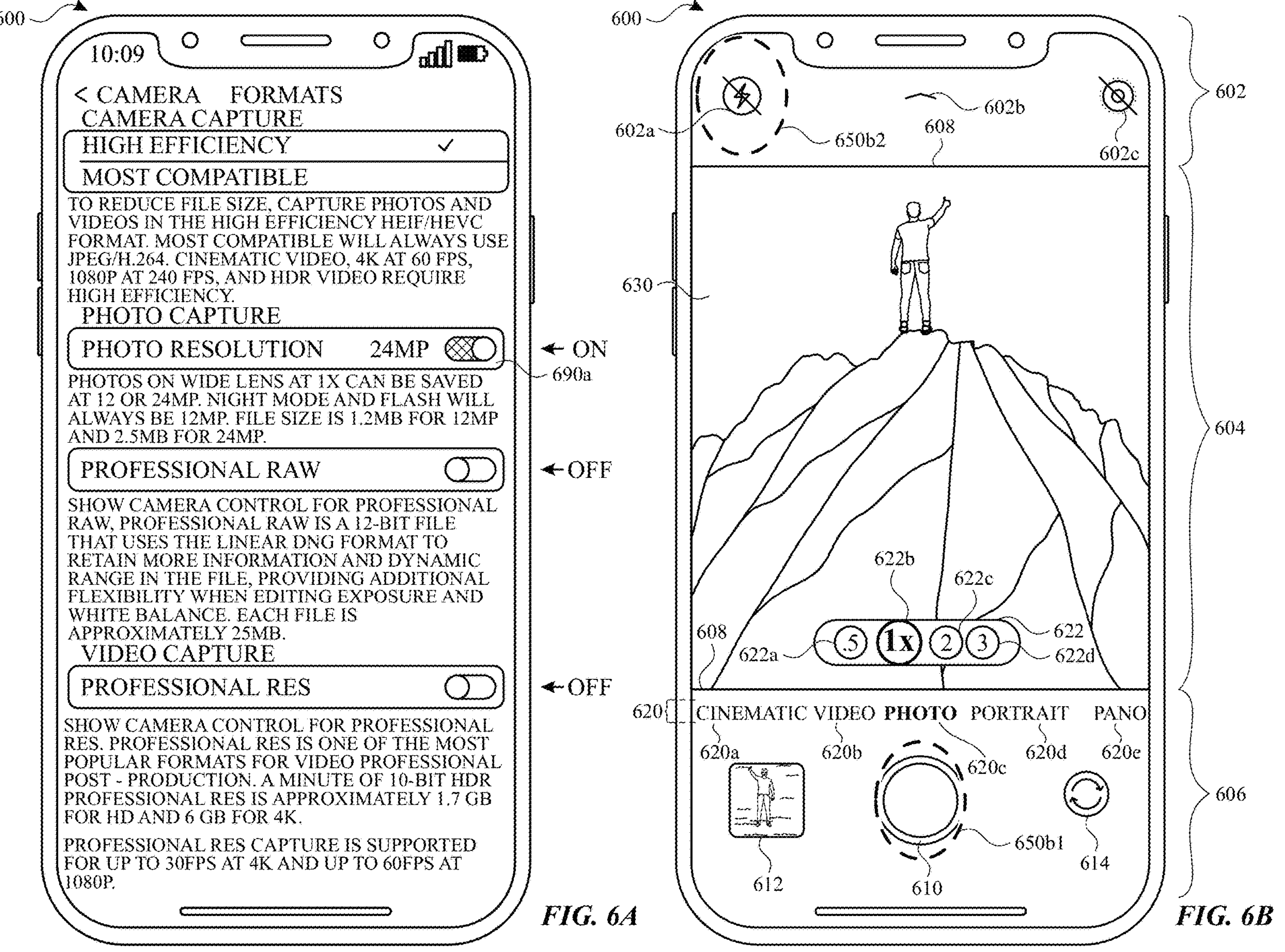
600
10:09
< CAMERA FORMATS
CAMERA CAPTURE
HIGH EFFICIENCY
MOST COMPATIBLE
TO REDUCE FILE SIZE, CAPTURE PHOTOS AND VIDEOS IN THE HIGH EFFICIENCY HEIF/HEVC FORMAT. MOST COMPATIBLE WILL ALWAYS USE JPEG/H.264. CINEMATIC VIDEO, 4K AT 60 FPS, 1080P AT 240 FPS, AND HDR VIDEO REQUIRE HIGH EFFICIENCY.
PHOTO CAPTURE
PHOTO RESOLUTION 24MP
ON
690a
PHOTOS ON WIDE LENS AT 1X CAN BE SAVED AT 12 OR 24MP. NIGHT MODE AND FLASH WILL ALWAYS BE 12MP. FILE SIZE IS 1.2MB FOR 12MP AND 2.5MB FOR 24MP.
PROFESSIONAL RAW
OFF
SHOW CAMERA CONTROL FOR PROFESSIONAL RAW, PROFESSIONAL RAW IS A 12-BIT FILE THAT USES THE LINEAR DNG FORMAT TO RETAIN MORE INFORMATION AND DYNAMIC RANGE IN THE FILE, PROVIDING ADDITIONAL FLEXIBILITY WHEN EDITING EXPOSURE AND WHITE BALANCE. EACH FILE IS APPROXIMATELY 25MB.
VIDEO CAPTURE
PROFESSIONAL RES
OFF
SHOW CAMERA CONTROL FOR PROFESSIONAL RES. PROFESSIONAL RES IS ONE OF THE MOST POPULAR FORMATS FOR VIDEO PROFESSIONAL POST - PRODUCTION. A MINUTE OF 10-BIT HDR PROFESSIONAL RES IS APPROXIMATELY 1.7 GB FOR HD AND 6 GB FOR 4K.
PROFESSIONAL RES CAPTURE IS SUPPORTED FOR UP TO 30FPS AT 4K AND UP TO 60FPS AT 1080P.
FIG. 6A
600
602a
650b2
608
602b
602c
602
630
604
622b
622c
608
622a
.5
1x
2
3
622
622d
620
CINEMATIC VIDEO PHOTO PORTRAIT PANO
620a
620b
620c
620d
620e
606
650b1
612
610
614
FIG. 6B 600
00:00:01
622b
.5
1x
2
3
SLO-MO CINEMATIC VIDEO PHOTO PORTRAIT
616
650h
618

600
00:00:00
602e
HD · 30
602f
622b
.5
1x
2
3
SLO-MO CINEMATIC VIDEO PHOTO PORTRAIT
620
650g
610
612

700

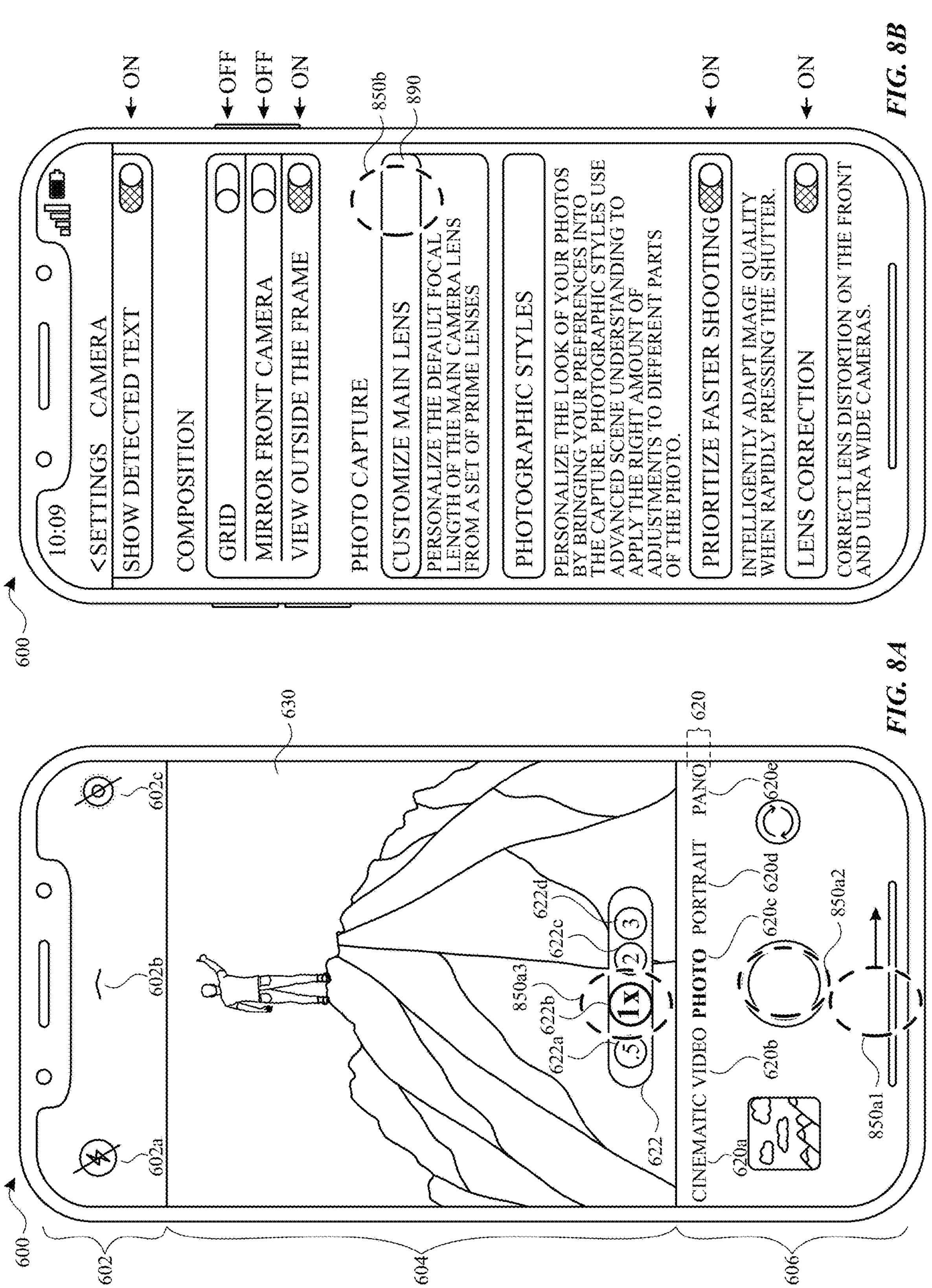

600
602
604
606
602a
602b
602c
630
620
620a
620b
620c
620d
620e
622
622a
622b
622c
622d
850a1
850a2
850a3
.5
1x
2
3
CINEMATIC VIDEO PHOTO PORTRAIT PANO
FIG. 8A
10:09
<SETTINGS CAMERA
SHOW DETECTED TEXT
COMPOSITION
GRID
MIRROR FRONT CAMERA
VIEW OUTSIDE THE FRAME
PHOTO CAPTURE
CUSTOMIZE MAIN LENS
PERSONALIZE THE DEFAULT FOCAL LENGTH OF THE MAIN CAMERA LENS FROM A SET OF PRIME LENSES
PHOTOGRAPHIC STYLES
PERSONALIZE THE LOOK OF YOUR PHOTOS BY BRINGING YOUR PREFERENCES INTO THE CAPTURE. PHOTOGRAPHIC STYLES USE ADVANCED SCENE UNDERSTANDING TO APPLY THE RIGHT AMOUNT OF ADJUSTMENTS TO DIFFERENT PARTS OF THE PHOTO.
PRIORITIZE FASTER SHOOTING
INTELLIGENTLY ADAPT IMAGE QUALITY WHEN RAPIDLY PRESSING THE SHUTTER.
LENS CORRECTION
CORRECT LENS DISTORTION ON THE FRONT AND ULTRA WIDE CAMERAS.
ON
OFF
OFF
ON
ON
ON
850b
890
FIG. 8B 600
806
10:09
ADDITIONAL MAIN LENS
ADD A 28MM OR 35MM LENS
830
850d
622a
622e
622c
622d
.5
28 MM
2
3
NONE
28MM
35MM
822
822c
822b
822a
DEFAULT TO 28MM
826a
USE 28MM
824b 808c
808a
808b
808
850c1
622
622b
1X
35MM
28MM
24MM
850c2
USE ONLY THE DEFAULT 1X LENS AT 24MM
USE 1X (24MM)
850c3
824a 600
630
622
622b
1X
.5
2
3
CINEMATIC VIDEO PHOTO PORTRAIT PANO 600
806
10:09
ADDITIONAL MAIN LENS
ADD A 28MM OR 35MM LENS
830
622g
35 MM
24MM
28MM
35MM
822
822c
822b
DEFAULT TO 35MM
826b
850g
USE 35MM
824c 600
630
840
842
844
8501
840a
840b
840c
0.5
13MM
1X
24MM
3
77MM
CINEMATIC VIDEO PHOTO PORTRAIT PANO 600
630
840
842
844
850k
840a
840b
840c
0.5
13MM
1X
24MM
3
77MM
CINEMATIC VIDEO PHOTO PORTRAIT PANO 600
630
622h
850p
.9x
35 MM
2
3
CINEMATIC VIDEO PHOTO PORTRAIT PANO 600
630
840
844
850r
842
0.9X
0.5 13MM
3 77MM
CINEMATIC VIDEO PHOTO PORTRAIT PANO 600
630
862
860
NATURAL LIGHT
622c
850r
2X
VIDEO PHOTO PORTRAIT PANO
620c
620d
604

600
630
850q
622a
5x
35 MM
2
3
CINEMATIC VIDEO PHOTO PORTRAIT PANO
620c
620d 600
630
622c
622b
622d
622
2X
1
3
VIDEO PHOTO PORTRAIT PANO
NATURAL LIGHT 600
630
NATURAL LIGHT
AUTO (IS)
NIGHT
874
3X
IS 600
630
850u1
NATURAL LIGHT
VIDEO PHOTO PORTRAIT PANO
3X
IS
622d
850u2

902
While the computer system is not operating a first camera mode, detect a request to transition the computer system to operate in a first camera mode.

904
In response to detecting the request to transition the computer system to the first camera mode, display, via the display generation component, a camera user interface that includes a plurality of selectable controls for managing zoom levels to capture media, wherein the plurality of selectable controls includes:

906
A first selectable control that, when selected, causes the computer system to be configured to capture media with a first native zoom level of the first fixed focused camera.

908
A second selectable control that, when selected, causes the computer system to be configured to capture media with a second native zoom level of the second fixed focused camera, wherein the second native zoom level is different from the first native zoom level.

910
A third selectable control that, when selected, causes the computer system to be configured to capture media with a digital zoom level using at least one of the plurality of cameras.

1002
Display, via the display generation component, a camera user interface that includes one or more selectable controls for managing zoom levels to capture media, wherein the plurality of selectable controls includes a respective selectable control that corresponds to a predefined zoom level for a camera of the one or more cameras.

1004
While displaying the camera user interface, detect a selection input directed to the respective selectable control.

1006
In response to detecting the selection input directed to the respective selectable control, select the predefined zoom level as a current zoom level for the camera, including:

1008
In accordance with a determination that a user has selected a first zoom level as the predefined zoom level, selecting the first zoom level as the current zoom level for the camera in response to detecting the selection input directed to the respective selectable control.

1010
In accordance with a determination that a user has selected a second zoom level, different from the first zoom level, as the predefined zoom level, selecting the second zoom level as the current zoom level for the camera in response to detecting the selection input directed to the respective selectable control.

*FIG. 10*

600
630
PRO-RES
00:00:00
HD · 30
STABILIZATION ON
SLO-MO CINEMATIC VIDEO PHOTO PORTRAIT
OFF
HIGH
ULTRA
.5
1x
2
3
610
620
620a
620b
620c
622
1102b1
1102b2
1122
1122a
1122b
1122c
1124a
1150e1
1150e2
1150f1
1150f2
1150f3
1150f4
1150f5
1150f6
1160a
1160b
1160c
1188a 600
630
00:00:01
622
.5
1x
2
3
616
618

600
630
10:09
PRO-RES
00:00:00
HD · 30
1102b4
622
OFF
HIGH
ULTRA
1122a
1122c
SLO-MO
CINEMATIC
VIDEO
PHOTO
PORTRAIT
620a
620b
620c
610
1150j
1122b
1122
1124c

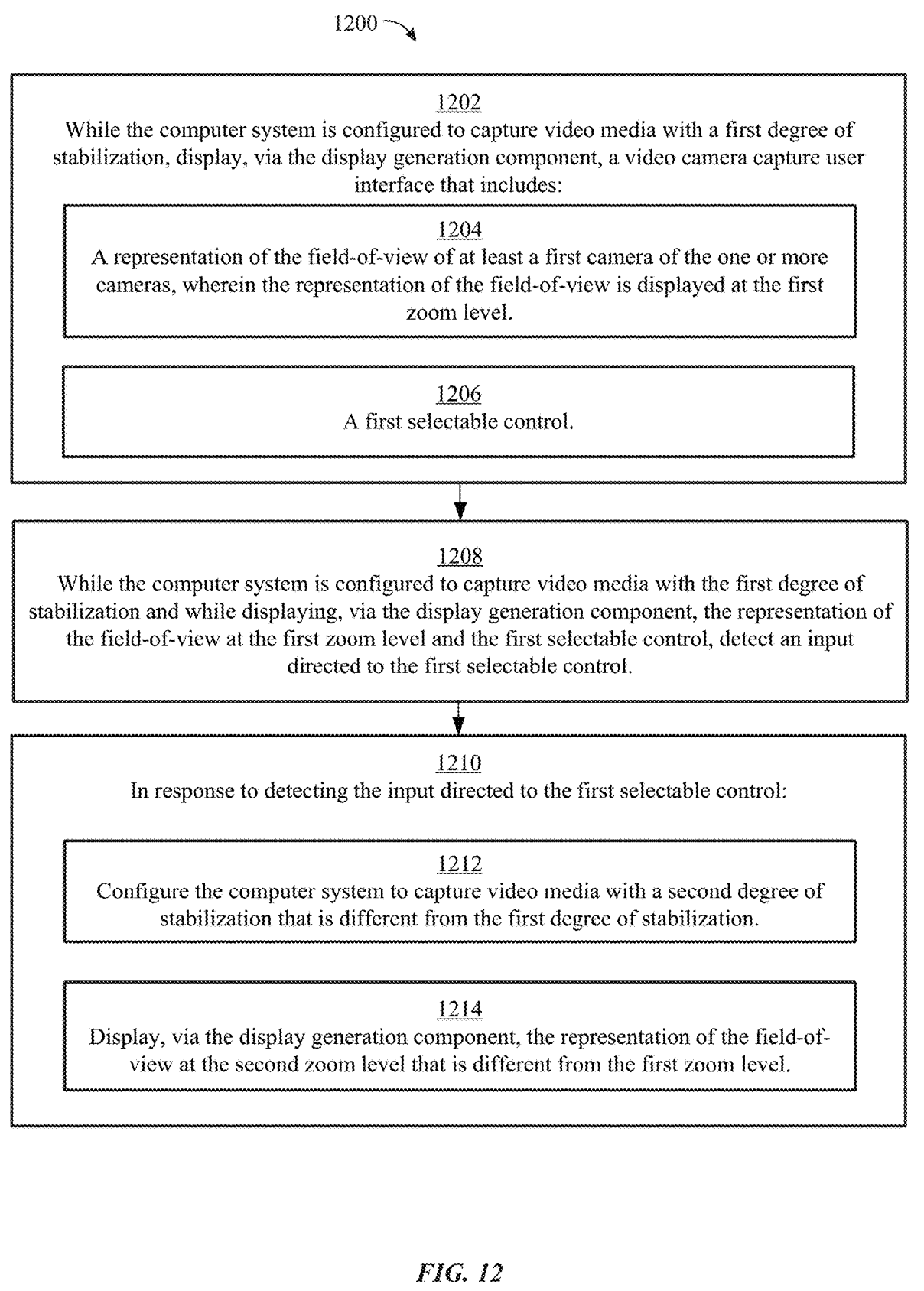

1200

1202
While the computer system is configured to capture video media with a first degree of stabilization, display, via the display generation component, a video camera capture user interface that includes:

1204
A representation of the field-of-view of at least a first camera of the one or more cameras, wherein the representation of the field-of-view is displayed at the first zoom level.

1206
A first selectable control.

1208
While the computer system is configured to capture video media with the first degree of stabilization and while displaying, via the display generation component, the representation of the field-of-view at the first zoom level and the first selectable control, detect an input directed to the first selectable control.

1210
In response to detecting the input directed to the first selectable control:

1212
Configure the computer system to capture video media with a second degree of stabilization that is different from the first degree of stabilization.

1214
Display, via the display generation component, the representation of the field-of-view at the second zoom level that is different from the first zoom level.

*FIG. 12*

USER INTERFACES FOR CAMERA MANAGEMENT

CROSS-REFERENCE TO RELATED APPLICATIONS

This application claims priority to U.S. Provisional Application No. 63/349,141, filed Jun. 5, 2022, entitled "USER INTERFACES FOR CAMERA MANAGEMENT," the entire contents of which is hereby incorporated by reference.

FIELD

The present disclosure relates generally to computer user interfaces, and more specifically to techniques for managing camera characteristics.

BACKGROUND

Users of smartphones and other personal electronic devices frequently capture, store, and edit media for safekeeping memories and sharing with friends using cameras with different camera characteristics. Some existing techniques allowed users to capture media, such as images, audio, and/or videos using cameras with different camera characteristics. Users can manage such media that has been captured using cameras with different camera characteristics.

BRIEF SUMMARY

Some techniques for managing camera characteristics using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing camera characteristics. Such methods and interfaces optionally complement or replace other methods for managing camera characteristics. Such methods and interfaces reduce the cognitive burden on a user and produce a more efficient human-machine interface. For battery-operated computing devices, such methods and interfaces conserve power and increase the time between battery charges.

In accordance with some embodiments, a method, performed at a computer system having one or more cameras is described. The method includes: detecting a request to capture visual media; and in response to detecting the request to capture visual media, initiating capture of visual media via the one or more cameras, including: in accordance with a determination that a first set of environmental conditions that affect media capture are detected, generating visual captured media that has a first resolution; and in accordance with a determination that a second set of environmental conditions that affect media capture are detected, wherein the second set of media capture conditions is different from the first set of media capture conditions, generating visual captured media that has a second resolution that is different from the first resolution.

In accordance with some embodiments, a non-transitory computer-readable storage medium is described. The non-transitory computer-readable storage medium stores one or more programs configured to be executed by one or more processors of a computer system having one or more cameras, the one or more programs including instructions for: detecting a request to capture visual media; and in response to detecting the request to capture visual media, initiating capture of visual media via the one or more cameras, including: in accordance with a determination that a first set of environmental conditions that affect media capture are detected, generating visual captured media that has a first resolution; and in accordance with a determination that a second set of environmental conditions that affect media capture are detected, wherein the second set of media capture conditions is different from the first set of media capture conditions, generating visual captured media that has a second resolution that is different from the first resolution.

In accordance with some embodiments, a transitory computer-readable storage medium is described. The transitory computer-readable storage medium stores one or more programs configured to be executed by one or more processors of a computer system having one or more cameras, the one or more programs including instructions for: detecting a request to capture visual media; and in response to detecting the request to capture visual media, initiating capture of visual media via the one or more cameras, including: in accordance with a determination that a first set of environmental conditions that affect media capture are detected, generating visual captured media that has a first resolution; and in accordance with a determination that a second set of environmental conditions that affect media capture are detected, wherein the second set of media capture conditions is different from the first set of media capture conditions, generating visual captured media that has a second resolution that is different from the first resolution.

In accordance with some embodiments, a computer system having one or more cameras, comprising: one or more processors; and memory storing one or more programs configured to be executed by the one or more processors is described. The one or more programs include instructions for: detecting a request to capture visual media; and in response to detecting the request to capture visual media, initiating capture of visual media via the one or more cameras, including: in accordance with a determination that a first set of environmental conditions that affect media capture are detected, generating visual captured media that has a first resolution; and in accordance with a determination that a second set of environmental conditions that affect media capture are detected, wherein the second set of media capture conditions is different from the first set of media capture conditions, generating visual captured media that has a second resolution that is different from the first resolution.

In accordance with some embodiments, a computer system having one or more cameras is described. The computer system comprises: means for detecting a request to capture visual media; and means for, in response to detecting the request to capture visual media, initiating capture of visual media via the one or more cameras, including: in accordance with a determination that a first set of environmental conditions that affect media capture are detected, generating visual captured media that has a first resolution; and in accordance with a determination that a second set of environmental conditions that affect media capture are detected, wherein the second set of media capture conditions is different from the first set of media capture conditions, generating visual captured media that has a second resolution that is different from the first resolution.

In accordance with some embodiments, a computer program product, comprising one or more programs configured to be executed by one or more processors of a computer system having one or more cameras is described. The one or more programs include instructions for: detecting a request to capture visual media; and in response to detecting the request to capture visual media, initiating capture of visual media via the one or more cameras, including: in accordance with a determination that a first set of environmental conditions that affect media capture are detected, generating visual captured media that has a first resolution; and in accordance with a determination that a second set of environmental conditions that affect media capture are detected, wherein the second set of media capture conditions is different from the first set of media capture conditions, generating visual captured media that has a second resolution that is different from the first resolution.

In accordance with some embodiments, a method performed at a computer system that is in communicate with a display generation component and has a plurality of cameras that includes a first fixed focal length camera and a second fixed focal length camera is described. The method includes: while the computer system is not operating a first camera mode, detecting a request to transition the computer system to operate in a first camera mode; and in response to detecting the request to transition the computer system to the first camera mode, displaying, via the display generation component, a camera user interface that includes a plurality of selectable controls for managing zoom levels to capture media, wherein the plurality of selectable controls includes: a first selectable control that, when selected, causes the computer system to be configured to capture media with a first native zoom level of the first fixed focal length camera; a second selectable control that, when selected, causes the computer system to be configured to capture media with a second native zoom level of the second fixed focal length camera, wherein the second native zoom level is different from the first native zoom level; and a third selectable control that, when selected, causes the computer system to be configured to capture media with a digital zoom level using at least one of the plurality of cameras.

In accordance with some embodiments, a non-transitory computer-readable storage medium is described. The non-transitory computer-readable storage medium stores one or more programs configured to be executed by one or more processors of a computer system configured to communicate with a display generation component and having a plurality of cameras that includes a first fixed focal length camera and a second fixed focal length camera, the one or more programs including instructions for: while the computer system is not operating a first camera mode, detecting a request to transition the computer system to operate in a first camera mode; and in response to detecting the request to transition the computer system to the first camera mode, displaying, via the display generation component, a camera user interface that includes a plurality of selectable controls for managing zoom levels to capture media, wherein the plurality of selectable controls includes: a first selectable control that, when selected, causes the computer system to be configured to capture media with a first native zoom level of the first fixed focal length camera; a second selectable control that, when selected, causes the computer system to be configured to capture media with a second native zoom level of the second fixed focal length camera, wherein the second native zoom level is different from the first native zoom level; and a third selectable control that, when selected, causes the computer system to be configured to capture media with a digital zoom level using at least one of the plurality of cameras.

In accordance with some embodiments, a transitory computer-readable storage medium is described. The transitory computer-readable storage medium stores one or more programs configured to be executed by one or more processors of a computer system configured to communicate with a display generation component and having a plurality of cameras that includes a first fixed focal length camera and a second fixed focal length camera, the one or more programs including instructions for: while the computer system is not operating a first camera mode, detecting a request to transition the computer system to operate in a first camera mode; and in response to detecting the request to transition the computer system to the first camera mode, displaying, via the display generation component, a camera user interface that includes a plurality of selectable controls for managing zoom levels to capture media, wherein the plurality of selectable controls includes: a first selectable control that, when selected, causes the computer system to be configured to capture media with a first native zoom level of the first fixed focal length camera; a second selectable control that, when selected, causes the computer system to be configured to capture media with a second native zoom level of the second fixed focal length camera, wherein the second native zoom level is different from the first native zoom level; and a third selectable control that, when selected, causes the computer system to be configured to capture media with a digital zoom level using at least one of the plurality of cameras.

In accordance with some embodiments, a computer system configured to communicate with a display generation component and having a plurality of cameras that includes a first fixed focal length camera and a second fixed focal length camera, comprising: one or more processors; and memory storing one or more programs configured to be executed by the one or more processors is described. The one or more programs include instructions for: while the computer system is not operating a first camera mode, detecting a request to transition the computer system to operate in a first camera mode; and in response to detecting the request to transition the computer system to the first camera mode, displaying, via the display generation component, a camera user interface that includes a plurality of selectable controls for managing zoom levels to capture media, wherein the plurality of selectable controls includes: a first selectable control that, when selected, causes the computer system to be configured to capture media with a first native zoom level of the first; a second selectable control that, when selected, causes the computer system to be configured to capture media with a second native zoom level of the second fixed focal length camera, wherein the second native zoom level is different from the first native zoom level; and a third selectable control that, when selected, causes the computer system to be configured to capture media with a digital zoom level using at least one of the plurality of cameras.

In accordance with some embodiments, a computer system configured to communicate with a display generation component and having a plurality of cameras that includes a first fixed focal length camera and a second fixed focal length camera is described. The computer system comprises: means for, while the computer system is not operating a first camera mode, detecting a request to transition the computer system to operate in a first camera mode; and means for, in response to detecting the request to transition the computer system to the first camera mode, displaying, via the display generation component, a camera user interface that includes a plurality of selectable controls for managing zoom levels to capture media, wherein the plurality of selectable controls includes: a first selectable control that, when selected, causes the computer system to be configured to capture media with a first native zoom level of the first fixed focal length camera; a second selectable control that, when selected, causes the computer system to be configured to capture media with a second native zoom level of the second fixed focal length camera, wherein the second native zoom level is different from the first native zoom level; and a third selectable control that, when selected, causes the computer system to be configured to capture media with a digital zoom level using at least one of the plurality of cameras.

In accordance with some embodiments, a computer program product, comprising one or more programs configured to be executed by one or more processors of a computer system that is in communication with a display generation component and has a plurality of cameras that includes a first fixed focal length camera and a second fixed focal length camera is described. The one or more programs include instructions for: while the computer system is not operating a first camera mode, detecting a request to transition the computer system to operate in a first camera mode; and in response to detecting the request to transition the computer system to the first camera mode, displaying, via the display generation component, a camera user interface that includes a plurality of selectable controls for managing zoom levels to capture media, wherein the plurality of selectable controls includes: a first selectable control that, when selected, causes the computer system to be configured to capture media with a first native zoom level of the first fixed focal length camera; a second selectable control that, when selected, causes the computer system to be configured to capture media with a second native zoom level of the second fixed focal length camera, wherein the second native zoom level is different from the first native zoom level; and a third selectable control that, when selected, causes the computer system to be configured to capture media with a digital zoom level using at least one of the plurality of cameras.

In accordance with some embodiments, a method, performed at a computer system that is in communication with a display generation component and has one or more cameras is described. The method includes: displaying, via the display generation component, a camera user interface that includes one or more selectable controls for managing zoom levels to capture media, wherein the one or more selectable controls include a respective selectable control that corresponds to a predefined zoom level for a camera of the one or more cameras; while displaying the camera user interface, detecting a selection input directed to the respective selectable control; and in response to detecting the selection input directed to the respective selectable control, selecting the predefined zoom level as a current zoom level for the camera, including: in accordance with a determination that a user has selected a first zoom level as the predefined zoom level, selecting the first zoom level as the current zoom level for the camera in response to detecting the selection input directed to the respective selectable control; and in accordance with a determination that a user has selected a second zoom level, different from the first zoom level, as the predefined zoom level, selecting the second zoom level as the current zoom level for the camera in response to detecting the selection input directed to the respective selectable control.

In accordance with some embodiments, a non-transitory computer-readable storage medium is described. The non-transitory computer-readable storage medium stores one or more programs configured to be executed by one or more processors of a computer system configured to communicate with a display generation component and having one or more cameras, the one or more programs including instructions for: displaying, via the display generation component, a camera user interface that includes one or more selectable controls for managing zoom levels to capture media, wherein the one or more selectable controls include a respective selectable control that corresponds to a predefined zoom level for a camera of the one or more cameras; while displaying the camera user interface, detecting a selection input directed to the respective selectable control; and in response to detecting the selection input directed to the respective selectable control, selecting the predefined zoom level as a current zoom level for the camera, including: in accordance with a determination that a user has selected a first zoom level as the predefined zoom level, selecting the first zoom level as the current zoom level for the camera in response to detecting the selection input directed to the respective selectable control; and in accordance with a determination that a user has selected a second zoom level, different from the first zoom level, as the predefined zoom level, selecting the second zoom level as the current zoom level for the camera in response to detecting the selection input directed to the respective selectable control.

In accordance with some embodiments, a transitory computer-readable storage medium is described. The transitory computer-readable storage medium stores one or more programs configured to be executed by one or more processors of a computer system configured to communicate with a display generation component and having one or more cameras, the one or more programs including instructions for: displaying, via the display generation component, a camera user interface that includes one or more selectable controls for managing zoom levels to capture media, wherein the one or more selectable controls include a respective selectable control that corresponds to a predefined zoom level for a camera of the one or more cameras; while displaying the camera user interface, detecting a selection input directed to the respective selectable control; and in response to detecting the selection input directed to the respective selectable control, selecting the predefined zoom level as a current zoom level for the camera, including: in accordance with a determination that a user has selected a first zoom level as the predefined zoom level, selecting the first zoom level as the current zoom level for the camera in response to detecting the selection input directed to the respective selectable control; and in accordance with a determination that a user has selected a second zoom level, different from the first zoom level, as the predefined zoom level, selecting the second zoom level as the current zoom level for the camera in response to detecting the selection input directed to the respective selectable control.

In accordance with some embodiments, a computer system configured to communicate with a display generation component and having one or more cameras, comprising: one or more processors; and memory storing one or more programs configured to be executed by the one or more processors is described. The one or more programs include instructions for: displaying, via the display generation component, a camera user interface that includes one or more selectable controls for managing zoom levels to capture media, wherein the one or more selectable controls include a respective selectable control that corresponds to a predefined zoom level for a camera of the one or more cameras; while displaying the camera user interface, detecting a selection input directed to the respective selectable control; and in response to detecting the selection input directed to the respective selectable control, selecting the predefined zoom level as a current zoom level for the camera, including: in accordance with a determination that a user has selected a first zoom level as the predefined zoom level, selecting the first zoom level as the current zoom level for the camera in response to detecting the selection input directed to the respective selectable control; and in accordance with a determination that a user has selected a second zoom level, different from the first zoom level, as the predefined zoom level, selecting the second zoom level as the current zoom level for the camera in response to detecting the selection input directed to the respective selectable control.

In accordance with some embodiments, a computer system configured to communicate with a display generation component and having one or more cameras is described. The computer system comprises: means for displaying, via the display generation component, a camera user interface that includes one or more selectable controls for managing zoom levels to capture media, wherein the one or more selectable controls include a respective selectable control that corresponds to a predefined zoom level for a camera of the one or more cameras; means for, while displaying the camera user interface, detecting a selection input directed to the respective selectable control; and means for, in response to detecting the selection input directed to the respective selectable control, selecting the predefined zoom level as a current zoom level for the camera, including: in accordance with a determination that a user has selected a first zoom level as the predefined zoom level, selecting the first zoom level as the current zoom level for the camera in response to detecting the selection input directed to the respective selectable control; and in accordance with a determination that a user has selected a second zoom level, different from the first zoom level, as the predefined zoom level, selecting the second zoom level as the current zoom level for the camera in response to detecting the selection input directed to the respective selectable control.

In accordance with some embodiments, a computer program product, comprising one or more programs configured to be executed by one or more processors of a computer system that is in communication with a display generation component and has one or more cameras is described. The one or more programs include instructions for: displaying, via the display generation component, a camera user interface that includes one or more selectable controls for managing zoom levels to capture media, wherein the one or more selectable controls include a respective selectable control that corresponds to a predefined zoom level for a camera of the one or more cameras; while displaying the camera user interface, detecting a selection input directed to the respective selectable control; and in response to detecting the selection input directed to the respective selectable control, selecting the predefined zoom level as a current zoom level for the camera, including: in accordance with a determination that a user has selected a first zoom level as the predefined zoom level, selecting the first zoom level as the current zoom level for the camera in response to detecting the selection input directed to the respective selectable control; and in accordance with a determination that a user has selected a second zoom level, different from the first zoom level, as the predefined zoom level, selecting the second zoom level as the current zoom level for the camera in response to detecting the selection input directed to the respective selectable control.

In accordance with some embodiments, a method performed at a computer system that is in communication with a display generation component and has one or more cameras is described. The method includes: while the computer system is configured to capture video media with a first degree of stabilization, displaying, via the display generation component, a video camera capture user interface that includes: a representation of the field-of-view of at least a first camera of the one or more cameras, wherein the representation of the field-of-view is displayed at the first zoom level; and a first selectable control; while the computer system is configured to capture video media with the first degree of stabilization and while displaying, via the display generation component, the representation of the field-of-view at the first zoom level and the first selectable control, detecting an input directed to the first selectable control; and in response to detecting the input directed to the first selectable control: configuring the computer system to capture video media with a second degree of stabilization that is different from the first degree of stabilization; and displaying, via the display generation component, the representation of the field-of-view at the second zoom level that is different from the first zoom level.

In accordance with some embodiments, a non-transitory computer-readable storage medium is described. The non-transitory computer-readable storage medium stores one or more programs configured to be executed by one or more processors of a computer system configured to communicate with a display generation component and having one or more cameras, the one or more programs including instructions for: while the computer system is configured to capture video media with a first degree of stabilization, displaying, via the display generation component, a video camera capture user interface that includes: a representation of the field-of-view of at least a first camera of the one or more cameras, wherein the representation of the field-of-view is displayed at the first zoom level; and a first selectable control; while the computer system is configured to capture video media with the first degree of stabilization and while displaying, via the display generation component, the representation of the field-of-view at the first zoom level and the first selectable control, detecting an input directed to the first selectable control; and in response to detecting the input directed to the first selectable control: configuring the computer system to capture video media with a second degree of stabilization that is different from the first degree of stabilization; and displaying, via the display generation component, the representation of the field-of-view at the second zoom level that is different from the first zoom level.

In accordance with some embodiments, a transitory computer-readable storage medium is described. The transitory computer-readable storage medium stores one or more programs configured to be executed by one or more processors of a computer system configured to communicate with a display generation component and having one or more cameras, the one or more programs including instructions for: while the computer system is configured to capture video media with a first degree of stabilization, displaying, via the display generation component, a video camera capture user interface that includes: a representation of the field-of-view of at least a first camera of the one or more cameras, wherein the representation of the field-of-view is displayed at the first zoom level; and a first selectable control; while the computer system is configured to capture video media with the first degree of stabilization and while displaying, via the display generation component, the representation of the field-of-view at the first zoom level and the first selectable control, detecting an input directed to the first selectable control; and in response to detecting the input directed to the first selectable control: configuring the computer system to capture video media with a second degree of stabilization that is different from the first degree of stabilization; and displaying, via the display generation component, the representation of the field-of-view at the second zoom level that is different from the first zoom level.

In accordance with some embodiments, a computer system configured to communicate with a display generation component and having one or more cameras, comprising: one or more processors; and memory storing one or more programs configured to be executed by the one or more processors is described. The one or more programs include instructions for: while the computer system is configured to capture video media with a first degree of stabilization, displaying, via the display generation component, a video camera capture user interface that includes: a representation of the field-of-view of at least a first camera of the one or more cameras, wherein the representation of the field-of-view is displayed at the first zoom level; and a first selectable control; while the computer system is configured to capture video media with the first degree of stabilization and while displaying, via the display generation component, the representation of the field-of-view at the first zoom level and the first selectable control, detecting an input directed to the first selectable control; and in response to detecting the input directed to the first selectable control: configuring the computer system to capture video media with a second degree of stabilization that is different from the first degree of stabilization; and displaying, via the display generation component, the representation of the field-of-view at the second zoom level that is different from the first zoom level.

In accordance with some embodiments, a computer system configured to communicate with a display generation component and having one or more cameras is described. The computer system comprises: means for, while the computer system is configured to capture video media with a first degree of stabilization, displaying, via the display generation component, a video camera capture user interface that includes: a representation of the field-of-view of at least a first camera of the one or more cameras, wherein the representation of the field-of-view is displayed at the first zoom level; and a first selectable control; means for, while the computer system is configured to capture video media with the first degree of stabilization and while displaying, via the display generation component, the representation of the field-of-view at the first zoom level and the first selectable control, detecting an input directed to the first selectable control; and means for, in response to detecting the input directed to the first selectable control: configuring the computer system to capture video media with a second degree of stabilization that is different from the first degree of stabilization; and displaying, via the display generation component, the representation of the field-of-view at the second zoom level that is different from the first zoom level.

In accordance with some embodiments, a computer program product, comprising one or more programs configured to be executed by one or more processors of a computer system that is in communication with a display generation component and has one or more cameras is described. The one or more programs include instructions for: while the computer system is configured to capture video media with a first degree of stabilization, displaying, via the display generation component, a video camera capture user interface that includes: a representation of the field-of-view of at least a first camera of the one or more cameras, wherein the representation of the field-of-view is displayed at the first zoom level; and a first selectable control; while the computer system is configured to capture video media with the first degree of stabilization and while displaying, via the display generation component, the representation of the field-of-view at the first zoom level and the first selectable control, detecting an input directed to the first selectable control; and in response to detecting the input directed to the first selectable control: configuring the computer system to capture video media with a second degree of stabilization that is different from the first degree of stabilization; and displaying, via the display generation component, the representation of the field-of-view at the second zoom level that is different from the first zoom level.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing camera characteristics, thereby increasing the effectiveness, efficiency, and user satisfaction with such devices. Such methods and interfaces may complement or replace other methods for managing camera characteristics.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 6A-6K illustrate exemplary user interfaces for managing the resolution of media in accordance with some embodiments.

FIG. 9 is a flow diagram illustrating exemplary methods for managing zoom controls for capturing media in accordance with some embodiments.

FIG. 10 is a flow diagram illustrating exemplary methods for managing predefined zoom levels for capturing media in accordance with some embodiments.

FIG. 12 is a flow diagram illustrating exemplary methods for managing media stabilization in accordance with some embodiments.

DESCRIPTION OF EMBODIMENTS

Figure 1A:
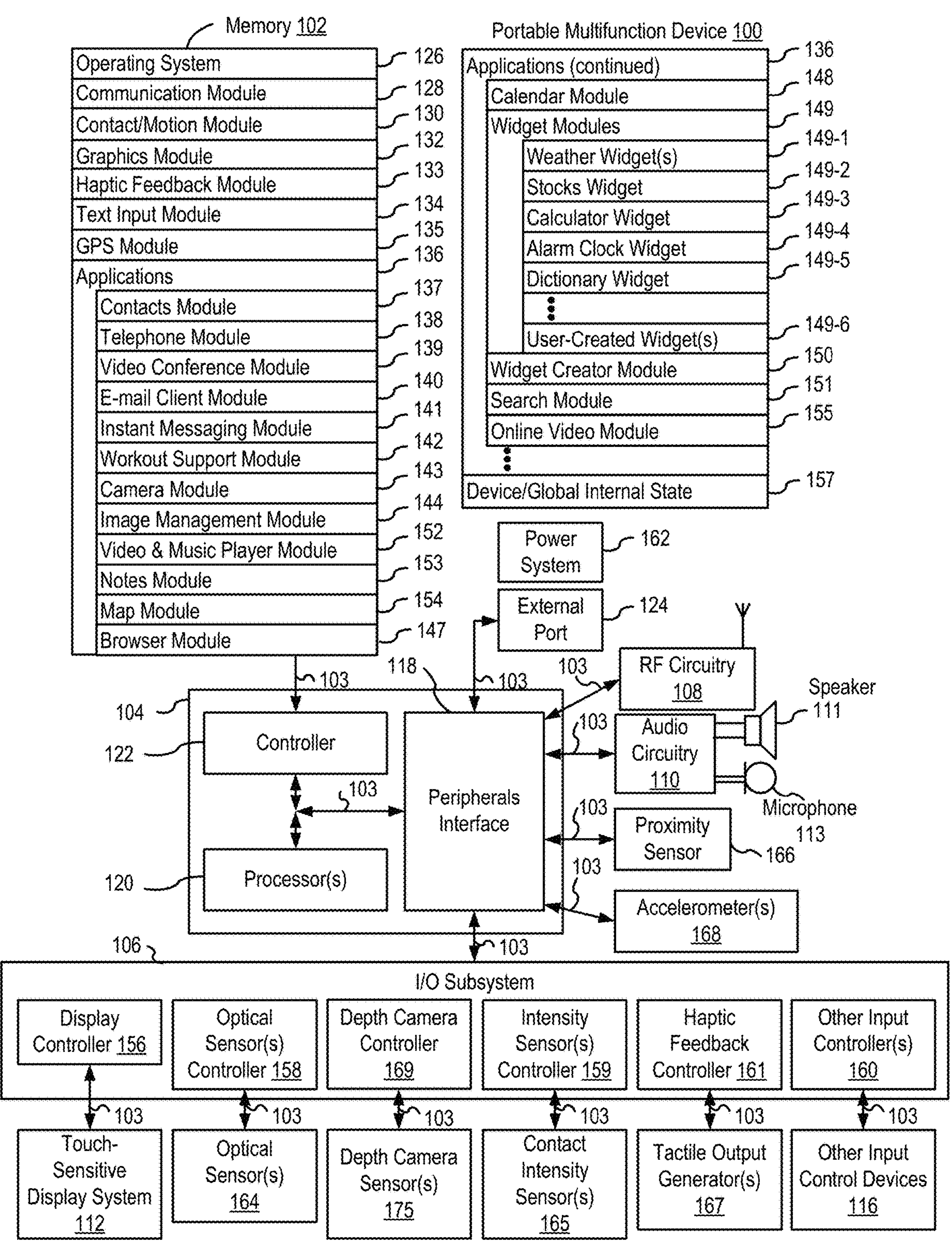
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing camera characteristics. In some cases, there is a need for a user to capture enhanced media by managing camera characteristics. Such techniques can reduce the cognitive burden on a user who manage camera characteristics to capture media, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing camera characteristics. FIGS. 6A-6K illustrate exemplary user interfaces for managing the resolution of media in accordance with some embodiments. FIG. 7 is a flow diagram illustrating exemplary methods for managing the resolution of media in accordance with some embodiments. The user interfaces of FIGS. 6A-6K are used to illustrate the processes described below, including the processes in FIG. 7. FIGS. 8A-8X illustrate exemplary user interfaces for managing zoom levels for capturing media in accordance with some embodiments. FIG. 9 is a flow diagram illustrating exemplary methods for managing zoom controls for capturing media in accordance with some embodiments. FIG. 10 is a flow diagram illustrating exemplary methods for managing predefined zoom levels for capturing media in accordance with some embodiments. The user interfaces of FIGS. 8A-8X are used to illustrate the processes described below, including the processes in FIGS. 9 and 10. FIGS. 11A-11M is a flow diagram illustrating exemplary methods for managing media stabilization in accordance with some embodiments. FIG. 12 illustrate exemplary user interfaces for managing media stabilization in accordance with some embodiments. The user interfaces of FIGS. 11A-11M are used to illustrate the processes described below, including the processes in FIG. 12.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication or via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
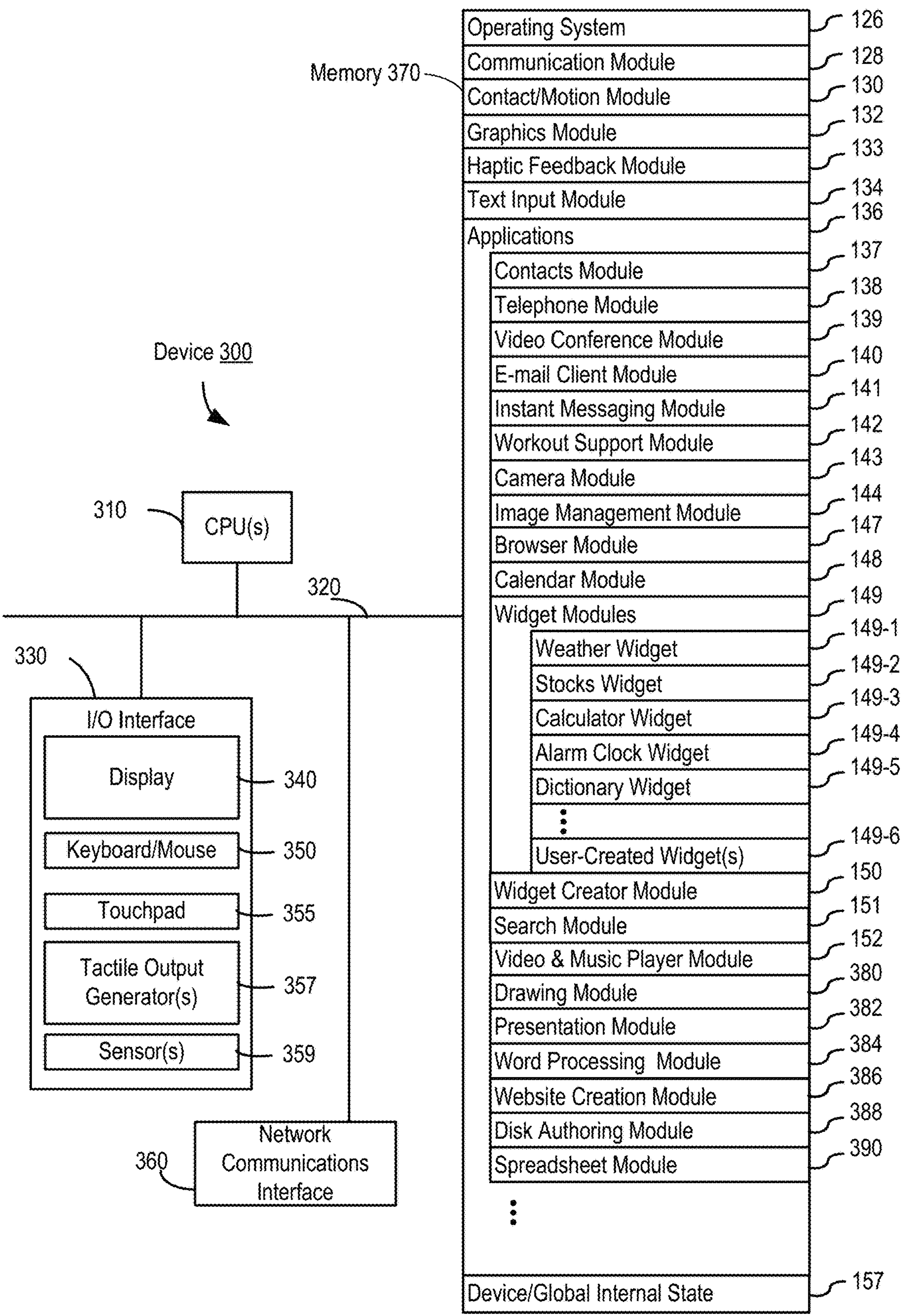
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);

Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, “instant messaging” refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
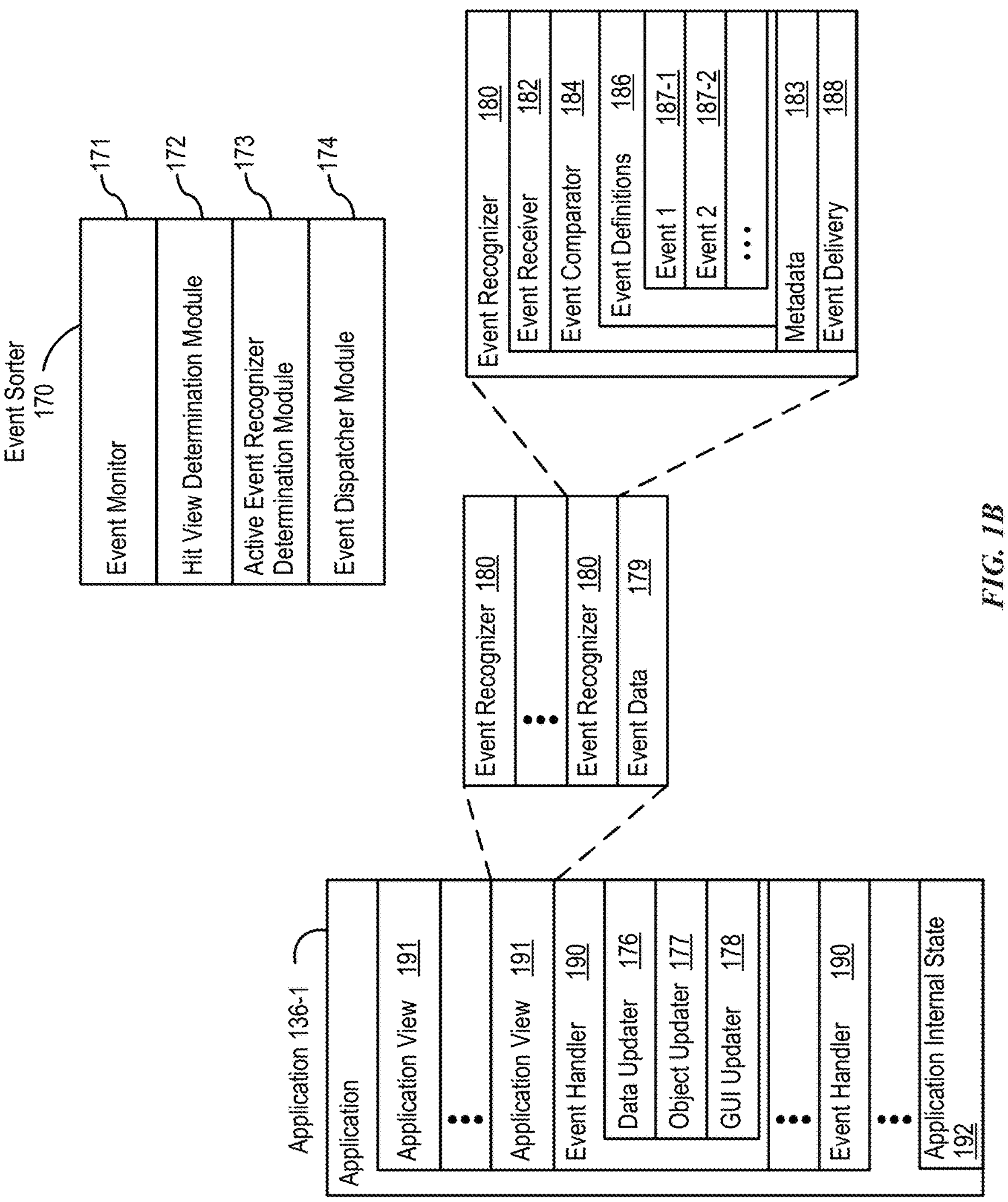
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
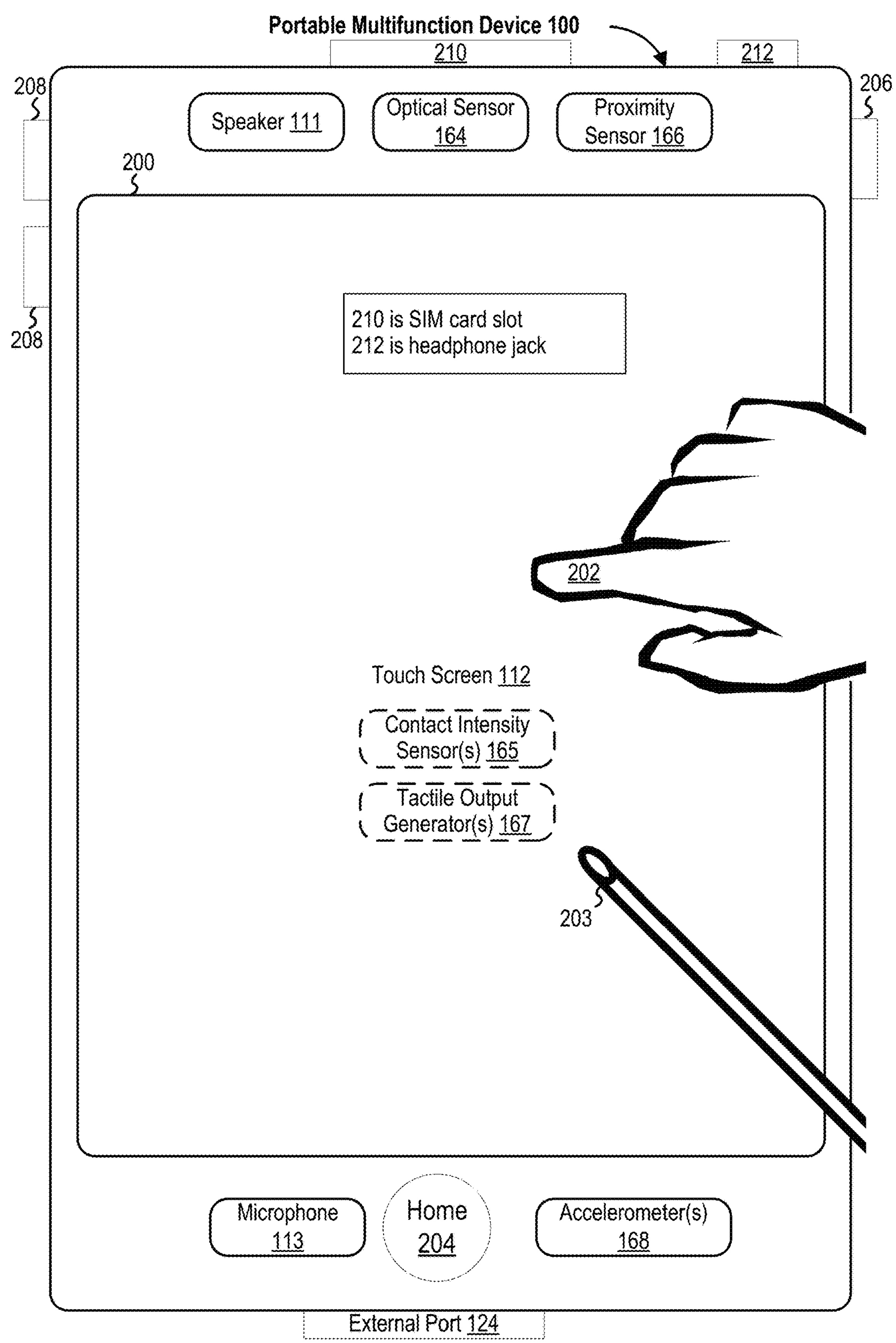
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
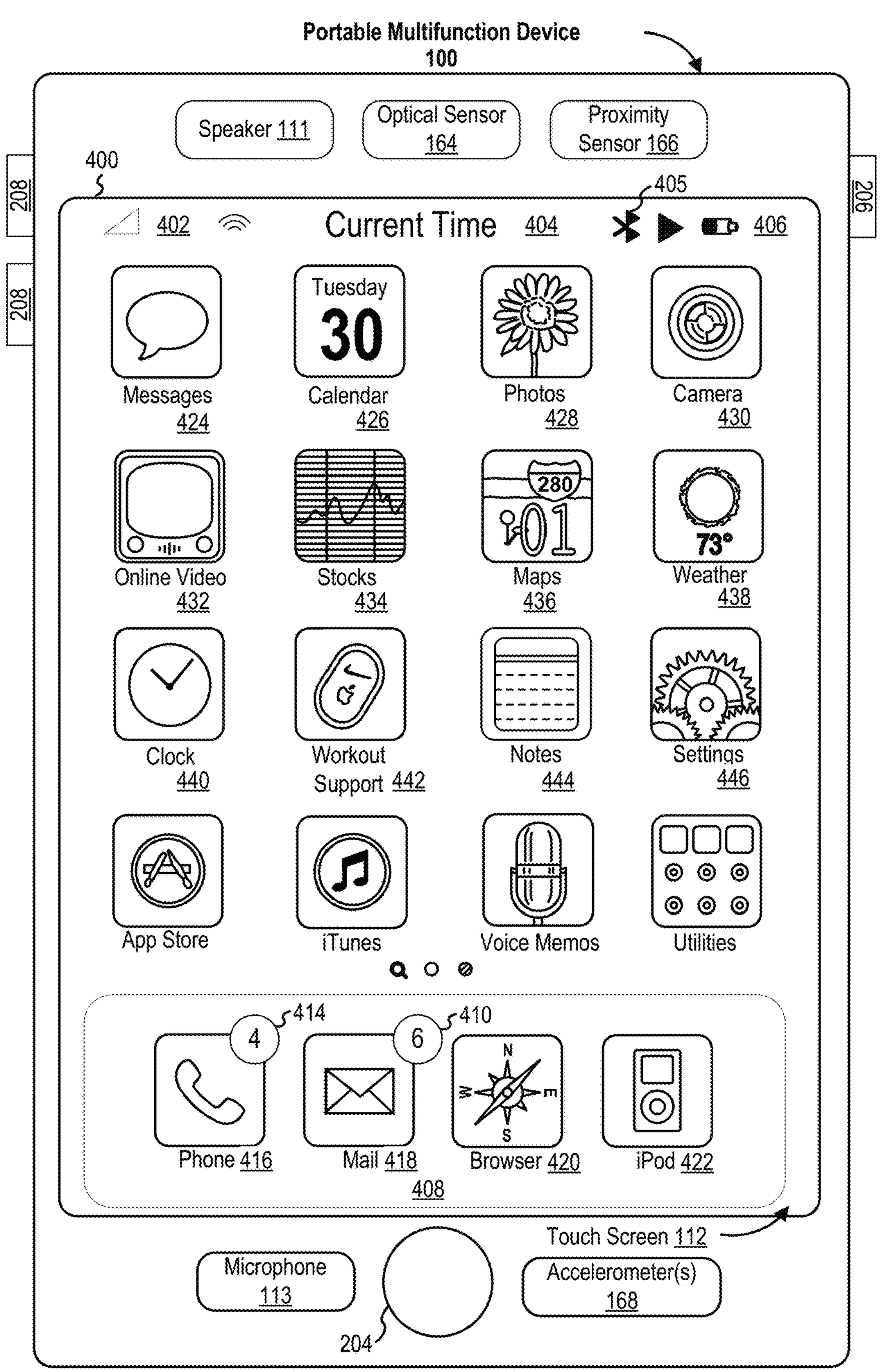
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
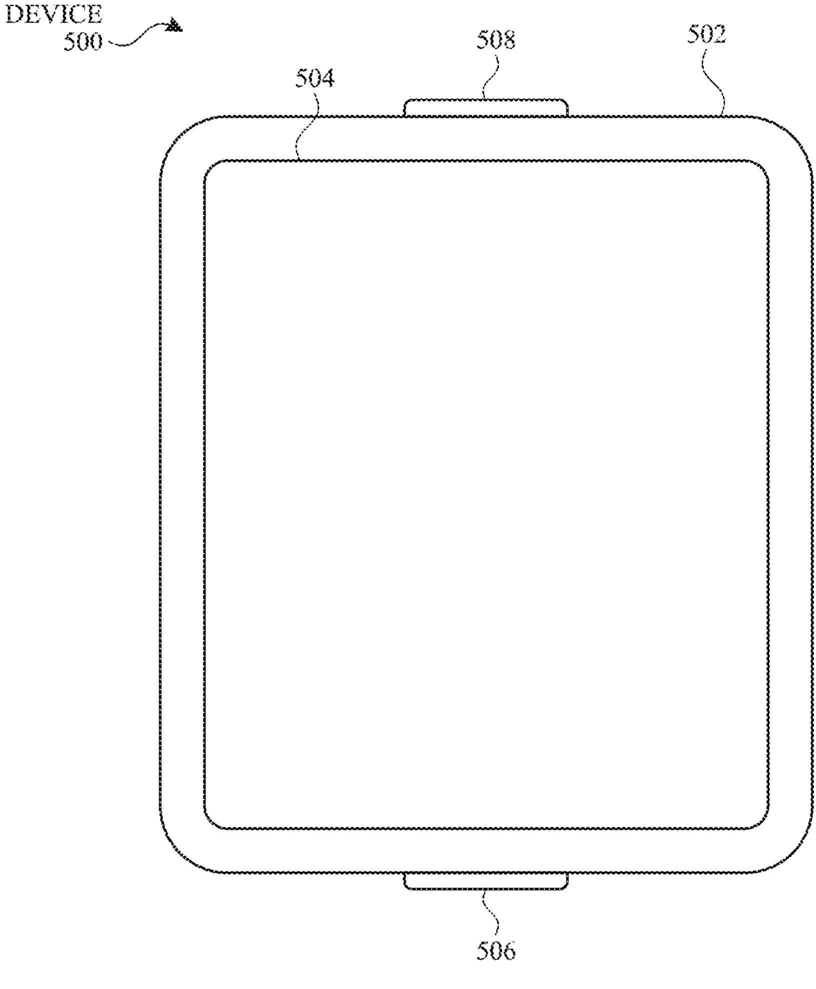
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
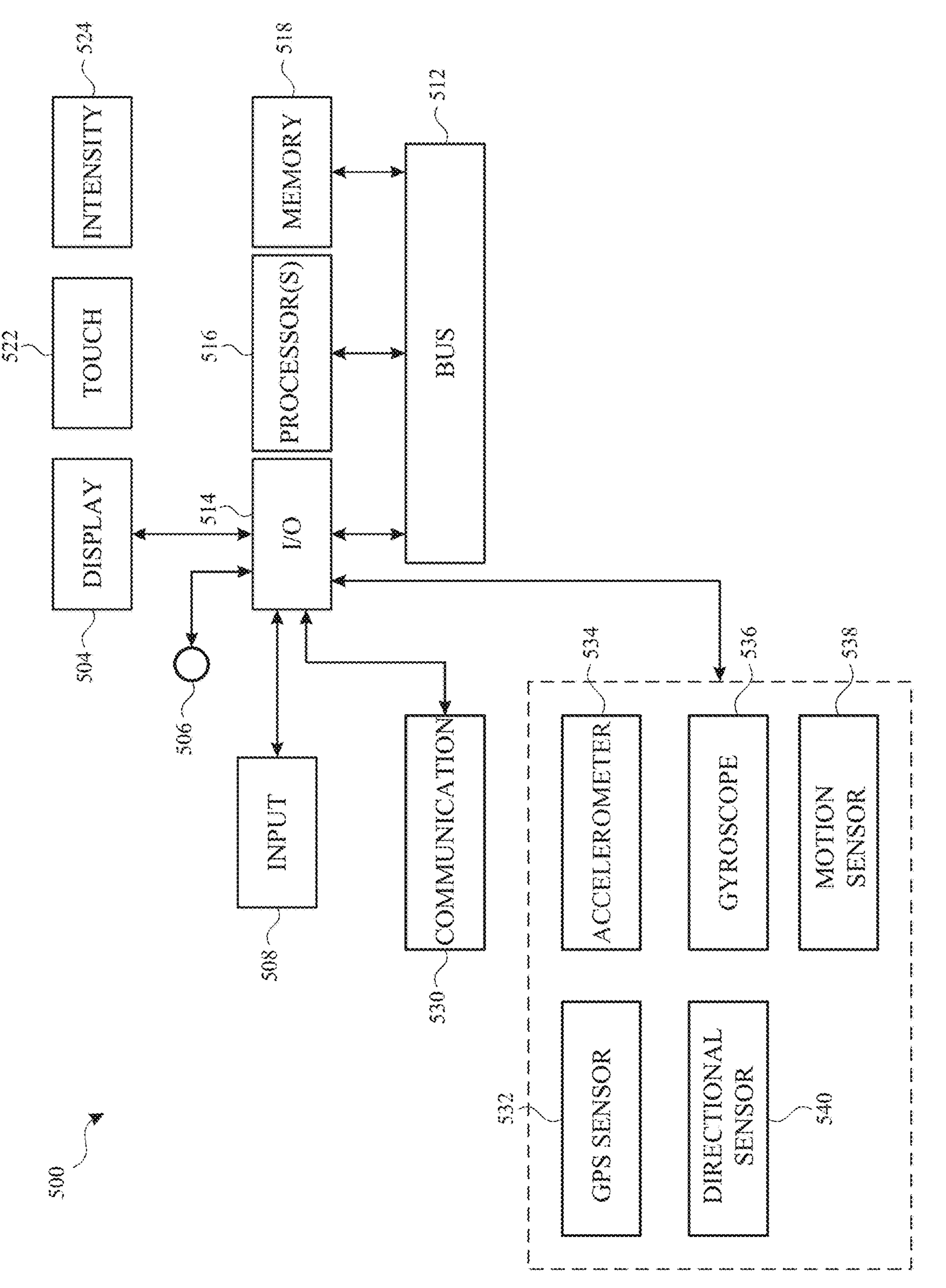
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1000, and 1200 (e.g., FIGS. 7, 9, 10, and 12). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UP") and associated processes that are implemented on an electronic device, such as portable multifunction device 100, device 300, or device 500.

FIGS. 6A-6K illustrate exemplary user for managing the resolution of media in accordance with some embodiments. The user interfaces in these figures are used to illustrate the processes described below, including the processes in FIG. 7. While the examples in FIGS. 6A-6K (and in FIGS. 8A-8X and 11A-11M) are described with respect to touch inputs on a touch-sensitive surface, it should be understood that taps, long presses, press-and-holds, swipes, and other touch gestures/inputs described herein could be replaced with other inputs directed to the relevant user interface elements. For example, a tap could be replaced by a mouse click, a swipe could be replaced with a click and drag, a double tap could be replaced with a double click, and/or a long press (and/or press-and-hold) could be replaced with a right click or a click while holding down a modifier key. Similarly, air gestures such as a pinch of two fingers together or a touch of a finger to a hand could replace a tap, while a pinch of two fingers together followed by movement could replace a touch and drag, a double pinch could replace a double tap, and a long pinch could replace a long tap or tap and hold. In some embodiments, the location in the user interface to which an input is directed is determined based on direct touch (e.g., a tap, double-tap, long press, press-and-hold, or swipe on a user interface element), but the location to which an input is directed could also be determined based on other indications of user intent such as the location of a displayed cursor or the location toward which a gaze of a user is directed.

FIG. 6A illustrates computer system 600 displaying a settings user interface. Computer system 600 includes multiple cameras that are positioned on the backside of computer system 600 (e.g., the side opposite of where the display of computer system 600 is positioned) (e.g., rear facing cameras). At FIG. 6A, the multiple cameras are different from each other, where each camera has different hardware specifications (e.g., camera sensor size, shape, and/or placement, camera lens shape, size, and/or placement, and/or aperture size, shape, and/or placement). Because of the differences in the hardware specifications, each of the cameras has a different set of image capture parameters, such as a minimum focal distance, a maximum and/or minimum field-of-view, a focal length, an aperture size range, a native zoom level, and/or a maximum/minimum optical (or digital) zoom. In some embodiments, computer system 600 is a tablet, phone, laptop, desktop, and/or camera. In some embodiments, computer system 600 optionally includes one or more features of device 100, device 300, and/or device 500.

FIGS. 6A-6K illustrate an exemplary embodiment where computer system 600 captures and generates media (e.g., photo and/or video media) with different resolutions while using the same camera to capture the media. In some embodiments, computer system 600 generates media with a first resolution by using the native zoom level of a camera. In some embodiments, computer system 600 generates media with a second resolution that is different from the first resolution by using an optical resolution that is based on the native zoom level of the camera. In some embodiments, a native zoom level is a zoom level at which a fixed focal length camera is capable of capturing media without additional digital processing to change the zoom level of the captured image, and a digital zoom level is a zoom level at which the fixed focal length camera is not capable of capturing media without additional digital processing to change the zoom level of the captured image. In some embodiments, the camera(s) used to capture the media in FIGS. 6A-6K are fixed focused focal length cameras (e.g., a 24 MM as discussed in relation to FIGS. 8A-8X).

At FIG. 6A, computer system 600 can be configured to generate media that has a resolution of 12 MP or 24 MP via photo resolution setting 690*a*. In FIG. 6A, photo resolution setting 690*a* is set to 24 MP. Accordingly, computer system 600 will generate media having a resolution of 24 MP when a set of criteria is met. While photo resolution setting 690*a* is set to 24 MP, computer system 600 will generate media having the resolution of 12 MP when the set of criteria is not met. As indicated in the text under photo resolution setting 690*a*, media captured with a camera (e.g., wide-angle lens camera) can be generated (e.g., and/or saved) at 12 MP or 24 MP; however, when a night mode (e.g., low-light mode) or a flash operation is used, computer system 600 will generate media having a resolution of 12 MP. Accordingly, the set of criteria includes a criterion that is met when the computer system 600 is configured to capture media without using flash and a criterion that is met when the computer system 600 is not configured to capture low-light media.

FIG. 6B illustrates computer system 600 displaying a camera user interface, which includes live preview 630 that optionally extends from the top of the display of computer system 600 to the bottom of the display of computer system 600. Live preview 630 is a representation of a field-of-view ("FOV") of one or more cameras of computer system 600. In particular, live preview 630 is a representation of the FOV of a wide-angle camera (e.g., as discussed above). In some embodiments, live preview 630 is a representation of a partial FOV of one or more cameras. In some embodiments, live preview 630 is based on images detected by one or more camera sensors. In some embodiments, computer system 600 captures images using multiple camera sensors and combines them to display live preview 630. In some embodiments, computer system 600 captures images using a single camera sensor to display live preview 630. In some embodiments, computer system 600 uses one or more fixed focal length cameras to capture images to display live preview. In some embodiments, computer system 600 captures images at the native zoom level of a fixed focal length camera to display live preview 630. In some embodiments, computer system 600 applies a digital zoom to the captured images (e.g., images captured at the native zoom level) to display live preview 630. The camera user interface of FIG. 6B includes indicator region 602 and control region 606, which are positioned with respect to live preview 630 such that indicators and controls can be displayed concurrently with live preview 630. Camera display region 604 (e.g., which includes live preview 630) is substantially not overlaid with indicators and/or controls (e.g., most of the indicators and controls of the camera user interface (e.g., discussed below in relation to FIG. 6B) are not displayed on top of live preview 630). As illustrated in FIG. 6B, the camera user interface includes visual boundary 608 that indicates the boundary between indicator region 602 and camera display region 604 and the boundary between camera display region 604 and control region 606.

As illustrated in FIG. 6B, indicator region 602 includes indicators, such as flash indicator 602*a*, modes-to-settings indicator 602*b*, and animated image indicator 602*c*. Flash indicator 602*a* indicates whether a flash mode is on (e.g., active), off (e.g., inactive), or in another mode (e.g., automatic mode). In FIG. 6B, flash indicator 602*a* indicates that the flash mode is off, so a flash operation will not be used when computer system 600 is capturing media. Moreover, modes-to-settings indicator 602*b*, when selected, causes computer system 600 to replace camera mode controls 620 with one or more controls that, when selected, change one or more camera settings for the currently selected camera mode (e.g., photo camera mode in FIG. 6B). Animated image indicator 602*c* indicates whether the camera is configured to capture a single image and/or multiple images (e.g., in response to detecting a request to capture media). Here, animated image indicator 602 indicates that the computer system is configured to capture a single image (e.g., via the slash through the indicator 602) in response to detecting a request to capture media. In some embodiments, indicator region 602 is overlaid onto live preview 630 and, optionally, includes a colored (e.g., gray and/or translucent) overlay.

As illustrated in FIG. 6B, camera display region 604 includes live preview 630 and zoom controls (e.g., affordances) 622. Zoom controls 622 include 0.5× zoom control 622*a*, 1× zoom control 622*b*, 2× zoom control 622*c*, and 3× zoom control 622*d*. As illustrated in FIG. 6B, 1× zoom control 622*b* is enlarged compared to the other zoom controls and bolded, which indicate that 1× zoom control 622*b* is selected and that computer system 600 is displaying live preview 630 at a 1× zoom level. In some embodiments, computer system 600 displays 1× zoom control 622*b* as being selected by displaying 1× zoom control 622*b* in a different color than the other zoom controls.

As illustrated in FIG. 6B, control region 606 includes camera mode controls 620, shutter control 610, camera switcher control 614, and representation of media collection 612. In FIG. 6B, camera mode controls 620*a*-620*e* are displayed, which includes cinematic video mode control 620*a*, video mode control 620*b*, photo mode control 620*c*, portrait mode control 620*d*, and panoramic mode control 620*e*. As illustrated in FIG. 6B, photo mode control 620*c* is selected, which is indicated by photo mode control 620*c* being bolded and in the center of the camera user interface. When photo mode control 620*c* is selected, computer system 600 initiates capture of (e.g., and/or captures) photo media (e.g., a still photo) in response to computer system 600 detecting an input directed to shutter control 610. The photo media that is captured by computer system 600 is representative of live preview 630 that is displayed when the input directed to shutter control 610 is detected. In some embodiments, in response to detecting an input directed to cinematic video control 620*a*, computer system 600 is configured to initiate capture of cinematic video media (e.g., a cinematic video), where a synthetic depth-of-field effect is applied to one or more portions of captured video, in response to detecting an input directed to shutter control 610. In some embodiments, in response to detecting an input directed to video mode control 620*b*, computer system 600 configures the camera application to initiate capture of video media (e.g., a video) in response to detecting an input directed to shutter control 610. In some embodiments, in response to detecting an input directed to portrait mode control 620*d*, computer system 600 is configured to initiate capture of portrait media (e.g., a still photo and/or a still photo having a bokeh applied) in response to detecting an input directed to shutter control 610. In some embodiments, in response to detecting an input directed to panoramic mode control 620*e*, computer system 600 is configured to initiate capture of panoramic media (e.g., a still photo that is larger than a still photo taken while photo capture mode is selected) in response to detecting an input directed to shutter control 610. In some embodiments, computer system 600 displays a particular set of indicators and/or controls on the camera user interface based on the camera mode that is selected (e.g., and/or the camera mode that computer system 600 is configured to operate in based on the selected camera mode). In some embodiments, computer system 600 transitions to operate in a different camera mode based on an input (e.g., a swipe input and/or drag input and, in some embodiments, a non-swipe input, such as a click and drag input, an air gesture (e.g., a pinch and move input), a gaze input, and/or or a combination thereof) directed to camera display 604 (e.g., without the input being directed to a particular camera mode control), as discussed further below in relation to FIG. 6F.

At FIG. 6B, shutter control 610, when selected, causes computer system 600 to capture media (e.g., a photo when shutter control 610 is activated in FIG. 6B), using the one or more camera sensors. Computer system 600 captures the media based on the current state of live preview 630 (or the FOV of one or more cameras) and the current state of the camera application (e.g., which camera mode is selected). Camera switcher control 614, when selected, causes computer system 600 to switch between the FOV of at least two sets of cameras and to update live preview 630, such as by switching between a rear-facing camera sensor and a front-facing camera sensor. The representation of media collection 612 illustrated in FIG. 6B is a representation of media (e.g., a photo and/or a video) that was most recently captured by computer system 600. In some embodiments, in response to detecting an input directed to media collection 612, computer system 600 displays an enlarged representation of the media that was most recently captured by computer system 600. At FIG. 6B, computer system 600 detects tap input 650*b*1 on shutter control 610. At FIG. 6B, in response to detecting tap input 650*b*1, computer system 600 generates (e.g., saves and/or captures) photo media (e.g., because photo mode control 620*c* is selected) using a respective camera (e.g., the wide-angle camera as discussed above and/or another camera (e.g., a telephoto camera and/or an ultra-wide-angle camera)).

Figures 6C, 6D:
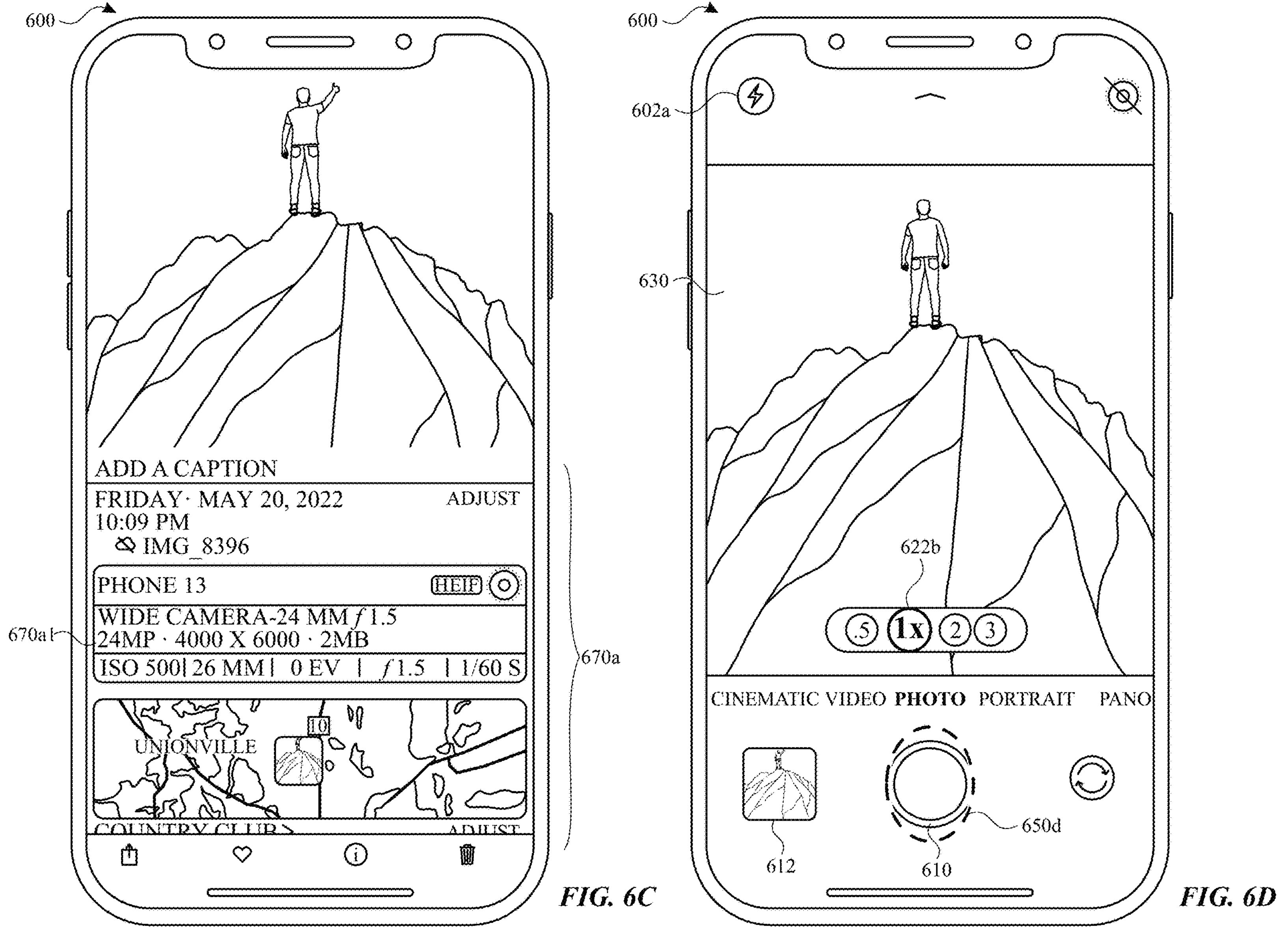
Figure 7:
FIG. 7 is a flow diagram illustrating exemplary methods for managing the resolution of media in accordance with some embodiments.

FIG. 6C illustrates computer system 600 displaying metadata 670*a* for the photo that was generated at FIG. 6B. Here, metadata 670*a* includes camera information 670*a*1, which indicates that the photo has a resolution of 24 MP. Looking back at FIG. 6B, computer system 600 generated the photo with the 24 MP resolution because the set of criteria was met (e.g., at the time at which tap input 650*b*1 was detected) and because photo resolution setting 690*a* of FIG. 6A was set to 24 MP. At FIG. 6B, computer system 600 detects tap input 650*b*2 on flash indicator 602*a*.

At FIG. 6D, in response to detecting tap input 650*b*2 on flash indicator 602*a* and after detecting tap input 650*b*1, computer system 600 configures the camera application to capture media using flash (and/or configured to perform a flash operation in response to an input being detected on shutter control 610). Further, in response to tap input 650*b*2, computer system 600 updates flash indicator 602*a* to indicate the change in configuration (e.g., removes the slash from flash indicator 602*a*). As illustrated in FIG. 6D, computer system 600 has updated the representation of media collection 612 to include a thumbnail of the photo that was generated at FIG. 6B (e.g., in response to detecting input 650*b*1). At FIG. 6D, computer system 600 detects tap input 650*d* on shutter control 610. At FIG. 6D, computer system 600 generates photo media using the respective camera representative of live preview 630 at FIG. 6D (or representative of the FOV of the respective camera).

Figures 6E, 6F:
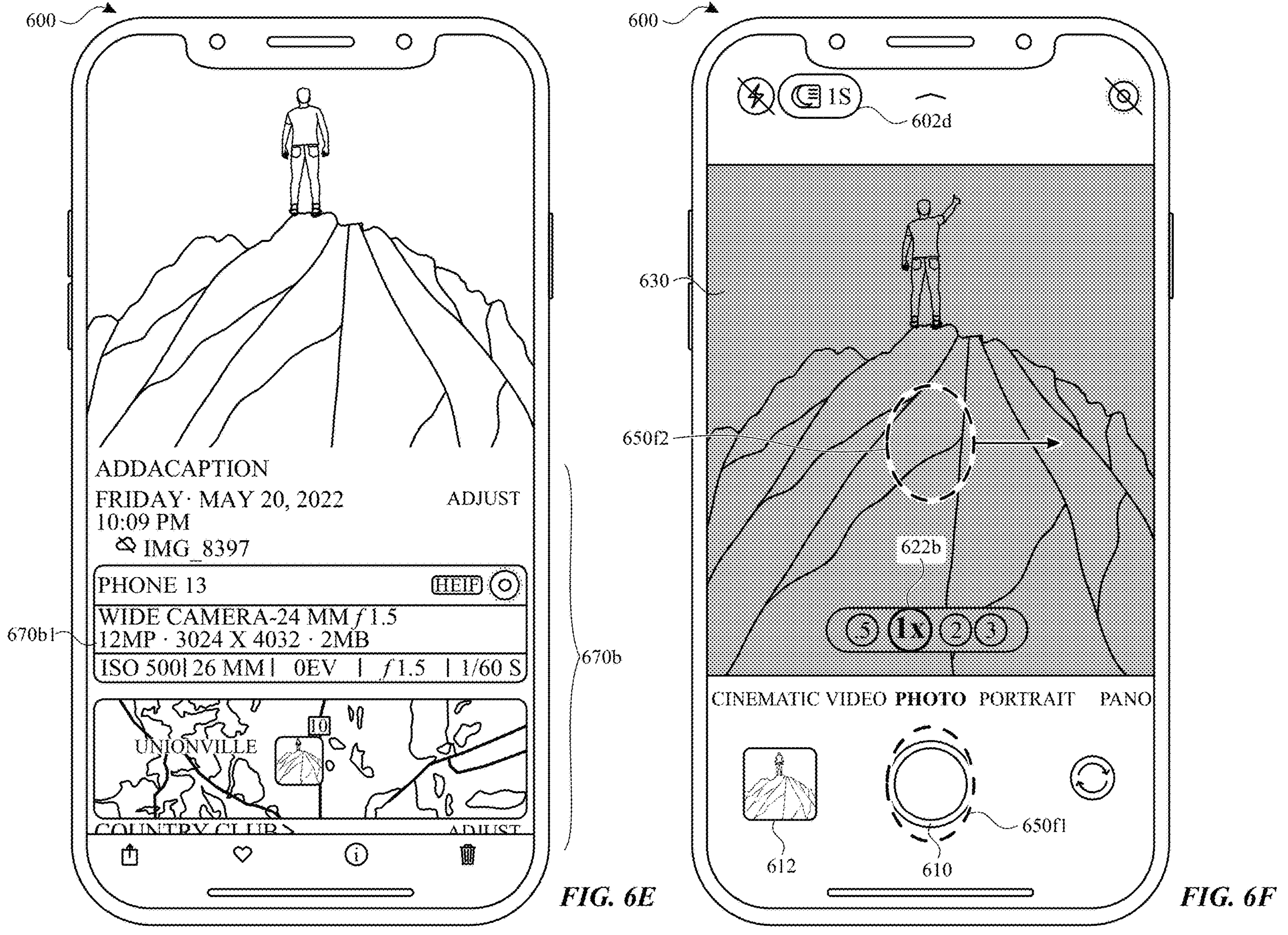

FIG. 6E illustrates computer system 600 displaying metadata 670*b* for the photo that was generated at FIG. 6D. Here, metadata 670*b* includes camera information 670*b*1, which indicates that the photo has a resolution of 12 MP (e.g., instead of 24 MP). Looking back at FIG. 6D, computer system 600 generated the photo with the 12 MP resolution (e.g., using the respective camera) because the set of criteria was not met. The set of criteria was not met because the computer system 600 was configured to capture media using flash at FIG. 6D (e.g., when input 650*d* was detected on shutter control 610). Considering FIGS. 6B-6D, computer system 600 generated photo media with different resolutions using the same camera while computer system 600 was configured with the same capture settings, expect for the flash mode being active and/or inactive. Thus, computer system 600 automatically chose which resolution to generate the photo media without requiring input from a user to specify and/or to control the resolution with which a particular photo would be generated. In some embodiments, computer system 600 generates media at the higher resolution by unbinning pixels from media captured at the lower resolution (e.g., 12 MP or 8 MP). In some embodiments, computer system 600 generates media at the higher resolution (e.g., 24 MP or 20 MP) by combining images (e.g., photos) that are captured at the native resolution. In some embodiments, the images are captured in response to detecting a single input on shutter control 610. In some embodiments, computer system 600 generates media at the higher resolution when a determination is made that the multiple images captured by computer system 600 are likely to be captured in consistent conditions. Thus, in some embodiments, computer system 600 generates media at the lower resolution when a determination is made that the multiple images captured by computer system 600 are not likely to be captured in consistent conditions. In some embodiments, at FIG. 6D, computer system 600 generates media with the lower resolution because computer system 600 only captures one photo while the flash operation is active and/or because capturing multiple images to generate the photo media with the higher resolution would require combining images at different light levels (e.g., where the light level of a particular image depends on when the image was captured relative to a flash operation (e.g., at the start, in the middle, and/or at the end of the flash operation)).

At FIG. 6F, computer system 600 detects that low-light criteria are met. In response to detecting that the low-light criteria are met, computer system 600 is configured to capture media while operating in a low-light mode and displays low-light indicator 602*d*. Low-light indicator 602*d* indicates that the time of capture for the low-light mode is set to one second. In addition, computer system 600 has also updated the representation of media collection 612 to include a thumbnail of the photo that was taken at FIG. 6D (e.g., in response to detecting input 650*d*). In some embodiments, the low-light criteria includes a criterion that is met when ambient light in the field-of-view of the one or more cameras is below a threshold (e.g., 0.1-20 lux). In some embodiments, the time of capture for the low-light mode depends on the amount of ambient light that is detected. In some embodiments, the time of capture for the low-light mode increases (e.g., linearly or non-linearly) as the detected ambient light decreases. In some embodiments, time of capture for low-light mode decreases (e.g., linearly or non-linearly) as the detected ambient light increases. At FIG. 6F, computer system 600 detects tap input 650*f*1 on shutter control 610. At FIG. 6F, in response to detecting tap input 650*f*1, computer system 600 generates photo media using the respective camera. The media generated in response to detecting tap input 650*f*1 has metadata that includes camera information that is similar to 670*b*1 of FIG. 6E, where the media has a resolution of 12 MP. Thus, at FIG. 6F, computer system 600 generates photo media at the lower resolution because the set of criteria is not satisfied (e.g., because computer system 600 was configured to capture low-light media when tap input 650*f*1 was detected on shutter control 610). In some embodiments, computer system 600 combines multiple images to capture media while operating in the low-light mode. In some embodiments, computer system 600 captures the multiple images by using different shutter speeds and/or levels of exposure for some of the multiple images. Thus, in some embodiments, computer system 600 is configured to generate media at the lower resolution (e.g., 12 MP or 8 MP) instead of the higher resolution because a potential difference in quality for the different images that are captured while the computer system is operating in low-light mode (e.g., for similar reasons as discussed above in relation to FIG. 6D). At FIG. 6F, computer system detects swipe input 650*f*2 on live preview 630.

Figures 6G, 6H:
Figures 6I, 6J:
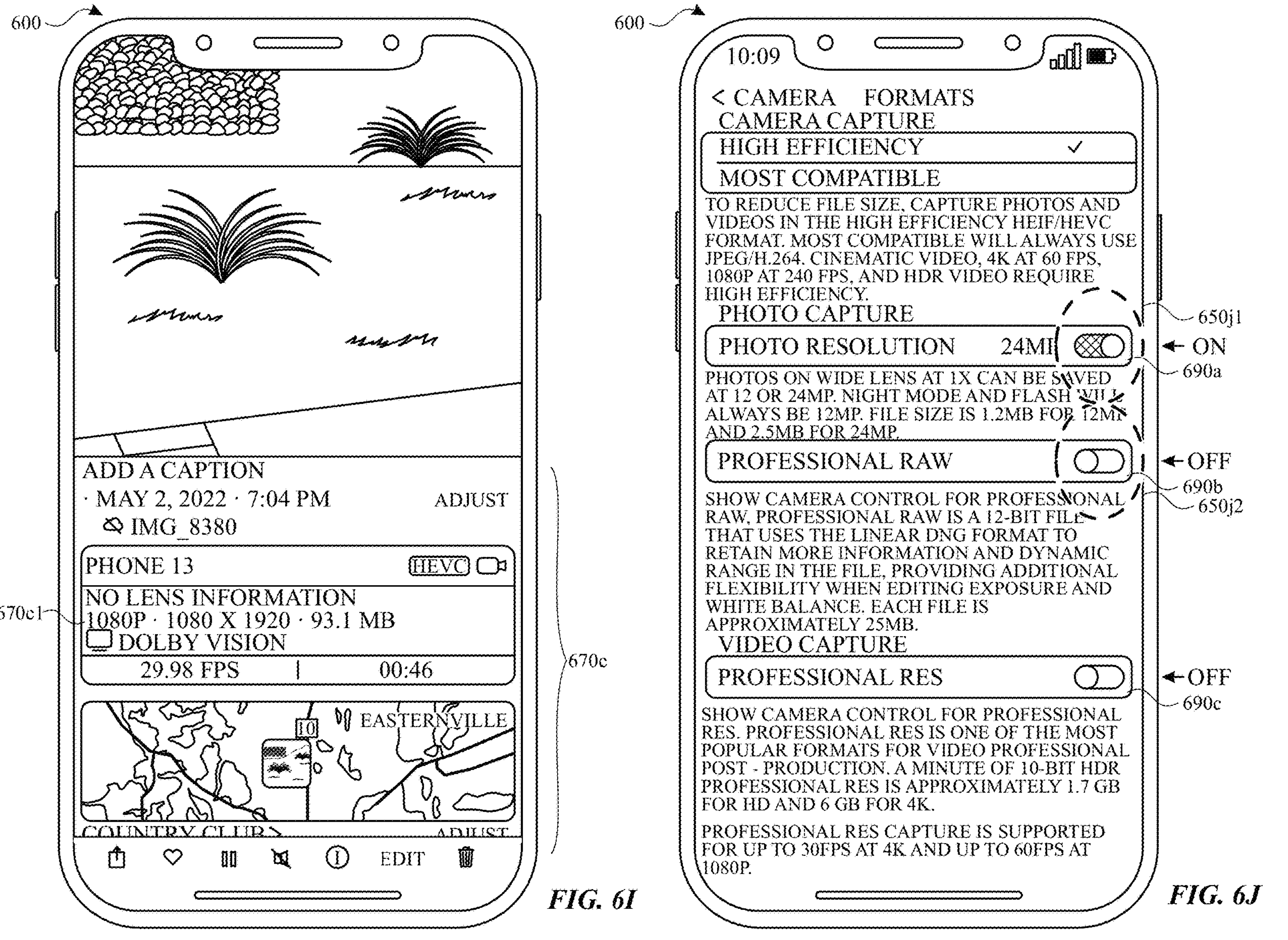

As illustrated in FIG. 6G, in response to detecting swipe input 650*f* on live preview 630, computer system 600 moves camera mode controls 620 to the right and displays video mode control 620*b* as being selected (e.g., bold). Thus, at FIG. 6G, computer system 600 is configured to operate in the video mode. At FIG. 6G, computer system 600 detects tap input 650*g* on shutter control 610. As illustrated in FIG. 6H, in response to detecting tap input 650*g*, computer system replaces shutter control 610 with stop control 616. At FIG. 6H, computer system 600 starts capturing video media (e.g., in response to detecting tap input 650*g* on shutter control) with the respective camera. At FIG. 6H, computer system 600 detects tap input 650*h* on stop control 616 and, in response, ceases the capture of the video media. FIG. 6I illustrates computer system 600 displaying metadata 670*c* for the video media that was captured (and/or generated) in FIGS. 6G-6H. Here, the video media has a 1080p resolution (e.g., indicated by camera interface 670*c*1). At FIGS. 6H-6I, the resolution of the video media does not change, irrespective of whether the set of criteria is met. In some embodiments, the computer system uses the native zoom level to capture video media (e.g., without applying a digital zoom while the 1× zoom level is selected). In some embodiments, 1× zoom control 622*b* being bolded in FIGS. 6G-6H indicates that the 1× zoom level is selected in FIGS. 6H-6I.

Figure 6K:
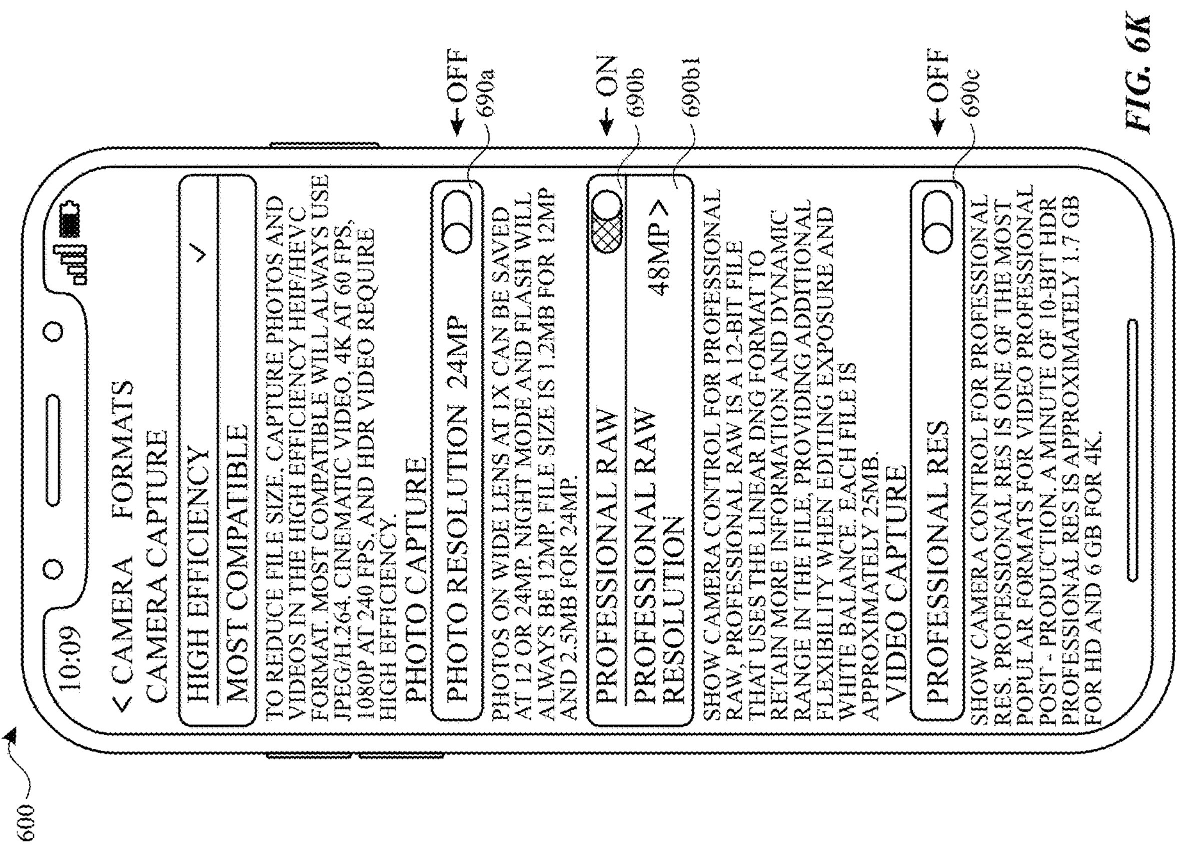

FIG. 6J illustrates computer system 600 displaying the settings user interface of FIG. 6A. The settings user interface includes photo resolution setting 690*a*, professional raw setting 690*b*, and professional resolution setting 690*c*. At FIG. 6J, computer system 600 detects tap input 650*j*1 on photo resolution setting 690*a* and tap input 650*j*2 on professional raw setting 690*b*. As illustrated in FIG. 6K, in response to detecting tap input 650*j*1, computer system 600 disables photo resolution setting 690*a*. Disabling photo resolution setting 690*a* results in computer system 600 being configured to generate media with the 12 MP resolution (e.g., while the computer system is configured to capture media at a certain zoom level (e.g., 1×, 2×, or 3×)), irrespective of whether the set of media criteria is met. As illustrated in FIG. 6K, in response to detecting tap input 650*j*2, computer system 600 transitions professional raw setting 690*b* from an off state to an on state. As illustrated in FIG. 6K, in response to detecting tap input 650*j*2, computer system 600 displays professional raw resolution setting 690*b*1, which indicates that computer system 600 is configured to generate media with a resolution of 48 MP when the professional raw mode is active. The resolution of 48 MP is greater than the resolution of 24 MP (e.g., the maximum resolution (e.g., for only discussion purposes herein) at which photo resolution setting 690*a* can be set). Thus, computer system 600 can be configured to generate media with a higher resolution than the resolution (e.g., highest resolution) to which photo resolution setting 690*a* can be set. In some embodiments, the maximum resolution at which photo resolution setting 690*a* can be set is greater than or less than the resolution of 24 MP.

FIG. 7 is a flow diagram illustrating a method for managing the resolution of media using a computer system in accordance with some embodiments. Method 700 is performed at a computer system (e.g., 100, 300, 500, and/or 600) (e.g., a smartwatch, a wearable electronic device, a smartphone, a desktop computer, a laptop, or a head mounted device (e.g., a head mounted augmented reality and/or extended reality device) having one or more cameras (e.g., one or more cameras (e.g., dual cameras, triple camera, quad cameras, etc.) on the same side or different sides of the electronic device (e.g., a front camera and/or a back camera))) (e.g., one or more 12 MP-48 MP cameras) (e.g., one or more 13 MM, 24 MM, 28 MM, 32 MM, 38 MM, and/or 77 MM focal length cameras) (e.g., one or more fixed focal length cameras) (e.g., a hardware camera and/or camera sensor (e.g., a wide-angle camera and/or camera sensor, a camera having a wide-angled width) and/or (e.g., a telephoto camera)) (e.g., sensor size, shape, and/or placement; lens shape, size, and/or placement; and/or aperture size, shape, and/or placement) (e.g., a first minimum focal distance (e.g., 7-12 cm or 12-15 cm) and a first field-of-view (e.g., an open observable area that is visible to a camera, the horizontal (or vertical or diagonal) length of an image at a given distance from the camera lens) (and, in some embodiments, a hardware or optical field-of-view (FOV) based on the sensor size and the focal length of the lens (e.g., not a digitally zoomed in FOV))) e.g., a second minimum focal distance (e.g., 0-6 cm or 7-12 cm) that is shorter than the first minimum focal distance (e.g., 7-12 cm or 12-15 cm) of the first camera and/or a second field of view that is wider than the first field-of-view (e.g., a FOV that has a wider angle of view in at least one dimension) of the first camera) (e.g., the wide-angle camera) (e.g., a hardware camera and/or camera sensor (e.g., an telephoto camera and/or camera sensor, a camera having a width)) (e.g., a camera that is different from the first camera and/or the second camera) (e.g., a third minimum focal distance that is longer than the first minimum focal distance of the first camera and the second minimum focal distance of the second camera and/or a third field of view that is narrower than the first field-of-view and/or the second field-of-view). In some embodiments, the computer system is in communication with (and/or includes) a display generation component (e.g., a display controller, a touch-sensitive display system, and/or a head mounted display system). In some embodiments, the computer system includes and/or in communication with one or more input devices (e.g., a touch-sensitive surface and/or a first camera of one or more cameras (e.g., one or more cameras (e.g., dual cameras, triple camera, quad cameras, and/or other camera configurations) on the same side or different sides of the computer system (e.g., a front camera and a back camera))). In some embodiments, the computer system includes and/or includes one or more output devices (e.g., speakers, display generation components, and/or haptic output devices). Some operations in method 700 are, optionally, combined, the orders of some operations are, optionally, changed, and some operations are, optionally, omitted.

As described below, method 700 provides an intuitive way for managing the resolution of media. The method reduces the cognitive burden on a user for managing the resolution of media, thereby creating a more efficient human-machine interface. For battery-operated computing devices, enabling a user to manage the resolution of media faster and more efficiently conserves power and increases the time between battery charges.

The computer system (e.g., 600) detects (702) a request (e.g., 650*b*2, 650*d*, 650*f*, and/or 650*g*) to capture visual media (e.g., a photo and/or a video) (e.g., while the computer system is configured to capture media and/or while the computer system is displaying a camera user interface that includes a camera control region). In some embodiments, the computer system displays the camera control region that includes a plurality of selectable user interface objects for camera capture modes. In some embodiments, each camera mode (e.g., video, photo/still, portrait, slow-motion, cinematic, and/or panoramic modes) has a plurality of settings (e.g., for a portrait capture mode: a studio lighting setting, a contour lighting setting, and/or a stage lighting setting) with multiple values (e.g., levels of light for each setting) of the mode (e.g., portrait capture mode) that a camera (e.g., a camera sensor) is operating in to capture media (including post-processing performed automatically after capture). In this way, for example, capture modes are different from modes which do not affect how the camera operates when capturing media or do not include a plurality of settings (e.g., a flash mode having one setting with multiple values (e.g., inactive, active, and/or auto). In some embodiments, capture modes allow user to capture different types of media (e.g., photos or video) and the settings for each mode can be optimized to capture a particular type of media corresponding to a particular mode (e.g., via post processing) that has specified properties (e.g., shape (e.g., square and/or rectangle), speed (e.g., slow motion and/or time elapse), audio, and/or video). For example, when the computer system is configured to operate in a still photo capture mode, the one or more cameras of the computer system, when activated, captures media of a first type (e.g., rectangular photos) with particular settings (e.g., flash setting and/or one or more filter settings). In some embodiments, when the computer system is configured to operate in a square capture mode, the one or more cameras of the computer system, when activated, captures media of a second type (e.g., square photos) with particular settings (e.g., flash setting and/or one or more filters). In some embodiments, when the computer system is configured to operate in a slow motion capture mode, the one or more cameras of the computer system, when activated, captures media that media of a third type (e.g., slow motion videos) with particular settings (e.g., flash setting and/or frames per second capture speed). In some embodiments, when the computer system is configured to operate in a portrait capture mode, the one or more cameras of the computer system captures media of a fifth type (e.g., portrait photos (e.g., photos with blurred backgrounds)) with particular settings (e.g., amount of a particular type of light (e.g., stage light, studio light, contour light, and/or other simulated lighting mode), f-stop, and/or blur). In some embodiments, when the computer system is configured to operate in a panoramic capture mode, the one or more cameras of the computer system captures media of a fourth type (e.g., panoramic photos (e.g., wide photos) with particular settings (e.g., zoom and/or amount of field to view to capture with movement). In some embodiments, when switching between capture modes, the display of the representation of the field-of-view changes to correspond to the type of media that will be captured by the capture mode (e.g., the representation is rectangular while the computer system is operating in a still photo capture mode and the representation is square while the computer system is operating in a square capture mode). In some embodiments, while the computer system is in the cinematic video mode, the computer system is configured to apply a synthetic depth-of-field effect to alter visual information to emphasize a subject in one or more frames of media.

In response to (704) detecting the request to capture visual media, the computer system (e.g., 600) initiates capture of visual media via the one or more cameras, including: in accordance with a determination that a first set of environmental conditions that affect media capture are detected, generating (706) visual captured media (e.g., as discussed in relation to FIGS. 6E, and/or 6I) that has a first resolution (e.g., image and/or visual resolution (e.g., quantified as pixel count/density (e.g., 800×1200, 2272×1704, 2592×1944, 3072×2304, 3264×2448, 3648×2736, 4000×3000, 4416×3312, or 5616×3744), line resolution, and/or temporal resolution (e.g., frames per second)).

In response to (704) detecting the request to capture visual media, the computer system (e.g., 600) initiates capture of visual media via the one or more cameras, including: in accordance with a determination that a second set of environmental conditions that affect media capture are detected, where the second set of media capture conditions is different from the first set of media capture conditions, generating (708) visual captured media (e.g., as discussed in relation to FIG. 6C) that has a second resolution that is different from (e.g., greater than or less than) the first resolution. In some embodiments, the second set of environmental conditions is detected when the first set of environment conditions is not detected, or vice-versa. In some embodiments, generating visual captured media that has the second resolution includes combining multiple images that have been captured in response to detecting the request to capture visual media, initiating capture of visual media via the one or more cameras. In some embodiments, multiple images (e.g., 2, 5, 7, or 9 images) are captured, analyzed, and/or processed (e.g., via a neural engine or neural network) to generate a single composite image using portions of one or more of the multiple images. In some embodiments, one or more images are captured at different shutter speeds (e.g., 3-10 images are captured using a first shutter speed, 1-7 images are captured using a second shutter speed that is longer than the first shutter speed, and 3-10 images are captured using a third shutter speed that is different from the first shutter speed and the second shutter speed). In some embodiments, the multiple images are captured at various times relative to the request to capture media (e.g., with some images being captured before the request) (e.g., images are captured on a continuous basis with images captured a predetermined period of time before the request being composited with images captured after the request). In some embodiments, the multiple images are combined and/or merged using machine learning (e.g., using a neural network and/or engine), where one or more pixels are selected from one or more of the multiple images and/or one or more pixels from the multiple images are used to optimize one or more pixels in the single image that is generated from the multiple images. In some embodiments, generating visual captured media that has the second resolution does not include combining multiple images that have been captured in response to detecting the request to capture visual media, initiating capture of visual media via the one or more cameras. Generating visual captured media that has a particular resolution based on detecting a particular set of environmental conditions that affect media capture allows the computer system to automatically and dynamically adjust the resolution at which visual captured media is generated based on the environment, which performs an operation when a set of conditions has been met without requiring further user input.

In some embodiments, the first set of environmental conditions includes a lighting condition that is based on the amount of light (e.g., ambient light) in the field-of-view of the one or more cameras (e.g., as discussed above in relation to FIG. 6F). In some embodiments, the second set of environmental conditions a lighting condition that based on the amount of light in the field-of-view of the one or more cameras. In some embodiments, the second set of environmental conditions includes a lighting condition that is detected when (e.g., based on, upon, after, and/or as a result of) (in some embodiments, at least) an amount of ambient light (e.g., detected light) in the field-of-view of the one or more cameras is above a threshold (e.g., 0- 20 lux). In some embodiments, the first set of environmental conditions includes a lighting condition that is detected when an amount of ambient light in the field-of-view of the one or more cameras being below the threshold. In some embodiments, the first set of environmental conditions is detected when the computer system is in a low-light camera mode and the second set of environmental conditions is detected when the computer system is not in the low-light camera mode. In some embodiments, the low-light camera mode is active (or the computer system is in the low-light camera mode) when the low-light conditions are met. In some embodiments, low-light conditions are met when the low-light conditions include a condition that is detected when ambient light in the field-of-view of the first camera of the one or more cameras is below a respective threshold (e.g., 20 lux) and/or is a between a respective range (e.g., between 20 lux-0 lux), when the user selects (e.g., turn on) a low-light status indicator (e.g., an indicator that indicates whether or not the computer system is operating in a low-light camera mode), and/or when the user turns on and/or activates a setting that activates the low-light camera mode. In some embodiments, while the low-light camera mode is active, a flash mode is inactive, or vice-versa. Generating visual captured media that has a particular resolution based on a lighting condition that is based on the amount of light in the field-of-view of the one or more cameras allows the computer system to automatically and dynamically adjust the resolution at which visual captured media is generated based on the amount of light in the environment, which performs an operation when a set of conditions has been met without requiring further user input.

In some embodiments, the first set of environmental conditions includes a condition that is detected based on whether a flash is enabled for media capture (e.g., as discussed in relation to FIG. 6F) (e.g., and/or whether a flash operation was performed while capturing media and/or while detecting a request to capture media). In some embodiments, the first set of environmental conditions includes a condition that is detected when a flash operation is active while capturing media (e.g., a flash operation was initiated in response to detecting the request to capture visual media). In some embodiments, the second set of environmental conditions includes a condition that is detected when the flash operation is not active while capturing media (e.g., a flash operation was not initiated in response to detecting the request to capture visual media). In some embodiments, the first set of environmental conditions includes a condition that is detected when a flash operation is active while capturing media because the flash operation is only used (e.g., a light is flashed) only during a part (e.g., and not during the total time) of the capture of media and, in some embodiments, images that would have been combined to create the higher resolution image (e.g., the image created when the second set of environmental conditions are detected) would be taken in different lighting conditions (e.g., one or more images that are captured while during the flash and one or more images that are captured after the flash (e.g., in response to a single request to capture media)). Generating visual captured media that has a particular resolution based on whether a flash operation was active while capturing media allows the computer system to automatically and dynamically adjust the resolution at which visual captured media is generated based on whether flash was used to capture media, which performs an operation when a set of conditions has been met without requiring further user input.

In some embodiments, the first set of environmental conditions and the second set of environmental conditions do not include a condition (e.g., any condition) that is dependent on (e.g., does not depend on and/or is independent from) a user-configurable resolution setting (e.g., as discussed above in relation to FIGS. 6B-6C) (e.g., a setting that configures the computer system to capture media at a particular resolution, irrespective of the environment conditions). In some embodiments, the first set of environmental conditions and the second set of environment conditions are independent from the user-configurable resolution setting and/or are not detected based on a change to and/or based on the user-configurable resolution setting. Generating visual captured media that has a particular resolution based on detecting a particular set of conditions that are independent from a user-configurable resolution setting allows the computer system to automatically and dynamically adjust the resolution which visual captured media is generated without regard to a user-configurable setting in order to generate enhanced/preferred media dynamically without user input during capture, which performs an operation when a set of conditions has been met without requiring further user input.

In some embodiments, the second resolution is more than fifty percent higher (e.g., on a pixel count basis) than the first resolution.

In some embodiments, generating visual captured media that has the first resolution includes generating visual media that has a respective field-of-view of the one or more cameras (e.g., as illustrated in FIG. 6E). In some embodiments, generating visual captured media that has the second resolution includes generating visual media that has the respective field-of-view of the one or more cameras (e.g., as illustrated in FIG. 6C) (e.g., the same field-of-view). In some embodiments, the visual captured media that has the first resolution does not include a portion of the field-of-view that the visual captured media that has the second resolution does not include, and vice-versa. Generating visual captured media that has a particular resolution based on detecting a particular set of conditions, where captured media generated at two different resolutions include the same field-of-view, allows the automatically and dynamically adjust the resolution which visual captured media is generated with minimal destruction of the intended field-of-view of the one or more cameras that is represented in the captured media, which performs an operation when a set of conditions has been met without requiring further user input.

In some embodiments, generating visual captured media that has the first resolution includes generating visual media using one or more capture settings (e.g., a focus setting (e.g., that configures to the camera to focus at a particular location and/or at a particular plane in the field-of-view of the one or more cameras), exposure time, exposure compensation, one or more media characteristic settings (e.g., tone and/or warmth), a timer setting (e.g., a setting that configures computer system to delay the time at which an image is captured), an aspect ratio setting, a shutter speed setting, filter effects, and/or f-stop)) that are in a respective state (e.g., a state of all of the settings collectively at an instance in time (e.g., before detecting the request to capture media)) (e.g., as discussed above in relation to FIGS. 6B-6C). In some embodiments, generating visual captured media that has the second resolution includes generating visual media using the one or more capture settings that are in the respective state (e.g., as discussed above in relation to FIGS. 6B-6C). In some embodiments, the computer system is configured to capture media based on the state of the one or more capture settings. Generating visual captured media that has a particular resolution based on detecting a particular set of conditions that is independent of one or more capture settings of the computer system allows the computer system to automatically and dynamically adjust the resolution which visual captured media is generated without regard to the state of one or more capture settings, which performs an operation when a set of conditions has been met without requiring further user input.

In some embodiments, the second resolution is a resolution that is less than a maximum resolution (e.g., as discussed above in relation to FIG. 6K) (e.g., 4-20 times a resolution (e.g., the highest native resolution of the one or more cameras) (e.g., 2560×1404, 4032×3024, and/or 6000×4000)) that is available for generating visual media captured using the one or more cameras. In some embodiments, the computer system generates captured media with the maximum resolution based on a raw setting and/or a selectable user interface object for controlling a file format for capturing media being in an enabled state (e.g., active state and/or an on state). In some embodiments, in response to detecting input on a control for the raw setting, the computer system switches between enabling and disabling the raw setting. In some embodiments, the raw setting is displayed concurrently with one or more other camera settings controls. In some embodiments, the one or more other camera setting controls include a control that, when selected, switches between a flash mode being active and/or inactive. In some embodiments, the one or more other camera setting controls include a control that, when selected, sets an amount of exposure compensation that will be applied while capture media. In some embodiments, the one or more other camera setting controls include a setting that, when selected, switches between a low-light mode being active and/or inactive.

In some embodiments, in accordance with a determination that a first user-configurable setting (e.g., 690*a*) (e.g., a resolution setting) is in a first state (e.g., a state that does not cause the computer system to be configured to generate visual media with a respective maximum resolution that is available for generating visual media captured using the one or more cameras and/or a selected resolution (e.g., third resolution and/or fourth resolution)), the second resolution is a third resolution (e.g., as discussed above in relation to FIGS. 6A, 6J, and 6K). In some embodiments, in accordance with a determination that the first user-configurable setting (e.g., 690*a*) is in a second state (e.g., a state that does not cause the computer system to be configured to generate visual media with a respective maximum resolution that is available for generating visual media captured using the one or more cameras and/or a selected resolution (e.g., third resolution and/or fourth resolution)) that is different from the first state, the second resolution is a fourth resolution that is lower than the third resolution (e.g., as discussed above in relation to FIGS. 6A, 6J, and 6K). In some embodiments, the computer system displays a control for managing the first user-configurable setting. In some embodiments, while displaying the control for managing the first user-configurable setting, the computer system detects an input (e.g., a tap input or, in some embodiments, a non-tap input (e.g., a dragging input, a mouse click, a gaze input, and/or a press-and-hold input)) directed to the first control. In some embodiments, in response to detecting the input directed to the first control and in accordance with a determination that the first user-configurable setting was in the first state when the input directed to the first control was detected, the computer system sets the first user-configurable setting to be in the second state. In some embodiments, in response to detecting the input directed to the first control and in accordance with a determination that the first user-configurable setting was in the second state when the input directed to the first control was detected, the computer system sets the first user-configurable setting to be in the first state. Generating visual captured media at a resolution that is based on the state of the first user-configurable setting provides the user with control over the resolution at which visual captured media is generated, which provides additional control options without cluttering the user interface with additional displayed controls.

In some embodiments, the first set of environmental conditions includes a condition that is detected when a user-configurable setting to capture media at the first resolution is set (e.g., as discussed above in relation to FIGS. 6J-6K). In some embodiments, the second set of environmental conditions are not detected when the user-configurable setting to capture media at the first resolution is set. Generating visual captured media at the first resolution when a determination that a user-configurable setting to capture media at the first resolution is set provides the user with control over the resolution at which visual captured media is generated, which provides additional control options without cluttering the user interface with additional displayed controls.

In some embodiments, the first resolution is a resolution that is used for capturing video media (e.g., as discussed in relation to FIGS. 6G-6H) (and the second resolution is not a resolution used for capturing video media). In some embodiments, the first set of environmental conditions are detected when a determination that the request to capture visual media is a request to capture video media. In some embodiments, the second set of environmental conditions are not detected when a determination that the request to capture visual media is a request to capture video media. Generating visual captured media at the first when a determination that the request to capture visual media is a request to capture video media allows the computer system to automatically and dynamically adjust the resolution which visual captured media is generated based on the type of media that is being captured, which performs an operation when a set of conditions has been met without requiring further user input.

In some embodiments, the one or more cameras include a fixed focal length camera (e.g., as discussed above in relation to FIGS. 6A-6B) (e.g., one or more fixed focal length cameras) (e.g., a hardware camera and/or camera sensor (e.g., a wide-angle camera and/or camera sensor, a camera having a wide-angled width) and/or (e.g., a telephoto camera)) (e.g., sensor size, shape, and/or placement; lens shape, size, and/or placement; and/or aperture size, shape, and/or placement) (e.g., a first minimum focal distance (e.g., 7-12 cm or 12-15 cm) and a first field-of-view (e.g., an open observable area that is visible to a camera, the horizontal (or vertical or diagonal) length of an image at a given distance from the camera lens) (and, in some embodiments, a hardware or optical field-of-view (FOV) based on the sensor size and the focal length of the lens (e.g., not a digitally zoomed in FOV))) e.g., a second minimum focal distance (e.g., 0-6 cm or 7-12 cm) that is shorter than the first minimum focal distance (e.g., 7-12 cm or 12-15 cm) of the first camera and/or a second field of view that is wider than the first field-of-view (e.g., a FOV that has a wider angle of view in at least one dimension) of the first camera) (e.g., the wide-angle camera) (e.g., a hardware camera and/or camera sensor (e.g., a telephoto camera and/or camera sensor, a camera having a width)) (e.g., a camera that is different from the first camera and/or the second camera) (e.g., a third minimum focal distance that is longer than the first minimum focal distance of the first camera and the second minimum focal distance of the second camera and/or a third field of view that is narrower than the first field-of-view and/or the second field-of-view). In some embodiments, initiating capture of the visual media via the one or more cameras includes (in some embodiments, is) initiating capture of the visual media via the fixed focal length camera. In some embodiments, the first resolution is a native resolution (e.g., a non-altered (e.g., digitally altered) and/or non-digital resolution and/or a resolution that was not generated using digital zoom and/or a resolution that was generated using the native, original, non-digital, and/or natural zoom of the fixed focal length camera) of the fixed focal length camera (e.g., as discussed above in relation to FIG. 6A). In some embodiments, the second resolution is not the native resolution (e.g., a digital resolution and/or a resolution that was generated using digital zoom and/or a resolution that was not generated using the native, original, non-digital, and/or natural zoom of the fixed focal length camera) of the fixed focal length camera (e.g., as discussed above in relation to FIG. 6A). In some embodiments, as a part of generating media with the first resolution, a digital zoom is not applied to the media (e.g., after the media is captured) in order to achieve the first resolution. In some embodiments, as a part of generation media with the second resolution, a digital zoom is applied to the media (e.g., after the media is captured) in order to achieve the second resolution. Generating visual captured media that has a particular resolution that is a native resolution or not the native resolution of a fixed focal length camera based on detecting a particular set of conditions allows the automatically and dynamically adjust the resolution which visual captured media is generated by using a native resolution of the fixed focal length camera or a non-resolution of the fixed focal length camera, which performs an operation when a set of conditions has been met without requiring further user input and gives the computer system the ability to generate media with an expanded number resolutions that are not native to a fixed focal length camera of the computer system.

Note that details of the processes described above with respect to method 700 (e.g., FIG. 7) are also applicable in an analogous manner to the methods described herein. For example, method 900 optionally includes one or more of the characteristics of the various methods described above with reference to method 700. For example, the computer system can capture media with a resolution using the techniques described in relation to method 700 at a chosen zoom level set using one or more techniques described in relation to method 900. For brevity, these details are not repeated below.

FIGS. 8A-8X illustrate exemplary user interfaces for managing zoom levels for capturing media in accordance with some embodiments. The user interfaces in these figures are used to illustrate the processes described below, including the processes in FIGS. 9 and 10.

FIG. 8A illustrates computer system 600 displaying a camera user interface, which includes indicator region 602, camera display region 604, and control region 606. Indicator region 602 includes flash indicator 602*a*, modes-to-settings indicator 602*b*, and animated image indicator 602*c*, which has one or more characteristics as described above in relation to FIGS. 6A-6K. Camera display region 604 includes live preview 630 and zoom controls 622, which have one or more characteristics as described above in relation to FIGS. 6A-6K. At FIG. 8A, 1× zoom control 622*b* is displayed as being selected and 0.5× zoom control 622*a*, 2× zoom control 622*c*, and 3× zoom control 622*d* are not displayed as being selected. Control region 606 includes camera mode controls 620, shutter control 610, camera switcher control 614, and a representation of media collection 612, which has one or more characteristics as described above in relation to FIGS. 6A-6K. In FIG. 8A, camera mode controls 620 are displayed, which includes cinematic video mode control 620*a*, video mode control 620*b*, photo mode control 620*c*, portrait mode control 620*d*, and/or panoramic mode control 620*e*. As illustrated in FIG. 8A, photo mode control 620*c* is selected, which is indicated by photo mode control 620*c* being bolded and in the center of the camera user interface. When photo mode control 620*c* is selected, computer system 600 initiates capture of (e.g., and/or captures) photo media (e.g., a still photo) in response to computer system 600 detecting an input directed to shutter control 610. The photo media that is captured by computer system 600 is representative of live preview 630 that is displayed when the input is directed to shutter control 610.

As described above in relation to FIG. 6A, computer system 600 includes multiple cameras that are positioned on the backside of computer system 600 at FIG. 8A. In FIG. 8A, the multiple cameras are different from each other, where each camera has different hardware specifications (e.g., camera sensor size, shape, and/or placement, camera lens shape, size, and/or placement, and/or aperture size, shape, and/or placement). Because of the differences in the hardware specifications, each of the cameras has a different set of image capture parameters, such as a minimum focal distance, a maximum and/or minimum field-of-view, a focal length, an aperture size range, a native zoom level, and/or a maximum/minimum optical (or digital) zoom. In FIG. 8A, zoom controls 622 include 0.5× zoom control 622*a,* 1× zoom control 622*b,* 2× zoom control 622*c*, and 3× zoom control 622*d*. In response to detecting an input directed to 0.5× zoom control 622*a*, computer system 600 configures the camera application to capture media using the native zoom level of a first camera (e.g., a rear-facing camera and/or, in some embodiments, an ultra-wide-angle camera) of computer system 600. In response to detecting an input directed to 1× zoom control 622*b*, computer system 600 configures the camera application to capture media using the native zoom level of a second camera (e.g., a rear-facing camera and/or, in some embodiments, a wide-angle camera) of computer system 600. In response to detecting an input directed to 3× zoom control 622*d*, computer system 600 configures the camera application to capture media using the native zoom level of a third camera (e.g., a rear-facing camera and/or, in some embodiments, a telephoto camera) of computer system 600. In response to detecting an input directed to 2× zoom control 622*c*, computer system 600 configures the camera application to capture media using a digital zoom that corresponds to the second camera (or the first camera or the third camera). Thus, at FIG. 8A, computer system 600 displays native zoom controls (0.5×, 1×, and/or 3×) with a digital zoom control (e.g., 2× or 2.5×). In some embodiments, a native zoom control is a control that configures the computer system to capture media at a zoom level at which the fixed focal length camera is capable of capturing without additional digital processing to change the zoom level of the captured image, and a digital zoom control is a control that configures the computer system to capture media at a zoom level at which the fixed focal length camera is not capable of capturing media without additional digital processing to change the zoom level of the captured image. In some embodiments, the first, second, and third cameras are fixed focal length cameras. In some embodiments, the first, second, and third cameras are all different cameras. In some embodiments, the first camera has a wider FOV than the second camera, and the second camera has a wider FOV than the third camera. In some embodiments, the first camera is an ultra-wide-angle camera (e.g., a 5 MM-15 MM fixed focal length camera), the second camera is a wide-angle camera (e.g., a 20 MM-30 MM fixed focal length camera), and the third camera is a telephoto camera (e.g., a 70 MM-80 MM fixed focal length camera). In some embodiments, zoom controls 622*a*-622*d* are concurrently displayed when the camera user interface is initially displayed (e.g., the default zoom controls). In some embodiments, the computer system initially displays zoom controls 622*a*-622*d* in response to detecting an input on the camera user interface (e.g., an input that causes the computer system to change from operating in a first camera mode to a second camera mode). In some embodiments, the computer system initially displays the camera user interface in response to detecting an input on a non-camera user interface.

In some embodiments, zoom controls 622*a*-622*d* are displayed while computer system 600 is operating in a camera mode that is different from the photo camera mode. At FIG. 8A, computer system 600 detects rightward swipe input 850*a*1.

Figures 8C, 8D:
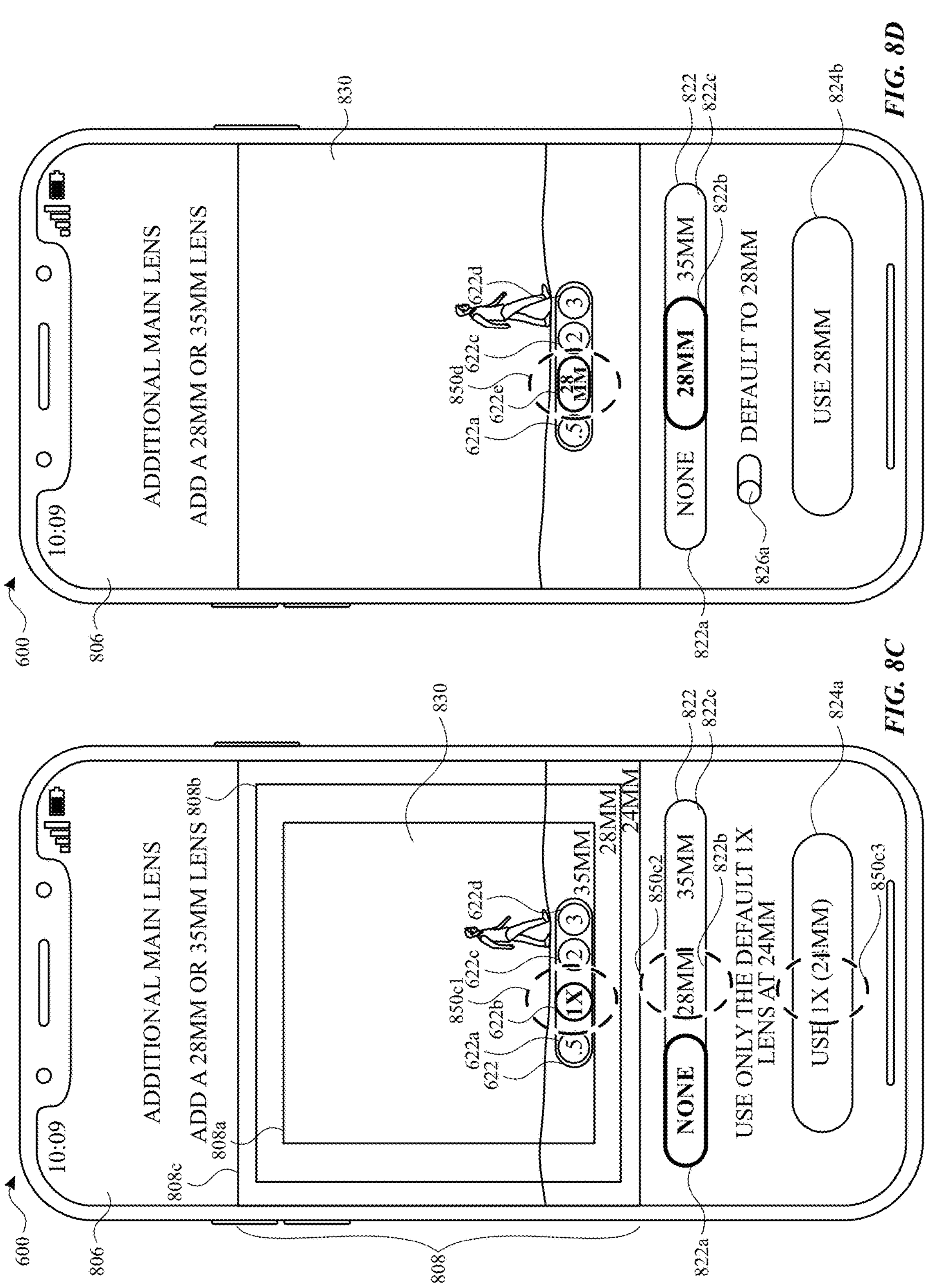
FIGS. 8A-8X illustrate exemplary user interfaces for managing zoom levels for capturing media in accordance with some embodiments.

As illustrated in FIG. 8B, in response to detecting rightward swipe input 850*a*1, computer system 600 displays a settings user interface (e.g., a previously viewed user interface). The settings user interface includes customize-main-lens control 890. At FIG. 8B, computer system detects tap input 850*b* on customize-main-lens control 890. As illustrated in FIG. 8C, in response to detecting tap input 850*b*, computer system 600 displays lens-customization user interface 806. User interface 806 includes sample display region 808, zoom option controls 822, and use 1× zoom control 824*a*. Sample display region 808 includes zoom controls 622 (e.g., 0.5× zoom control 622*a,* 1× zoom control 622*b,* 2× zoom control 622*c*, and 3× zoom control 622*d*), which are overlaid on a sample image 830 that includes 35 MM zoom indicator 808*a,* 28 MM zoom indicator 808*b*, and 24 MM zoom indicator 808*c*. The portions of sample image 830 that are within 35 MM zoom indicator 808*a* provides an indication of the media that computer system 600 generates (e.g., in response to a request to capture media) while configured to capture media at the 35 MM zoom level. The portions of sample image 830 that are within 28 MM zoom indicator 808*b* provides an indication of the media that computer system 600 generates while configured to capture media at the 28 MM zoom level. The portions of sample image 830 that are within 24 MM zoom indicator 808*c* provides an indication of the computer system 600 generates while configured to capture media at the 24 MM zoom level. With regards to the discussion of FIGS. 8A-8X, the 1× zoom level (e.g., shown by 1× zoom control 622*b*) is the same zoom level as a 24 MM zoom level, which is the native zoom level for the second camera (e.g., a camera having a 24 MM lens). Zoom option controls 822 include none-option control 822*a,* 28 MM option control 822*b*, and 35 MM option control 822*c*. At FIG. 8C, none-option control 822*a* is selected (e.g., bolded). Because none-option control 822*a* is selected, computer system displays 1× zoom control 622*b*. It should be understood that computer system 600 displays the set of zoom controls on lens-customization user interface 806 based on the state of the current settings (e.g., the state of a respective option control and/or the state of a respective set as default control being selected or not selected) on lens-customization user interface 806. Thus, if a user accepts the current settings in FIG. 8C, computer system 600 displays the particular set of zoom controls (e.g., zoom controls 622 of FIG. 8C) that are displayed in lens-customization user interface 806 on the camera user interface of FIG. 8A. Notably, zoom controls 622 of FIG. 8C match zoom controls 622 of FIG. 8A because computer system 600 is configured display zoom control 622 of FIG. 8A based on the current settings of lens-customization user interface 806 that is presented in FIG. 8C. At FIG. 8C, computer system 600 detects tap input 850*c*1 on 1× zoom control 622*b*, tap input 850*c*2 on 28 MM option control 822*b*, and tap input 850*c*3 on use 1× zoom control 824*a*. In some embodiments, in response to detecting tap input 850*c*1 on 1× zoom control 622*b*, computer system 600 does not cease to display 1× zoom control 622*b* and/or replaces 1× zoom control 622*b* with another zoom control. In some embodiments, in response to detecting tap input 850*c*3 on use 1× zoom control 824*a*, computer system 600 is configured to capture media without a custom zoom control (e.g., 28 MM and/or 35 MM) and with 1× zoom control 622*b* as the default zoom control (e.g., the zoom control that is displayed as being selected when the camera user interface of FIG. 8A is initially displayed).

As illustrated in FIG. 8D, in response to detecting tap input 850*c*2 on 28 MM option control 822*b*, computer system 600 replaces 1× zoom control 622*b* with 28 MM zoom control 622*e*. In response to detecting tap input 850*c*2, computer system 600 also updates sample image 830, such that sample image 830 is displayed at the 28 MM (and, in some embodiments, removes or does not display 35 MM zoom indicator 808*a,* 28 MM zoom indicator 808*b*, and 24 MM zoom indicator 808*c*). As illustrated in FIG. 8D, in response to detecting tap input 850*c*2, computer system 600 replaces use 1× zoom control 824*a* with use 28 MM zoom control 824*b* and displays set-28 MM-zoom-as-default control 826*a*. In response to detecting an input on use 28 MM zoom control 824*b*, computer system 600 is configured to allow 28 MM zoom control 622*e* to be selected from zoom controls 622 (or to be displayed with the other zoom controls, such as 0.5× zoom control 622*a,* 2× zoom control 622*b*, and 3× zoom control 622*d*, as shown in FIG. 8D). In response to detecting an input on set-28 MM-zoom-as-default control 826*a*, computer system 600 is configured to display 28 MM zoom control 622*e* as the default control in lieu of 1× zoom control 622*b* or 24 MM zoom control 622*f* of FIG. 8E (e.g., as discussed below in relation to FIG. 8J). At FIG. 8D, computer system 600 detects tap input 850*d* on 28 MM zoom control 622*e.*

Figures 8E, 8F:
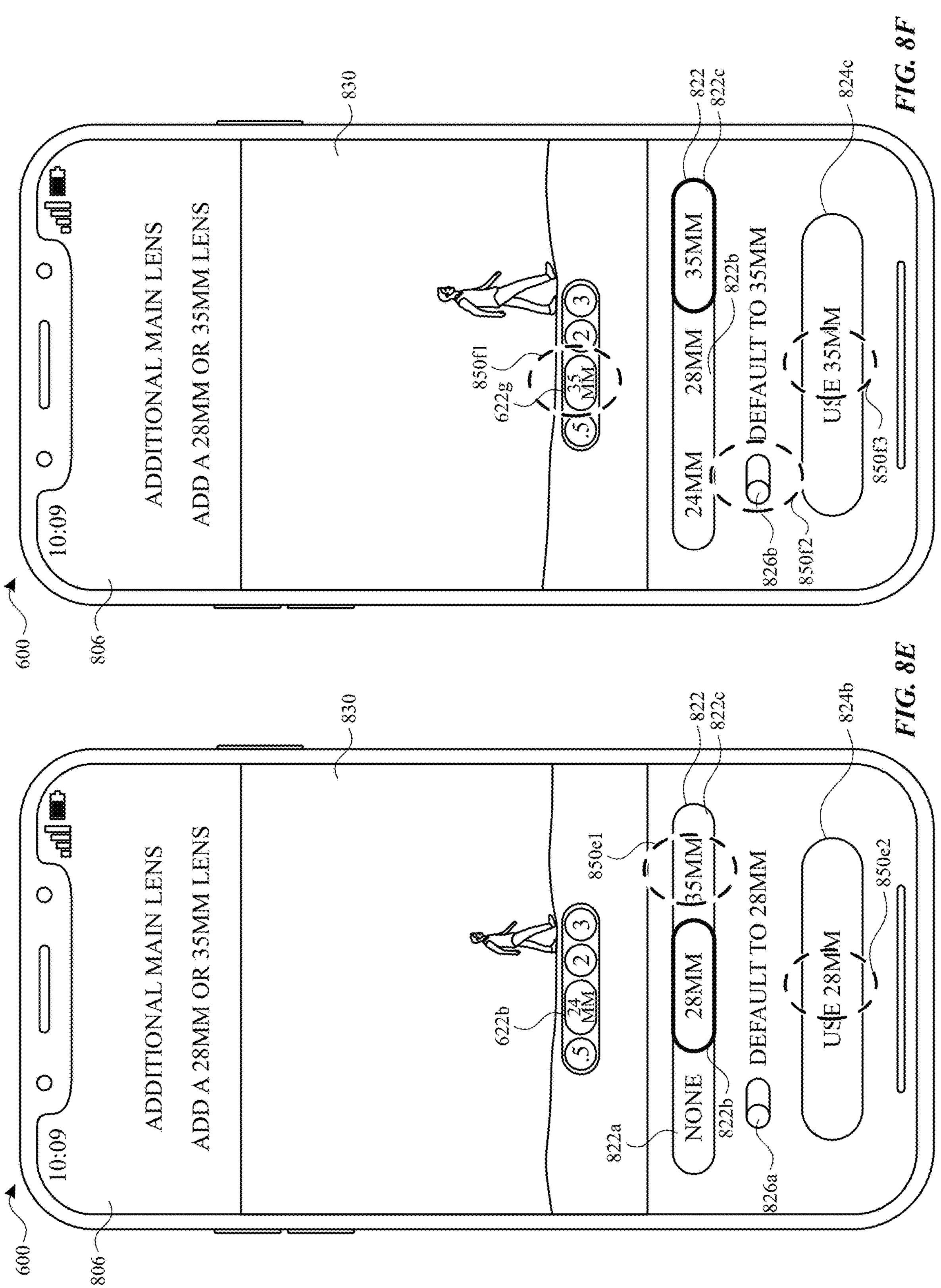
Figures 8G, 8H:
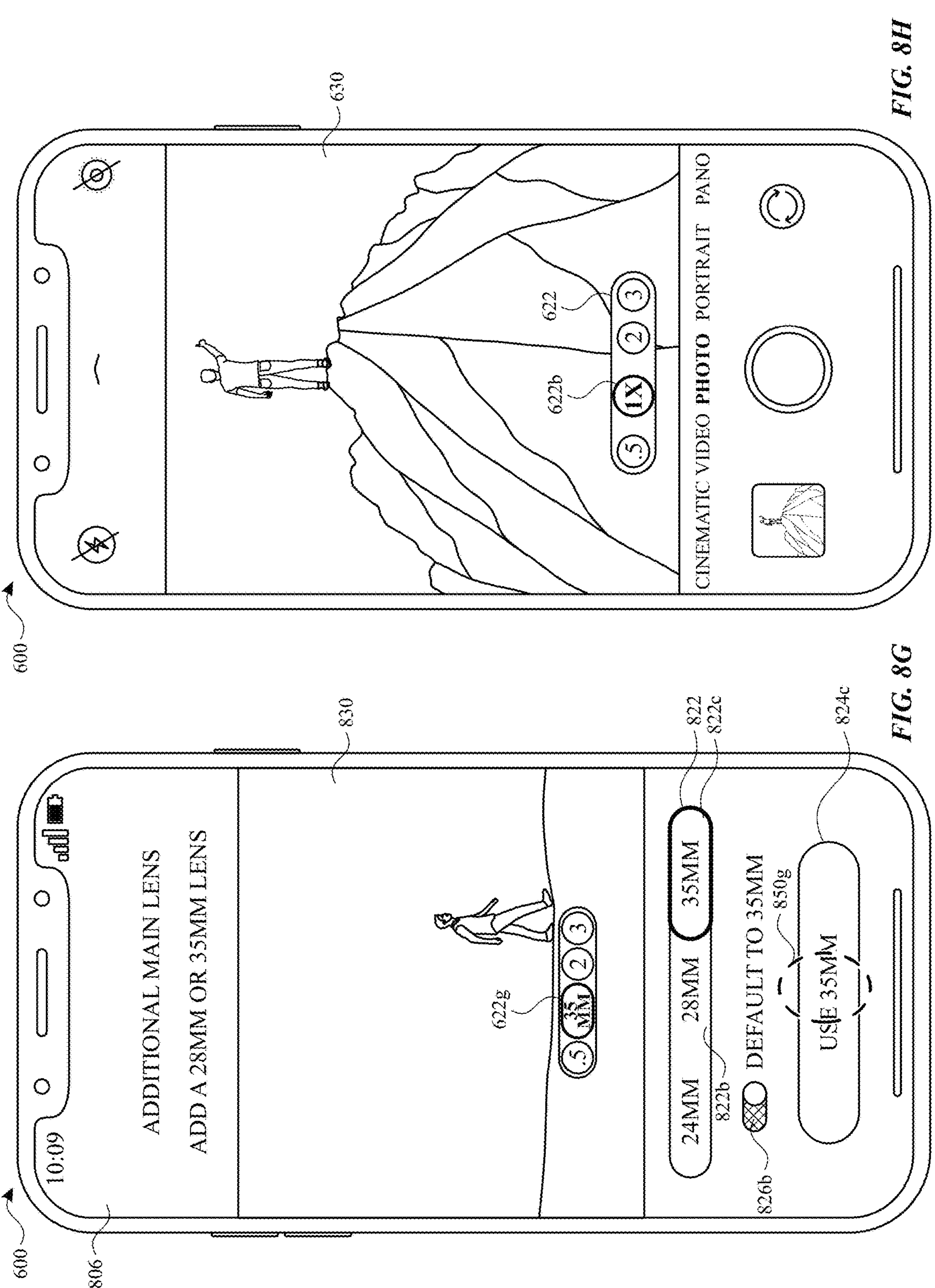
Figures 8I, 8J:
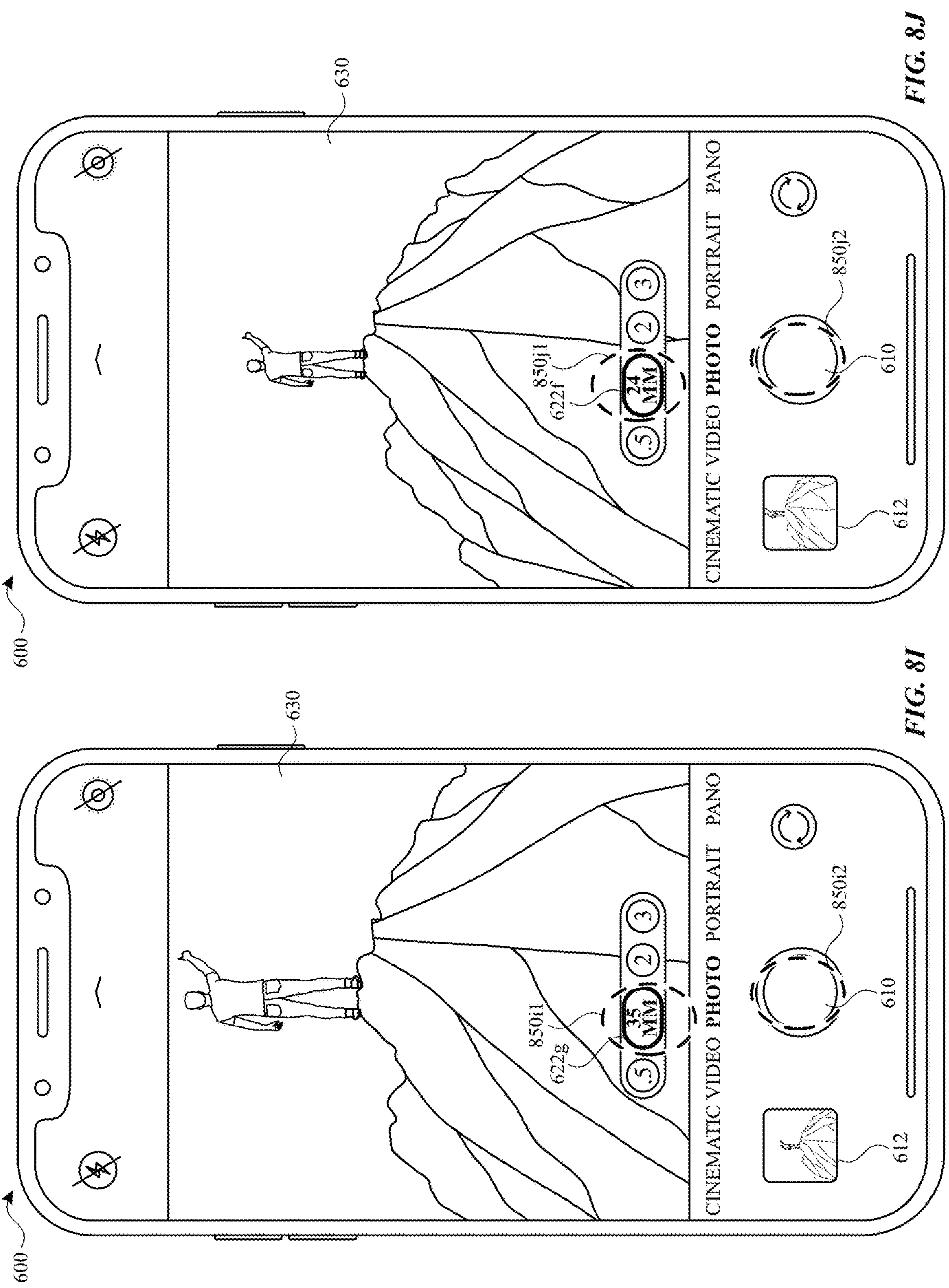
Figures 8K, 8L:
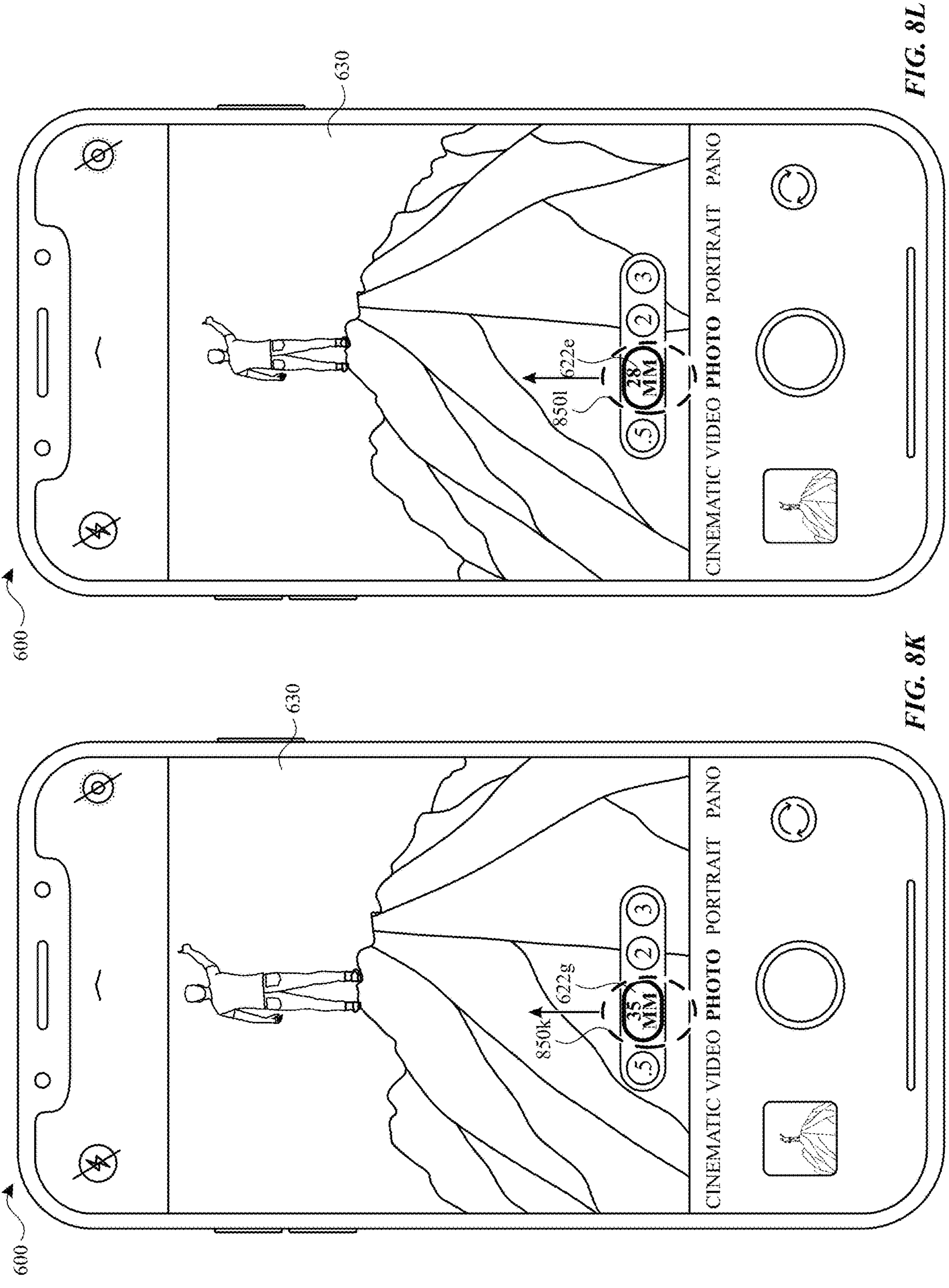
Figures 8M, 8N:
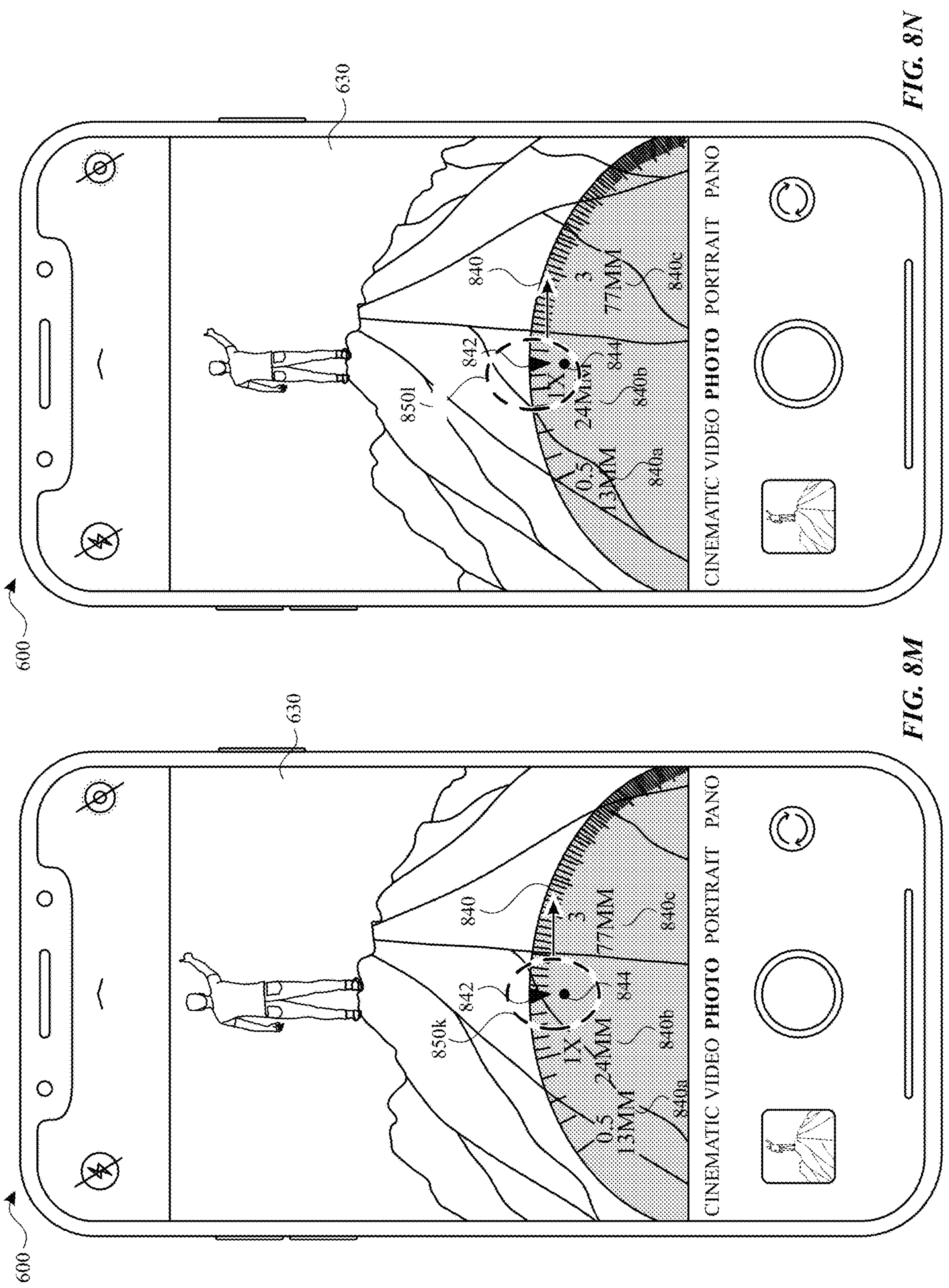
Figures 8O, 8P:
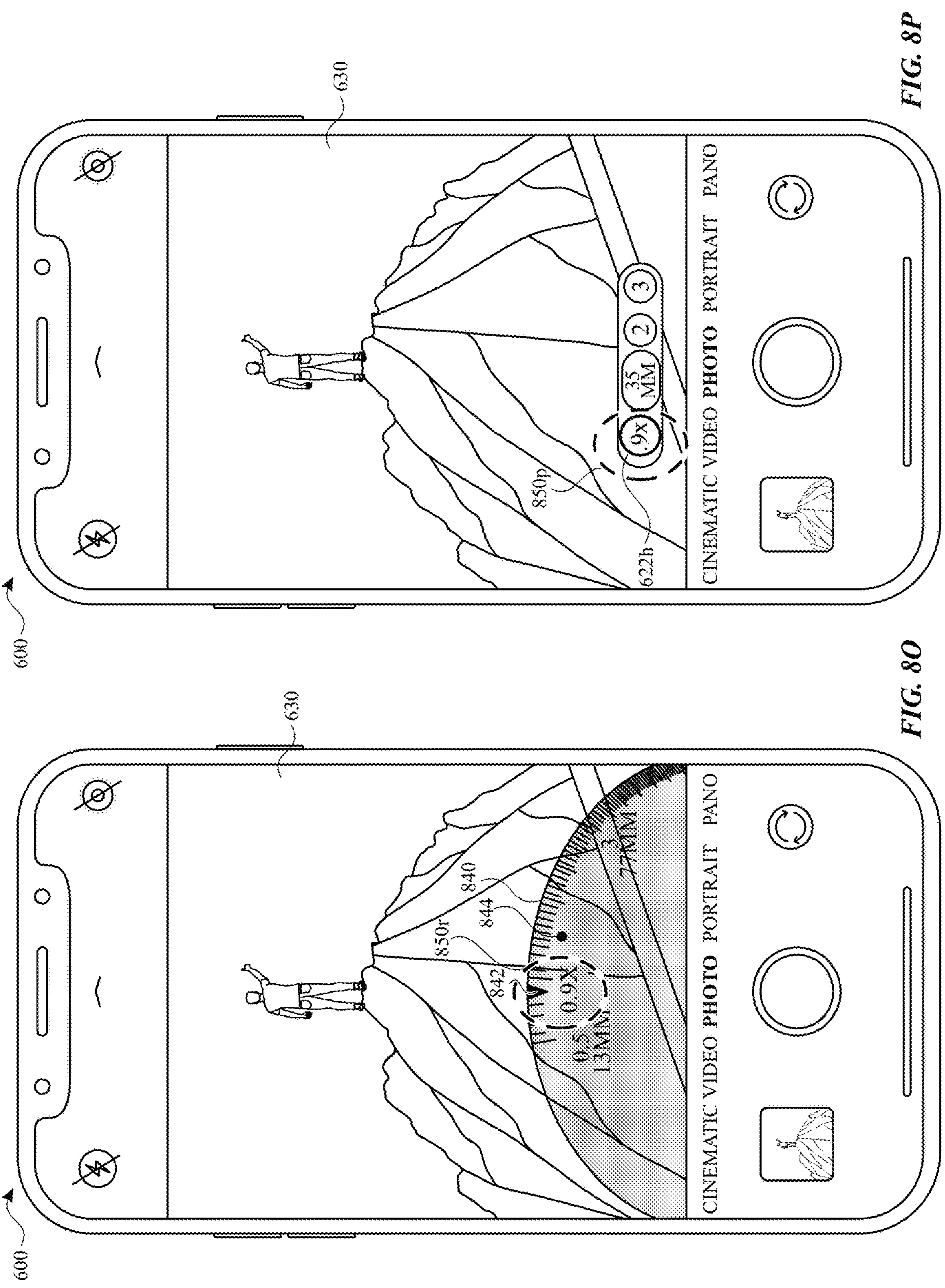
Figures 8Q, 8R:
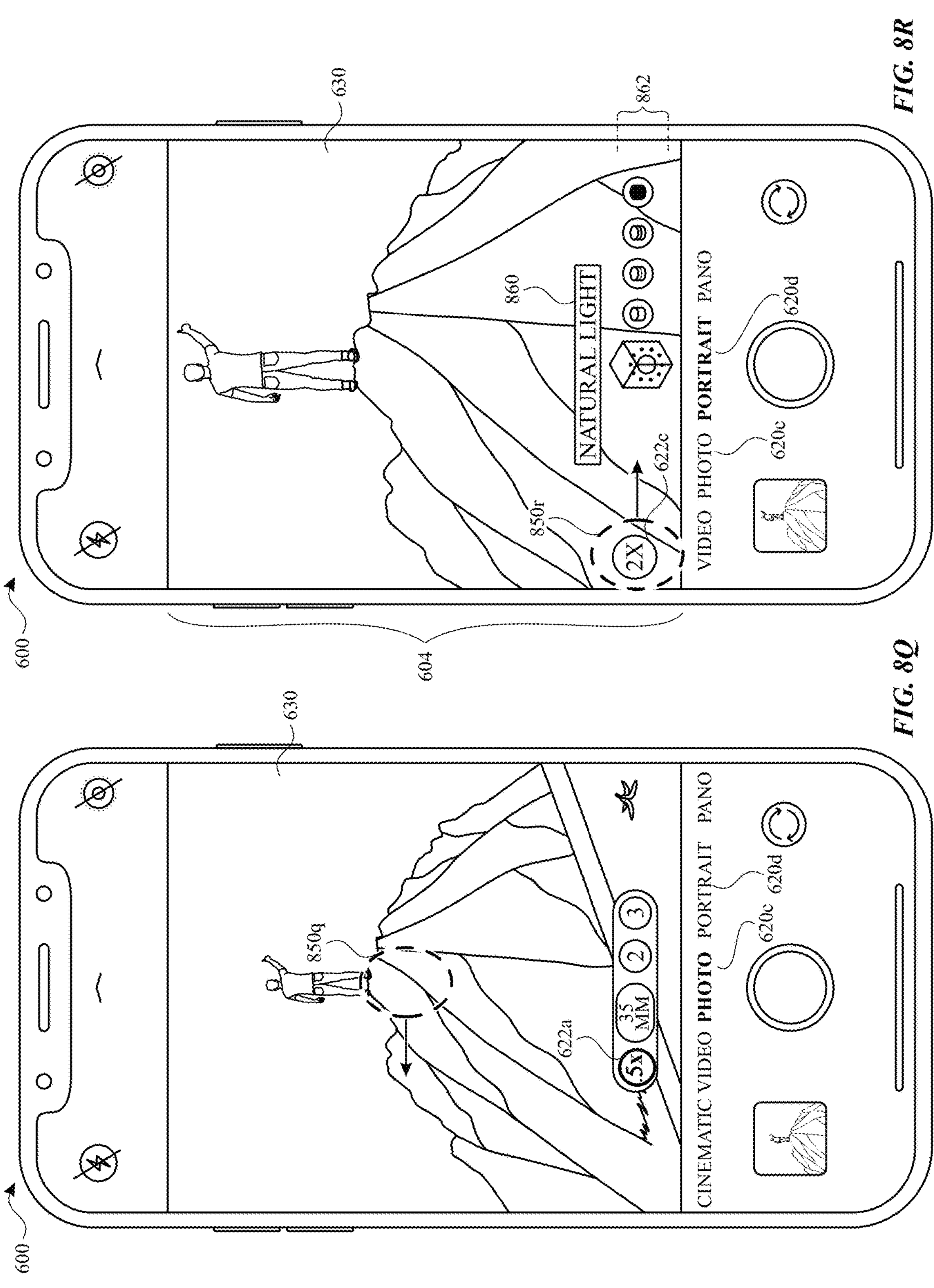
Figures 8S, 8T:
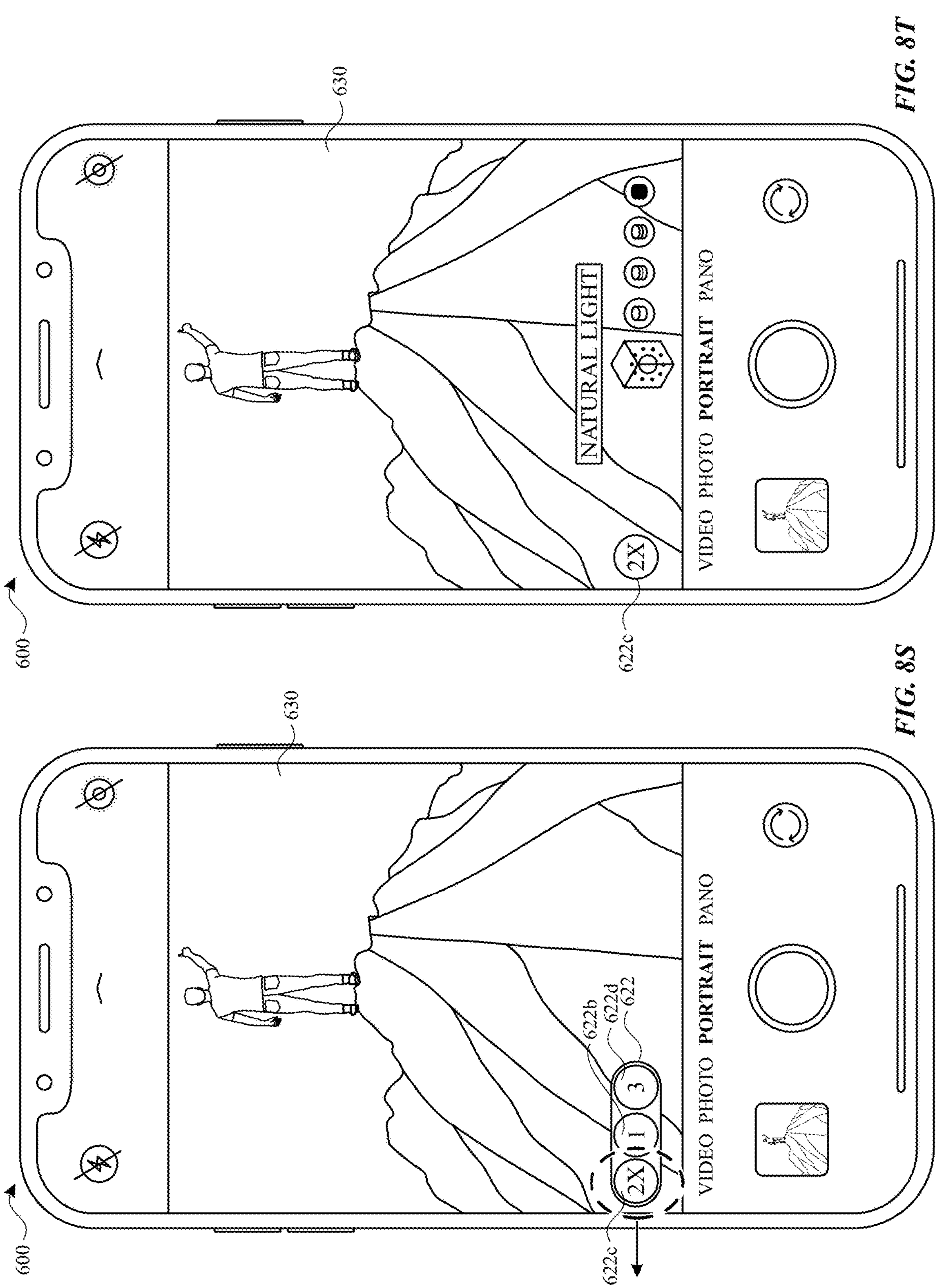
Figures 8U, 8V:
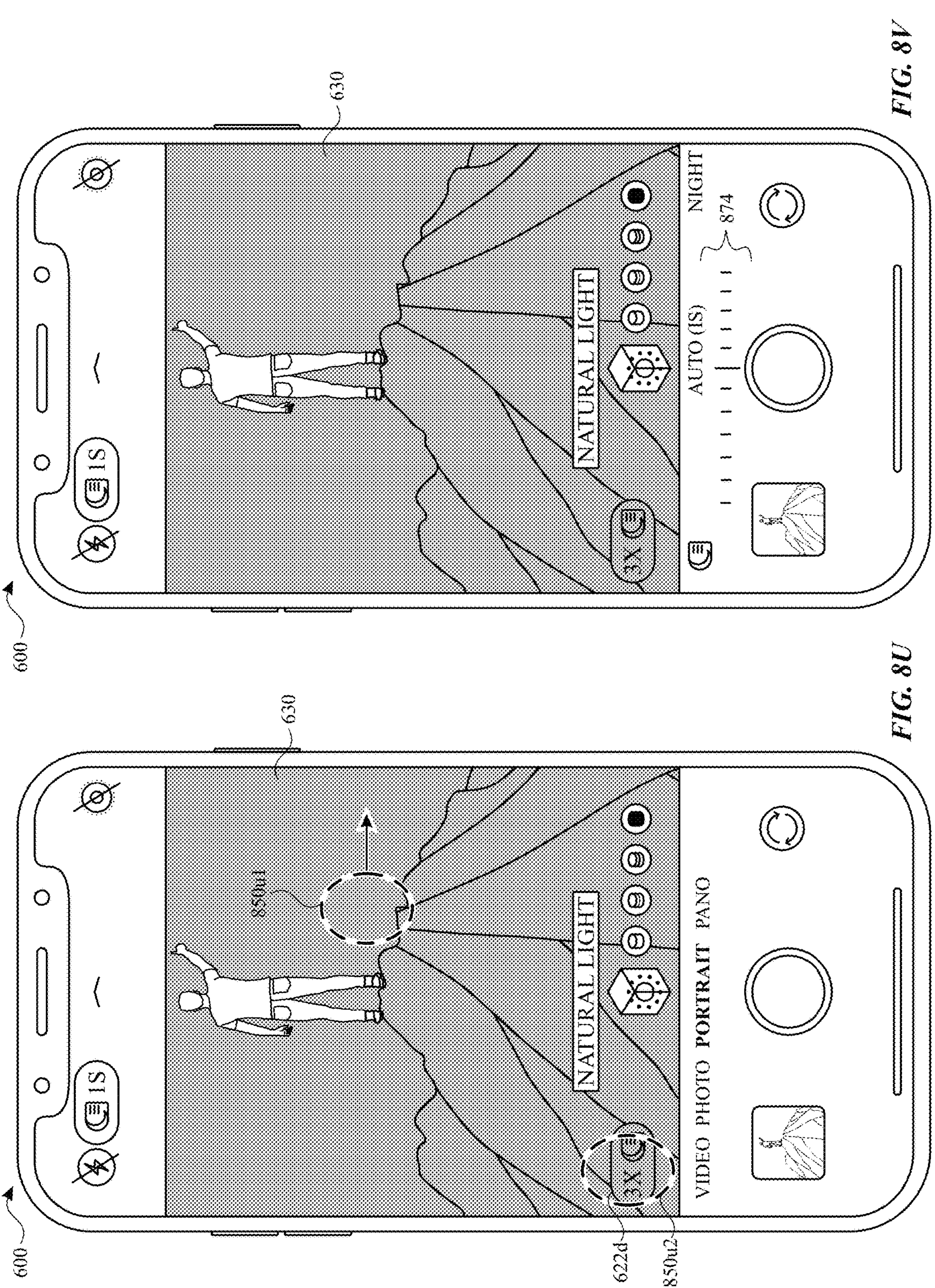
Figures 8W, 8X:
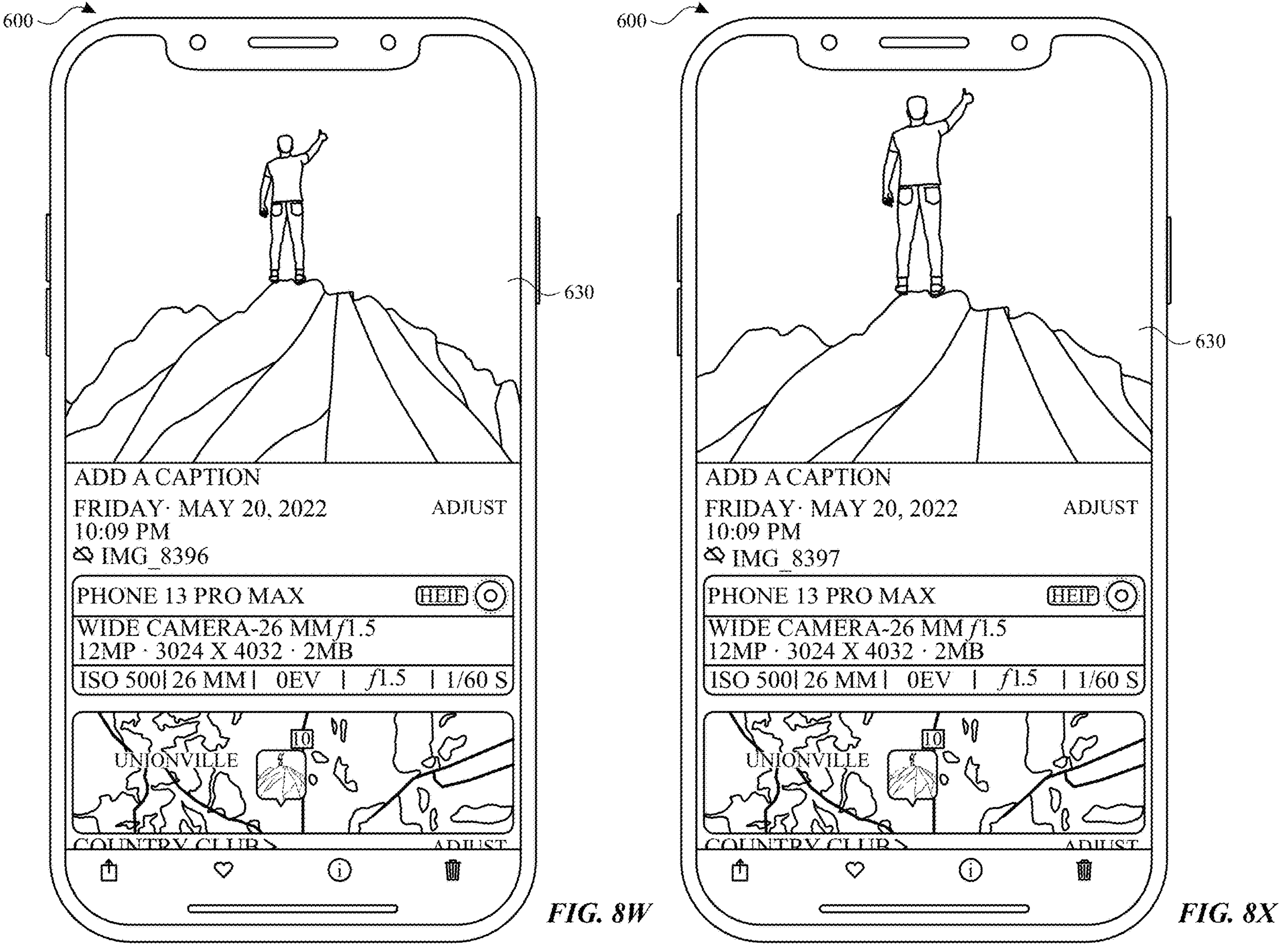

As illustrated in FIG. 8E, in response to detecting tap input 850*d*, computer system 600 optionally replaces 28 MM zoom control 622*e* with 24 MM zoom control 622*f* As discussed above, the 1× and the 24 MM zoom levels are equivalent zoom levels for the purposes of the discussion of FIGS. 8A-8X. At FIG. 8E, computer system displays 24 MM zoom control 622*f* because 28 MM option control 822*b* is selected. In some embodiments, computer system 600 displays 24 MM zoom control 622*f* instead of 1× zoom control 622*b* of FIG. 8C because transitioning from the 28 MM zoom control 622*e* to 24 MM zoom control 622*f* provides a less confusing user experience (e.g., using zoom levels with the same units of measurement) than transitioning from the 28 MM zoom control 622*e* to 1× zoom control 622*a* of FIG. 8C.

As illustrated in FIG. 8E, in response to detecting tap input 850*d*, computer system 600 updates sample image 830, such that sample image 830 is displayed at the 24 MM (or 1×) zoom level. In some embodiments, computer system 600 detects a tap input on 24 MM zoom control 622*f* and, in response, computer system 600 re-displays user interface 806 of FIG. 8D (e.g., replaces the 24 MM zoom control 622*f* with the 28 MM zoom control 622*e*). At FIGS. 8D-8E, user interface 806 is providing the user with an option to see how interacting with the various zoom controls would work in the camera user interface. Thus, it should be understood that computer system 600 performs one or more of the same (or a similar) operations when computer system 600 detects an input directed to the 24 MM zoom control 622*f* or 28 MM zoom control 622*e* (or any of the other zoom controls) on user interface 806 as the operations performed when computer system 600 detects an input directed to the 24 MM zoom control 622*f* or 28 MM zoom control 622*e* (or any of the other zoom controls) on the camera user interface (e.g., as discussed above in relation to FIG. 8A). At FIG. 8E, computer system 600 detects tap input 850*e*1 on 35 MM option control 822*c.*

As illustrated in FIG. 8F, in response to detecting tap input 850*e*1, computer system 600 replaces 24 MM zoom control 622*f* with 35 MM zoom control 622*g*. In response to detecting tap input 850*e*1, computer system 600 also updates sample image 830, such that sample image 830 is displayed at the 35 MM zoom level. As illustrated in FIG. 8F, in response to detecting tap input 850*e*1, computer system 600 replaces use 28 MM zoom control 824*b* with use 35 MM zoom control 824*c* and displays set-35 MM-zoom-as-default control 826*b*. In response to detecting an input on use 35 MM zoom control 824*c*, computer system 600 is configured to allow 35 MM zoom control 622*g* to be selected from zoom controls 622 (or to be displayed with the other zoom controls, such as 0.5× zoom control 622*a,* 2× zoom control 622*b*, and 3× zoom control 622*d*, as shown in FIG. 8F). In response to detecting an input on set-35 MM-zoom-as-default control 826*b*, computer system 600 is configured to display 35 MM zoom control 622*g* as the default control in lieu of 1× zoom control 622*b* or 24 MM zoom control 622*f.* At FIG. 8F, computer system 600 detects tap input 850*f*1 on 35 MM zoom control 622*g*, detects tap input 850*f*2 on set-35 MM-zoom-as-default control 826*b*, or detects tap input 850*f*3 on use 35 MM zoom control 824*c*. In some embodiments, in response to detecting tap input 850*f*1 on 35 MM zoom control 622*g*, computer system 600 displays a user interface that is similar to the user interface 806 of FIG. 8E (e.g., replacing the 35 MM zoom control 622*g* with 24 MM zoom control 622*e*, using one or more techniques discussed above in relation to FIG. 8E).

As illustrated in FIG. 8G, in response to detecting tap input 850*f*2 on set-35 MM-zoom-as-default control 826*b*, computer system 600 transitions 35 MM-zoom-as-default control 826*b* from the off state to the on state. Based on the state of the settings on user interface 806 of FIG. 8G, computer system 600 displays the camera user interface of FIG. 8I (e.g., when the camera user interface is initially displayed while the settings of user interface 806 are in a respective state).

Looking back at FIG. 8C, computer system 600 detects tap input 850*c*3 on use 1× zoom control 824*a*. As illustrated in FIG. 8H, after detecting tap input 850*c*3 on use 1× zoom control 824*a*, computer system 600 displays 1× zoom control 622*b* (e.g., when the camera user interface is initially displayed after tap input 850*c* is detected). At FIG. 8H, computer system 600 displays 1× zoom control 622*b* because none-option control 822*a* was selected at FIG. 8C. Thus, computer system 600 defaults to displaying 1× zoom control 622*b*. In some embodiments, in response to detecting an input on 1× zoom control 622*b*, computer system 600 does not display 24 MM zoom control 622*f,* 28 MM zoom control 622*e*, and 35 MM zoom control 622*g* (e.g., of FIGS. 8C-8G) (e.g., because none-option control 822*a* was selected at FIG. 8C).

Looking back at FIG. 8F, computer system 800 detects tap input 850*f*3 on use 35 MM zoom control 824*c*. As illustrated in FIG. 8J, after detecting tap input 850*f*3, computer system 600 displays 24 MM zoom control 622*f* (e.g., when the camera user interface is initially displayed after tap input 850*c* is detected). At FIG. 8J, computer system 600 displays 24 MM zoom control 622*f* because the setting determining whether the non-native FOV was set as a default FOV (e.g. set as 28 MM or 35 MM) (e.g., 826*b* of FIG. 8F) was in the off state (e.g., computer system 600 is not configured to provide 35 MM zoom control 622*g* as the default zoom). In some embodiments, in response to detecting an input on 24 MM zoom control 622*f* at FIG. 8J, computer system 600 displays the camera user interface of FIG. 8I, replacing 24 MM zoom control 622*f* with 35 MM zoom control 622*g*. In some embodiments, computer system 600 detects a tap input on use 28 MM zoom control 824*b* of FIG. 8D and, in response, computer system 600 displays a camera user interface that includes 24 MM zoom control 622*f* (e.g., when the camera user interface is initially displayed after tap input 850*c* is detected) because the setting determining whether the non-native FOV was set as a default FOV (e.g. set as 28 MM or 35 MM) (e.g., 826*a* of FIG. 8D) was in the off state.

Looking back at FIG. 8G, computer system 600 detects tap input 850*g* on use 35 MM zoom control 824*c*. As illustrated in FIG. 8I, after detecting tap input 850*g*, computer system 600 displays 35 MM zoom control 622*g* (e.g., when the camera user interface is initially displayed after tap input 850*c* is detected). At FIG. 8I, computer system 600 displays 35 MM zoom control 622*g* because the setting determining whether the non-native FOV was set as a default FOV (e.g. set as 28 MM or 35 MM) (e.g., 826*b*) was in an on state (e.g., computer system 600 is configured to provide 35 MM zoom control 622*g* as the default zoom) when tap input 850*g* was detected. In some embodiments, computer system 600 detects a tap input 850*e*2 on use 28 MM control 824*b* of FIG. 8E while the setting determining whether the non-native FOV was set as a default FOV (e.g. set as 28 MM or 35 MM) (e.g., 826*a*) is in an on state and, in response, computer system 600 displays a camera user interface that includes 28 MM zoom control 622*e* (e.g., when the camera user interface is initially displayed after tap input 850*e*2 is detected), as illustrated in FIG. 8L.

Turning back to FIG. 8I, computer system 600 detects tap input 850*i*1 on 35 MM zoom control 622*g* and detects tap input 850*i*2 on shutter control 610. As illustrated in FIG. 8J, in response to detecting tap input 850*i*1 on 35 MM zoom control 622*g*, computer system 600 replaces 35 MM zoom control 622*g* with 24 MM zoom control 622*f* As illustrated in FIG. 8J, in response to detecting tap input 850*i*1, computer system 600 updates live preview 630, such that live preview 630 represents the FOV at the 24 MM zoom level (e.g., 1× zoom level). Looking at FIGS. 8I-8J, computer system 600 zooms out of live preview 630 of FIG. 8I because the 24 MM zoom level of FIG. 8J is lower than the 35 MM zoom level of FIG. 8I. At FIG. 8J, in response to detecting tap input 850*i*2 on shutter control 610 (e.g., in FIG. 8I), computer system 600 captures media at the 35 MM zoom level and updates media collection 612 with a representation of the captured media (e.g., which will be discussed further below in relation to FIGS. 8W-8X). At FIG. 8J, computer system 600 detects tap input 850*j*1 on 24 MM zoom control 622*f* and detects tap input 850*j*2 on shutter control 610.

As illustrated in FIG. 8K, in response to detecting tap input 850*j*1 on 24 MM zoom control 622*f*, computer system 600 replaces 24 MM zoom control 622*f* with 35 MM zoom control 622*g*. In response to detecting tap input 850*j*1, computer system 600 updates live preview 630, such that live preview 630 represents the FOV at the 35 MM zoom level. At FIG. 8K, in response to detecting tap input 850*j*2 on shutter control 610 (e.g., in FIG. 8J), computer system 600 captures media at the 24 MM zoom level and updates media collection 612 with a representation of captured media. In some embodiments, while displaying live preview 630 at the 28 MM zoom level (and 28 MM zoom control 622*e* of FIG. 8L), computer system 600 detects an input directed to the shutter control and, in response, captures media at the 28 MM zoom level and updates media collection 612 with a representation of the captured media.

FIGS. 8K-8N illustrates exemplary embodiments concerning displaying one or more other zoom options along with the zoom levels that correspond to zoom controls 622. FIGS. 8K and 8M illustrate an exemplary embodiment where computer system 600 detects a request to display one or more other zoom levels while displaying 35 MM zoom control 622*g*. FIGS. 8L and 8N illustrate an exemplary embodiment where computer system 600 detects a request to display one or more other zoom levels while displaying 28 MM zoom control 622*e*. At FIG. 8K, computer system 600 detects a first portion of drag input 850*k* on 35 MM zoom control 622*g*. In some embodiments, drag input 850*k* is optionally in the upward, rightward, and/or leftward direction.

As illustrated in FIG. 8M, in response to detecting the first portion of drag input 850*k*, computer system 600 displays zoom control 840 and ceases to display zoom control 622. Zoom control 840 is a control (e.g., zoom wheel, zoom slider, or other zoom control) where a user can select multiple zoom options that are represented by zoom controls 622 of FIG. 8K and that are not represented by zoom controls 622 of FIG. 8K. At FIG. 8M, zoom control 840 includes 0.5× zoom indication 840*a*, 1× zoom indication 840*b*, and 3× zoom indication 840*c*, which are displayed at locations that corresponds to their respective zoom levels. Zoom control 840 also includes selection indicator 842, which is displayed at the 35 MM zoom level on zoom control 840 because drag input 850*k* was initially detected on 35 MM zoom control 622*g*. In some embodiments, when computer system 600 initially displays zoom control 840, computer system 600 displays indicator 842 at location that corresponds to the zoom control at which a drag input was initially detected.

Computer system 600 also displays indication 844 (e.g., a dot) as a part of zoom control 840. As illustrated in FIG. 8M, indication 844 is displayed at a location that corresponds to the 35 MM zoom level. Computer system 600 displays indication 844 at the location that corresponds to the 35 MM zoom level because computer system 600 was set up to use the 35 MM zoom level (e.g., in response to detecting input 850*g* at FIG. 8G). In some embodiments, computer system 600 does not display indication 844 at the location that corresponds to the 35 MM zoom level when computer system 600 is not set up to use the 35 MM zoom level. Thus, in some embodiments, computer system 600 displays zoom control 840 with indications for native zoom levels (e.g., 840*a*-840*c*) and digital zoom levels (e.g., indication 844). In some embodiments, computer system 600 displays indication 844 (e.g., the dot) with a different visual appearance than 0.5× zoom indication 840*a*, 1× zoom indication 840*b*, and 3× zoom indication 840*c* (e.g., with text) to conserve display space (e.g., or due to display space constraints) on zoom control 840.

Looking back at FIG. 8L, computer system 600 detects a first portion of drag input 850*l* on 28 MM zoom control 622*e*. As illustrated in FIG. 8N, in response to detecting the first portion of drag input 850*k*, computer system 600 displays zoom control 840. Zoom control 840 of FIG. 8N is different from zoom control 840 of FIG. 8M because indication 844 is displayed at a location that corresponds to the 28 MM zoom level at FIG. 8N and not the location that corresponds to 35 MM zoom. Computer system 600 displays indication 844 at the location that corresponds to the 28 MM zoom level because computer system 600 was set up to use the 28 MM zoom level (e.g., in response to detecting a tap input directed to use 28 MM zoom control 824*b* of FIG. 8E).

Looking back at FIG. 8M, computer system 600 detects a second portion (e.g., a rightward portion) of drag input 850*k*. As illustrated in FIG. 8O, computer system 600 moves zoom control 840 to the right, such that display of selection indicator 842 is at a location that corresponds to a 0.9× zoom level (e.g., while detecting the second portion of drag input 850*k*) and no longer at the location that corresponds to the 35 MM zoom level. While moving selection indicator 842, computer system 600 updates (e.g., zooms) live preview 630 based on the location of selection indicator 842 on zoom control 840. In some embodiments, in response to detecting a third portion of the input in an opposite direction, computer system 600 moves zoom control 840 to the left (e.g., to select a higher zoom level and/or a zoom level that is greater than 0.9×). At FIG. 8O, computer system 600 detects the end of drag input 850*k*.

As illustrated in FIG. 8P, computer system 600 ceases to display zoom control 840 and displays zoom controls 622 with a zoom control (e.g., 0.9× zoom control 622*h*) that corresponds to the selected zoom level (e.g., 0.9×). 0.9× zoom control 622*h* takes the place of one of zoom controls 622 that was displayed before drag input 850*k* was detected (e.g., 0.5× zoom control 622*a* of FIG. 8K). At FIG. 8P, computer system 600 detects tap input 850*p* on 0.9× zoom control 622*h*. As illustrated in FIG. 8Q, in response to detecting tap input 850*p*, computer system 600 displays 0.5× zoom control 622*a* as being selected and updates live preview 630, such that live preview 630 is displayed at the 0.5× zoom level. In response to detecting tap input 850*p*, computer system 600 replaces 0.9× zoom control 622*h* with 0.5× zoom control 622*a* because the 0.9× zoom control 622*h* is no longer being used and is not an original zoom control. At FIG. 8Q, computer system 600 detects leftward swipe input 850*q* on live preview 630.

As illustrated in FIG. 8R, in response to detecting swipe input 850*q*, computer system 600 moves camera modes 620 to the right and displays portrait mode control 620*d* as being selected. At FIG. 8R, in response to detecting swipe input 850*q*, computer system 600 is configured to be in the portrait camera mode. In response to detecting swipe input 850*q*, computer system 600 displays 2× zoom control 622*c* (e.g., a digital zoom control) and ceases to display the other zoom controls 622 of FIG. 8Q. In response to detecting swipe input 850*q*, computer system 600 displays lighting effect controls 862 (which, when individual activated, enables changing a lighting effect that is applied to captured media) to the right of 2× zoom control 622*c* in the camera display region 604. Along with lighting effect controls 862, computer system 600 also displays light effect indicator ("Natural Light"), which indicates the lighting effect that will be applied to captured media. At FIG. 8R, computer system 600 detects rightward swipe input 850*r* on 2× zoom control 622*c*. As illustrated in FIG. 8S, in response to detecting rightward swipe input 850*r*, computer system 600 expands 2× zoom control 622*c* to display 1× zoom control 622*b* and 3× zoom control 622*d*. In some embodiments, computer system 600 does not display 0.5× zoom control 622*a* of FIG. 8A after expanding 2× zoom control 622*c* because 0.5× zoom control 622*a* (or the 0.5× zoom level) is not compatible with capturing portrait media. In some embodiments, in response to detecting an input on 1× zoom control 622*b*, computer system 600 displays 1× zoom control as being selected. In some embodiments, in response to detecting an input on 3× zoom control 622*d*, computer system 600 displays 3× zoom control as being selected. At FIG. 8S, computer system 600 detects leftward swipe input 850*s* on zoom controls 622.

As illustrated in FIG. 8T, in response to detecting leftward swipe input 850*s*, computer system 600 removes the unselected zoom controls from FIG. 8S (e.g., 1× zoom control 622*b* and 3× zoom control 622*d*) and continues to display the selected zoom control from FIG. 8S (e.g., 2× zoom control 622*c*). In response to detecting leftward swipe input 850*s*, computer system 600 re-displays lighting effect controls 862. At FIG. 8T, computer system 600 detects that low-light criteria are met (e.g., as described above in relation to FIG. 6F). As illustrated in FIG. 8U, in response to detecting that low-light criteria are met, computer system 600 replaces 2× zoom control 622*c* with 3× zoom control 622*d* (or, in other embodiments, 1× zoom control 622*b*). At FIG. 8U, 3× zoom control 622*d* includes an indication (e.g., half-moon) that computer system 600 can be configured to operate in a low-light mode. At FIG. 8U, computer system 600 detects rightward swipe input 850*u*1 on live preview 630 and/or tap input 850*u*2 on 3× zoom control 622*d*. In some embodiments, in response to detecting rightward swipe input 850*u*1, computer system 600 re-displays the user interface of FIG. 8Q with zoom controls 622. As illustrated in FIG. 8V, in response to detecting input 850*u*2, computer system 600 displays low-light mode control 874 (e.g., for setting a duration of capture for low-light mode).

Looking back at FIG. 8I, computer system 600 detects input 850*i*1 on shutter control 610 and, in response, captures media representative of live preview 630 of FIG. 8I at the 35 MM zoom level. Turning to FIG. 8J, computer system 600 detects input 850*j* on shutter control 610 and, in response, captures media representative of live preview 630 of FIG. 8J at the 24 MM zoom level (e.g., the 1× zoom level and the native zoom level, as discussed above). FIG. 8W includes representation 896, which is a representation of the media captured at the 35 MM zoom level in FIG. 8I. FIG. 8X includes representation 898, which is a representation of media captured at the 24 MM zoom level. Notably, in FIGS. 8W-8X, the resolution (e.g., indicated by 890) of media representation 896 is the same (or similar to) as the resolution (e.g., indicated by 892) of media representation of media representation 898. Thus, computer system 600 generates media with the same or similar resolution with the digital zoom level (e.g., 35 MM zoom level) as computer system 600 generates with the native zoom level (e.g., 1× zoom level or 24 MM zoom level). In some embodiments, computer system 600 generates the digital zoom level with the same or similar resolution as computer system 600 generates with the native zoom level by unbinning pixels of media captured at the native zoom level.

FIG. 9 is a flow diagram illustrating a method for managing zoom controls for capturing media in accordance with some embodiments using a computer system in accordance with some embodiments. Method 900 is performed at a computer system (e.g., 100, 300, 500, and 600) (e.g., a smartwatch, a wearable electronic device, a smartphone, a desktop computer, a laptop, or a head mounted device (e.g., a head mounted augmented reality and/or extended reality device)) having a plurality of cameras that includes a first fixed focal length (e.g., a prime lens) camera and a second fixed focal length camera (e.g., one or more cameras (e.g., dual cameras, triple camera, quad cameras, etc.) (e.g., as described above in relation to method 700)) (e.g., as discussed above in relation to FIGS. 8A-8C), where the computer system is in communication with a display generation component (e.g., a display controller, a touch-sensitive display system, and/or a head mounted display system). In some embodiments, the computer system includes and/or in communication with one or more input devices (e.g., a touch-sensitive surface and/or a first camera of one or more cameras (e.g., one or more cameras (e.g., dual cameras, triple camera, quad cameras, and/or other camera configurations) on the same side or different sides of the computer system (e.g., a front camera, a back camera))). In some embodiments, the computer system includes and/or includes one or more output devices (e.g., speakers, display generation components, and/or haptic output devices).

Some operations in method 900 are, optionally, combined, the orders of some operations are, optionally, changed, and some operations are, optionally, omitted.

As described below, method 900 provides an intuitive way for managing zoom controls for capturing media. The method reduces the cognitive burden on a user for managing zoom controls for capturing media, thereby creating a more efficient human-machine interface. For battery-operated computing devices, enabling a user to manage zoom controls for capturing media faster and more efficiently conserves power and increases the time between battery charges.

While the computer system (e.g., 600) is not operating a first camera mode (e.g., a mode that computer system operations in when one of 620*a*-620*e* is selected) (e.g., a media capture mode (e.g., photo, video, cinematic video, panoramic, portrait, slow motion, or time lapse)), the computer system (e.g., 600) detects (902) a request (e.g., 850*a*1) to transition the computer system to operate in a first camera mode.

In response to detecting the request (e.g., 850*a*1) to transition the computer system to the first camera mode, the computer system (e.g., 600) displays (904), via the display generation component, a camera user interface that includes a plurality of selectable controls (e.g., 622) for managing zoom levels to capture media, where the plurality of selectable controls includes (in some embodiments, the plurality of second controls were not displayed at the time the request to transition was detected) a first selectable control (906) (e.g., 622*a*, 622*b*, and/or 622*d*) that, when selected, causes the computer system (e.g., 600) to be configured to capture media with a first native zoom level (e.g., 0.1-10× zoom) of the first fixed focal length camera (e.g., a zoom level that the fixed focal length camera is capable of capturing media at without additional digital processing to change the zoom level of the captured image).

In response to detecting the request (e.g., 850*a*1) to transition the computer system to the first camera mode, the computer system (e.g., 600) displays (904), via the display generation component, a camera user interface that includes a plurality of selectable controls (e.g., 622) for managing zoom levels to capture media, where the plurality of selectable controls includes a second selectable control (908) (e.g., 622*a*, 622*b*, and/or 622*d*) that, when selected, causes the computer system to be configured to capture media with a second native zoom level (e.g., 0.1-10× zoom) of the second fixed focal length camera, where the second native zoom level is different from the first native zoom level (e.g., a zoom level that the fixed focal length camera is capable of capturing media at without additional digital processing to change the zoom level of the captured image).

In response to detecting the request (e.g., 850*a*1) to transition the computer system to the first camera mode, the computer system (e.g., 600) displays (904), via the display generation component, a camera user interface that includes a plurality of selectable controls (e.g., 622) for managing zoom levels to capture media, where the plurality of selectable controls includes a third selectable control (910) (e.g., 622*c*, 622*e*, and/or 622*g*) (e.g., at least one) that, when selected, causes the computer system to be configured to capture media with a digital zoom level (e.g., 0.1-10× zoom) using at least one of (e.g., the first fixed focal length camera, the second fixed focal length camera, another fixed focal length camera, or any combination thereof) the plurality of cameras (e.g., a zoom level that the fixed focal length camera is capable of capturing media with additional digital processing to change the zoom level of the captured image). In some embodiments, the digital zoom level is different from the first native zoom level and the second native zoom level. In some embodiments, the computer system displays, via the display device, a camera user interface that includes a first representation of at least a portion of a field-of-view of the one or more cameras displayed at the first native zoom level, the second native zoom level, and/or the digital zoom level. In some embodiments, the first fixed focal length camera has a different sized field-of-view than the second fixed focal length camera. Displaying the plurality of controls that includes the first selectable control, the second selectable control, and the third selectable control in response to detecting the request to transition the computer system to the first camera mode provides the user with more control over the user interface in order to choose between native zoom levels and a digital zoom level, which provides additional control options without cluttering the user interface and reduces the number of inputs needed to perform an operation.

In some embodiments, detecting the request to transition the computer system to the first camera mode includes detecting an input (e.g., 850*b*2, 850*f*3, and/or 850*g*) (e.g., a tap input or, in some embodiments, a non-tap input (e.g., a dragging input, a mouse click, a gaze input, and/or a press-and-hold input)) that is directed to a non-camera user interface (e.g., user interface in FIG. 6J and/or one or more user interfaces described above in relation to FIGS. 8H-8L) (e.g., wake screen, home screen, a settings user interface, or an application UI for a non-camera application) while the computer system is not operating in the first mode. In some embodiments, the non-camera user interface is displayed before the camera user interface is displayed. Displaying the plurality of controls that includes the first selectable control, the second selectable control, and the third selectable control in response to detecting an input that is directed to a non-camera user interface while the computer system is not operating in the first mode and is displaying the non-camera user interface provides the user with more control over the user interface in order to choose between native zoom levels and a digital zoom level, which provides additional control options without cluttering the user interface and reduces the number of inputs needed to perform an operation.

In some embodiments, detecting the request to transition the computer system to the first camera mode includes detecting an input (e.g., 850*q* and/or as described above in relation to FIG. 8R) (e.g., a tap input or, in some embodiments, a non-tap input (e.g., a dragging input, a mouse click, a gaze input, and/or a press-and-hold input)) that is directed to a first camera user interface (e.g., the user interface in FIGS. 8Q-8R) (e.g., a camera user interface for media capture mode, different from the first camera mode, (e.g., photo, video, cinematic video, panoramic, portrait, slow motion, or time lapse)) that is different from (e.g., does not include the plurality of selectable controls for managing zoom levels to capture media) the camera user interface that includes the plurality of selectable controls (e.g., 622). Displaying the plurality of controls that includes the first selectable control, the second selectable control, and the third selectable control in response to detecting an input that is directed to a first camera user interface that is different from the camera user interface that includes the plurality of selectable controls provides the user with more control over the user interface in order to choose between native zoom levels and a digital zoom level, which provides additional control options without cluttering the user interface and reduces the number of inputs needed to perform an operation.

In some embodiments, displaying the camera user interface includes the plurality of selectable controls, detecting a first input (e.g., **850*i*2 and/or 850*p*) (e.g., a tap input or, in some embodiments, a non-tap input (e.g., a mouse click, a button press input, an air gesture/input, a gaze input, and/or a press-and-hold input)) directed to the camera user interface that includes the plurality of selectable controls (e.g., 622). In some embodiments, in response to detecting the first input directed to the camera user interface that includes the plurality of selectable controls: in accordance with a determination that the first input is directed to the first selectable control (and in accordance with a determination that the computer system is not currently configured to capture media with the first native zoom level (e.g., before the first input directed to the camera user interface was detected)), the computer system (e.g., 600) configures the computer system to capture media with the first native zoom level of the first fixed focal length camera (e.g., as discussed above in relation to FIGS. 8J and 8**P) (and/or maintaining the configuration when the computer system was configured to capture media with the first native zoom level (e.g., before (e.g., immediately before) the first input directed to the camera user interface was detected). In some embodiments, in response to detecting a request to capture media (e.g., via an input directed to a shutter control) while the computer system is configured to capture media with the first native zoom level of the first fixed focal length camera, the computer system captures media with the first native zoom level.

In some embodiments, in response to detecting the first input directed to the camera user interface that includes the plurality of selectable controls, and in accordance with a determination that the first input is directed to the second selectable control (and in accordance with a determination that the computer system is not currently configured to capture media with the second native zoom level (e.g., before the first input directed to the camera user interface was detected)), the computer system (e.g., 600) configures the computer system to capture media with the second native zoom (e.g., indicated by **622*a*, 622*b*, 622*d*, and/or 622*f*) level of the second fixed focal length camera (and/or maintaining the configuration when the computer system was configured to capture media with the second native zoom level (e.g., before (e.g., immediately before) the first input directed to the camera user interface was detected) (e.g., as discussed above in relation to FIGS. 8J and 8**P). In some embodiments, in response to detecting a request to capture media while the computer system is configured to capture media with the second native zoom level of the second fixed focal length camera, the computer system captures media with the second native zoom level.

In some embodiments, in response to detecting the first input directed to the camera user interface that includes the plurality of selectable controls, and in accordance with a determination that the first input is directed to the third selectable control (and in accordance with a determination that the computer system is not currently configured to capture media with the digital native zoom level (e.g., before the first input directed to the camera user interface was detected)), configuring the computer system to capture media with the digital zoom level (e.g., indicated by **622*c*, 622*e*, and/or 622*g***) using at least one of the plurality of cameras (and/or maintaining the configuration when the computer system was configured to capture media with the digital zoom level (e.g., before (e.g., immediately before) the first input directed to the camera user interface was detected). In some embodiments, in response to detecting a request to capture media while the computer system is configured to capture media with the digital zoom level, the computer system captures media with the digital zoom level.

Configuring the computer system to capture media at a particular zoom level based the control at which the input is directed provides the user with more control over the user interface in order to choose between native zoom levels and a digital zoom level, which provides additional control options without cluttering the user interface.

In some embodiments, displaying the camera user interface that includes the plurality of selectable controls, detecting a second input (e.g., **850*k* and/or 850*l*) (e.g., a movement input (e.g., swipe input and/or a drag input and, in some embodiments, a non-swipe and/or a non-drag input, such as a click and drag input, a rotational input, a sliding input, and/or an air gesture) directed to the camera user interface that includes the plurality of selectable controls. In some embodiments, in response to detecting the second input directed to the camera user interface that includes the plurality of selectable controls: in accordance with a determination that movement of the second input includes a first amount of movement, configuring the computer system to capture media with a first zoom level (e.g., 842) that is in a range of zoom levels that includes the first native zoom level (e.g., 840*a*-840*c*), the second native zoom level (e.g., 840*a*-840*c*), and the digital zoom level (e.g., 844) (e.g., as discussed above in relation to FIGS. 8K-8**O). In some embodiments, while the computer system is configured to capture media with a first zoom level that is in a range of zoom levels that includes the first native zoom level, the computer system capture media with the first zoom level.

In some embodiments, in response to detecting the second input directed to the camera user interface that includes the plurality of selectable controls: in accordance with a determination that movement of the second input includes a second amount of movement that is different from the first amount of movement, configuring the computer system to capture media with a second zoom level (e.g., 842) that is in the range of zoom levels. In some embodiments, the second zoom level is different from the first zoom level (e.g., as discussed above in relation to FIGS. 8K-8O). In some embodiments, the first zoom level and/or the second zoom level are different from the first native zoom level, the second native zoom level, and the digital zoom level. In some embodiments, while the computer system is configured to capture media with a second zoom level that is in a range of zoom levels that includes the first native zoom level, the computer system capture media with the second zoom level. In some embodiments, in accordance with a determination that movement of the second input is in a first direction, the computer system is configured to capture media with the first zoom level that is in the range of zoom levels that includes the first native zoom level, the second native zoom level, and the digital zoom level. In some embodiments, in accordance with a determination that movement of the second input is in a second direction that is different from the first direction, the computer system is configured to capture media with a second zoom level that is in the range of zoom levels, where the second zoom level is different from the first zoom level and is represented in the range of zoom levels that is in a different direction from the first zoom level relative a representation in the range of zoom levels closer to which the input was detected. Configuring the computer system to capture media at a particular zoom level that is in the range of zoom levels in response to detecting the second input directed to the camera user interface that includes the plurality of selectable controls provides the user with more control over the user interface in order to choose between native zoom levels and a digital zoom level, which provides additional control options without cluttering the user interface.

In some embodiments, while displaying the camera user interface that includes the plurality of selectable controls, the computer system (e.g., 600) detects a request to capture media (e.g., 650*b*2, 650*d*, 650*f*, and/or 650*g*) (e.g., via an input (e.g., a tap input or, in some embodiments, a non-tap input (e.g., a dragging input, a mouse click, a gaze input, and/or a press-and-hold input)) on a shutter control). In some embodiments, in response to detecting the request (e.g., 650*b*2, 650*d*, 650*f*, and/or 650*g*) to capture media: in accordance with a determination that the computer system was configured to capture media with the first native zoom level (e.g., indicated by 622*b* and/or 622*f*) when the request to capture media was detected: initiating capture of respective media with the first native zoom level. In some embodiments, in response to detecting the request (e.g., 650*b*2, 650*d*, 650*f*, and/or 650*g*) to capture media: computer system (e.g., 600) generates visual content corresponding to the respective media captured with the first native zoom level. In some embodiments, the visual content corresponding to the respective media captured with the first native zoom level has a first resolution (e.g., as discussed above in relation to FIGS. 8W-8X).

In some embodiments, while displaying the camera user interface that includes the plurality of selectable controls, the computer system (e.g., 600) detects a request to capture media (e.g., 650*b*2, 650*d*, 650*f*, and/or 650*g*) (e.g., via an input (e.g., a tap input or, in some embodiments, a non-tap input (e.g., a dragging input, a mouse click, a gaze input, and/or a press-and-hold input)) on a shutter control). In some embodiments, in response to detecting the request (e.g., 650*b*2, 650*d*, 650*f*, and/or 650*g*) to capture media: in accordance with a determination that the computer system was configured to capture media with the digital zoom level (e.g., indicated by 622*e* and/or 622*g*) when the request to capture media was detected: initiating capture of respective media with the digital zoom level; and generating visual content corresponding to the respective media captured with the digital zoom level. In some embodiments, the visual content corresponding to the respective media that was captured with the digital zoom level has a second resolution that is similar to (e.g., equal to, equivalent to, within a threshold of (e.g., a threshold aspect ratio and/or a threshold number and/or percentage (e.g., 80%, 85%, 90%, 95%, 97%, or 99%) of pixels)) the first resolution (e.g., as discussed above in relation to FIGS. 8W-8X). Generating visual content corresponding to the respective media captured with the digital zoom level that has a resolution that is similar to respective media generated with the respective zoom level in response to detecting the request to capture media allows the computer system to provide media with similar resolutions in response to detecting user input, which provides additional control options without cluttering the user interface and reduces the number of inputs needed to generate media using different zoom levels with similar resolutions.

In some embodiments, generating visual content corresponding to the respective media captured with the digital zoom level includes expanding (e.g., digitally expanding) (e.g., by unbinning (e.g., reversing pixel binning) and/or unbinning pixels that are binned and/or bent at the native resolution of at least one of the plurality of cameras) one or more frames captured by at least one of the plurality of cameras (e.g., as discussed above in relation to FIGS. 8W-8X).

In some embodiments, while displaying the plurality of selectable for managing zoom levels to capture media (and, in some embodiments, while the computer system is operating in the first camera mode), the computer system (e.g., 600) detects a request to transition (e.g., 850*q* and/or 850*u*1) the computer system to operate in a second camera mode (e.g., photo, video, cinematic video, panoramic, portrait, slow motion, or time lapse camera mode) that is different from the first camera mode. In some embodiments, in response to detecting the request (e.g., 850*q* and/or 850*u*1) to transition the computer system to operate in the second camera mode, the computer system (e.g., 600) displays, via the display generation component, a second camera user interface that is different from the camera user interface (e.g., as described above in relation to FIGS. 8Q-8R). In some embodiments, the second camera user interface includes the third selectable control (e.g., and one or more of the other plurality of selectable controls). In some embodiments, in response to detecting the request to transition the computer system to operate in a second camera, the computer system transitions from operating in the first camera mode to operate in the second camera mode. In some embodiments, in response to detecting the third selectable control while displaying the second camera user interface, the computer system displays one or more of the other plurality of selectable controls (e.g., the first selectable control and/or the second selectable control) (and, in some embodiments, ceases to display the third selectable control). Displaying a second camera user interface that is different from the camera user interface that includes the third selectable control in response to detecting the request to transition the computer system to operate in a second camera mode provides the user with feedback that the third selectable control is relevant to the second camera user interface and/or that a control that was relevant to the camera user interface is also relevant to the second camera user interface, which provides improved visual feedback to the user and reduces the number of inputs needed to perform an operation.

In some embodiments, the second camera user interface does not include the first selectable control (e.g., 622*a*, 622*b*, and/or 622*d*) and the second selectable control (e.g., 622*a*, 622*b*, and/or 622*d*), the method (900) includes while displaying the second camera user interface (e.g., a portrait camera user interface, as described above in relation to method 700) that includes the third selectable control (e.g., 622*c*) and does not include the first selectable control (e.g., 622*a*, 622*b*, and/or 622*d*) and the second selectable control (e.g., 622*a*, 622*b*, and/or 622*d*), detecting an input (e.g., a tap input or, in some embodiments, a non-tap input (e.g., a dragging input, a mouse click, a gaze input, and/or a press-and-hold input)) directed to the second camera user interface. In some embodiments, the second camera user interface does not include the first selectable control (e.g., 622*a*, 622*b*, and/or 622*d*) and the second selectable control (e.g., 622*a*, 622*b*, and/or 622*d*), the method (900) includes in response to detecting the input (e.g., 850*r*) directed to the second camera user interface, displaying, via the display generation component, the first selectable control (e.g., 622*a*, 622*b*, and/or 622*d*) and the second selectable control (e.g., 622*a*, 622*b*, and/or 622*d*) concurrently with the third selectable control (e.g., 622*c*). In some embodiments, as a part of displaying, via the display generation component, the first selectable control and the second selectable control concurrently with the third selectable control, the computer system displays an animation of the third selectable control expanding to display the first selectable control and the second selectable control. Displaying, via the display generation component, the first selectable control and the second selectable control concurrently with the third selectable control in response to detecting the input directed to the second camera user interface provides the user with control over the computer system to display additional zoom controls, which provides additional control options without cluttering the user interface with additional displayed controls.

In some embodiments, before detecting the input (e.g., 850*r*) directed to the second camera user interface, the camera user interface includes one or more filter controls (e.g., 862) that are displayed concurrently with the third selectable control (e.g., 622*c*). In some embodiments, the one or more filter controls, when selected, causes the computer system (e.g., 600) to be configured to apply a respective filter to captured media (e.g., captured media) (e.g., one or more media lighting capture controls (e.g., a portrait lighting effect control (e.g., a studio lighting, contour lighting, and/or stage lighting)). In some embodiments, the computer receives a user input corresponding to the selection of the affordance for controlling a lighting effect operation, and in response to receiving the user input, the electronic device can change the state (e.g., amount of lighting) of the lighting effect and/or display a user interface to change the state of the lighting effect operation. In some embodiments, in response to detecting the input directed to the second camera user interface, ceasing to display the one or more filter controls (e.g., 862). Ceasing to display the one or more respective controls in response to detecting the input directed to the second camera user interface allows the computer system to conserve user interface real estate while displaying the additional zoom controls.

In some embodiments, in response to detecting the request to transition the computer system to the first camera mode and in accordance with a determination that the first camera mode is a first type of camera mode (e.g., as indicated by 622*a*-620*e* being selected) (e.g., a portrait camera/capture mode), the third selectable control (e.g., 622) is displayed as being selected (e.g., initially selected (e.g., as the default control for the first type of camera mode)) (and the computer system is configured to capture media with the digital zoom level). In some embodiments, the third selectable control is displayed as being selected irrespective of whether the third selectable control was displayed as being selected before the request to transition the computer system to the first mode was received and/or whether another selectable zoom control (e.g., first selectable control or second selectable control) was displayed as being selected. In some embodiments, in response to detecting the request to transition the computer system to the first camera mode and in accordance with a determination that the first camera mode is a second type of camera mode (e.g., as indicated by 622*a*-620*e* being selected) (e.g., a photo camera/capture mode (e.g., still photo) and/or panorama camera/capture mode) that is different from the first type of mode, the third selectable control (e.g., 622) is not displayed as being selected (e.g., not initially selected (e.g., as the default control)) (and the computer system is not computer system capture media with the digital zoom level). In some embodiments, in response to detecting the request to transition the computer system to the first camera mode and in accordance with a determination that the first camera mode is a second type of camera mode, the computer system displays another selectable control (e.g., zoom control) as being selected and/or as the default control for the second type of camera mode. Displaying the third selectable control is displayed as being selected in response to detecting the request to transition the computer system to the first camera mode and in accordance with a determination that the first camera mode is a first type of camera mode allows the computer system to automatically display the third selectable control as the default control, which performs an operation when a set of conditions has been met without requiring further user input.

In some embodiments, while the plurality of selectable control options (e.g., 622) are included in the camera user interface, the plurality of selectable control options (e.g., the first selectable control, the second selectable control, and the third selectable control options) are the only selectable control options that can be selected to affect the zoom level to which the computer system (e.g., 600) can be configured. In some embodiments, the third selectable control is included in a set of discreet selectable zoom controls that correspond to a respective camera mode (e.g., a portrait camera mode). In some embodiments, the set of discrete selectable zoom controls that correspond to the respective camera mode represent one or more discrete zoom levels that are the only zoom levels that correspond to the respective camera mode. In some embodiments, the respective camera mode is the first camera mode. In some embodiments, the respective camera mode is different from the first camera mode.

In some embodiments, while displaying the third selectable control (e.g., 6 cc) as being selected and while the computer system is configured to capture media with the digital zoom level using at least one of the plurality of cameras, the computer system (e.g., 600) detects a set of conditions to transition from a first capture mode to a second capture mode (e.g., as discussed above in relation to FIGS. 8T-8V). In some embodiments, the first capture mode is not a low-light capture mode (e.g., as described above in relation to method 700) and the third capture mode is the low-light capture mode. In some embodiments, in response to detecting the set of conditions to transition from the first capture mode to the second capture mode, the computer system (e.g., 600) configures the computer system to capture media with the first native zoom level (e.g., 622*b* and/or 622*d*) or the second native zoom level (e.g., 622*b* and/or 622*d*) (and, in some embodiments, displaying a selectable control corresponding to the zoom level that is different from the digital zoom level as being selected). Configuring the computer system to capture media with a zoom level that is different from the digital zoom in response to detecting the set of conditions to transition from the first capture mode to the second capture mode allows the computer system to automatically select a zoom level that is more relevant (and/or preferred) to the second capture mode.

In some embodiments, the set of conditions to transition from the first capture mode to the second capture mode includes detecting an input (e.g., a tap input or, in some embodiments, a non-tap input (e.g., a dragging input, a mouse click, a gaze input, and/or a press-and-hold input)) that is directed to a control that, when selected, causes the computer system to transition to (or transition out of) the second capture mode (and/or to enter into or exit the second capture mode) (e.g., as discussed above in relation to FIGS. 8T-8V). Configuring the computer system to capture media with a zoom level that is different from the digital zoom in response to detecting an input that is directed to a control that, when selected, causes the computer system to transition to the second capture mode gives the user control over the user interface to transition the computer system to the second capture mode, which provides additional control options without cluttering the user interface with additional displayed controls.

In some embodiments, the set of conditions to transition from the first capture mode to the second capture mode includes determining that the ambient light in the field-of-view of at least one of the plurality of cameras is below a threshold (e.g., 0-20 lux) (e.g., as discussed above in relation to FIGS. 8T-8V). Configuring the computer system to capture media with a zoom level that is different from the digital zoom according to a determination that is made that the ambient light in the field-of-view of at least one of the plurality of cameras is below a threshold allows the computer system to automatically select a zoom level that is more relevant (and/or preferred) to the second capture mode.

Note that details of the processes described above with respect to method 900 (e.g., FIG. 9 are also applicable in an analogous manner to the methods described herein. For example, method 900 optionally includes one or more of the characteristics of the various methods described herein with reference to method 700. For example, the computer system can capture media with a resolution using the techniques described in relation to method 700 at a chosen zoom level set using one or more techniques described in relation to method 900. For brevity, these details are not repeated below.

FIG. 10 is a flow diagram illustrating a method for managing predefined zoom levels for capturing media in accordance with some embodiments using a computer system in accordance with some embodiments. Method 1000 is performed at a computer system (e.g., 100, 300, 500, and/or 600) (e.g., a smartwatch, a wearable electronic device, a smartphone, a desktop computer, a laptop, or a head mounted device (e.g., a head mounted augmented reality and/or extended reality device)) having one or more cameras (e.g., one or more cameras (e.g., dual cameras, triple camera, quad cameras, etc.) on the same side or different sides of the electronic device (e.g., a front camera and/or a back camera))) (e.g., one or more 12 MP-48 MP cameras) (e.g., one or more 13 MM, 24 MM, 28 MM, 32 MM, 38 MM, and/or 77 MM focal length cameras) (e.g., one or more fixed focal length cameras, as described above in relation to method 700), where the computer system is in communication with (and/or includes) a display generation component (e.g., a display controller, a touch-sensitive display system, and/or a head mounted display system). In some embodiments, the computer system includes and/or in communication with one or more input devices (e.g., a touch-sensitive surface and/or a first camera of one or more cameras (e.g., one or more cameras (e.g., dual cameras, triple camera, quad cameras, etc.) on the same side or different sides of the computer system (e.g., a front camera, a back camera))). In some embodiments, the computer system includes and/or includes one or more output devices (e.g., speakers, display generation components, and/or haptic output devices). Some operations in method 1000 are, optionally, combined, the orders of some operations are, optionally, changed, and some operations are, optionally, omitted.

As described below, method 1000 provides an intuitive way for managing predefined zoom levels for capturing media. The method reduces the cognitive burden on a user for managing predefined zoom levels for capturing media, thereby creating a more efficient human-machine interface. For battery-operated computing devices, enabling a user to manage predefined zoom levels for capturing media faster and more efficiently conserves power and increases the time between battery charges.

Computer system (e.g., 600) displays (1002), via the display generation component, a camera user interface that includes one or more selectable controls (e.g., 622) for managing zoom levels to capture media (and, in some embodiments, while the computer system is configured to capture media based on a user-configured-default (or user-selected-default) value for a zoom level (e.g., a value that indicates a zoom level) (e.g., 0.1-10× zoom) of the one or more cameras), where the one or more of selectable controls includes a respective selectable control (e.g., 622*b* and/or 622*e*-622*g*) that corresponds to a predefined zoom level for a camera of the one or more cameras.

While displaying the camera user interface, computer system (e.g., 600) detects (1004) a selection input (e.g., 850*c*1, 850*d*, 850*f*1, and/or 850*i*2) (e.g., a tap input, long press input, click input or other selection input) (and, in some embodiments, a non-tap input (e.g., a dragging input, a mouse click, a gaze input, and/or a press-and-hold input)) directed to the respective selectable control (e.g., 622*b* and/or 622*e*-622*g*).

In response to detecting the selection input (e.g., 850*c*1, 850*d*, 850*f*1, and/or 850*i*2) directed to the respective selectable control, computer system (e.g., 600) selects (1006) the predefined zoom level as a current zoom level for the camera, including: in accordance with a determination that a user has selected a first zoom level as the predefined zoom level, selecting (1008) the first zoom level as the current zoom level for the camera in response to detecting (e.g., directly in response to detecting) the selection input directed to the respective selectable control (e.g., as discussed above in relation to FIGS. 8C-8L). In response to detecting the selection input (e.g., 850*c*1, 850*d*, 850*f*1, and/or 850*i*2) directed to the respective selectable control, the computer system (e.g., 600) selects (1006) the predefined zoom level as a current zoom level for the camera, including: in accordance with a determination that a user has selected a second zoom level, different from the first zoom level, as the predefined zoom level, selecting (1010) the second zoom level as the current zoom level for the camera in response to detecting (e.g., directly in response to detecting) the selection input directed to the respective selectable control (e.g., as discussed above in relation to FIGS. 8C-8L). Selecting a predefined zoom level as a current zoom level for the camera provides a user with control over the computer system to set a predefined zoom level that the computer system is configured to capture media in response to detecting the selection input directed to the respective selectable control, which provides additional control options without cluttering the user interface with additional displayed controls.

In some embodiments, the computer system (e.g., 600) is configured to capture media using a first field-of-view of a first camera (e.g., the camera) of the one or more cameras before detecting the selection input directed to the respective selectable control (e.g., as discussed above in relation to FIG. 8A). In some embodiments, in response to detecting the selection input (e.g., 850*c*1, 850*d*, 850*f*1, and/or 850*i*2) directed to the respective selectable control: in accordance with a determination that a user has selected the first zoom level as the predefined zoom level, the computer system (e.g., 600) configures the computer system to capture media using a second field-of-view of the first camera (e.g., as discussed above in relation to FIGS. 8C-8L). In some embodiments, in response to detecting the selection input (e.g., 850*c*1, 850*d*, 850*f*1, and/or 850*i*2) directed to the respective selectable control: in accordance with a determination that a user has selected the second zoom level as the predefined zoom level, the computer system (e.g., 600)

configures the computer system capture media using a third field-of-view of the first camera (e.g., as discussed above in relation to FIGS. 8C-8L). In some embodiments, the third field-of-view is different from the first field-of-view and the second field-of-view. In some embodiments, the first field-of-view is wider and/or narrower than the second field-of-view and/or the third field-of-view. In some embodiments, the second field-of-view is wider and/or narrower than the third field-of-view. Configuring the computer system is configured capture media using a different field-of-view of a camera based on the predefined zoom level allows the computer system to automatically switch to using a different field-of-view according to the selected predefined zoom level, which performs an operation when a set of conditions has been met without requiring further user input.

In some embodiments, the camera user interface includes a representation (e.g., 630) of a field-of-view of a second camera (e.g., the camera and/or of at least one camera of the one or more cameras) of the one or more cameras that is displayed at a third zoom level (e.g., as discussed above in relation to FIGS. 8C-8L) before detecting the selection input directed to the respective selectable control. In some embodiments, in response to detecting the selection input (e.g., 850*c*1, 850*d*, 850*f*1, and/or 850*i*2) directed to the respective selectable control: in accordance with a determination that a user has selected the first zoom level as the predefined zoom level, displaying, via the display generation component, the representation (e.g., a live preview (e.g., a live feed of the media that can be captured)) of the field-of-view (e.g., an open observable area that is visible to a camera, the horizontal (or vertical or diagonal) length of an image at a given distance from the camera lens) of the second camera at the first zoom level. In some embodiments, the first zoom level is different from the third zoom level (e.g., as discussed above in relation to FIGS. 8C-8L). In some embodiments, in accordance with a determination that a user has selected the first zoom level as the predefined zoom level, the computer system changes the representation from the third zoom level to the first zoom level). In some embodiments, in response to detecting the selection input (e.g., 850*c*1, 850*d*, 850*f*1, and/or 850*i*2) directed to the respective selectable control: in accordance with a determination that a user has selected the second zoom value as the predefined zoom level, the computer system displays, via the display generation component, the representation of the field-of-view of the second camera at the second zoom level. In some embodiments, the second zoom level is different from the third zoom level (e.g., as discussed above in relation to FIGS. 8C-8L). In some embodiments, in accordance with a determination that a user has selected the first zoom level as the predefined zoom level, the computer system changes the representation from the third zoom level to the second zoom level. Displaying the representation of the field-of-view the computer system to automatically change the representation of the field-of-view according to the selected predefined zoom level and provides feedback to the user concerning the change in the zoom level, which performs an operation when a set of conditions has been met without requiring further user input and provides improved visual feedback.

In some embodiments, the plurality of selectable controls (e.g., 622) includes a first selectable control (e.g., 622*a*, 622*c*, and/or 622*d*) (e.g., or more selectable controls) that corresponds to a zoom level that has not been preselected by one or more users (and/or is not a predefined zoom level). In some embodiments, in response to detecting an input (e.g., a tap input or, in some embodiments, a non-tap input (e.g., a dragging input, a mouse click, a gaze input, and/or a press-and-hold input)) directed to the first selectable control, the computer system selects the zoom level that has not been preselected by one or more users as the current zoom level for the camera. In some embodiments, the first selectable control is different from the respective selectable control. In some embodiments, zoom level of the first control cannot be adjusted. Displaying the plurality of selectable controls that includes the first selectable control that corresponds to a zoom level that has not been preselected by one or more users provides a user with control over the computer system to change the zoom level to the zoom level that has not been preselected by the one or more users, which provides additional control options without cluttering the user interface with additional displayed controls.

In some embodiments, the plurality of selectable controls includes a second selectable control (e.g., or more or more selectable controls) that corresponds to a native zoom level (e.g., as described above in relation to method 700) of the camera (e.g., the camera is a prime lens and/or a fixed focal length camera). In some embodiments, in response to detecting an input (e.g., a tap input or, in some embodiments, a non-tap input (e.g., a dragging input, a mouse click, a gaze input, and/or a press-and-hold input)) directed to the second selectable control, the computer system selects the native zoom level as the current zoom level for the camera. Displaying the plurality of selectable controls that includes the second selectable control that corresponds to a native zoom level of the camera provides a user with control over the computer system to change the zoom level to a native zoom level, which provides additional control options without cluttering the user interface with additional displayed controls.

In some embodiments, the plurality of selectable controls (e.g., 622) includes a third selectable control (e.g., 622*c*, 622*e*, and/or 622*g*) (e.g., or more or more selectable controls) that corresponds to a digital zoom level (e.g., as described above in relation to method 700). In some embodiments, in response to detecting an input (e.g., a tap input or, in some embodiments, a non-tap input (e.g., a dragging input, a mouse click, a gaze input, and/or a press-and-hold input)) directed to the third selectable control, the computer system selects the digital zoom level as the current zoom level for the camera. Displaying the plurality of selectable controls that includes the third selectable control that corresponds to a digital zoom level of the camera provides a user with control over the computer system to change the zoom level to a digital zoom level, which provides additional control options without cluttering the user interface with additional displayed controls.

In some embodiments, the respective selectable control (e.g., 622) is displayed with an indication (e.g., 622*c* and/or 622*e*-622*g*) of a current setting that corresponds to the predefined zoom level. In some embodiments, in accordance with a determination that a user has selected the first zoom level as the predefined zoom level, the indication (e.g., 622*c* and/or 622*e*-622*g*) (e.g., 0.5×, 1×, 2×, 3×, 24 mm, 28 mm, and/or 35 mm) of the current setting that corresponds to the predefined zoom level includes the first zoom level (and does not include the second zoom level). In some embodiments, in accordance with a determination that a user has selected the first zoom level as the predefined zoom level, the indication (e.g., 622*c* and/or 622*e*-622*g*) (e.g., 0.5×, 1×, 2×, 3×, 24 mm, 28 mm, and/or 35 mm) of the current setting that corresponds to the predefined zoom level includes the second zoom level (and does not include the first zoom level). In some embodiments, the first zoom level includes a character and/or measurement (e.g., x vs. mm) that is not included in the second zoom level, or vice-versa. Displaying different indications of the current setting that corresponds to the predefined zoom level that includes different zoom levels when prescribed conditions are met provides visual feedback concerning the zoom level that corresponds to the predefined zoom level, which provides improved visual feedback to the user.

In some embodiments, the respective selectable control (e.g., 622*c* and/or 622*e*-622*g*) is displayed with a first appearance (e.g., that indicates that a native zoom level for the camera (e.g., that is different from the predefined zoom level)) before detecting the selection input directed to the respective selectable control. In some embodiments, in response to detecting the selection input (e.g., 850*c*1, 850*d*, 850*f*1, and/or 850*i*2) directed to the respective selectable control, changing the appearance of the respective selectable control (e.g., 622*c* and/or 622*e*-622*g*, such that the respective selectable control is displayed with a second appearance (e.g., that indicates that a predefined zoom level for the camera (e.g., that is different from the native zoom level)) that is different from the first appearance. In some embodiments, selecting the predefined zoom level as the current zoom level for the camera includes changing the current zoom level for the camera from a previous zoom level to the predefined zoom level. In some embodiments, the previous zoom level is different from the predefined zoom level. In some embodiments, in response to detecting the selection input directed to the respective selectable control, the computer system changes a zoom level of a representation of the field-of-view of at least the camera (e.g., from the previous zoom level to the predefined zoom level). Changing the appearance of the respective selectable control in response to detecting the selection input directed to the respective selectable control provides visual feedback that the respective selectable control has been selected, which provides improved visual feedback to the user.

In some embodiments, the camera is a fixed focal length camera (e.g., as discussed above in relation to FIGS. 8A-8J). In some embodiments, a native zoom level (e.g., as discussed above in relation to FIGS. 8A-8J) (e.g., 622*b* and/or 622*f*) (e.g., a zoom level that corresponds to the fixed focal length of the camera) for the camera was selected as the current zoom level for the camera before detecting the selection input directed to the respective selectable control (e.g., 622*c* and/or 622*e*-622*g*). In some embodiments, the native zoom level is different from the predefined zoom level (e.g., 622*e* and/or 622*g*). In some embodiments, while the first zoom level (e.g., 622*b* and/or 622*f*) (or the second zoom level) (e.g., the predefined zoom level) is selected as the current zoom level for the camera, the computer system (e.g., 600) detects a second selection input (e.g., a tap input or, in some embodiments, a non-tap input (e.g., a dragging input, a mouse click, a gaze input, and/or a press-and-hold input)) directed to the respective selectable control. In some embodiments, in response to detecting the second selection input (e.g., 850*c*1, 850*d*, 850*f*1, and/or 850*i*2) directed to the respective selectable control, the computer system (e.g., 600) selects the native zoom level as the current zoom level for the camera in response to detecting (e.g., directly in response to detecting) the second selection input directed to the respective selectable control. In some embodiments, in response to detecting the selection input directed to the respective selectable control, the computer system changes the appearance of the respective selectable control to indicate the native zoom level without indicating the predefined zoom level. In some embodiments, before detecting the selection input directed to the respective selectable control, the appearance of the respective selectable control has an appearance that indicates the predefined zoom level without indicating the native zoom level. Selecting the native zoom level as the current zoom level for the camera in response to detecting the second selection input directed to the respective selectable control in response to detecting the second selection input directed to the respective selectable control provides the user with control over whether the native zoom level is selected as the current zoom level for the camera, which provides additional control options without cluttering the user interface with additional displayed controls.

In some embodiments, the computer system (e.g., 600) receives a request to display the camera user interface while the respective selectable control corresponds to a native zoom level. In some embodiments, in response to receiving the request: in accordance with a determination that a user has selected the native zoom level as the predefined zoom level (e.g., a default setting is set to an off state), displaying, via the display generation component, the respective selectable control (e.g., 622*b* and/or 622*e*) with a first visual representation (e.g., appearance of (e.g., 622*b* or 622*e*) of the native zoom level (e.g., lx) (e.g., as discussed above in relation to FIGS. 8C-8L). In some embodiments, in response to receiving the request: in accordance with a determination that a user has selected a first zoom level, different from the native zoom level (e.g., a default setting is set to an on state), displaying, via the display generation component, the respective selectable control (e.g., 622*b* and/or 622*e*) with a second representation (e.g., appearance of (e.g., 622*b* or 622*e*) of the native zoom level (e.g., 24 MM) that is different from the first representation of the native zoom level (e.g., as discussed above in relation to FIGS. 8C-8L). Displaying the respective selectable control with a first representation or the second representation when prescribed conditions are met provides the user with visual feedback concerning whether the predefined zoom level has been selected to be the default or not, which provides improved visual feedback and performs an operation when a set of conditions has been met without requiring further user input.

In some embodiments, the plurality of selectable controls (e.g., 622) includes a fourth selectable control (e.g., 622*a*) that corresponds to a fourth zoom level. In some embodiments, while the first zoom level is selected as the current zoom level for the camera (e.g., in response to detecting (e.g., directly in response to detecting) the selection input directed to the respective selectable control), the computer system (e.g., 600) detects an input (e.g., 850*p*) (e.g., a tap input or, in some embodiments, a non-tap input (e.g., a dragging input, a mouse click, a gaze input, and/or a press-and-hold input)) that is directed to the fourth selectable control. In some embodiments, in response to detecting the input directed to the fourth selectable control, the computer system (e.g., 600) selects the fourth zoom level as the current zoom level (e.g., in response to detecting the input directed to the fourth selectable control) while continuing to maintain the first zoom level as the zoom level associated with the respective selectable control (and/or while continuing to display the respective control with an indication of the predefined zoom level) (e.g., as discussed above in relation to FIGS. 8P-8Q). Selecting the fourth zoom level as the current zoom level while continuing to maintain the first zoom level as the predefined zoom level in response to detecting the input directed to the fourth selectable control provides the user with control over whether the fourth zoom level is selected as the current zoom level for the camera without modifying the predefined zoom level, which provides additional control options without cluttering the user interface with additional displayed controls without impacting the predefined zoom level.

In some embodiments, while displaying the plurality of selectable control, the computer system (e.g., 600) detects an input (e.g., a dragging input or, in some embodiments, a non-drag input (e.g., a tap and drag input, a mouse click and drag input, a gaze input, and/or a press-and-hold input)) directed to the plurality of selectable controls. In some embodiments, while detecting the input directed to the plurality of selectable controls: computer system (e.g., 600) detects a first portion of the input directed to the plurality of selectable controls. In some embodiments, while detecting the input directed to the plurality of selectable controls: in response to detecting the first portion (e.g., a tap input and/or a stationary input, such as a mouse click, an air gesture, and/or a long press) of the input (e.g., 850*k* and/or 850*l*) directed to the plurality of selectable controls, the computer system (e.g., 600) selects a first zoom level that does not correspond to the plurality of selectable controls as the current zoom level for the camera. In some embodiments, in response to detecting the first portion of the input directed to the plurality of selectable controls, the computer system displays a user interface object, such as zoom wheel.

In some embodiments, while detecting the input directed to the plurality of selectable controls: after selecting the first zoom level that does not correspond to the plurality of selectable controls as the current zoom level for the camera, the computer system (e.g., 600) detects a second portion of the input (e.g., 850*k* and/or 850*l*) directed to the plurality of selectable controls (e.g., as discussed above in relation to FIGS. 8K-8O).

In some embodiments, while detecting the input directed to the plurality of selectable controls: in response to detecting the second portion (e.g., a swipe input and/or a movement input, such as a mouse and drag input, a dragging input, and/or an air gesture) of the input directed to the plurality of selectable controls, the computer system (e.g., 600) selects a second zoom level that does not correspond to the plurality of selectable controls as the current zoom level for the camera (e.g., as discussed above in relation to FIGS. 8K-8O). In some embodiments, the first zoom level that does not correspond to the plurality of selectable controls is different from the second zoom level that does not correspond to the plurality of selectable controls. In some embodiments, in response to detecting the second portion of the input directed to the plurality of selectable controls, the computer system moves the user interface object, such as zoom wheel and/or an adjustable control. In some embodiments, the adjustable control includes an indication of a digital zoom level and/or an indication of a native zoom level. In some embodiments, each of the plurality of visual indicators has a unique visual characteristic that is different from the other visual indicators (e.g., unique text (e.g., 0.5×, 1×, 24 MM, 28 MM, 35 MM, 2×, and/or 3×), colors, sizes). In some embodiments, dynamically updating display of a representation to a particular zoom level when a particular zoom affordance is selected provides the user with feedback about the change in zoom level of the updated representation that corresponds to the particular zoom affordance. Selecting a second zoom level that does not correspond to the plurality of selectable controls as the current zoom level for the camera response to detecting the second portion of the input directed to the plurality of selectable controls provides the user with control to select zoom level that do not correspond to the plurality of selectable controls, which provides additional control options without cluttering the user interface with additional displayed controls without impacting the predefined zoom level.

In some embodiments, while detecting the input directed to the plurality of selectable controls, the computer system (e.g., 600) detects a third portion of the input directed to the plurality of selectable controls (e.g., as discussed above in relation to FIGS. 8K-8O). In some embodiments, in response to detecting the third portion of the input (e.g., 850*k* and/or 850*l*) directed to the plurality of selectable controls: in accordance with a determination that a location of the input directed to the plurality of selectable controls is within a predetermined distance from a location of a representation of a third zoom level (e.g., that does not correspond to the plurality of selectable controls), the computer system (e.g., 600) selects the third zoom level that does not correspond to the plurality of selectable controls as the current zoom level for the camera. In some embodiments, the location of the input directed to the plurality of selectable controls is different from the location of the representation of the third zoom level that does not corresponds to the plurality of selectable controls (e.g., as discussed above in relation to FIGS. 8K-8O). In some embodiments, in response to detecting the third portion of the input (e.g., 850*k* and/or 850*l*) directed to the plurality of selectable controls: in accordance with a determination that a location of the input directed to the plurality of selectable controls is not within a predetermined distance from a location of a representation of the third zoom, the computer system (e.g., 600) sets a different zoom level other than the third zoom level as the current zoom level for the camera (e.g., as discussed above in relation to FIGS. 8K-8O). In some embodiments, the computer system snaps a selection indication (e.g., a mark and/or a selector) to a location that corresponds to the third zoom level.

In some embodiments, the predefined zoom level (e.g., as indicated by 622*e* and/or 622*g*) is a digital zoom of a fixed focal length camera (e.g., as discussed above in relation to the third selectable control of method 700). Selecting a predefined zoom level that is a digital zoom level as a current zoom level for the camera provides a user with control over the computer system to set a predefined zoom level that the computer system is configured to capture media in response to detecting the selection input directed to the respective selectable control, which provides additional control options without cluttering the user interface with additional displayed controls.

In some embodiments, while the first zoom level is selected as the current zoom level, the computer system (e.g., 600) detects a request to capture media (e.g., 850*i*1 and/or 850*j*). In some embodiments, in response to detecting the request to capture media: computer system (e.g., 600) initiates capture of media at the first zoom level using the camera. In some embodiments, in response to detecting the request to capture media: computer system (e.g., 600) generates captured media at the first zoom level that has a resolution that is approximately the same as (e.g., equal to, equivalent to, within a threshold of (e.g., a threshold aspect ratio and/or a threshold number and/or percentage (e.g., 80%, 85%, 90%, 95%, 97%, or 99%) of pixels)) a resolution of media that is captured at a native zoom level of the camera (e.g., as discussed in relation to FIGS. 8I-8J and 8W-8X). Generating captured media at the first zoom level that has a resolution that is approximately the same as a resolution of media that was captured at a native zoom level of the camera in response to detecting the request to capture media allows the computer system to provide media with similar resolutions, which provides additional control options without cluttering the user interface and reduces the number of inputs needed to generate media using different zoom levels with similar resolutions.

In some embodiments, generating the captured media at the first zoom level that has the resolution that is approximately the same as the resolution of media that was captured at a native zoom level of the camera includes unbinning portions (e.g., pixels) of the captured media at the first zoom level (e.g., as discussed above in relation to FIGS. 8W-8X).

In some embodiments, before displaying the camera user interface, the computer system (e.g., 600) displays, via the display generation component, a settings user interface that includes a control (e.g., 822) for setting the predefined zoom level. In some embodiments, while displaying the settings user interface that includes the control for setting the predefined zoom level, the computer system (e.g., 600) detects an input (e.g., 850*c*2, 850*e*, 850*f*3, and/or 850*g*) (e.g., a tap input or, in some embodiments, a non-tap input (e.g., a dragging input, a mouse click, a gaze input, and/or a press-and-hold input)) directed to the control for setting the predefined zoom level. In some embodiments, in response to detecting the input directed to the control for setting the predefined zoom level, the computer system (e.g., 600) sets the predefined zoom level to a first selected zoom level (e.g., as discussed above in relation to FIGS. 8C-8L). Setting the predefined zoom level to a first selected zoom level in response to detecting the input directed to the control for setting the predefined zoom level provides the user with control over the computer system to set the predefined zoom level, which provides additional control options without cluttering the user interface.

In some embodiments, the settings user interface includes a sample representation (e.g., 830) that includes a first cropping indication (e.g., 808*a*-808*c*) and a second cropping indication (e.g., 808*a*-808*c*). In some embodiments, the first cropping indication indicates how the sample representation would be cropped at a second selected zoom level. In some embodiments, the second cropping indication indicates how the sample representation would be cropped at a third selected zoom level that is different from the second selected zoom level. Displaying a sample representation that includes a first cropping indication and a second cropping indication with different indications indicating how the sample representation would be cropped at different zoom level provides the user with feedback concerning how media would be cropped at different zoom levels, which provides improved visual feedback to the user.

In some embodiments, the control (e.g., 822*a*-822*c* and/or 824-824*c*) for setting the predefined zoom level is displayed with an indication (e.g., 822*a*-822*c*) of a fourth selectable zoom level before detecting the input (e.g., 850*c*2 and/or 850*e*) (e.g., a tap input or, in some embodiments, a non-tap input (e.g., a dragging input, a mouse click, a gaze input, and/or a press-and-hold input)) directed to the control for setting the predefined zoom level. In some embodiments, in response to detecting the input (e.g., 850*c*2 and/or 850*e*) directed to the control for setting the predefined zoom level, the computer system (e.g., 600) displays, via the display generation component, the control (e.g., 822*a*-822*c* and/or 824-824*c*) for setting the predefined zoom level with an indication (e.g., 822*a*-822*c* and/or 824-824*c*) of the first selectable zoom level that is different from the fourth selectable zoom level (e.g., while ceasing to display the indication of the fourth zoom level). Displaying the control for setting the predefined zoom level with an indication of the first selectable zoom level that is different from the fourth selectable zoom level in response to detecting the input directed to the control for setting the predefined zoom level provides the user with control over the computer system to set the predefined zoom level, which provides additional control options without cluttering the user interface.

Note that details of the processes described above with respect to method 1000 (e.g., FIG. 10 are also applicable in an analogous manner to the methods described herein. For example, method 1000 optionally includes one or more of the characteristics of the various methods described herein with reference to method 700. For example, the computer system can capture media with a resolution using the techniques described in relation to method 700 at a chosen zoom level set using one or more techniques described in relation to method 1000. For brevity, these details are not repeated below.

FIGS. 11A-11M illustrate exemplary user interfaces for managing media stabilization in accordance with some embodiments. The user interfaces in these figures are used to illustrate the processes described below, including the processes in FIG. 12.

Figures 11A, 11B:
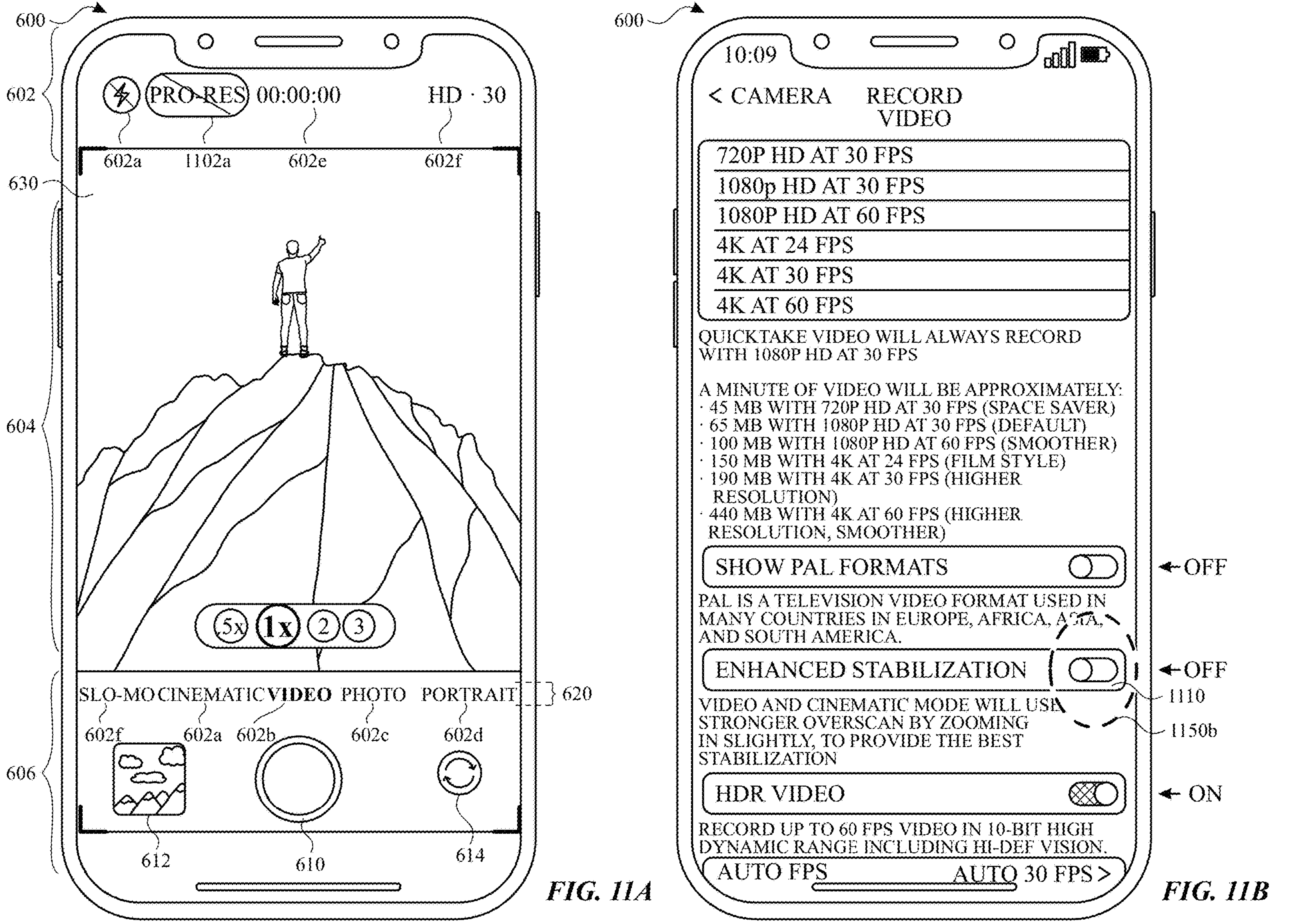
FIGS. 11A-11M exemplary user interfaces for managing media stabilization in accordance with some embodiments.

FIG. 11A illustrates computer system 600 displaying a camera user interface, which includes indicator region 602, camera display region 604, and control region 606. Indicator region 602 includes flash indicator 602*a*, professional resolution indicator 1102*a*, time indicator 602*e*, and video capture indicator 602*f*. In FIG. 11A, flash indicator 602*a* indicates that the flash mode is off, so a flash operation will not be used when computer system 600 is capturing media. In response to detecting an input directed to flash indicator 602*a*, computer system 600 changes flash indicator 602*a* to indicate that the flash operation will be used when computer system 600 is captured media. In FIG. 11A, professional resolution indicator 1102*a* indicates that the computer system 600 not configured to generate video media that has an enhanced resolution (e.g., a resolution that is higher than the resolution at which computer system 600 generates captured video media when the indicator is in a disabled state). At FIG. 11A, professional resolution indicator 1102*a* is displayed because professional resolution control 690*c* of FIGS. 6J-6K is in the on state. When professional resolution control 690*c* of FIGS. 6J-6K is not in the on state, computer system 600 does not display professional resolution indicator 1102*a*. In response to detecting an input directed to professional resolution indicator 1102*a*, computer system 600 is configured to generate video media that has the enhanced resolution. In FIG. 11A, time indicator 602*e* indicates the capture time that is associated with video media. Because computer system 600 is not capturing video media at FIG. 11A, time indicator 602*e* indicates that zero seconds of video capture has occurred. Video capture indicator 602*f* indicates a resolution (e.g., "HD") and frame-per-second ("30") at which computer system 600 is configured to capture video media. In response to detecting an input directed to video capture indicator 602*f*, the resolution and frames-per-second at which computer system 600 is configured to capture video media is updated (e.g., "HD and/or 4K" at "60 and/or 120" frames-per-second). Camera display region 604 includes live preview 630, which is displayed using one or more techniques discussed above (e.g., at FIG. 6B). Control region 606 includes shutter control 610, a representation of media collection 612 (e.g., which is a representation of the most recently captured media item), and camera switcher control 614, which are displayed using one or more techniques discussed above in relation to FIG. 6B. In FIG. 11A, control region 606 also includes camera mode controls 620. Camera mode controls 620 include slow-motion mode control 620*f*, cinematic video mode control 620*a*, video mode control 620*b*, photo mode control 620*c*, and portrait mode control 620*d*. In FIG. 11A, video mode control 620*b* is displayed as being selected, using one or more techniques as described above in relation to FIG. 6B. Thus, at FIG. 11A, computer system 600 is currently operating in the video mode (e.g., where computer system 600 captures video media in response to detecting an input on shutter control 610 and/or a request to capture media).

Figures 11C, 11D:
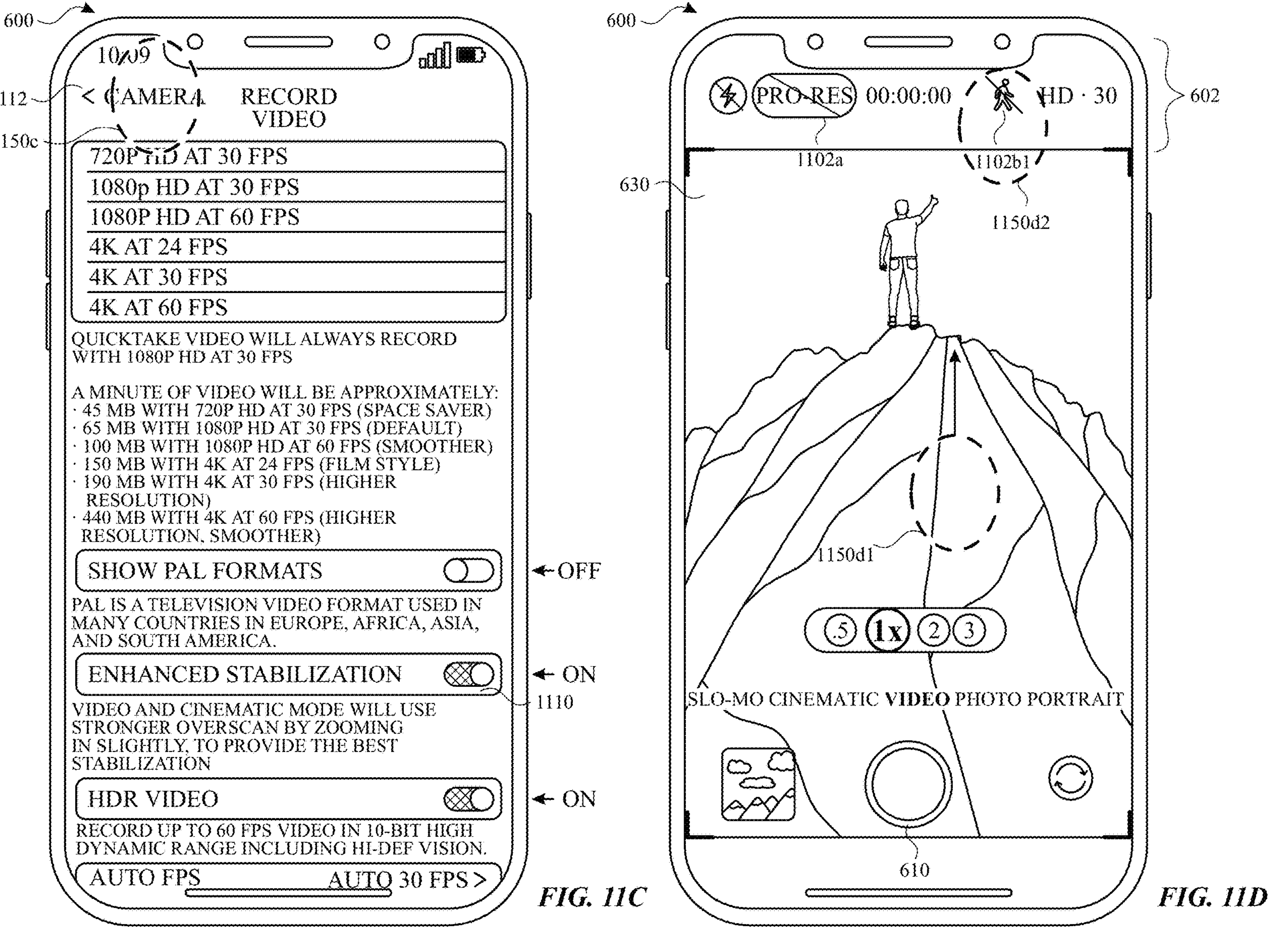

FIG. 11B illustrates computer system 600 displaying a settings user interface. The settings user interface includes enhanced stabilization control 1110, which is currently in the off state. While enhanced stabilization control 1110 is in the off state, computer system 600 is not configured to use (e.g., to optionally use) enhanced stabilization when capturing video media. At FIG. 11B, computer system 600 detects tap input 1150*b* on enhanced stabilization control 1110. As illustrated in FIG. 11C, in response to detecting tap input 1150*b*, computer system 600 displays enhanced stabilization control 1110 in the on state. Moreover, in response to detecting tap input 1150*b*, computer system 600 is configured to capture video media with (e.g., optionally with) enhanced stabilization. At FIG. 11C, computer system 600 detects tap input 1150*c* on exit control 1112.

As illustrated in FIG. 11D, after detecting tap input 1150*c* on exit control 1112, computer system 600 re-displays the camera user interface. At FIG. 11D, computer system 600 updates indicator region 602 to include stabilization indicator 1102*b*1 because computer system 600 is configured to capture video media with (e.g., optionally with) enhanced stabilization. In some embodiments, stabilization indicator 1102*b*1 is displayed at the location at which professional resolution indicator 1102*a* is displayed in FIG. 11D when professional resolution indicator 1102*a* is not displayed (and/or when professional resolution control 690*c* of FIGS. 6J-6K is not in the on state). At FIG. 11D, computer system 600 detects upward swipe input 1150*d*1 on live preview 630 and/or detects tap input 1150*d*2 on stabilization indicator 1102*b*1. In some embodiments, in response to detecting tap input 1150*d*2, computer system 600 displays the user interface of FIG. 11F.

Figures 11E, 11F:
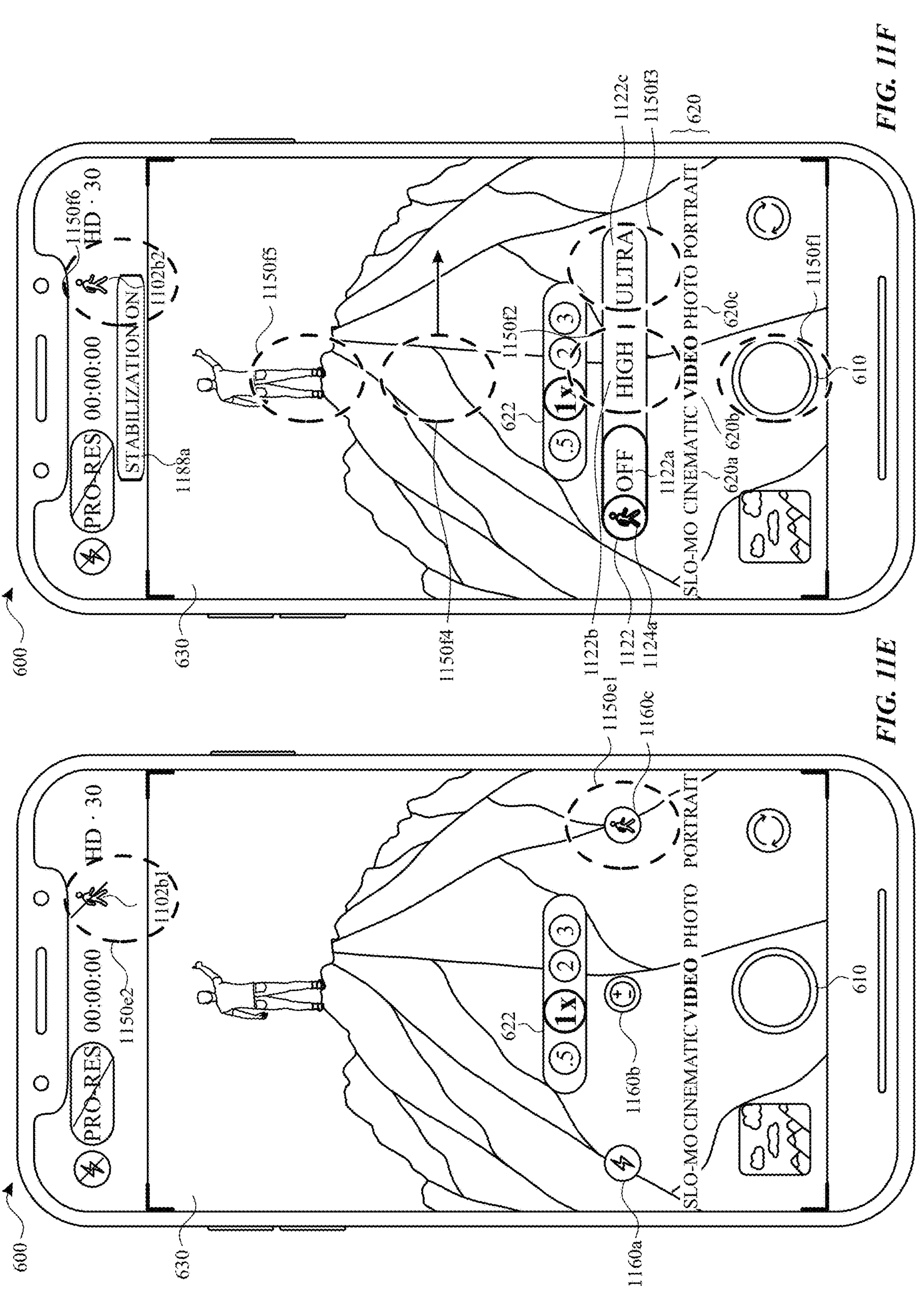

As illustrated in FIG. 11E, in response to detecting upward swipe input 1150*d*1, computer system 600 displays a group of camera setting controls for the video mode. As illustrate in FIG. 11E, camera setting controls include flash setting control 1106*a*, exposure setting control 1160*b*, and stabilization setting control 1160*c*. In some embodiments, in response to detecting an input on flash setting control 1106*a*, computer system 600 displays one or more of a flash-on control (e.g., for turning the flash mode on), a flash-off control (e.g., for turning the flash mode off), and/or an automatic-flash-on control (e.g., for allowing the computer system to automatically turn the flash mode on and/or off based on environmental conditions). In some embodiments, in response to detecting an input on exposure setting control 1160*b*, computer system 600 displays a control (e.g., slider) for setting an exposure compensation. At FIG. 11E, computer system 600 detects tap input 1150*e*1 on stabilization setting control 1160*c* and/or detects tap input 1150*e*2 on stabilization indicator 1102*b*1.

As illustrated in FIG. 11F, in response to detecting tap input 1150*e*1 or tap input 1150*e*2 (or tap input 1150*d*2 of FIG. 11D), computer system 600 moves zoom controls 622 up (e.g., from the location that zoom controls 622 was displayed at FIG. 11D) and displays stabilization control 1122 at the location at which zoom controls 622 was displayed at FIG. 11D. Stabilization control 1122 includes off-stabilization control 1122*a*, high-stabilization control 1122*b*, and ultra-stabilization control 1122*c*. At FIG. 11F, off-stabilization control 1122*a* is selected (e.g., as indicated as off-stabilization control 1122*a*). As illustrated in FIG. 11F, in response to detecting tap input 1150*e*1 or tap input 1150*e*2 (or tap input 1150*d*2 of FIG. 11D), computer system 600 changes the appearance of the stabilization indicator (e.g., replaces stabilization indicator 1102*b*1 with stabilization indicator 1102*b*2) to indicate that a stabilization mode is in an active state (e.g., removes slash in FIG. 11E from the stabilization indicator at FIG. 11F). In response to detecting tap input 1150*e*1 or tap input 1150*e*2 (or tap input 1150*d*2 of FIG. 11D), computer system 600 displays stabilization banner notification 1188*a*, which indicates that computer system 600 is operating (e.g., or has or will begin to operate) in the stabilization mode (e.g., "Stabilization On"). In some embodiments, computer system 600 ceases to display banner notification 1188*a* after a predetermined period of time (e.g., 1-10 seconds) (e.g., while computer system 600 continues to operate in the stabilization mode). In some embodiments, computer system 600 ceases to display banner notification 1188*a* to conserve screen real estate and/or to reduce the number of visual distractions (e.g., so that the user can focus on capturing visual content displayed via live preview 630). At FIG. 11F, computer system 600 detects tap input 1150*f*1 on shutter control 610 (e.g., as discussed below in relation to FIG. 11G), tap input 1150*f*2 on high-stabilization control 1122*b* (e.g., as discussed below in relation to FIG. 11H), tap input 1150*f*3 on ultra-stabilization control 1122*c* (e.g., as discussed below in relation to FIG. 11J), rightward swipe input 1150*f*4 on live preview 630 (e.g., as discussed below in relation to FIG. 11K), leftward swipe input 1150*f*5 on live preview 630 (e.g., as discussed below in relation to FIG. 11M), and tap input 1150*f*6 on stabilization indicator 1102*b*2. In some embodiment, the banner is displayed adjacent to the camera preview. In some embodiments, the banner is displayed overlapping at least a portion of the camera preview.

Figures 11G, 11H:
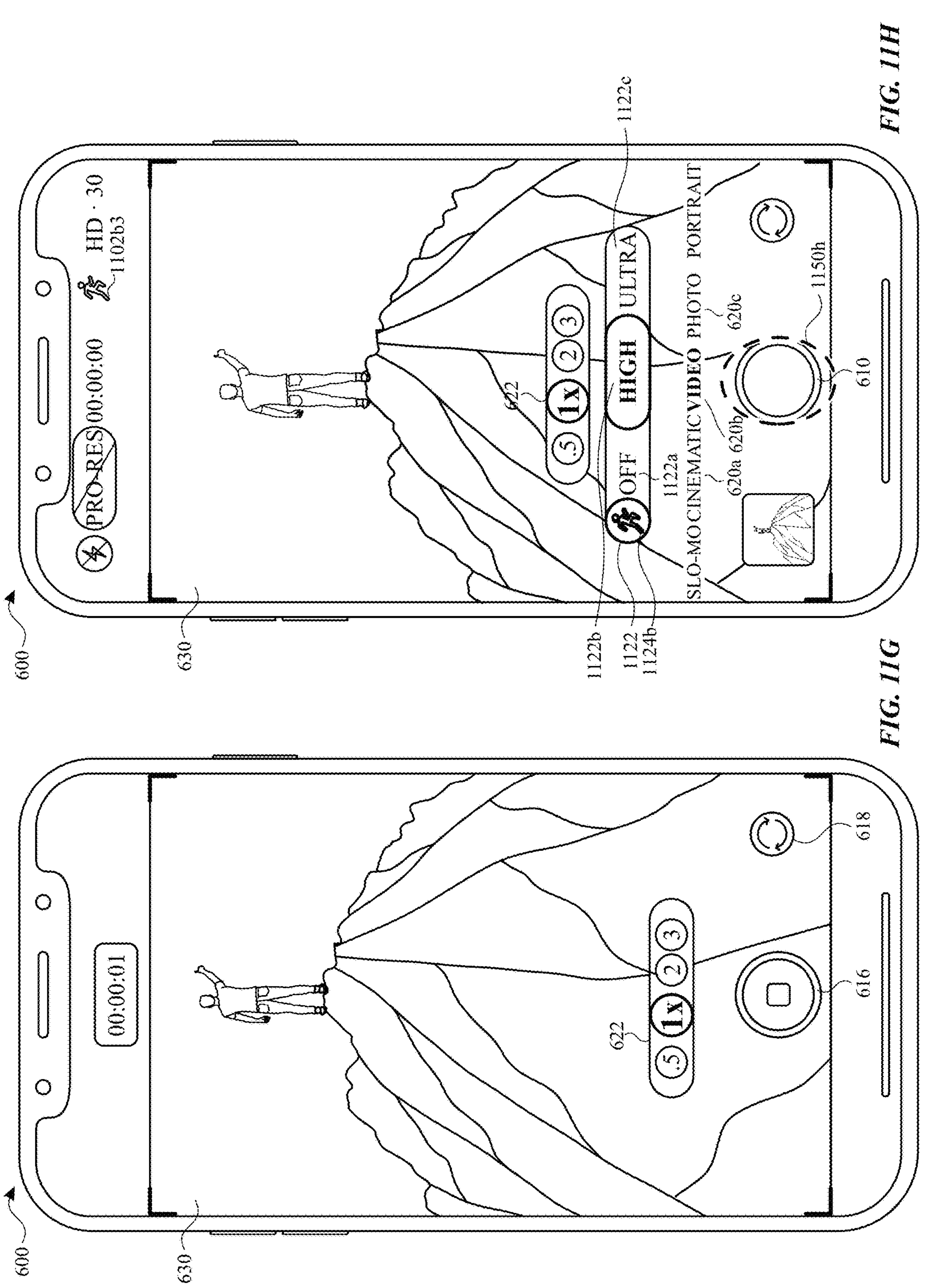

As illustrated in FIG. 11G, in response to detecting tap input 1150*f*1 on shutter control 610, computer system 600 captures video media according to off-stabilization control 1122*a* of FIG. 11F (e.g., because off-stabilization control 1122*a* was selected (e.g., bolded) when tap input 1150*f*1 was detected) being selected. As illustrated in FIG. 11G, in response to detecting tap input 1150*f*1 on shutter control 610, computer system 600 ceases to display one or more controls (e.g., including stabilization control 122) and indicators (e.g., stabilization indicator 1102*b*1). While capturing media according to off-stabilization control 1122*a* being selected, computer system 600 captures video media with a normal degree of stabilization and/or the stabilization that computer system 600 uses to capture video media when enhanced stabilization control 1110 of FIG. 11B is in the off state (e.g., the computer system is not configured to optionally capture video media with enhanced stabilization). In some embodiments, computer system 600 applies a digital zoom (e.g., 0.1-0.5 more zoom than the zoom level (e.g., "1×" at FIG. 11G as indicated by zoom control 622*b* being selected) at which the video is captured) to generated (and/or captured) media with the normal degree of stabilization and/or according to off-stabilization control 1122*a* of FIG. 11F being selected.

As illustrated in FIG. 11H, in response to detecting tap input 1150*f*2 on high-stabilization control 1122*b* at FIG. 11F, computer system 600 displays high-stabilization control

Figures 11I, 11J:
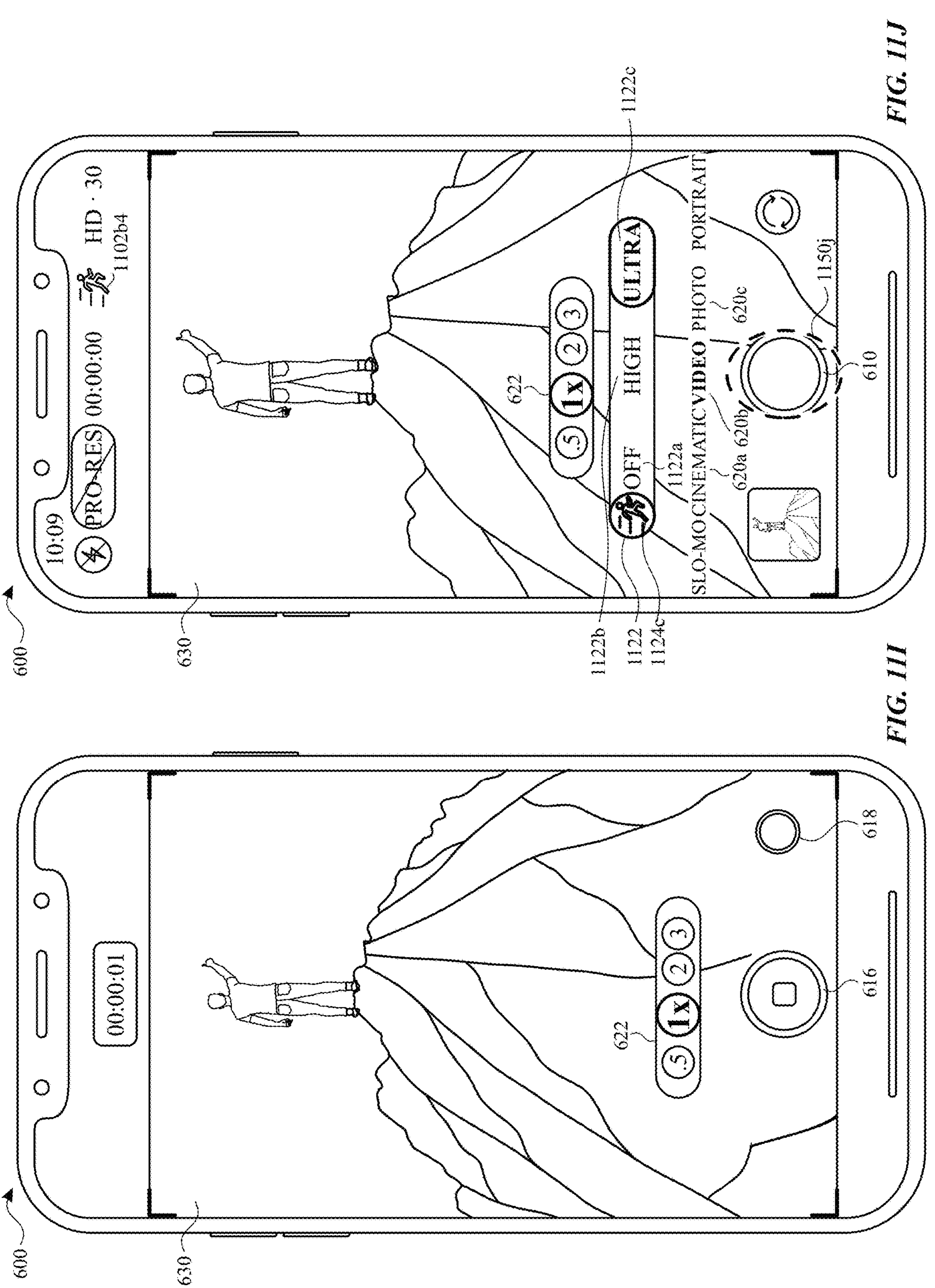

1122*b* as being selected and zooms into live preview 630 (e.g., because computer system 600 is using a greater zoom level to apply the high stabilization than computer system 600 used to apply the normal stabilization). In addition, computer system 600 replaces stabilization indicator 1102*b*2 with stabilization indicator 1102*b*3 (and replaces indicator 1124*a* with indicator 1124*b*) to indicate that high-stabilization control 1122*b* is selected (e.g., indicators changed from including a walking icon at FIG. 11F to including running icon at FIG. 11H). At FIG. 11H, in response to detecting tap input 1150*f*2, computer system 600 is configured to capture media according to high-stabilization control 1122*b* being selected. At FIG. 11H, computer system 600 detects tap input 1150*h* on shutter control 610. As illustrated in FIG. 11I, in response to detecting tap input 1150*h*, computer system 600 captures video media according to high-stabilization control 1122*b* of FIG. 11H (e.g., because high-stabilization control 1122*b* was selected (e.g., bolded) when tap input 1150*h* was detected) being selected. As illustrated in FIG. 11I, in response to detecting tap input 1150*h*, computer system 600 ceases to display one or more controls and indicators. While capturing media according to high-stabilization control 1122*b* being selected, computer system 600 captures video media with a higher degree of stabilization than the normal degree of stabilization (e.g., as discussed above). In some embodiments, computer system 600 applies more digital zoom (e.g., 0.1-0.5 more digital zoom than the digital zoom that is applied with the normal degree of stabilization) (e.g., represented by the zoom level of live preview 630 changing at FIG. 11H).

Figures 11K, 11L:
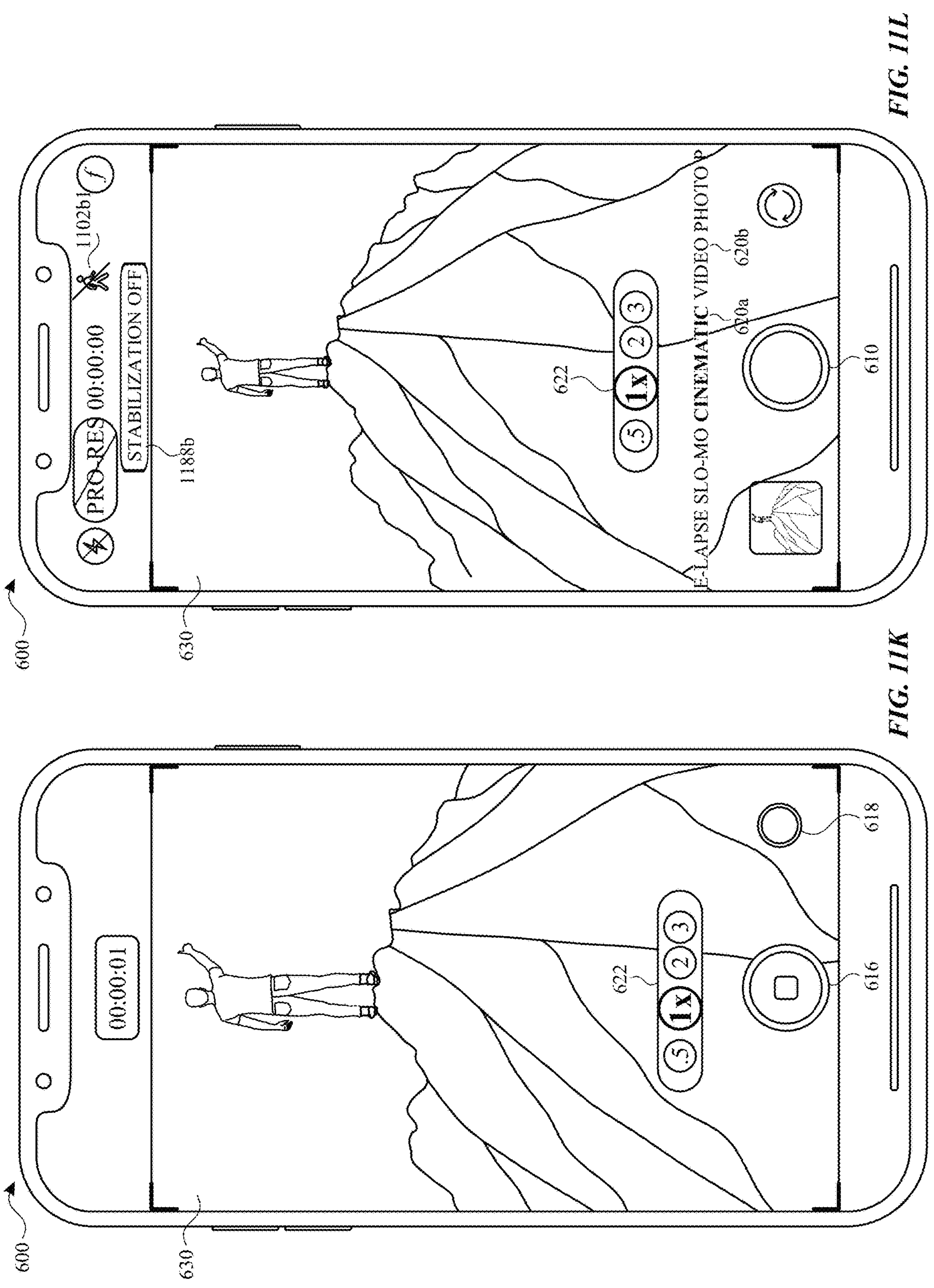

As illustrated in FIG. 11J, in response to detecting tap input 1150*f*3 on ultra-stabilization control 1122*c* at FIG. 11F, computer system 600 displays ultra-stabilization control 1122*c* as being selected and zooms into live preview 630 (e.g., because computer system 600 is using a greater zoom level to apply the ultra stabilization than computer system 600 used to apply the high stabilization). In addition, computer system 600 replaces stabilization indicator 1102*b*2 with stabilization indicator 1102*b*4 (and replaces indicator 1124*a* with indicator 1124*c*) to indicate that ultra-stabilization control 1122*b* is selected (e.g., icon changed from a walking icon at FIG. 11F to a running icon with wind at FIG. 11J). Stabilization indicator 1102*b*3 (and indicator 1124*c*) of FIG. 11J has a different appearance than stabilization indicator 1102*b*2 (and indicator 1124*b*) of FIG. 11H to indicate that a higher degree of stabilization will be applied to video media when the computer system is configured to capture media with the ultra-stabilization than the degree of stabilization that is applied when the computer system is configured to capture media with the high degree of stabilization. At FIG. 11J, in response to detecting tap input 1150*f*3, computer system 600 is configured to capture media according to ultra-stabilization control 1122*c* being selected. At FIG. 11J, computer system 600 detects tap input 1150*j* on shutter control 610. As illustrated in FIG. 11K, in response to detecting tap input 1150*j*, computer system 600 captures video media according to ultra-stabilization control 1122*c* of FIG. 11K (e.g., because ultra-stabilization control 1122*c* was selected (e.g., bolded) when tap input 1150*j* was detected) being selected. As illustrated in FIG. 11K, in response to detecting tap input 1150*j*, computer system 600 ceases to display one or more controls and indicators. While capturing media according to ultra-stabilization control 1122*c* being selected, computer system 600 captures video media with a higher degree of stabilization than the degree of stabilization that computer system 600 captures media with according to high-stabilization control 1122*c* being selected. In some embodiments, computer system 600 applies more digital zoom (e.g., 0.1-0.5 more digital zoom than the digital zoom that is applied with the high degree of stabilization) (e.g., represented by the zoom level of live preview 630 changing at FIG. 11H). In some embodiments, in response to detecting a tap input on high-stabilization control 1122*b* at FIG. 11J, computer system 600 displays the user interface of FIG. 11H and zooms out of live preview 630.

As illustrated in FIG. 11L, in response to detecting rightward swipe input 1150*f*4 on live preview 630 at FIG. 11F, computer system 600 displays cinematic video mode control 620*a* as being selected. At FIG. 11L, in response to detecting rightward swipe input 1150*f*4, computer system 600 is configured to capture cinematic video media (e.g., and/or to operate in the cinematic video mode). While computer system 600 is configured to capture cinematic video media, computer system 600 continues to display stabilization indicator 1102*b*1 (e.g., because the computer system is configured to capture video). Moreover, in response to detecting tap input 1150*f*6 on stabilization indicator 1102*b*1 at FIG. 11F, computer system 600 replaces stabilization indicator 1102*b*2 with stabilization indicator 1102*b*1 to indicate that the stabilization mode is in the inactive state (e.g., adds a slash to stabilization indicator 1102*b*1 at FIG. 11L that was not there in FIG. 11F). In response to detecting tap input 1150*f*6, computer system 600 displays stabilization banner notification 1188*b*, which indicates that computer system 600 is no longer operating in the stabilization mode (e.g., "Stabilization Off"). In some embodiments, computer system 600 ceases to display banner notification 1188*b* after a predetermined period of time (e.g., 1-10 seconds).

Figure 11M:
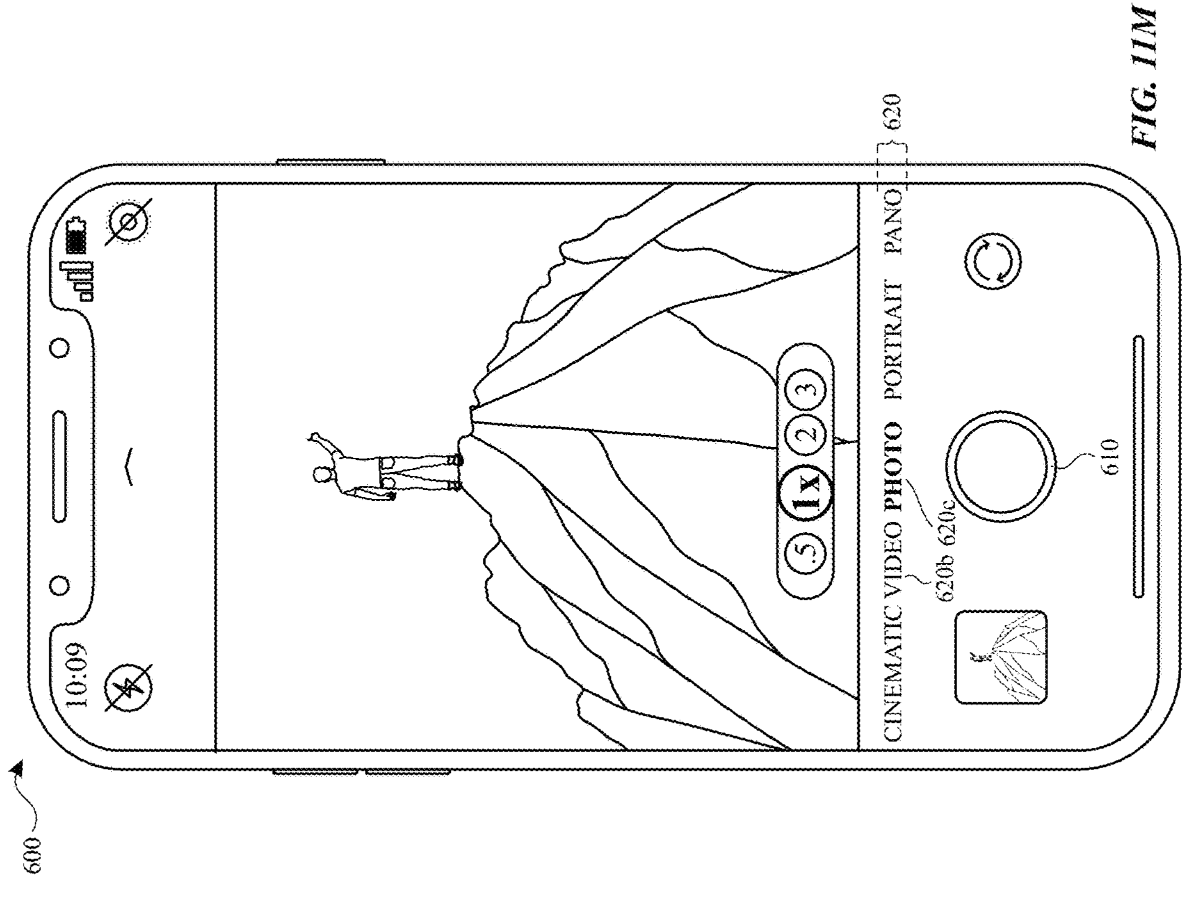

As illustrated in FIG. 11M, in response to detecting leftward swipe input 1150*f*5 on live preview 630 at FIG. 11F, computer system 600 displays photo mode control 620*c* as being selected. At FIG. 11M, in response to detecting leftward swipe input 1150*f*, computer system 600 is configured to capture photo media (e.g., and/or to operate in photo mode). While computer system 600 is configured to capture photo media, computer system 600 does not display a stabilization indicator (e.g., because the computer system is not configured to capture video).

FIG. 12 is a flow diagram illustrating a method for managing media stabilization using a computer system in accordance with some embodiments. Method 1200 is performed at a computer system (e.g., 100, 300, 500, and/or 600) (e.g., a smartwatch, a wearable electronic device, a smartphone, a desktop computer, a laptop, or a head mounted device (e.g., a head mounted augmented reality and/or extended reality device))) has one or more cameras (e.g., one or more cameras (e.g., dual cameras, triple camera, quad cameras, etc.) on the same side or different sides of the electronic device (e.g., a front camera and/or a back camera))) (e.g., one or more 12 MP-48 MP cameras) (e.g., one or more 13 MM, 24 MM, 28 MM, 32 MM, 38 MM, and/or 77 MM focal length cameras) (e.g., one or more fixed focal length cameras, as described above in relation to method 700), where the computer system (e.g., 600) is in communication with (and/or includes) a display generation component (e.g., a display controller, a touch-sensitive display system, and/or a head mounted display system): In some embodiments, the computer system includes and/or in communication with one or more input devices (e.g., a touch-sensitive surface and/or a first camera of one or more cameras (e.g., one or more cameras (e.g., dual cameras, triple camera, quad cameras, etc.) on the same side or different sides of the computer system (e.g., a front camera, a back camera))). In some embodiments, the computer system includes and/or includes one or more output devices (e.g., speakers, display generation components, and/or haptic output devices). Some operations in method 1300 are, optionally, combined, the orders of some operations are, optionally, changed, and some operations are, optionally, omitted.

As described below, method 1200 provides an intuitive way for managing media stabilization. The method reduces the cognitive burden on a user for managing media stabilization, thereby creating a more efficient human-machine interface. For battery-operated computing devices, enabling a user to manage media stabilization faster and more efficiently conserves power and increases the time between battery charges.

While the computer system (e.g., 600) is configured to capture video media with a first degree of stabilization (e.g., as indicated by 1122*a*, 1122*b*, and/or 1122*c*) (e.g., image stabilization (e.g., optical and/or digital image stabilization) that compensates for motion of the one or more cameras during exposure/capture (e.g., real-time or post-processing stabilization)) (in some embodiments, the degree of stabilization is the amount of motion (or blurring resulting from motion) that can be compensated for by a given stabilization configuration)), the computer system (e.g., 600) displays (1202), via the display generation component, a video camera capture user interface (e.g., the camera user interface described above in relation to FIGS. 11D-11M) that includes: a representation (1204) (e.g., 630) of the field-of-view of at least a first camera of the one or more cameras (e.g., preview content and/or preview video content), where the representation of the field-of-view is displayed at the first zoom level (e.g., 0.1-10× zoom) (e.g., as indicated by the selected zoom control in 622); and a first selectable control (1206) (e.g., 1122*a*, 1122*b*, and/or 1122*c*) (e.g., to change the degree of stabilization). In some embodiments, the first selectable control is displayed with one or more selecting controls for controlling and/or changing one or more camera settings (e.g., camera capture settings) (e.g., as described above in relation to method 700).

While the computer system (e.g., 600) is configured to capture video media with the first degree of stabilization and while displaying, via the display generation component, the representation (e.g., 630) of the field-of-view at the first zoom level and the first selectable control, the computer system (e.g., 600) detects (1208) an input (e.g., 1150*f*2 and/or 1150*f*3) (e.g., a tap input or, in some embodiments, a non-tap input (e.g., a dragging input, a mouse click, a gaze input, and/or a press-and-hold input)) directed to the first selectable control.

In response to (1210) detecting the input (e.g., 1150*f*2 and/or 1150*f*3) directed to the first selectable control (and/or in response to detecting one or more inputs (e.g., irrespective of whether the first selectable control is displayed) (in some embodiments, the input is a gesture/input, such as a pinch, shake, and or edge swipe gesture, or that causes the computer system to change the zoom level and/or the degree of stabilization; in some embodiments, the input is an air gesture) (e.g., as indicated by 1122*a*, 1122*b*, and/or 1122*c*): configuring (1212) the computer system (e.g., 600) to capture video media with a second degree of stabilization that is different from (e.g., greater than or less than) the first degree of stabilization (e.g., as described above in relation to FIGS. 11F-11K).

In response to (1210) detecting the input (e.g., 1150*f*2 and/or 1150*f*3) directed to the first selectable control (and/or in response to detecting one or more inputs (e.g., irrespective of whether the first selectable control is displayed) (in some embodiments, the input is a gesture/input, such as a pinch, shake, and or edge swipe gesture, that causes the computer system to change the zoom level and/or the degree of stabilization; or in some embodiments, the input is an air gesture) (e.g., as indicated by 1122*a*, 1122*b*, and/or 1122*c*): displaying (1214), via the display generation component, the representation (e.g., 630) of the field-of-view at the second zoom level (e.g., 0.1-10× zoom) that is different from the first zoom level (and/or changing the representation of the field-of-view from the first zoom level to the second zoom level). In some embodiments, displaying, via the display generation component, the representation of the field-of-view of at least the first camera at the second zoom level (e.g., 0.1-10× zoom) that is different from the first zoom level includes transitioning the representation of the field-of-view of at the first camera from being displayed at the first zoom level to being displayed at the second zoom level. Configuring the computer system to capture video media with a second degree of stabilization that is different from the first degree of stabilization in response to detecting the input directed to the first selectable control provides the user with control to change the degree of stabilization used to capture video media, which provides additional control options without cluttering the user interface with additional displayed controls. Displaying, via the display generation component, the representation of the field-of-view at the second zoom level that is different from the first zoom level in response to detecting the input directed to the first selectable control provides visual feedback to the user regarding the change in the degree of stabilization being used to capture video media, which provides improved visual feedback to the user.

In some embodiments, while displaying, via the display generation component, the video capture user interface that includes the representation (e.g., 630) of the field-of-view, detecting a request (e.g., 1150*f*1, 1150*h*, and/or 1150*j*) to capture media. In some embodiments, in response to detecting the request to capture media: in accordance with a determination that the computer system is configured to capture video media with the first degree of stabilization (e.g., and/or was configured to capture video media with the first degree of stabilization when the request to capture media was detected), capturing video media corresponding to the representation of the field-of-view at the first zoom level and with the first degree of stabilization (e.g., as described above in relation to FIGS. 11F-11K). In some embodiments, in response to detecting the request to capture media: in accordance with a determination that the computer system is configured to capture video media with the second degree of stabilization (e.g., and/or was configured to capture video media with the second degree of stabilization when the request to capture media was detected), capturing video media corresponding to the representation of the field-of-view at the second zoom level and with the second degree of stabilization (e.g., as described above in relation to FIGS. 11F-11K). Capturing video media with a different degree of stabilization based on how the computer system is configured allows the computer system to automatically capture video based on a configured stabilization, which performs an operation when a set of conditions has been met without requiring further user input.

In some embodiments, displaying the representation of the field-of-view of at least the first camera at the second zoom level includes displaying, via the display generation component, an animation that transitions the representation of the field-of-view from being displayed at the first zoom level to being displayed at the second zoom level. Displaying an animation that transitions the representation of the field-of-view from being displayed at the first zoom level to being displayed at the second zoom level in response to detecting the input directed to the first selectable control provides visual feedback to the user regarding the change in the degree of stabilization being used to capture video media, which provides improved visual feedback to the user.

In some embodiments, while displaying, via the display generation component, the video capture user interface that includes the representation (e.g., 630) of the field-of-view: in accordance a determination that the computer system is configured to capture video media with the first degree of stabilization, the computer system (e.g., 600) displays, via the display generation component, a first indicator (e.g., 1102*b*1-1102*b*4 (e.g., that changes between FIGS. 11F-11K)) (e.g., without displaying the second indicator). In some embodiments, the first indicator indicates that the computer system is configured to capture video media with the first degree of stabilization. In some embodiments, while displaying, via the display generation component, the video capture user interface that includes the representation (e.g., 630) of the field-of-view: in accordance a determination that the computer system is configured to capture video media with the second degree of stabilization, displaying, via the display generation component, a second indicator (e.g., 1102*b*1-1102*b*4 (e.g., that changes between FIGS. 11F-11K)) that is different from the first indicator (e.g., without displaying the first indicator). In some embodiments, the second indicator indicates that the computer system is configured to capture video media with the second degree of stabilization. Displaying an indicator that indicates that the computer system is configured to capture media with a particular degree of stabilization provides visual feedback to the user regarding the degree of stabilization being used to capture video media, which provides improved visual feedback to the user.

In some embodiments, the first selectable control (e.g., 1122 and/or 1122*a*-1122*c*) is displayed with a first appearance while the computer system is configured to capture video media with the first degree of stabilization. In some embodiments, in response to detecting the input (e.g., 1150*f*2 and/or 1150*f*3) directed to the first selectable control, the computer system (e.g., 600) displays, via the display generation component, the first selectable control with a second appearance (e.g., 1122 and/or 1122*a*-1122*c*) that is different from the first appearance (e.g., without displaying the first selectable control with the first appearance). Displaying the first selectable control with a second appearance that is different from the first appearance in response to detecting the input directed to the first selectable control provides visual feedback to the user regarding that the degree of stabilization being used to capture video media has changed, which provides improved visual feedback to the user.

In some embodiments, in response to detecting the input (e.g., 1150*e*2 and/or 1150*f*6) directed to the first selectable control, the computer system (e.g., 600) displays, via the display generation component, a banner notification (e.g., 1188*a* and/or 1188*b*) (e.g., a notification that is displayed near (e.g., closer to the top than the bottom of the display) the top of the display) that includes an indication that the computer system has been configured to capture media with a different degree of stabilization than the first degree of stabilization (e.g., as described above in relation to FIGS. 11F and 11L). In some embodiments, the banner notification includes an indication of the current and/or updated degree of stabilization (e.g., second degree of stabilization) that the computer system has been configured to update (e.g., in response to detecting the input directed to the first selectable control). In some embodiments, the banner notification ceases to be displayed after a predetermined period of time (e.g., 0.1-5 seconds). In some embodiments, by displaying the banner notification, the computer system informs the user about the degree of stabilization (e.g., about the degree of stabilization changing) in a visually prominent manner (e.g., to get the user's attention). In some embodiments, ceasing to display the banner notification after the predetermined period of time (e.g., automatically) conserves screen real estate (in some embodiments, of the display generation component) and/or reduces obstruction of relevant controls and/or other relevant information (e.g., one or more portions of the representation of the field-of-view of the one or more cameras). In some embodiments, the banner notification includes an indication concerning whether the computer system is configured to operate in a video stabilization mode (e.g., stabilization on and/or stabilization off).

In some embodiments, while the computer system (e.g., 600) is configured to capture video media with the first degree of stabilization, the computer system (e.g., 600) detects a request (e.g., 1150*f*2 and/or 1150*f*3) to increase the degree of stabilization used to capture video media. In some embodiments, in response to detecting the request to increase the degree of stabilization used to capture video media: computer system (e.g., 600) configures the computer system to capture video media with a degree of stabilization that is higher than the first degree of stabilization (e.g., as described above in relation to FIGS. 11H and 11J). In some embodiments, in response to detecting the request to increase the degree of stabilization used to capture video media: computer system (e.g., 600) displays, via the display generation component, the representation (e.g., 630) of the field-of-view at a zoom level that is higher than (e.g., has a higher amount of zoom than) (e.g., reducing the field-of-view of the representation of the field-of-view and/or zooming in) the first zoom level. Configuring the computer system to capture video media with a degree of stabilization that is an increase from the first degree of stabilization and displaying, via the display generation component, the representation of the field-of-view at a zoom level that is higher than the first zoom level in response to detecting the request to increase stabilization of video media provides visual feedback to the user regarding that the degree of stabilization being used to capture video media has changed and provides the user with control to increase the degree of stabilization, which provides additional control options without cluttering the user interface with additional displayed controls and performs an operation when a set of conditions has been met without requiring further user input.

In some embodiments, while the computer system (e.g., 600) is configured to capture video media with the first degree of stabilization, the computer system (e.g., 600) detects a request (e.g., as described above in relation to FIGS. 11H-11J) to decrease the degree of stabilization used to capture video media. In some embodiments, in response to detecting the request to decrease the degree of stabilization used to capture video media: computer system (e.g., 600) configures the computer system to capture video media with a degree of stabilization that is lower than the first degree of stabilization (e.g., as described above in relation to FIGS. 11H and 11J). In some embodiments, in response to detecting the request to decrease the degree of stabilization used to capture video media: computer system (e.g., 600) displays, via the display generation component, the representation (e.g., 630) of the field-of-view at a zoom level that is lower than (e.g., has a lower amount of zoom, has an increased FOV, and/or is zoomed out) the first zoom level. Configuring the computer system to capture video media with a degree of stabilization that is a decrease from the first degree of stabilization and displaying, via the display generation component, the representation of the field-of-view at a zoom level that is lower than the first zoom level in response to detecting the request to decrease stabilization of video media provides visual feedback to the user regarding that the degree of stabilization being used to capture video media has changed and provides the user with control to decrease the degree of stabilization, which provides additional control options without cluttering the user interface with additional displayed controls and performs an operation when a set of conditions has been met without requiring further user input.

In some embodiments, the first selectable control (e.g., 1122) is overlaid on the representation (e.g., 630) of the field-of-view. Displaying the first selectable control overlaid on the representation of the field-of-view provides the user with feedback that the first selectable can be used without further cluttering the user interface.

In some embodiments, the first selectable control (e.g., 1122 and/or 1122*a*-1122*c*) is concurrently displayed with one or more video capture controls (e.g., 620) (e.g., a focus setting (e.g., that configures to the camera to focus at a particular location and/or at a particular plane in the field-of-view of the one or more cameras), exposure time, exposure compensation, one or more media characteristic settings (e.g., tone and/or warmth), a timer setting (e.g., a setting that configures computer system to delay the time at which an image is captured), an aspect ratio setting, a shutter speed setting, filter effects, and/or f-stop)). Displaying the first selectable control concurrently with the one or more video capture controls provides the user with multiple controls to control the capture of video media and the first selectable control, which provides additional control options without cluttering the user interface with additional displayed controls.

In some embodiments, the first selectable control (e.g., 1122 and/or 1122*a*-1122*c*) is concurrently displayed with a shutter control (e.g., 610) (e.g., a virtual control, a non-physical control, and/or a user interface object and/or element). In some embodiments, while displaying the shutter control (e.g., concurrently with the first selectable control), the computer system (e.g., 600) detects an input (e.g., 1150*f*1, 1150*h*, and/or 1150*j*) (e.g., a tap input or, in some embodiments, a non-tap input (e.g., a dragging input, a mouse click, a gaze input, and/or a press-and-hold input)) directed to the shutter control. In some embodiments, in response to detecting the input directed to the shutter control, the computer system (e.g., 600) initiates the capture of media (e.g., a photo or video) that corresponds to the field-of-view of at least the first camera of the one or more cameras (e.g., as discussed above in relation to FIGS. 11F-11K). Displaying the first selectable control concurrently with the shutter control provides the user with the shutter control and the first selectable control, which provides additional control options without cluttering the user interface with additional displayed controls.

In some embodiments, the video camera capture user interface includes a stabilization option control (e.g., 1102*b*). In some embodiments, before displaying the first selectable control and while displaying the stabilization option control, the computer system (e.g., 600) detects an input (e.g., 1150*d*2) (e.g., a tap input or, in some embodiments, a non-tap input (e.g., a dragging input, a mouse click, a gaze input, and/or a press-and-hold input)) directed to the stabilization control. In some embodiments, the first selectable control is displayed in the video camera capture interface in response to detecting the input directed to the stabilization option control. Displaying, via the display generation component, the first selectable control in response to detecting the input directed to the stabilization control gives the user control to display the first selectable control, which provides additional control options without cluttering the user interface with additional displayed controls.

In some embodiments, the first selectable control (e.g., 1122) is in a group of selectable stabilization controls (e.g., 1122*a*-1122*c*) that correspond to different levels of video stabilization (e.g., that are different from the video stabilization that corresponds to the first selectable control). In some embodiments, the group of selectable stabilization controls includes a selectable control that corresponds to a third degree of stabilization. In some embodiments, in response to detecting an input directed to the selectable control that corresponds to a third degree of stabilization, the computer system uses the third degree of stabilization to capture media (e.g., a degree of stabilization that is different from the first degree of stabilization and the second degree of stabilization). Displaying the first selectable control is in a group of selectable controls that correspond to different levels of video stabilization provides the user with control to change the degree of stabilization used by the computer system, which provides additional control options without cluttering the user interface with additional displayed controls.

In some embodiments, the group of selectable controls (e.g., 1122) includes a third selectable control (e.g., 1122*a*-1122*c*) that corresponds to a third degree of stabilization that is greater than the second degree of stabilization and a fourth selectable control (e.g., 1122*a*-1122*c*) that corresponds to a fourth degree of stabilization that is less than the second degree of stabilization. In some embodiments, the third selectable control and the fourth selectable control are concurrently displayed. In some embodiments, while displaying the group of selectable controls that includes the third selectable control and the fourth selectable control, the computer system (e.g., 600) detects an input (e.g., 1150*f*1, 1150*h*, and/or 1150*j*) (e.g., a tap input or, in some embodiments, a non-tap input (e.g., a dragging input, a mouse click, a gaze input, and/or a press-and-hold input)) directed to the group of selectable controls. In some embodiments, in response to detecting the input directed to the group of selectable controls: in accordance with a determination that the input is directed to the third selectable control, the computer system (e.g., 600) configures the computer system to capture video media with the third degree of stabilization (e.g., as discussed above in relation to FIGS. 11F-11K). In some embodiments, in accordance with a determination that the input is directed to the third selectable control, the computer system displays, via the display generation component, the representation of the field-of-view of at a third zoom level (e.g., 0.1-10× zoom) is greater than the second zoom level. In some embodiments, in response to detecting the input directed to the group of selectable controls: in accordance with a determination that the input is directed to the fourth selectable control, the computer system (e.g., 600) configures the computer system to capture video media with the fourth degree of stabilization (e.g., as discussed above in relation to FIGS. 11F-11K). In some embodiments, in accordance with a determination that the input is directed to the fourth selectable control, the computer system displays, via the display generation component, the representation of the field-of-view of at a fourth zoom level (e.g., 0.1-10× zoom) is less than the second zoom level. Configuring the computer system to capture video media with a degree of stabilization based on user input a particular degree of stabilization based on prescribed conditions in response to detecting the input directed to the group of selectable controls provides the user with control the degree of stabilization used by the computer system, which provides additional control options without cluttering the user interface with additional displayed controls.

In some embodiments, while the computer system is configured to capture video media with the second degree of stabilization, the computer system (e.g., 600) detects a request (e.g., 610) to capture media. In some embodiments, in response to detecting the request to capture media, the computer system (e.g., 600) captures a first portion of media with the second degree of stabilization. In some embodiments, while capturing a first portion of the media with the second degree of stabilization, the computer system (e.g., 600) detects movement of the computer system (e.g., as discussed above in relation to FIGS. 11F-11K). In some embodiments, in response to detecting movement (e.g., lateral movement, rotational movement, and/or shakiness) of the computer system (and while continuing to capture the media): in accordance with a determination that the detected movement of the computer system meets a threshold level of movement (e.g., an amount of shakiness, lateral movement, and/or rotational movement) (e.g., 0.1-5 m/s), the computer system (e.g., 600) captures a second portion (e.g., a second portion of the media that occurs after the first portion of the media) of the media with a fifth degree of stabilization that is different from the second degree of stabilization (e.g., as discussed above in relation to FIGS. 11F-11K). In some embodiments, in response to detecting movement (e.g., lateral movement, rotational movement, and/or shakiness) of the computer system (and while continuing to capture the media): in accordance with a determination that the detected movement of the computer system does not meet the threshold level of movement, the computer system (e.g., 600) captures the second portion of the media with the second degree of stabilization (e.g., as discussed above in relation to FIGS. 11F-11K). In some embodiments, in accordance with a determination that the detected movement of the computer system meets a threshold level of movement, where the movement of the computer system is above a higher threshold level of movement, the fifth degree of stabilization is higher than the first degree of stabilization. In some embodiments, in accordance with a determination that the detected movement of the computer system meets a threshold level of movement, where the movement of the computer system is below a lower threshold level of movement, the fifth degree of stabilization is lower than the first degree of stabilization. Capturing the second portion of the media using a different degree of stabilization in response to detecting movement of the computer system when prescribed conditions are met allows the computer system to change the degree of stabilization based on the movement of the computer system based on the movement of the computer system, which performs an operation when a set of conditions has been met without requiring further user input.

In some embodiments, while a stabilization setting is enabled, the computer system (e.g., 600) displays, via the display generation component, an indication (e.g., 1102*b*1-1102*b*4 and/or 1124*a*-1124*c*) that indicates that the stabilization setting is enabled. In some embodiments, the indication that indicates that the stabilization setting is enabled is different from the first selectable control (e.g., 1122). Displaying an indication that indicates that the stabilization setting is enabled provides feedback to the user concerning whether the computer system is configured to apply a degree of stabilization outside of a normal degree of stabilization that is applied, which provides improved visual feedback to the user.

In some embodiments, the video capture user interface is displayed while the computer system is operating in a first video capture mode (e.g., as indicated by 620*b* being selected) e.g., video, photo/still, portrait, slow-motion, cinematic, and/or panoramic modes). In some embodiments, while operating in the first video capture mode and displaying the video camera capture user interface that includes the first selectable control, the computer system (e.g., 600) detects a request to operate in a second video capture mode that is different from the first video capture mode. In some embodiments, the first mode is a first video capture mode (e.g., a video capture mode and/or a cinematic capture mode) and the second mode is a second video capture mode (e.g., as indicated by 620*b* being selected) (e.g., a video capture mode and/or a cinematic capture mode) that is different from the first video capture mode. In some embodiments, in response to detecting the request to operate in the second mode, the computer system (e.g., 600) displays, via the display generation component, a second video capture user interface that includes the first selectable control (e.g., as described in relation to FIG. 11L). In some embodiments, the second video capture user interface is different from the video capture user interface. Displaying the first selectable control in multiple different capture user interface provides the user with control to change the degree of stabilization while operating in different modes, which provides additional control options without cluttering the user interface with additional displayed controls.

In some embodiments, the video capture user interface is displayed while the computer system is operating in a third mode (e.g., as indicated by 620*b* being selected) (e.g., a video mode and/or a cinematic mode). In some embodiments, while operating in the third mode and displaying the video camera capture user interface that includes the first selectable control (e.g., 1122 and/or 1102*b*), the computer system (e.g., 600) detects a request to operate in a fourth mode (e.g., as indicated by 620*c* being selected) that is different from the third mode. In some embodiments, the third mode is a video capture mode, and the fourth mode is a non-video capture mode (e.g., panorama, portrait, or still photo mode). In some embodiments, in response to detecting the request to operate in the fourth mode, the computer system (e.g., 600) displays, via the display generation component, a non-video capture user interface that does not include the first selectable control (e.g., as described above in relation to FIG. 11M). Displaying, via the display generation component, a non-video capture user interface that does not include the first selectable control in response to detecting the request to operate in the fourth mode provides the user with feedback that the computer system cannot be configured to change the degree of stabilization while operating in the fourth mode, which provides improved visual feedback to the user.\

Note that details of the processes described above with respect to method 1200 (e.g., FIG. 12 are also applicable in an analogous manner to the methods described herein. For example, method 1200 optionally includes one or more of the characteristics of the various methods described above with reference to method 900. For example, the zoom controls discussed in relation to method 900 can be used to captured media with stabilization using the techniques discussed in relation to method 1200. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve media capture by managing camera characteristics. The present disclosure contemplates that in some instances, this gathered data may include personal information data that uniquely identifies or can be used to contact or locate a specific person. Such personal information data can include demographic data, location-based data, telephone numbers, email addresses, social network IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to manage media capture by automatically managing camera characteristics based on environmental conditions. Accordingly, use of such personal information data enables users to have calculated control over captured media. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of managing cameras, the present technology can be configured to allow users to select to "opt in" or "opt out" of participation in the collection of personal information data during registration for services or anytime thereafter. In another example, users can select not to provided data associated with captured media to one of more services. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, media can be captured with camera settings that are based on inferred preferences based on non-personal information data or a bare minimum amount of personal information, such as the content being requested by the device associated with a user, other non-personal information available to media capture management applications, or publicly available information.

The invention claimed is:

1. A computer system configured to communicate with one or more cameras, comprising:

one or more processors; and memory storing one or more programs configured to be executed by the one or more processors, the one or more programs including instructions for:

detecting a request to capture visual media at a respective zoom level; and in response to detecting the request to capture visual media, initiating capture of visual media via the one or more cameras at the respective zoom level, including combining multiple frames taken at different times into a composite visual media item:

in accordance with a determination that a device setting is in a first state and a first set of environmental lighting conditions that affect media capture are detected, generating visual captured media at the respective zoom level that is a first composite visual media item that has a first resolution;

in accordance with a determination that the device setting is in the first state and a second set of environmental lighting conditions that affect media capture are detected, wherein the second set of environmental lighting conditions is different from the first set of environmental lighting conditions, generating visual captured media at the respective zoom level that is a second composite visual media item that has a second resolution that is different from the first resolution; and in accordance with a determination that the device setting is in a second state that is different from the first state, generating visual captured media at the respective zoom level that is a third composite visual media item that has the first resolution that is different from the second resolution without regard to whether the first set of environmental lighting conditions that affect media capture are detected or the second set of environmental lighting conditions that affect media capture are detected.

2. The computer system of claim 1, wherein the first set of environmental lighting conditions includes a lighting condition that is based on an amount of light in a field-of-view of the one or more cameras.

3. The computer system of claim 1, wherein the first set of environmental lighting conditions includes a condition that is detected based on whether a flash is enabled for media capture.

4. The computer system of claim 1, wherein the first set of environmental lighting conditions and the second set of environmental lighting conditions do not include a condition that is dependent on a user-configurable resolution setting.

5. The computer system of claim 1, wherein the second resolution is more than fifty percent higher than the first resolution.

6. The computer system of claim 1, wherein:

generating visual captured media at the respective zoom level that is the first composite visual media item that has the first resolution includes generating visual media that has a respective field-of-view of the one or more cameras; and generating visual captured media at the respective zoom level that is the second composite visual media item that has the second resolution includes generating visual media that has the respective field-of-view of the one or more cameras.

7. The computer system of claim 1, wherein:

generating visual captured media at the respective zoom level that is the first composite visual media item that has the first resolution includes generating visual media using one or more capture settings that are in a respective state; and generating visual captured media at the respective zoom level that is the second composite visual media item that has the second resolution includes generating visual media using the one or more capture settings that are in the respective state.

8. The computer system of claim 1, wherein the second resolution is a resolution that is less than a maximum resolution that is available for generating visual media captured using the one or more cameras.

9. The computer system of claim 1, wherein:

in accordance with a determination that a first user-configurable setting is in a first state, the second resolution is a third resolution; and in accordance with a determination that the first user-configurable setting is in a second state that is different from the first state, the second resolution is a fourth resolution that is lower than the third resolution.

10. The computer system of claim 1, wherein the first set of environmental lighting conditions includes a condition that is detected when a user-configurable setting to capture media at the first resolution is set.

11. The computer system of claim 1, wherein the first resolution is a resolution that is used for capturing video media.

12. The computer system of claim 1, wherein:

the one or more cameras include a fixed focal length camera;

initiating capture of the visual media via the one or more cameras includes initiating capture of the visual media via the fixed focal length camera;

the first resolution is a native resolution of the fixed focal length camera; and the second resolution is not the native resolution of the fixed focal length camera.

13. A non-transitory computer-readable storage medium storing one or more programs configured to be executed by one or more processors of a computer system in communication with one or more cameras, the one or more programs including instructions for:

detecting a request to capture visual media at a respective zoom level; and in response to detecting the request to capture visual media, initiating capture of visual media via the one or more cameras at the respective zoom level, including combining multiple frames taken at different times into a composite visual media item:

in accordance with a determination that a device setting is in a first state and a first set of environmental lighting conditions that affect media capture are detected, generating visual captured media at the respective zoom level is a first composite visual media item that that has a first resolution;

in accordance with a determination that the device setting is in the first state and a second set of environmental lighting conditions that affect media capture are detected, wherein the second set of environmental lighting conditions is different from the first set of environmental lighting conditions, generating visual captured media at the respective zoom level that is a second composite visual media item that has a second resolution that is different from the first resolution; and in accordance with a determination that the device setting is in a second state that is different from the first state, generating visual captured media at the respective zoom level that that is a third composite visual media item has the first resolution that is different from the second resolution without regard to whether the first set of environmental lighting conditions that affect media capture are detected or the second set of environmental lighting conditions that affect media capture are detected.

14. The non-transitory computer-readable storage medium of claim 13, wherein the first set of environmental lighting conditions includes a lighting condition that is based on an amount of light in a field-of-view of the one or more cameras.

15. The non-transitory computer-readable storage medium of claim 13, wherein the first set of environmental lighting conditions includes a condition that is detected based on whether a flash is enabled for media capture.

16. The non-transitory computer-readable storage medium of claim 13, wherein the first set of environmental lighting conditions and the second set of environmental lighting conditions do not include a condition that is dependent on a user-configurable resolution setting.

17. The non-transitory computer-readable storage medium of claim 13, wherein the second resolution is more than fifty percent higher than the first resolution.

18. The non-transitory computer-readable storage medium of claim 13, wherein:

generating visual captured media at the respective zoom level that is the second composite visual media item that has the first resolution includes generating visual media that has a respective field-of-view of the one or more cameras; and generating visual captured media at the respective zoom level that is the second composite visual media item that has the second resolution includes generating visual media that has the respective field-of-view of the one or more cameras.

19. The non-transitory computer-readable storage medium of claim 13, wherein:

generating visual captured media at the respective zoom level that is the first composite visual media item that has the first resolution includes generating visual media using one or more capture settings that are in a respective state; and generating visual captured media at the respective zoom level that is the second composite visual item that has the second resolution includes generating visual media using the one or more capture settings that are in the respective state.

20. The non-transitory computer-readable storage medium of claim 13, wherein the second resolution is a resolution that is less than a maximum resolution that is available for generating visual media captured using the one or more cameras.

21. The non-transitory computer-readable storage medium of claim 13, wherein:

in accordance with a determination that a first user-configurable setting is in a first state, the second resolution is a third resolution; and in accordance with a determination that the first user-configurable setting is in a second state that is different from the first state, the second resolution is a fourth resolution that is lower than the third resolution.

22. The non-transitory computer-readable storage medium of claim 13, wherein the first set of environmental lighting conditions includes a condition that is detected when a user-configurable setting to capture media at the first resolution is set.

23. The non-transitory computer-readable storage medium of claim 13, wherein the first resolution is a resolution that is used for capturing video media.

24. The non-transitory computer-readable storage medium of claim 13, wherein:

the one or more cameras include a fixed focal length camera;

initiating capture of the visual media via the one or more cameras includes initiating capture of the visual media via the fixed focal length camera;

the first resolution is a native resolution of the fixed focal length camera; and the second resolution is not the native resolution of the fixed focal length camera.

25. A method, comprising:

at a computer system in communication with one or more cameras:

detecting a request to capture visual media at a respective zoom level; and in response to detecting the request to capture visual media, initiating capture of visual media via the one or more cameras at the respective zoom level, including combining multiple frames taken at different times into a composite visual media item:

in accordance with a determination that a device setting is in a first state and a first set of environmental lighting conditions that affect media capture are detected, generating visual captured media at the respective zoom level that is a first composite visual media item that has a first resolution;

in accordance with a determination that the device setting is in the first state and a second set of environmental lighting conditions that affect media capture are detected, wherein the second set of environmental lighting conditions is different from the first set of environmental lighting conditions, generating visual captured media at the respective zoom level that is a second composite visual media item that has a second resolution that is different from the first resolution; and in accordance with a determination that the device setting is in a second state that is different from the first state, generating visual captured media at the respective zoom level that is a third composite visual media item that has the first resolution that is different from the second resolution without regard to whether the first set of environmental lighting conditions that affect media capture are detected or the second set of environmental lighting conditions that affect media capture are detected.

26. The method of claim 25, wherein the first set of environmental lighting conditions includes a lighting condition that is based on an amount of light in a field-of-view of the one or more cameras.

27. The method of claim 25, wherein the first set of environmental lighting conditions includes a condition that is detected based on whether a flash is enabled for media capture.

28. The method of claim 25, wherein the first set of environmental lighting conditions and the second set of environmental lighting conditions do not include a condition that is dependent on a user-configurable resolution setting.

29. The method of claim 25, wherein the second resolution is more than fifty percent higher than the first resolution.

30. The method of claim 25, wherein:

generating visual captured media at the respective zoom level that is the first composite visual media item that has the first resolution includes generating visual media that has a respective field-of-view of the one or more cameras; and generating visual captured media at the respective zoom level that is the second composite visual media item that has the second resolution includes generating visual media that has the respective field-of-view of the one or more cameras.

31. The method of claim 25, wherein:

generating visual captured media at the respective zoom level that is the first composite visual media item that has the first resolution includes generating visual media using one or more capture settings that are in a respective state; and generating visual captured media at the respective zoom level that is the second composite visual media item that has the second resolution includes generating visual media using the one or more capture settings that are in the respective state.

32. The method of claim 25, wherein the second resolution is a resolution that is less than a maximum resolution that is available for generating visual media captured using the one or more cameras.

33. The method of claim 25, wherein:

in accordance with a determination that a first user-configurable setting is in a first state, the second resolution is a third resolution; and in accordance with a determination that the first user-configurable setting is in a second state that is different from the first state, the second resolution is a fourth resolution that is lower than the third resolution.

34. The method of claim 25, wherein the first set of environmental lighting conditions includes a condition that is detected when a user-configurable setting to capture media at the first resolution is set.

35. The method of claim 25, wherein the first resolution is a resolution that is used for capturing video media.

36. The method of claim 25, wherein:

the one or more cameras include a fixed focal length camera;

initiating capture of the visual media via the one or more cameras includes initiating capture of the visual media via the fixed focal length camera;

the first resolution is a native resolution of the fixed focal length camera; and the second resolution is not the native resolution of the fixed focal length camera.

* * * * *